(12) United States Patent
Ip et al.

(10) Patent No.: US 12,460,263 B2
(45) Date of Patent: Nov. 4, 2025

(54) GENETIC VARIANTS FOR DIAGNOSIS OF ALZHEIMER'S DISEASE

(71) Applicant: The Hong Kong University of Science and Technology, Kowloon (CN)

(72) Inventors: Nancy Yuk-Yu Ip, Hong Kong (CN); Kit Yu Fu, Hong Kong (CN); Xiaopu Zhou, Chongqing (CN); Yuanbing Jiang, Sichuan (CN); Yu Chen, Hong Kong (CN); Fanny Chui Fun Ip, Hong Kong (CN)

(73) Assignee: The Hong Kong University of Science and Technology, Kowloon (HK)

( * ) Notice: Subject to any disclaimer, the term of this patent is extended or adjusted under 35 U.S.C. 154(b) by 901 days.

(21) Appl. No.: 17/639,065

(22) PCT Filed: Aug. 25, 2020

(86) PCT No.: PCT/CN2020/111095
§ 371 (c)(1),
(2) Date: Feb. 28, 2022

(87) PCT Pub. No.: WO2021/037027
PCT Pub. Date: Mar. 4, 2021

(65) Prior Publication Data
US 2022/0325347 A1  Oct. 13, 2022

Related U.S. Application Data

(60) Provisional application No. 62/893,502, filed on Aug. 29, 2019.

(51) Int. Cl.
| | | |
|---|---|---|
| *C12Q 1/6883* | (2018.01) | |
| *A61K 31/496* | (2006.01) | |
| *A61K 45/06* | (2006.01) | |
| *A61P 25/28* | (2006.01) | |
| *G01N 33/68* | (2006.01) | |
| *C12Q 1/6869* | (2018.01) | |

(52) U.S. Cl.
CPC .......... *C12Q 1/6883* (2013.01); *A61K 31/496* (2013.01); *A61K 45/06* (2013.01); *A61P 25/28* (2018.01); *G01N 33/6896* (2013.01); *C12Q 1/6869* (2013.01); *C12Q 2600/156* (2013.01); *G01N 2800/2821* (2013.01)

(58) Field of Classification Search
None
See application file for complete search history.

(56) References Cited

U.S. PATENT DOCUMENTS

| | | | |
|---|---|---|---|
| 11,725,232 B2 * | 8/2023 | Chu Ip ................. | C12Q 1/6827 424/94.1 |
| 2011/0200564 A1 | 8/2011 | Tanzi et al. | |
| 2016/0168640 A1 * | 6/2016 | Khosla ...................... | A61P 1/04 506/2 |
| 2024/0376452 A1 * | 11/2024 | Ip .............................. | C12N 9/22 |
| 2025/0135034 A1 * | 5/2025 | Ip ........................ | C07K 14/4711 |

FOREIGN PATENT DOCUMENTS

| | | |
|---|---|---|
| CN | 105525002 A | 4/2016 |
| CN | 109234385 A | 1/2019 |
| WO | 2009/137475 A2 | 11/2009 |
| WO | 2018/077303 A1 | 5/2018 |
| WO | 2018/212427 A1 | 11/2018 |

OTHER PUBLICATIONS

Ashford, J. Treatment of Alzheimer's Disease: Trazodone, Sleep, Serotonin, Norepinephrine, and Future Directions. J Alzheimers Dis. Feb. 12, 2019;67(3):923-930 (Year: 2019).*
International Search Report and Written Opinion for PCT Patent Application No. PCT/CN2020/111095, dated Dec. 23, 2020, 10 pages.

* cited by examiner

*Primary Examiner* — Clinton A Brooks
*Assistant Examiner* — Nicola Maria Bauer
(74) *Attorney, Agent, or Firm* — Kilpatrick Townsend & Stockton LLP

(57) ABSTRACT

The present invention provides genetic markers associated with the Alzheimer's Disease (AD), diagnostic and treatment methods for AD, and kits for diagnosing AD.

18 Claims, 15 Drawing Sheets
Specification includes a Sequence Listing.

Figure 12. AD-risk prediction in female APOE-ε4 carriers

GENETIC VARIANTS FOR DIAGNOSIS OF ALZHEIMER'S DISEASE

RELATED APPLICATIONS

This application is a 371 U.S. national phase application of PCT Application No. PCT/CN2020/111095, filed Aug. 25, 2020, which claims priority to U.S. Provisional Patent Application No. 62/893,502, filed Aug. 29, 2019, the contents of which are hereby incorporated by reference in the entirety for all purposes.

SEQUENCE LISTING

A Sequence Listing conforming to the rules of WIPO Standard ST.25 is herebyincorporated by reference. Said Sequence Listing has been filed as an electronic document via PatentCenter in ASCII formatted text. The electronic document, created on Jul. 23, 2025, is entitled "091256-1288668-001910US ST25.txt", and is 187,789 bytes in size.

BACKGROUND OF THE INVENTION

Brain diseases such as neurodegenerative diseases and neuroinflammatory disorders are devastating conditions that affect a large subset of the population. Many are incurable, highly debilitating, and often result in progressive deterioration of brain structure and function over time. Disease prevalence is also increasing rapidly due to growing aging populations worldwide, since the elderly are at high risk for developing these conditions. Currently, many neurodegenerative diseases and neuroinflammatory disorders are difficult to diagnose due to limited understanding of the pathophysiology of these diseases. Meanwhile, current treatments are ineffective and do not meet market demand; demand that is significantly increasing each year due to aging populations. For example, Alzheimer's disease (AD) is marked by gradual but progressive decline in learning and memory, and a leading cause of mortality in the elderly. Increasing prevalence of AD is driving the need and demand for better diagnostics. According to Alzheimer's Disease International, the disease currently affects 46.8 million people globally, but the number of cases is projected to triple in the coming three decades. One of the countries with the fastest elderly population growth is China. Based on population projections, by 2030 1 in 4 individuals will be over the age of 60, which will place a vast proportion at risk of developing AD. In fact, the number of AD cases in China doubled from 3.7 million to 9.2 million from 1990-2010, and the country is projected to have 22.5 million cases by 2050. Hong Kong's population is also aging quickly. In 2012, the number of seniors aged 65+ made up 14.9% of the population. It is estimated that the elderly will make up 24% of the population by 2025, and 39.3% of the population by 2050. There were 103,433 cases of AD in 2009, but this number is projected to increase to 332,688 by 2039.

More worrisome is that, despite the increase in AD prevalence, many people fail to receive a correct AD diagnosis. According to Alzheimer's Disease International's World Alzheimer' Report 2015, in high-income countries only 20-50% of dementia cases are documented in primary care. The rest remain undiagnosed or incorrectly diagnosed. This 'treatment gap' is much more significant in low- and middle-income countries. Without a formal diagnosis, patients do not receive the treatment and care they need, nor do they or their care-givers qualify for critical support programs. Early diagnosis and early intervention are two important means of narrowing the treatment gap. Thus, early diagnostic tools that can determine disease risk both quickly and accurately have significant therapeutic value on many levels. Research has confirmed that AD affects the brain long before actual symptoms of memory loss or cognitive decline actually manifest. To this date, however, there are no diagnostic tools for early detection; by the time a patient is diagnosed with AD using methods currently available, which involves subjective clinical assessment, often the pathological symptoms are already at an advanced state. As such, for the purpose of improving AD treatment and long term management, there exists an urgent need for developing new and effective methods for early diagnosis of AD or for detecting an increased risk of developing AD in a patient at a later time. This invention addresses this and other related needs. The invention discloses compositions, methods, and kits related to the use of genetic variants or their combination, to assess individual risk of developing Alzheimer's disease (AD). Diseases such as AD may be associated with one or more genetic variations, where the presence of a genetic variation may increase the risk of developing AD or is indicative of AD, thus enabling genetic analysis as a tool for disease prediction.

Specifically, the inventors have determined that elevated soluble ST2 protein (sST2) in the plasma and cerebral spinal fluid (CSF), in conjunction with the presence of specific novel variants associated with sST2 protein in plasma, are associated with increased AD risk in Chinese populations. Moreover, the inventors have demonstrated that ST2 transcripts, eosinophil counts, and associated marker gene expression are altered in blood of AD patients. The inventors have further identified medication that can reduce plasma sST2 levels, which may be able to alleviate AD in clinical practice.

By leveraging these findings, the inventors have developed novel methods to determine if a subject has AD or is at increased risk of developing the disease by means of detecting specific variants in individuals' genomic DNA sequences. A polygenic risk scoring system based on genomic information, further optimized by including information on blood cell counts and plasma protein levels, has also been developed to predict the relative risk of AD. Taken together, this invention provides a significant breakthrough for clinical screening (e.g., diagnosis, prognosis) of the disease.

BRIEF SUMMARY OF THE INVENTION

The invention relates to the discovery of novel genetic variants associated with the Alzheimer's Disease (AD). The invention thus provides methods and compositions useful for diagnosis or treating AD. Thus, in a first aspect, the present invention provides a method for detecting the presence of AD in a subject or an increased risk of developing AD at a later time by detecting in a biological sample taken from the subject the presence of one or more of the genetic variants in Table 3, for example, at least 5, 10, 15, 20, or 25 or more of the genetic variants in Table 3. In some embodiments, the subject is a Chinese, for example, a Hong Kong Chinese or mainland Chinese. In some embodiments, the subject has a family history of AD but does not exhibit symptoms of AD. In some embodiments, the subject has no family history of AD. In some embodiments, the sample is a blood sample, such as a whole blood sample or a sample of blood cells. In some embodiments, the sample contains cells or tissues from any part of the patient's body, such as saliva, oral swab, sweat, or urine. In some embodiments, the detecting step comprises an amplification reaction to amplify the genetic variant(s), such as polymerase chain reaction (PCR) including reverse transcription PCR (RT-PCR). In some embodiments, the detecting step comprises a hybridization-based method or a sequencing-based method. In some embodiments, the genetic variants comprise or consist of rs1921622, rs75687525, rs4499395, rs56238602, rs2140316, rs12052753, rs199977663, rs2141304, rs4103380, rs4703514, rs191531802, rs2300619, rs1229502, rs9886235, rs6587006, rs7047059, rs5006678, rs7849649, rs1907370, rs11615704, rs66994203, rs117523785, rs17641976, rs7208104, rs12600563, rs142226688, rs111246464, rs4583526, and rs56242654, or any combinations thereof. In some embodiments, the variants comprise or consist of rs1921622 and rs12052753. In some embodiments, the claimed method further comprises the step of determining the subject's APOE genotype or haplotype. In some embodiments, the claimed method further comprises the step of determining eosinophil count in a blood sample. In some embodiments, the method further comprises the step of determining sST2, full length ST2, or CCR3 expression level in a blood sample. In some embodiments, the expression level is protein level. In some embodiments, wherein the step of determining sST2 or CCR3 expression level comprises an immunoassay or mass spectrometry. In other embodiments, the expression level is mRNA level. wherein the step of determining sST2, full length ST2, or CCR3 expression level comprises a reverse transcription polymerase chain reaction (RT-PCR), in situ hybridization, or a sequencing-based method. In some embodiments, the claimed method further comprises a step of calculating a Polygenic Risk Score (PRS) as the sum of effect size-weighted ($\beta i$) genotype dosage of corresponding variants on sST2 level in the sample, wherein n is the number of genetic variants tested: PRS=$\beta 1$ snp1+$\beta 2$snp2+ . . . +$\beta n$snpn. In some embodiments, the number of genetic variants tested is 29. In some embodiments, the method is applied to determine the subject with a PRS no greater than 0 as not having AD or not having increased risk for AD and the subject with a PRS greater than 0 as having AD or having increased risk for AD. In some embodiments, the method further comprises a step of administering to the subject an agent effective for treating AD upon determining the subject as having AD or having an increased risk of developing AD. In some embodiments, the agent is trazodone.

In a second aspect, the invention provides a method for treating or reducing the risk of AD in a subject by administering to the subject a composition comprising (1) an effective amount of trazodone and (2) a pharmaceutically acceptable excipient. In some embodiments, the method further includes a step of administering to the subject an effective amount of a second therapeutically active agent for AD. In some embodiments, the composition being administered to the patient is formulated for subcutaneous, transdermal, intramuscular, intravenous, intraperitoneal, intracranial injection, topical, nasal, or oral administration. In some embodiments, the treatment method comprises these steps: (a) selecting a subject who has been determined as having AD or having increased risk for AD, according to any of the methods disclosed above or herein for detecting AD or an increased risk for later developing AD; and (b) administering to the subject a composition comprising an effective amount of trazodone and a pharmaceutically acceptable excipient.

In a third aspect, the invention provides a medicament for treating or reducing the risk of AD in a subject. The medicament comprises (1) an effective amount of trazodone; and (2) a pharmaceutically acceptable excipient. In some embodiments, the medicament further comprises a second therapeutically active agent for AD. In some embodiments, the medicament is formulated for subcutaneous, transdermal, intramuscular, intravenous, intraperitoneal, intracranial injection, topical, nasal, or oral administration.

In a four aspect, the present invention provides a kit for detecting the presence of Alzheimer's Disease (AD) or an increased risk of developing AD in a subject. The kit typically includes a set of oligonucleotide primers suitable for amplifying a genomic DNA sequence harboring at least one of the genetic variants in Table 3. The kit optionally also includes an agent capable of specifically identifying the at least one genetic variant. In some embodiments, the kit further comprises a primer suitable for directing reverse transcription of an mRNA transcribed from the genomic DNA seqeunce. In some embodiments, the kit further comprises an instruction manual for detecting the presence of AD or an increased risk of developing AD.

Definitions

The term "nucleic acid" or "polynucleotide" refers to deoxyribonucleic acids (DNA) or ribonucleic acids (RNA) and polymers thereof in either single- or double-stranded form. Unless specifically limited, the term encompasses nucleic acids containing known analogues of natural nucleotides that have similar binding properties as the reference nucleic acid and are metabolized in a manner similar to naturally occurring nucleotides. Unless otherwise indicated, a particular nucleic acid sequence also implicitly encompasses conservatively modified variants thereof (e.g., degenerate codon substitutions), alleles, orthologs, SNPs, and complementary sequences as well as the sequence explicitly indicated. Specifically, degenerate codon substitutions may be achieved by generating sequences in which the third position of one or more selected (or all) codons is substituted with mixed-base and/or deoxyinosine residues (Batzer et al., *Nucleic Acid Res.* 19:5081 (1991); Ohtsuka et al., *J. Biol. Chem.* 260:2605-2608 (1985); and Rossolini et al., *Mol. Cell. Probes* 8:91-98 (1994)). The term nucleic acid is used interchangeably with gene, cDNA, and mRNA encoded by a gene.

The term "gene" means the segment of DNA involved in producing a polypeptide chain. It may include regions preceding and following the coding region (leader and trailer) as well as intervening sequences (introns) between individual coding segments (exons).

The term "amino acid" refers to naturally occurring and synthetic amino acids, as well as amino acid analogs and amino acid mimetics that function in a manner similar to the naturally occurring amino acids. Naturally occurring amino acids are those encoded by the genetic code, as well as those amino acids that are later modified, e.g., hydroxyproline, γ-carboxyglutamate, and O-phosphoserine. Amino acid analogs refers to compounds that have the same basic chemical structure as a naturally occurring amino acid, i.e., an a carbon that is bound to a hydrogen, a carboxyl group, an amino group, and an R group, e.g., homoserine, norleucine, methionine sulfoxide, methionine methyl sulfonium. Such analogs have modified R groups (e.g., norleucine) or modified peptide backbones, but retain the same basic chemical structure as a naturally occurring amino acid. "Amino acid mimetics" refers to chemical compounds having a structure that is different from the general chemical structure of an amino acid, but that functions in a manner similar to a naturally occurring amino acid.

There are various known methods in the art that permit the incorporation of an unnatural amino acid derivative or analog into a polypeptide chain in a site-specific manner, see, e.g., WO 02/086075.

Amino acids may be referred to herein by either the commonly known three letter symbols or by the one-letter symbols recommended by the IUPAC-IUB Biochemical Nomenclature Commission. Nucleotides, likewise, may be referred to by their commonly accepted single-letter codes.

"Polypeptide," "peptide," and "protein" are used interchangeably herein to refer to a polymer of amino acid residues. All three terms apply to amino acid polymers in which one or more amino acid residue is an artificial chemical mimetic of a corresponding naturally occurring amino acid, as well as to naturally occurring amino acid polymers and non-naturally occurring amino acid polymers. As used herein, the terms encompass amino acid chains of any length, including full-length proteins, wherein the amino acid residues are linked by covalent peptide bonds.

An "expression cassette" is a nucleic acid construct, generated recombinantly or synthetically, with a series of specified nucleic acid elements that permit transcription of a particular polynucleotide sequence in a host cell. An expression cassette may be part of a plasmid, viral genome, or nucleic acid fragment. Typically, an expression cassette includes a polynucleotide to be transcribed and/or expressed, operably linked to a promoter.

As used herein, the term "gene expression" is used to refer to the transcription of a DNA to form an RNA molecule encoding a particular protein or the translation of a protein encoded by a polynucleotide sequence. In other words, both mRNA level and protein level encoded by a gene of interest are encompassed by the term "gene expression level" in this disclosure.

In this disclosure the term "biological sample" or "sample" includes sections of tissues such as biopsy and autopsy samples, and frozen sections taken for histologic purposes, or processed forms of any of such samples. Biological samples include blood and blood fractions or products (e.g., whole blood, serum, plasma, platelets, blood cells such as eosinophils, and the like), sputum or saliva, lymph and tongue tissue, cultured cells, e.g., primary cultures, explants, and transformed cells, stool, urine, stomach biopsy tissue etc. A biological sample is typically obtained from a eukaryotic organism, which may be a mammal, may be a primate and may be a human subject.

The term "immunoglobulin" or "antibody" (used interchangeably herein) refers to an antigen-binding protein having a basic four-polypeptide chain structure consisting of two heavy and two light chains, said chains being stabilized, for example, by interchain disulfide bonds, which has the ability to specifically bind antigen. Both heavy and light chains are folded into domains.

The term "antibody" also refers to antigen- and epitope-binding fragments of antibodies, e.g., Fab fragments, that can be used in immunological affinity assays. There are a number of well characterized antibody fragments. Thus, for example, pepsin digests an antibody C-terminal to the disulfide linkages in the hinge region to produce F(ab)'$_2$, a dimer of Fab which itself is a light chain joined to $V_H$-$C_H$1 by a disulfide bond. The F(ab)'$_2$ can be reduced under mild conditions to break the disulfide linkage in the hinge region thereby converting the (Fab')$_2$ dimer into an Fab' monomer. The Fab' monomer is essentially a Fab with part of the hinge region (see, e.g., Fundamental Immunology, Paul, ed., Raven Press, N.Y. (1993), for a more detailed description of other antibody fragments). While various antibody fragments are defined in terms of the digestion of an intact antibody, one of skill will appreciate that fragments can be synthesized de novo either chemically or by utilizing recombinant DNA methodology. Thus, the term antibody also includes antibody fragments either produced by the modification of whole antibodies or synthesized using recombinant DNA methodologies.

The phrase "specifically binds," when used in the context of describing a binding relationship of a particular molecule to a protein or peptide, refers to a binding reaction that is determinative of the presence of the protein in a heterogeneous population of proteins and other biologics. Thus, under designated binding assay conditions, the specified binding agent (e.g., an antibody) binds to a particular protein at least two times the background and does not substantially bind in a significant amount to other proteins present in the sample. Specific binding of an antibody under such conditions may require an antibody that is selected for its specificity for a particular protein or a protein but not its similar "sister" proteins. A variety of immunoassay formats may be used to select antibodies specifically immunoreactive with a particular protein or in a particular form. For example, solid-phase ELISA immunoassays are routinely used to select antibodies specifically immunoreactive with a protein (see, e.g., Harlow & Lane, *Antibodies, A Laboratory Manual* (1988) for a description of immunoassay formats and conditions that can be used to determine specific immunoreactivity). Typically a specific or selective binding reaction will be at least twice background signal or noise and more typically more than 10 to 100 times background. On the other hand, the term "specifically bind" when used in the context of referring to a polynucleotide sequence forming a double-stranded complex with another polynucleotide sequence describes "polynucleotide hybridization" based on the Watson-Crick base-pairing, as provided in the definition for the term "polynucleotide hybridization method."

As used in this application, an "increase" or a "decrease" refers to a detectable positive or negative change in quantity from a comparison control, e.g., an established standard control (such as an average level/amount of sST2 or eosinophil found in samples from healthy non-AD subjects). An increase is a positive change that is typically at least 10%, or at least 20%, or 50%, or 100%, and can be as high as at least 2-fold or at least 5-fold or even 10-fold of the control value. Similarly, a decrease is a negative change that is typically at least 10%, or at least 20%, 30%, or 50%, or even as high as at least 80% or 90% of the control value. Other terms indicating quantitative changes or differences from a comparative basis, such as "more," "less," "higher," and "lower," are used in this application in the same fashion as described above. In contrast, the term "substantially the same" or "substantially lack of change" indicates little to no change in quantity from the standard control value, typically within ±10% of the standard control, or within ±5%, 2%, or even less variation from the standard control.

A "polynucleotide hybridization method" as used herein refers to a method for detecting the presence and/or quantity of a pre-determined polynucleotide sequence based on its ability to form Watson-Crick base-pairing, under appropriate hybridization conditions, with a polynucleotide probe of a known sequence. Examples of such hybridization methods include Southern blot, Northern blot, and in situ hybridization.

"Primers" as used herein refer to oligonucleotides that can be used in an amplification method, such as a polymerase chain reaction (PCR), to amplify a nucleotide sequence based on the polynucleotide sequence corresponding to a gene of interest, e.g., any one of the genetic variants described herein or a portion thereof. Typically at least one of the PCR primers for amplification of a polynucleotide sequence is sequence-specific for that polynucleotide sequence. The exact length of the primer will depend upon many factors, including temperature, source of the primer, and the method used. For example, for diagnostic and prognostic applications, depending on the complexity of the target sequence, the oligonucleotide primer typically contains at least 10, or 15, or 20, or 25 or more nucleotides, although it may contain fewer nucleotides or more nucleotides. The factors involved in determining the appropriate length of primer are readily known to one of ordinary skill in the art. In this disclosure the term "primer pair" means a pair of primers that hybridize to opposite strands a target DNA molecule or to regions of the target DNA which flank a nucleotide sequence to be amplified. In this disclosure the term "primer site," means the area of the target DNA or other nucleic acid to which a primer hybridizes.

A "label," "detectable label," or "detectable moiety" is a composition detectable by spectroscopic, photochemical, biochemical, immunochemical, chemical, or other physical means. For example, useful labels include $^{32}P$, fluorescent dyes, electron-dense reagents, enzymes (e.g., as commonly used in an ELISA), biotin, digoxigenin, or haptens and proteins that can be made detectable, e.g., by incorporating a radioactive component into the peptide or used to detect antibodies specifically reactive with the peptide. Typically a detectable label is attached to a probe or a molecule with defined binding characteristics (e.g., a polypeptide with a known binding specificity or a polynucleotide), so as to allow the presence of the probe (and therefore its binding target) to be readily detectable.

The term "amount" as used in this application refers to the quantity of a substance of interest, such as a polynucleotide or a polypeptide of interest or a certain type of blood cells, present in a sample. Such quantity may be expressed in the absolute terms, i.e., the total quantity of the substance in the sample, or in the relative terms, i.e., the concentration of the substance in the sample.

The term "subject" or "subject in need of treatment," as used herein, includes individuals who seek medical attention due to risk of (e.g., with family history), or having been diagnosed of, AD. Subjects also include individuals currently undergoing therapy that seek manipulation of the therapeutic regimen. Subjects or individuals in need of treatment include those that demonstrate symptoms of AD or are at risk of suffering from AD or its symptoms. For example, a subject in need of treatment includes individuals with a genetic predisposition or family history for AD, those that have suffered relevant symptoms in the past, those that have been exposed to a triggering substance or event, as well as those suffering from chronic or acute symptoms of the condition. A "subject in need of treatment" may be at any age of life.

"Inhibitors," "activators," and "modulators" of a target protein are used to refer to inhibitory, activating, or modulating molecules, respectively, identified using in vitro and in vivo assays for the protein binding or signaling, e.g., ligands, agonists, antagonists, and their homologs and mimetics. The term "modulator" includes inhibitors and activators. Inhibitors are agents that, e.g., partially or totally block, decrease, prevent, delay activation, inactivate, desensitize, or down regulate the activity of the target protein. In some cases, the inhibitor directly or indirectly binds to the protein, such as a neutralizing antibody. Inhibitors, as used herein, are synonymous with inactivators and antagonists.

Activators are agents that, e.g., stimulate, increase, facilitate, enhance activation, sensitize or up regulate the activity of the target protein. Modulators include the target protein's ligands or binding partners, including modifications of naturally-occurring ligands and synthetically-designed ligands, antibodies and antibody fragments, antagonists, agonists, small molecules including carbohydrate-containing molecules, siRNAs, RNA aptamers, and the like.

The term "treat" or "treating," as used in this application, describes an act that leads to the elimination, reduction, alleviation, reversal, prevention and/or delay of onset or recurrence of any symptom of a predetermined medical condition. In other words, "treating" a condition encompasses both therapeutic and prophylactic intervention against the condition.

The term "effective amount," as used herein, refers to an amount that produces therapeutic effects for which a substance is administered. The effects include the prevention, correction, or inhibition of progression of the symptoms of a disease/condition and related complications to any detectable extent. The exact amount will depend on the purpose of the treatment, and will be ascertainable by one skilled in the art using known techniques (see, e.g., Lieberman, *Pharmaceutical Dosage Forms* (vols. 1-3, 1992); Lloyd, *The Art, Science and Technology of Pharmaceutical Compounding* (1999); and Pickar, *Dosage Calculations* (1999)).

The term "standard control," as used herein, refers to a sample comprising an analyte of a predetermined amount to indicate the quantity or concentration of this analyte present in this type of sample (e.g., DNA/mRNA, protein, or blood cells such as eosinophils) taken from an average healthy subject not suffering from or at risk of developing a predetermined disease or condition (e.g., Alzheimer's Disease).

The term "average," as used in the context of describing a healthy subject who does not suffer from and is not at risk of developing a relevant disease or disorders (e.g., AD) refers to certain characteristics, such as the level of a pertinent gene's mRNA or protein in the person's tissues (e.g., blood) or blood cell (e.g., eosinophil) counts that are representative of a randomly selected group of healthy humans who are not suffering from and is not at risk of developing the disease or disorder. This selected group should comprise a sufficient number of human subjects such that the average amount or concentration of the analyte of interest among these individuals reflects, with reasonable accuracy, the corresponding profile in the general population of healthy people. Optionally, the selected group of subjects may be chosen to have a similar background to that of a person whose is tested for indication or risk of the relevant disease or disorder, for example, matching or comparable age, gender, ethnicity, and medical history, etc.

The term "inhibiting" or "inhibition," as used herein, refers to any detectable negative effect on a target biological process. Typically, an inhibition is reflected in a decrease of at least 10%, 20%, 30%, 40%, or 50% in one or more parameters indicative of the biological process or its downstream effect, e.g., plasma level of sST2 or eosinophil count or blood CCR3 level, when compared to a control where no such inhibition is present. The term "enhancing" or "enhancement" is defined in a similar manner, except for indicating a positive effect, i.e., the positive change is at least 10%, 20%, 30%, 40%, 50%, 80%, 100%, 200%, 300% or even more in comparison with a control. The terms "inhibitor" and "enhancer" are used to describe an agent that exhibits inhibiting or enhancing effects as described above, respectively. Also used in a similar fashion in this disclosure are the terms "increase," "decrease," "more," and "less,"

which are meant to indicate positive changes in one or more predetermined parameters by at least 10%, 20%, 30%, 40%, 50%, 80%, 100%, 200%, 300% or even more, or negative changes of at least 10%, 20%, 30%, 40%, 50%, 80% or even more in one or more predetermined parameters.

"Hong Kong Chinese" and "mainland Chinese" are terms used to refer to ethnic Chinese people who and whose ancestors have been residing in Hong Kong and mainland China, respectively, for a length of time, e.g., at least the last 3, 4, 5, 6, 7, or 8 generations or the last 100, 150, 200, 250, or 300 years.

DETAILED DESCRIPTION OF THE INVENTION

I. Introduction

Figure 1:
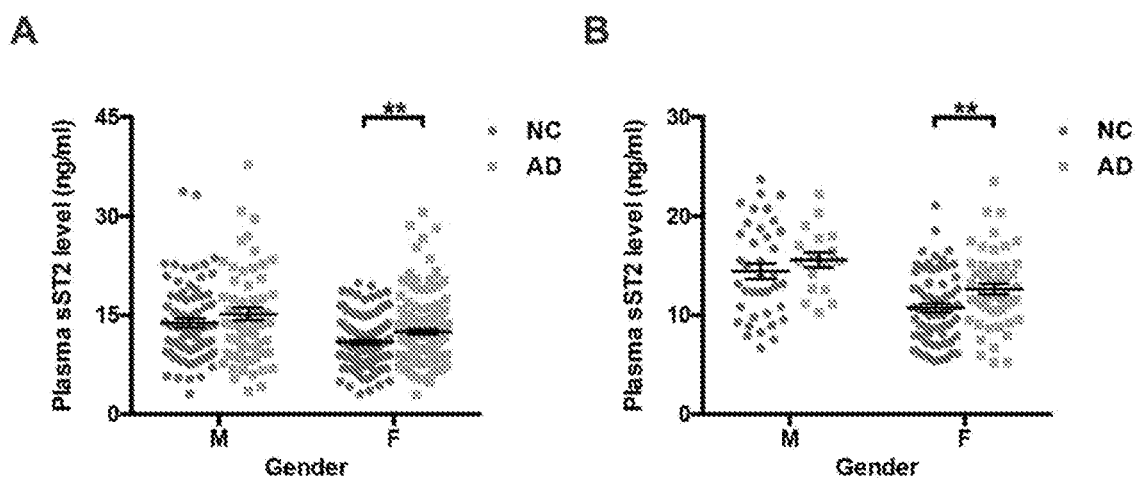
FIG. 1. Elevation of plasma sST2 levels in female AD patients. (A) Plasma sST2 levels were elevated in female AD patients (n=427; n=76, 69, 118, and 164 for male NC, male AD, female NC, and female AD subjects in the Hong Kong Chinese AD cohort, respectively). Data are mean±SEM (P<0.01; linear regression analysis adjusted for age, disease history, and population structure). (B) Plasma sST2 levels were elevated in female AD patients without any cardiovascular diseases (n=176; n=39, 22, 64, and 51 for male NC, male AD, female NC, and female AD subjects in the Hong Kong Chinese AD cohort without cardiovascular diseases, respectively). Data are mean±SEM (P<0.01; linear regression analysis adjusted for age, disease history, and population structure).

AD patients face a grim prognosis due to the progressive and incurable nature of this disease. Early diagnosis of AD or detection of an increased risk for developing AD at a future time may provide the patients and their family more options in terms of treatment and long term management of the disease.

The present inventors discovered for the first time that certain genetic variants, especially those at the IL1RL1 locus, which directly influence the level of plasma sST2 protein, are correlated with the presence of AD in a patient or an increased risk of the patient developing the disease at a later time. This discovery thus provides novel methods and compositions useful for the early diagnosis and treatment of AD.

II. General Methodology

Practicing this invention utilizes routine techniques in the field of molecular biology. Basic texts disclosing the general methods of use in this invention include Sambrook and Russell, *Molecular Cloning, A Laboratory Manual* (3rd ed. 2001); Kriegler, *Gene Transfer and Expression: A Laboratory Manual* (1990); and *Current Protocols in Molecular Biology* (Ausubel et al., eds., 1994)).

For nucleic acids, sizes are given in either kilobases (kb) or base pairs (bp). These are estimates derived from agarose or acrylamide gel electrophoresis, from sequenced nucleic acids, or from published DNA sequences. For proteins, sizes are given in kilodaltons (kDa) or amino acid residue numbers. Protein sizes are estimated from gel electrophoresis, from sequenced proteins, from derived amino acid sequences, or from published protein sequences.

Oligonucleotides that are not commercially available can be chemically synthesized, e.g., according to the solid phase phosphoramidite triester method first described by Beaucage and Caruthers, *Tetrahedron Lett.* 22:1859-1862 (1981), using an automated synthesizer, as described in Van Devanter et. al., *Nucleic Acids Res.* 12:6159-6168 (1984). Purification of oligonucleotides is performed using any art-recognized strategy, e.g., native acrylamide gel electrophoresis or anion-exchange high performance liquid chromatography (HPLC) as described in Pearson and Reanier, *J. Chrom.* 255: 137-149 (1983).

The sequence of interest used in this invention, e.g., the polynucleotide sequence of any one of the genetic variants shown in Tables 2 and 3, and synthetic oligonucleotides (e.g., primers useful for amplifying any one of the genetic variants) can be verified using, e.g., the chain termination method for sequencing double-stranded templates of Wallace et al., *Gene* 16: 21-26 (1981).

III. Diagnostic Method

The present invention relates to detecting of AD-associated genetic variants, measuring the amount of a marker mRNA/protein found in a person's biological sample (for example, a blood sample), and/or measuring the number of a certain type of blood cells (for example, eosinophils), as a means to detect the presence, to assess the risk of developing, and/or to monitor the progression or treatment efficacy of AD. More specifically, the method involves (1) determining the presence of any one or more of the genetic variants in Table 2 or 3; (2) quantitatively determining the expression level of one or more marker gene(s), such as sST2 or CCR3, at the mRNA or protein level, and/or (3) determining eosinophil counts in a patient's biological sample and comparing with a standard control value in order to detect any quantitative changes, which in turn indicate the presence of AD or an elevated risk of later developing AD in the patient.

To practice this method one typically sequence the relevant genomic sequence to detect the AD-associated variants or analyzes the amount of the pertinent mRNA or protein found in a sample taken from a person being tested, e.g., a blood sample especially a whole blood sample or blood cell sample. Collection of blood from an individual is performed in accordance with the standard protocol hospitals or clinics generally follow. An appropriate amount of peripheral blood, e.g., typically between 5-50 ml, is collected in some cases and may be stored according to standard procedure prior to further preparation. Other biological samples taken from a broad range of anatomic sites containing somatic cells can also be used for the purpose of detecting genetic variants, for example, saliva, mouth swab, tissue biopsy, or cerebrospinal fluid (CSF).

To detect the presence of specific AD-associated genetic variants, e.g., those listing in Tables 2 and 3 or an APOE genotype such as APOE-ε4, polynucleotide sequence-based analysis is performed on a test subject's genomic DNA. In some cases, a polynucleotide hybridization method may be used in the analysis, e.g., by way of a chip containing a large number of immobilized polynucleotide probes allowing ready identification of various different genetic sequences of interest. In some cases, an amplification reaction is optional prior to the sequence analysis. A variety of polynucleotide amplification methods are well-established and frequently used in research. For instance, the general methods of polymerase chain reaction (PCR) for polynucleotide sequence amplification are well known in the art and are thus not described in detail herein. For a review of PCR methods, protocols, and principles in designing primers, see, e.g., Innis, et al., *PCR Protocols: A Guide to Methods and Applications*, Academic Press, Inc. N.Y., 1990. PCR reagents and protocols are also available from commercial vendors, such as Roche Molecular Systems.

When the presence of specific AD-associated genetic variants, such as those listing in Tables 2 and 3 or an APOE genotype, is sought to be detected at the mRNA level, a step of reverse transcription (RT) is typically performed prior to the amplification reaction such as PCR. Once adequate DNA potentially containing the genetic variants has been obtained, sequencing can be performed to reveal the presence of such relevant variants, e.g., single-nucleotide polymorphisms (SNPs). Various high-through put, fully automated sequencing technologies are available through commercial suppliers (e.g., ThermoFisher Scientific) and can be used for practicing the present invention.

Although PCR amplification is often used in practicing the present invention, one of skill in the art will recognize that amplification of the relevant genomic sequence may be accomplished by any known method, such as the ligase chain reaction (LCR), transcription-mediated amplification, and self-sustained sequence replication or nucleic acid sequence-based amplification (NASBA), each of which provides sufficient amplification. Techniques for polynucleotide sequence determination are also well-established and widely practiced in the relevant research field. For instance, the basic principles and general techniques for polynucleotide sequencing are described in various research reports and treatises on molecular biology and recombinant genetics, such as Wallace et al., supra; Sambrook and Russell, supra, and Ausubel et al., supra. DNA sequencing methods routinely practiced in research laboratories, either manual or automated, can be used for practicing the present invention.

Similarly, the analysis of pertinent protein or mRNA (such as sST2 or CCR3) found in a patient's sample according to the present invention may be performed using, e.g., the whole blood, or a cellular sample such as all blood cells. Standard methods known in the research field can be used to isolate and analyze the protein or RNA level of a marker gene in the sample. See, e.g., Sambrook and Russell, supra).

In order to establish a standard control for practicing the method of this invention, a group of healthy persons free of any neurodegenerative disorders especially AD and not known to be at risk of developing the disorder are first selected. These individuals are within the appropriate parameters, if applicable, for the purpose of screening for and/or assessing future risk of such disorders using the methods of the present invention. Optionally, the individuals are of the same or comparable gender, age, ethnic background, and medical history. The healthy status of the selected individuals is confirmed by well established, routinely employed methods including but not limited to general physical examination of the individuals and general review of their medical records.

Furthermore, the selected group of healthy individuals must be of a reasonable size, such that the average amount/concentration of pertinent mRNA or protein or blood cells (e.g., eosinophils) in the samples obtained from the group can be reasonably regarded as representative of the normal or average level among the general population of healthy people without and not at risk of developing AD. Preferably, the selected group comprises at least 10 human subjects.

Once such an average value for the pertinent protein or mRNA or blood cells is established based on the individual values found in each subject of the selected healthy control group, this average or median or representative value or profile is considered a standard control. A standard deviation is also determined during the same process. In some cases, separate standard controls may be established for separately defined groups having distinct characteristics such as age, gender, ethnic background, or any distinct past event(s) in the medical history.

In a related aspect, the present invention also provides treatment methods for AD patients upon detection of AD or a heightened risk of later developing AD in a patient. For example, when the diagnostic method steps described above and herein are completed, optionally with additional diagnostic examination performed to provide further confirmatory information (for example, by brain imaging via CT scan or other imaging techniques to show excessive loss of brain volume, or by testing cognitive capability to show an accelerated decline), and a patient has been determined to either already have AD or is at a significantly increased risk of later developing AD, suitable therapeutic or prophylactic regimens may be ordered by physicians or other medical professionals to treat the patient, to manage/alleviate the ongoing symptoms, or to delay the future onset of the disease. The U.S. Food and Drug Administration (FDA) has approved a number of cholinesterase inhibitors, including donepezil (Aricept™, the only cholinesterase inhibitor approved to treat all stages of AD, including moderate to severe), rivastigmine (Exelon™, approved to treat mild to moderate AD), galantamine (Razadyne™, mild to moderate patients) and memantine (Namenda™) Donepezil is the only cholinesterase inhibitor approved to treat all stages of AD, including moderate to severe. Any one or more of these drugs can be prescribed for treating patients who have been diagnosed with AD in accordance with the methods of this invention. For patients having increased expression of plasma sST2, one possibility of treatment is administration of trazodone, which is currently approved for use as an antidepressant and has been shown by the present inventors as an effective agent to lower plasma sST2 level.

For patients who are deemed high risk for AD in a future time but do not yet exhibit any clinical symptoms, continuous monitoring is also appropriate, for example, the patients may be subject to regular testing (e.g., once a year or once every two years) to detect any change in their cognitive capabilities. Methods suitable for such regular monitoring include General Practitioner Assessment of Cognition (GP-COG), Mini-Cog, Eight-item Informant Interview to Differentiate Aging and Dementia (AD8), and Short Informant Questionnaire on Cognitive Decline in the Elderly (IQCODE). Furthermore, prophylactic treatment with trazodone may also be recommended.

IV. Kits and Devices

The present invention provides a kit for diagnosing or determining risk of AD in a subject. The kit typically comprises a first container containing an agent for amplifying a genomic sequence potentially harboring one or more genetic variants in Table 2 or 3. Optionally the kit includes a second container containing an agent for detecting the presence of one or more genetic variants in Table 2 or 3. For example, the agent in the first container may include a pair of primers or oligonucleotides useful for amplifying the genomic sequence, e.g., in a PCR. In the case of the kit intended for use in an RT-PCR, a further primer for reverse transcription is included as well. The second container may include a polynucleotide probe that specifically binds to a DNA sequence comprising the variant or variants so as to be able to indicate the presence or absence of the variant(s). In some embodiments, the primers and/or probe may be conjugated with a detectable label to facilitate the ready detection of the relevant DNA amplicons and/or the genetic variant(s) of interest.

Further optional components of the kit may include (a) one container containing an agent that is useful for determining the expression level of sST2 or CCR3 mRNA or protein in a biological sample taken from the subject, such as an antibody that specifically recognizes the protein or a polynucleotide probe that specifically binds a coding sequence for the mRNA; and (b) another container containing a standard control indicating the corresponding sST2 or CCR3 level (which may be protein or mRNA level) in the same type of biological sample taken from an average healthy subject not suffering from and not at risk of suffering from AD. Optionally, the polynucleotide probe or antibody is labeled with a detectable moiety. The antibody can be either a monoclonal antibody or a polyclonal antibody. In some cases, the kits may include at least two different antibodies, one for specific binding to the target protein (i.e., the primary antibody) and the other for detection of the primary antibody (i.e., the secondary antibody), which is often attached to a detectable moiety. In addition, the kits of this invention may provide instruction manuals to guide users in analyzing test samples and assessing the presence, risk, or state of gastric cancer in a test subject.

This invention also provides a kit for inhibiting or treating AD for therapy or prevention of the pertinent symptoms according to the method of this disclosure. The kits typically include a container that contains (1) a pharmaceutical composition having an effective amount of an active agent (for instance, trazodone) and (2) informational material containing instructions on how to dispense the pharmaceutical composition, including description of the type of patients who may be treated (e.g., patients suffering from AD), the schedule (e.g., dose and frequency) and route of administration, and the like. Optionally, an additional container may be included in the kit that provides a second therapeutic agent known to be effective for treating AD, for example, any one of cholinesterase inhibitors (Aricept, Exelon, Razadyne, Cognex) for early to moderate stages of AD or memantine (Namenda) to treat the cognitive symptoms (memory loss, confusion, and problems with thinking and reasoning) for moderate to severe stages of AD.

In a further aspect, the present invention can also be embodied in a device or a system comprising one or more such devices, which device is capable of carrying out all or some of the method steps described herein. For instance, in some cases, the device or system performs the following steps upon receiving a biological sample, e.g., a blood sample taken from a subject being tested for AD, assessing the risk of developing AD, or monitored for progression of the condition: (a) determining in sample the presence or absence of one or more genetic variants in Table 2 or 3; (b) generating a composite score (polygenic risk score, or PRS) from the information obtained in step (a); and (c) providing an output indicating whether AD is present in the subject or whether the subject is at risk of developing AD, or whether there is a change, i.e., worsening or improvement, in the subject's condition associated with AD.

In some cases, the device or system of the invention performs the task of steps (b) and (c), after step (a) has been performed and the presence or absence of relevant genetic variants from (a) has been entered into the device. Preferably, the device or system is partially or fully automated.

Optionally, the device or system may further perform, prior to step (c), the additional step(s) of assessing the quantity of additional marker(s), such as sST2 and/or CCR3 in either protein or mRNA form, present in the sample, or determining blood cell count such as eosinophil count in a blood sample, or determining a subject the APOE genotype especially APOE-ε4 genotype; in the alternative, the additional information, including the quantity/concentration of the marker(s) present in the sample, blood cell count, APOE genotype, or test subject's gender and/or ethnic background is obtained from one or more separate processes not performed with the device or system but is fed into the device or system in order to perform step (c) while taking into consideration of such additional information.

EXAMPLES

The following examples are provided by way of illustration only and not by way of limitation. Those of skill in the art will readily recognize a variety of non-critical parameters that could be changed or modified to yield essentially the same or similar results.

INTRODUCTION

Alzheimer's disease (AD) is one of the most common forms of dementia worldwide, accounting for 60-70% of all dementia cases. It is an irreversible degenerative brain disease and a leading cause of mortality in the elderly. The hallmarks of AD are deposition of extracellular beta-amyloid (Aβ) plaques and intracellular neurofibrillary tangles, which result in progressively declining memory, reasoning, judgment, and locomotion abilities. An estimated 46.8 million people worldwide are afflicted with AD, but this figure is expected to rise significantly to 100 million by 2050 owing to longer life expectancies and aging populations. There is currently no cure for AD, and its pathophysiology is still relatively unknown.

There are only five drugs approved by the US Food and Drug Administration (FDA) to treat AD, but these only alleviate symptoms rather than alter disease pathology, i.e., they cannot reverse the condition or prevent further deterioration. Furthermore, AD affects the brain long before actual symptoms of memory loss or cognitive decline manifest. However, there are no diagnostic tools for early detection; by the time a patient is diagnosed with AD using current methods, which involves subjective clinical assessment, the pathological symptoms are already at an advanced stage. In addition, although several serum protein biomarkers such as serum APOE, Aβ, Tau, and p-Tau have been identified and brain imaging techniques such as positron emission tomography (PET) scan and functional magnetic resonance imaging (MRI) have been introduced to help predict AD progression, limitations such as high cost, high inter-individual variation, and low-throughput rates prevent their use for disease diagnosis. Thus, early therapeutic intervention is critical for the management of AD, and new and effective methods for the early diagnosis of AD and determining an individual's risk of developing the disease are urgently required.

The pathophysiological mechanisms of AD are complex, but genetic factors are believed to play critical roles. Genes can differ between individuals because of genomic variability—the most frequent of which can be due to single nucleotide polymorphisms (SNPs). Additional genetic polymorphisms in a human genome can be caused by duplication, insertion, deletion, translocation, and/or inversion of short and/or long stretches of DNA. Genetic variations may encode protein variants that can result in increased susceptibility to a disease or result in disease onset, including AD. AD may be associated with one or more genetic variations, wherein the presence of a genetic variation may increase the risk of developing AD or may be indicative of AD. Accordingly, genetic analysis can be used to determine the presence of such genetic variations.

AD is classified into two types based on the onset age: familial AD (also known as early-onset AD) with an onset age ≤45 years or late-onset AD with an onset age ≥65 years. Early-onset AD accounts for 10% of all cases and tends to be predominant in certain families because of the inheritance of specific and rare missense mutations in APP, PSEN1, or PSEN2. Meanwhile, late-onset AD accounts for 90% of all cases. Polymorphisms in APOE are the most relevant risk factors for late-onset AD. Genetics studies including, but not limited to, genome-wide association studies (GWAS), candidate gene sequencing, and whole-exome sequencing have identified several disease genes and risk alleles. However, most previous genetics studies on AD, including those on the APOE locus, have been conducted on individuals with Caucasian ancestry, whereas data from other ethnicities are limited. Given the diverse genomic content across different ethnic groups, the genetic risk factors for AD may be different between populations of Asian (e.g., Chinese) and Caucasian origins. Moreover, susceptibility to certain genetic risk factors varies among populations. Therefore, it is vital to systematically investigate the genetic risk factors in populations of different ethnicities.

Inflammatory disorders and cardiovascular diseases are potentially associated with AD risks (McGeer & McGeer, 2001; Newman et al., 2005). Individuals affected by inflammatory disorders and cardiovascular disease may harbor genetic predisposition to those disease (Grotenboer, Ketelaar, Koppelman, & Nawijn, 2013; Tu et al., 2013). Large-scale genome-wide association studies (GWAS) have identified single nucleotide polymorphisms (SNPs) in IL1RL1 (the gene that encodes full-length ST2 and sST2 protein) that associate with plasma protein levels of soluble ST2 (sST2), a decoy receptor for IL-33, in different diseases across various populations (Gudbjartsson et al., 2009; Zhu et al., 2018). Two of the IL1RL1 SNPs reported in asthma demonstrated a possible functional effect on airway inflammation (Gordon et al., 2016), whereas others were postulated to exert a protective function by influencing IL-33 activity (Ramirez-Carrozzi, Dressen, Lupardus, Yaspan, & Pappu, 2015). IL1RL1 SNPs associated with serum sST2 levels have also been identified in cardiovascular disease (Ho et al., 2013), while other studies have also demonstrated the utility of IL1RL1 SNPs as a predictor of mortality in coronary and peripheral artery disease (Lin et al., 2017). Thus, studies of the genetic variants of IL1RL1 in different diseases, and their regulation on sST2 levels in human blood may help to identify new biomarkers for different diseases and uncover new disease pathways.

Several studies have shown that IL-33/ST2 signaling mediates allergic asthma. IL-33 expression is elevated in airways of bronchial asthma, where it promotes airway remodeling. In a mouse model of pulmonary inflammation, pre-exposure to sST2 results in reduced production of TH2 cytokines, in keeping with the role of sST2 as a decoy receptor for IL-33, and, patients of bronchial asthma show elevated levels of serum sST2 (Kakkar & Lee, 2008). Meanwhile, IL-33/ST2 signaling exerts a protective role in cardiac fibroblasts and cardiomyocytes where the expression levels of IL-33, sST2, and ST2L increase in response to myocardial stress. In experimental models, IL-33/ST2 signaling prevents fibrosis and cardiomyocyte hypertrophy and reduces apoptosis, thus improving cardiac function. The antihypertrophic effect of IL-33 may be exerted via suppression of ROS (reactive oxygen species), regulation of NF-κB, or other mechanisms (Sanada et al., 2007). sST2 appears to antagonize the cardio-protective effects of IL-33/ST2L. In stimulated cardiomyocytes, pre-incubation with sST2 reversed the anti-hypertrophic effect of IL-33, and led to a decrease in free IL-33. High serum sST2 levels were also observed in patients with acute myocardial infraction and acute heart failure (Pascual-Figal & Januzzi, 2015). These results collectively suggest the potential usage of sST2 or associated genomic information as promising biomarkers for inflammatory diseases, cardiovascular disorders, as well as neurological disorders such as AD. Hence, the inventors undertook a comprehensive study of the genetic basis of AD in the Chinese population with a focus on sST2.

Results

Figure 2:
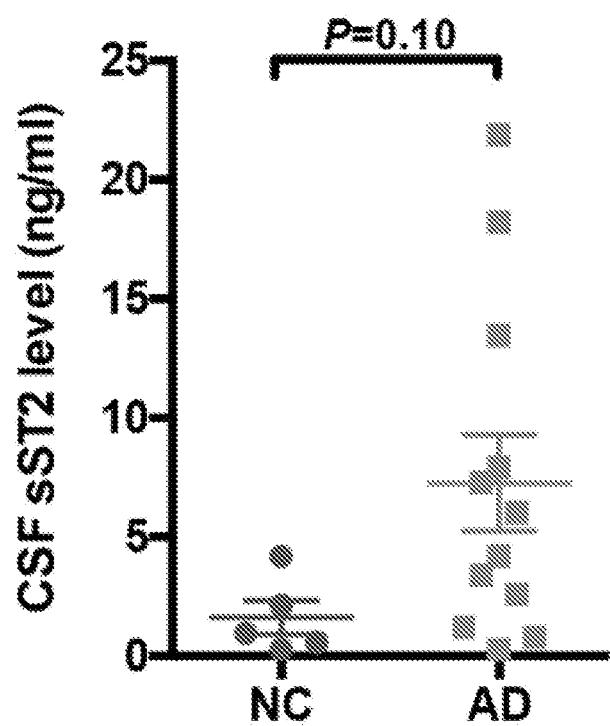
FIG. 2. Elevation of sST2 levels in CSF in AD patients. Data are mean±SEM (linear regression adjusted for age and gender; n=5 and 12 for NC and AD from the UKBBN, respectively).
Figure 3:
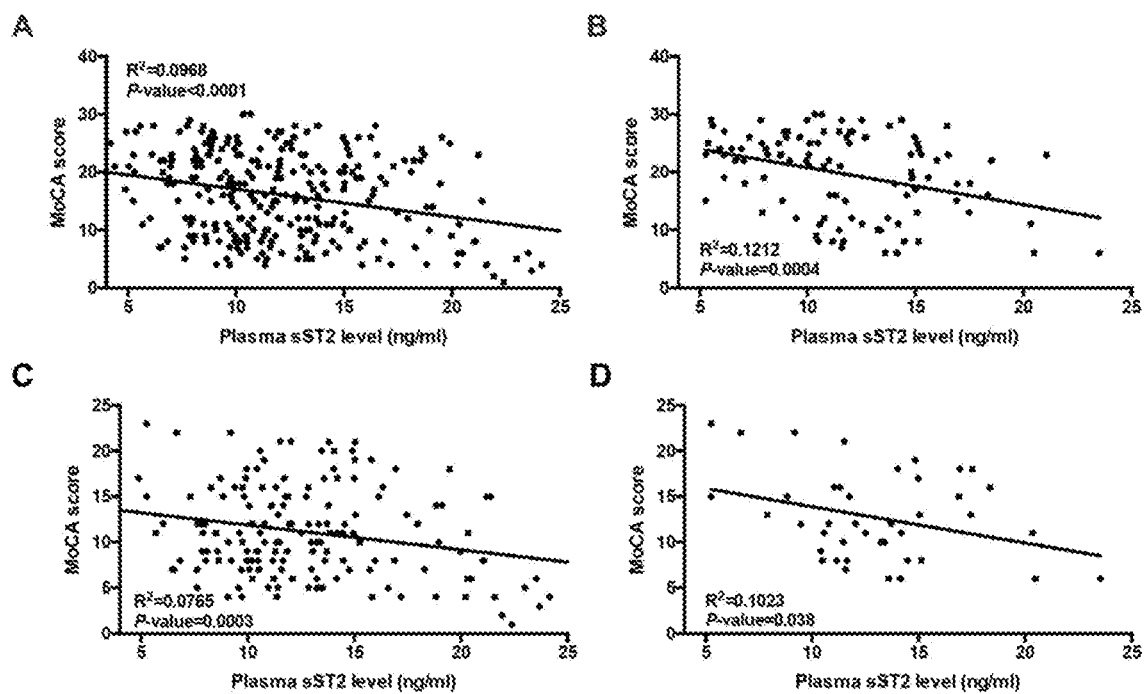
FIG. 3. Plasma sST2 levels are negatively correlated with cognitive performance in female patients. (A, B) Plasma sST2 levels were negatively correlated with cognitive performance in (A) all females (n=282) and (B) females without cardiovascular diseases (n=115) in the Hong Kong Chinese AD cohort. Linear regression analysis adjusted for age, disease history, and population structure. (C, D) Plasma sST2 levels were negatively correlated with cognitive performance in (C) all female AD patients (n=164) and (D) female AD patients without cardiovascular diseases (n=42) in the Hong Kong Chinese AD cohort. Linear regression analysis adjusted for age, disease history, and population structure.
Figure 4:
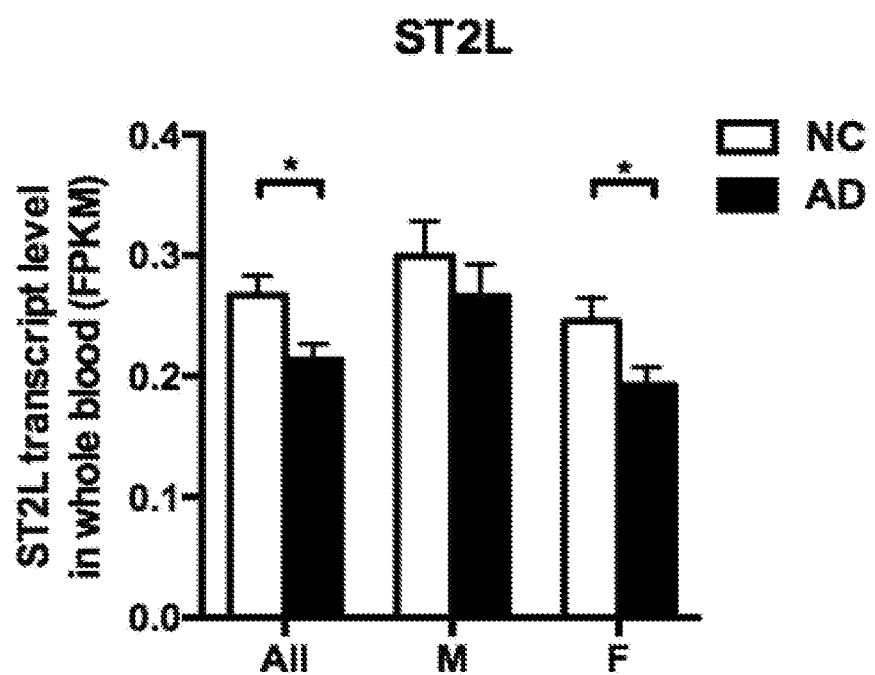
FIG. 4. Altered ST2 gene expression levels in blood of AD patients. Full-length ST2 (ST2L) transcript levels in peripheral blood were reduced in AD (n=62, 47, 95, and 118 blood bulk RNA-seq data from male NC, male AD, female NC, and female AD subjects in the Hong Kong Chinese cohort, respectively). Data are mean±SEM (*P<0.05; linear regression analysis adjusted for age, gender, disease history, RIN (RNA integrity number), and population structure).

Levels of plasma sST2 were measured in a Hong Kong Chinese AD cohort comprising 427 participants by ELISA assay (Table 1). Female AD patients exhibited higher plasma sST2 levels compared to age- and gender-matched normal controls (NCs) (FIG. 1A) as well as female AD patients without a history of cardiovascular disease (FIG. 1B). Moreover, sST2 protein levels were elevated in the cerebrospinal fluid (CSF) of AD patients (FIG. 2). By further associating the detected plasma sST2 levels with cognitive performances measured by MoCA score, the inventors identified a negative correlation between plasma sST2 levels and cognitive performance in female participants as well as in female patients with AD (FIG. 3). Moreover, by analyzing whole blood RNA-seq data from 322 participants, the inventors showed that AD patients exhibited reduced transcript levels of full-length ST2, especially females (FIG. 4).

TABLE 1

Summary characteristics of the Hong Kong Chinese AD cohort

|  | NC | AD |
|---|---|---|
| N | 194 | 233 |
| Age, years | 73.47 | 80.20 |
| Gender, M (F) | 76 (118) | 69 (164) |
| Edu, years | 8.03 | 4.85 |
| MoCA score | 23.15 | 11.92 |
| Heart disease (%) | 13 (6.70%) | 45 (19.31%) |
| Hypertension (%) | 114 (58.76%) | 143 (61.37%) |
| Diabetes mellitus (%) | 45 (23.19%) | 79 (33.90%) |
| Hyperlipidemia (%) | 66 (34.02%) | 102 (43.77%) |
| APOE-ε4 allele frequency | 9.02% | 19.74% |
| APOE-ε2 allele frequency | 11.08% | 7.72% |

NC, normal control; AD, Alzheimer's disease.

Figure 5:
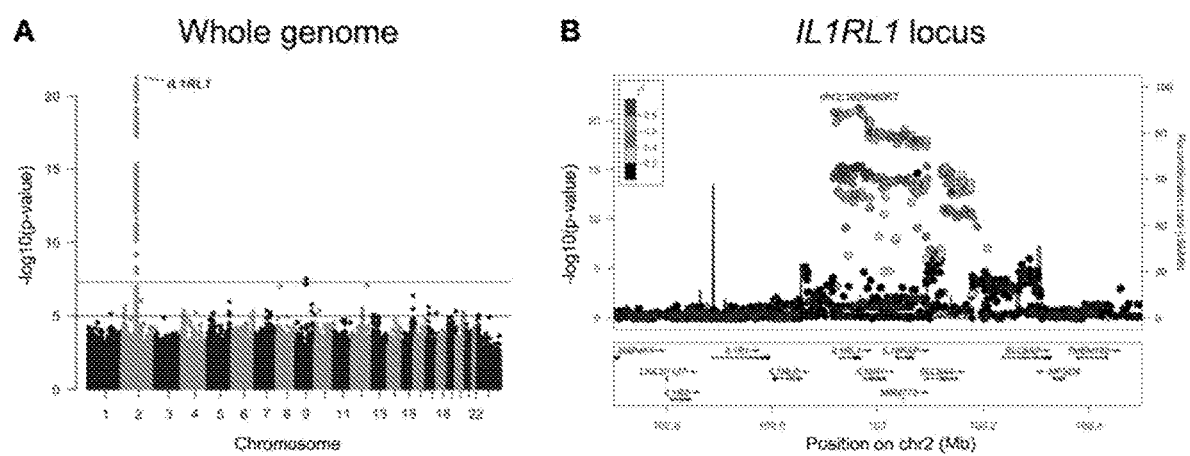
FIG. 5. GWAS identified variants that are associated with plasma sST2 level. (A) Manhattan plot displaying the genetic variants identified by GWAS that were associated with plasma levels of sST2 in the Hong Kong Chinese AD dataset. Horizontal lines in blue and red represent the suggestive threshold (P=1E-5) and the genome-wide significance threshold (P=5E-8), respectively. (B) Regional plot of IL1RL1 variants that were associated with plasma sST2 level. The black diamond specifies the sentinel variant in the locus. Different colors illustrate the LD measured as $R^2$ between the sentinel variant and its neighboring variants. cM/Mb, centimorgans per megabase.
Figure 6:
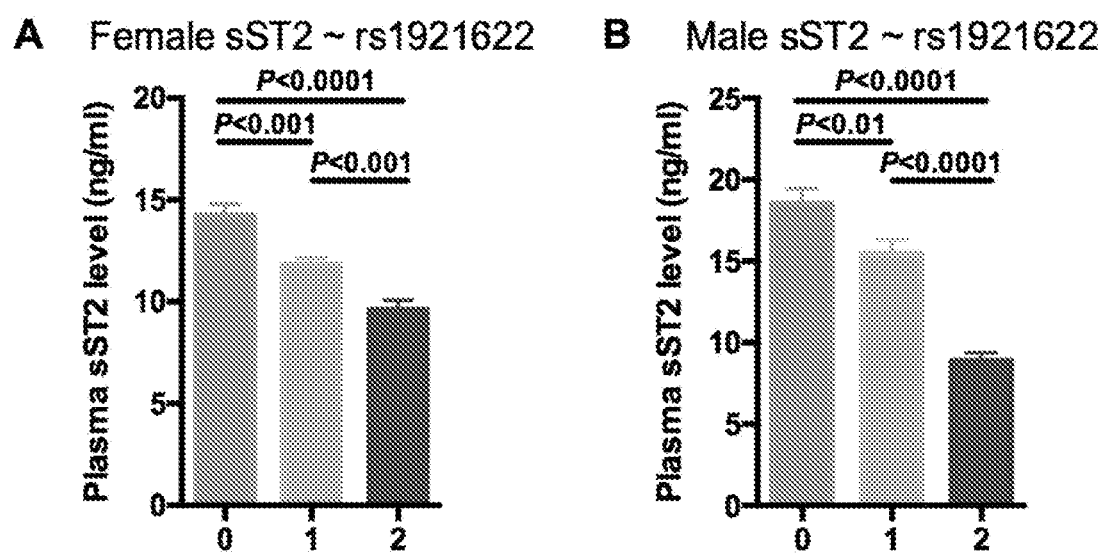
FIG. 6. Association between IL1RL1 variants and plasma sST2 levels. rs1921622 was associated with decreased plasma sST2 levels in (A) female (n=282) and (B) male (n=145) patients in the Hong Kong Chinese AD cohort. The X-axis indicates the copy number of rs1921622 minor alleles. Data are mean±SEM (linear regression analysis adjusted for age, disease status, and population structure).

Additionally, the inventors performed whole-genome sequencing (WGS) analysis on the Hong Kong Chinese AD cohort and conducted an association test between the genetic variants and plasma levels of sST2. The variants near the IL1RL1 (the gene that encodes full-length ST2 and sST2 protein) regions were associated with changes in plasma sST2 levels (FIG. 5A). A regional plot of the IL1RL1 region (chr2:102,500,000-103,500,000) revealed that multiple variants in this locus may modulate the plasma sST2 level in the Chinese population (FIG. 5A and Table 2). In particular, the minor allele of the sentinel variant rs1921622 was associated with a lower level of plasma sST2 in both males and females (effective size=−3.346, T=−10.21, P=5.35E-22; FIG. 6 and Table 2).

TABLE 2

List of variants associated with plasma sST2 levels. For each SNP, a positive beta value indicates a higher plasma sST2 level in the minor allele carriers and a negative beta value indicates a lower plasma sST2 level in the minor allele carriers. SNP, single nucleotide polymorphism; MA, minor allele, Beta, effect size; Stat, Coefficient t-statistics.

| SNP | BP | MA | Beta | Stat | P-value | SNP | BP | MA | Beta | Stat | P-value |
|---|---|---|---|---|---|---|---|---|---|---|---|
| rs75687525 | 1:163472218 | C | 2.38 | 4.55 | 7.14E−06 | rs12463588 | 2:103085257 | G | −2.76 | −7.72 | 8.62E−14 |
| rs7605722 | 2:16200946 | A | −1.67 | −4.61 | 5.36E−06 | rs10165460 | 2:103085631 | T | −3.16 | −9.26 | 1.08E−18 |
| rs7605772 | 2:16201132 | A | −1.67 | −4.61 | 5.36E−06 | rs11123931 | 2:103085660 | G | −3.16 | −9.26 | 1.08E−18 |
| rs13427501 | 2:16202446 | G | −1.67 | −4.61 | 5.36E−06 | rs2310302 | 2:103086049 | C | −2.76 | −7.72 | 8.62E−14 |
| rs7600440 | 2:16204606 | A | −1.72 | −4.79 | 2.33E−06 | rs12469887 | 2:103086758 | C | −2.76 | −7.72 | 8.62E−14 |
| rs4499395 | 2:16206193 | T | −1.72 | −4.8 | 2.22E−06 | rs990171 | 2:103086770 | C | −3.16 | −9.26 | 1.08E−18 |

TABLE 2-continued

List of variants associated with plasma sST2 levels. For each SNP, a positive beta value indicates a higher plasma sST2 level in the minor allele carriers and a negative beta value indicates a lower plasma sST2 level in the minor allele carriers. SNP, single nucleotide polymorphism; MA, minor allele, Beta, effect size; Stat, Coefficient t-statistics.

| SNP | BP | MA | Beta | Stat | P-value | SNP | BP | MA | Beta | Stat | P-value |
|---|---|---|---|---|---|---|---|---|---|---|---|
| rs6760942 | 2:16207141 | A | −1.72 | −4.8 | 2.22E−06 | rs56043441 | 2:103087383 | T | −2.81 | −7.92 | 2.17E−14 |
| rs28432381 | 2:16212065 | A | 1.68 | 4.64 | 4.65E−06 | rs10195075 | 2:103087622 | A | −2.74 | −7.65 | 1.40E−13 |
| rs4073262 | 2:16214286 | A | 1.62 | 4.51 | 8.34E−06 | rs1403553 | 2:103087662 | G | −2.76 | −7.72 | 8.62E−14 |
| rs56238602 | 2:102863095 | T | 1.77 | 4.56 | 6.63E−06 | rs4140786 | 2:103088176 | T | −2.73 | −7.7 | 1.01E−13 |
| rs1420091 | 2:102917234 | C | −2.78 | −8.07 | 7.52E−15 | rs4140785 | 2:103088517 | C | −2.78 | −7.85 | 3.54E−14 |
| rs4399750 | 2:102917788 | C | −2.86 | −8.17 | 3.75E−15 | rs10201184 | 2:103089078 | C | −2.75 | −7.69 | 1.06E−13 |
| rs4577297 | 2:102918018 | A | −3.38 | −10.08 | 1.59E−21 | rs4851011 | 2:103089678 | T | −2.78 | −7.85 | 3.54E−14 |
| rs2110660 | 2:102918601 | G | −2.86 | −8.21 | 2.74E−15 | rs17027255 | 2:103090127 | T | −2.78 | −7.82 | 4.46E−14 |
| rs1420090 | 2:102919305 | C | −2.82 | −8.07 | 7.80E−15 | rs1474309 | 2:103091001 | T | −2.81 | −7.99 | 1.35E−14 |
| rs7565653 | 2:102919426 | A | −2.82 | −8.1 | 6.36E−15 | rs17027258 | 2:103091540 | G | −2.78 | −7.85 | 3.54E−14 |
| rs7568913 | 2:102920037 | C | −3.33 | −10.06 | 1.78E−21 | rs10197881 | 2:103091715 | G | −3.16 | −9.23 | 1.44E−18 |
| rs10179654 | 2:102921783 | G | −3.27 | −9.8 | 1.53E−20 | rs1468791 | 2:103092021 | G | −3.16 | −9.23 | 1.44E−18 |
| rs4090473 | 2:102922987 | G | −2.85 | −8.22 | 2.57E−15 | rs1468790 | 2:103092441 | C | −2.34 | −5.94 | 5.87E−09 |
| rs12476925 | 2:102924549 | T | −2.85 | −8.22 | 2.57E−15 | rs1468789 | 2:103092503 | T | −2.21 | −4.97 | 9.95E−07 |
| rs12476968 | 2:102924662 | T | −2.85 | −8.22 | 2.57E−15 | rs1468788 | 2:103092513 | T | −2.34 | −5.94 | 5.87E−09 |
| rs7562254 | 2:102924947 | C | −3.33 | −10.02 | 2.56E−21 | rs7597819 | 2:103092906 | G | −3.12 | −9.08 | 4.33E−18 |
| rs56224165 | 2:102925223 | T | −2.72 | −7.63 | 1.65E−13 | rs6737668 | 2:103093081 | T | −3.16 | −9.11 | 3.48E−18 |
| rs4851564 | 2:102925790 | C | −2.73 | −7.69 | 1.10E−13 | rs10469840 | 2:103093243 | C | −3.16 | −9.27 | 1.02E−18 |
| rs6721346 | 2:102926320 | C | −2.82 | −8.15 | 4.40E−15 | rs759382 | 2:103094213 | T | −2.94 | −8.45 | 4.81E−16 |
| rs12470864 | 2:102926362 | A | −2.88 | −8.4 | 7.15E−16 | rs759381 | 2:103094323 | T | −2.84 | −8.06 | 8.12E−15 |
| rs12470867 | 2:102926366 | A | −2.7 | −7.56 | 2.55E−13 | rs6543146 | 2:103096695 | G | −1.73 | −4.65 | 4.52E−06 |
| rs10178436 | 2:102926511 | C | −3.31 | −9.94 | 5.03E−21 | rs1030026 | 2:103098178 | C | −1.73 | −4.64 | 4.78E−06 |
| rs11679191 | 2:102926800 | T | −2.82 | −8.15 | 4.40E−15 | rs1523199 | 2:103098191 | G | −1.79 | −4.79 | 2.32E−06 |
| rs11685424 | 2:102926981 | A | −2.82 | −8.15 | 4.40E−15 | rs1523198 | 2:103098474 | T | −1.79 | −4.79 | 2.32E−06 |
| rs11685480 | 2:102927086 | A | −2.82 | −8.15 | 4.40E−15 | rs2140316 | 2:103098676 | A | −1.78 | −4.78 | 2.48E−06 |
| rs6543115 | 2:102927641 | G | −3.35 | −10.05 | 2.03E−21 | rs74180219 | 2:103100298 | C | −1.98 | −5.39 | 1.16E−07 |
| rs6543116 | 2:102927726 | G | −3.38 | −10.11 | 1.27E−21 | rs61604733 | 2:103100300 | C | −1.97 | −5.35 | 1.46E−07 |
| rs6733174 | 2:102929012 | C | −2.79 | −8.04 | 9.39E−15 | rs10175045 | 2:103103232 | C | −1.79 | −4.81 | 2.12E−06 |
| rs6543118 | 2:102929469 | A | −3.35 | −10.03 | 2.46E−21 | rs10172588 | 2:103103297 | G | −1.82 | −4.9 | 1.35E−06 |
| rs1558622 | 2:102930147 | A | −2.86 | −8.21 | 2.77E−15 | rs2310303 | 2:103103879 | G | −1.72 | −4.65 | 4.38E−06 |
| rs1558621 | 2:102930307 | G | −2.85 | −8.23 | 2.41E−15 | rs2310304 | 2:103105148 | C | −1.81 | −4.89 | 1.44E−06 |
| rs10189202 | 2:102930380 | C | −2.86 | −8.21 | 2.77E−15 | rs6705272 | 2:103106569 | C | −1.97 | −5.23 | 2.68E−07 |
| rs10191914 | 2:102930657 | C | −2.86 | −8.21 | 2.77E−15 | rs1523200 | 2:103106773 | G | −1.91 | −4.57 | 6.44E−06 |
| rs10189711 | 2:102930881 | G | −2.9 | −8.36 | 9.65E−16 | rs1523201 | 2:103107064 | T | −1.8 | −4.85 | 1.76E−06 |
| rs12712135 | 2:102930948 | G | −3.35 | −10.03 | 2.46E−21 | rs7567885 | 2:103108852 | G | −1.95 | −5.19 | 3.30E−07 |
| rs1558620 | 2:102931395 | C | −2.86 | −8.21 | 2.77E−15 | rs4851598 | 2:103109676 | C | −1.95 | −5.19 | 3.30E−07 |
| rs1558619 | 2:102931550 | T | −2.81 | −8.08 | 7.12E−15 | rs1403548 | 2:103110375 | T | −1.8 | −4.85 | 1.76E−06 |
| rs12996505 | 2:102931802 | G | −3.34 | −9.99 | 3.32E−21 | rs12712153 | 2:103111761 | T | −1.95 | −5.17 | 3.63E−07 |
| rs13020553 | 2:102931826 | G | −2.91 | −8.46 | 4.75E−16 | rs11687071 | 2:103111920 | A | −1.95 | −5.19 | 3.30E−07 |
| rs13020793 | 2:102931926 | T | −2.86 | −8.21 | 2.77E−15 | rs7566063 | 2:103112565 | A | −1.8 | −4.85 | 1.76E−06 |
| rs10183388 | 2:102932247 | T | −3.34 | −9.99 | 3.32E−21 | rs7591872 | 2:103112641 | C | −1.81 | −4.9 | 1.37E−06 |
| rs953934 | 2:102932293 | T | −3.34 | −9.99 | 3.32E−21 | rs7591878 | 2:103112658 | A | −1.85 | −4.98 | 9.51E−07 |
| rs950880 | 2:102932562 | A | −2.91 | −8.46 | 4.75E−16 | rs6543150 | 2:103113983 | T | −1.75 | −4.73 | 3.16E−06 |
| rs1968171 | 2:102933552 | C | −2.86 | −8.21 | 2.77E−15 | rs6543151 | 2:103114041 | G | −1.88 | −5.01 | 8.23E−07 |
| rs4613307 | 2:102933758 | G | −2.84 | −8.11 | 5.83E−15 | rs6543152 | 2:103114043 | A | −1.88 | −5.01 | 8.23E−07 |
| rs1968170 | 2:102933802 | A | −2.78 | −8 | 1.26E−14 | rs6543153 | 2:103114203 | C | −1.97 | −5.25 | 2.40E−07 |
| rs11123918 | 2:102935237 | C | −2.86 | −8.21 | 2.77E−15 | rs6543154 | 2:103114334 | C | −1.81 | −4.87 | 1.61E−06 |
| rs10182639 | 2:102935805 | A | −2.86 | −8.21 | 2.77E−15 | rs6543155 | 2:103114895 | A | −1.81 | −4.89 | 1.44E−06 |
| rs11693204 | 2:102935974 | A | −2.67 | −7.48 | 4.54E−13 | rs7573566 | 2:103115205 | C | −1.97 | −5.23 | 2.68E−07 |
| rs11690443 | 2:102936131 | A | −2.86 | −8.18 | 3.47E−15 | rs11123934 | 2:103115568 | A | −1.81 | −4.89 | 1.44E−06 |
| rs12712136 | 2:102936366 | C | −2.86 | −8.18 | 3.47E−15 | rs12987295 | 2:103115838 | A | −1.98 | −5.25 | 2.42E−07 |
| rs974389 | 2:102936981 | A | −2.86 | −8.18 | 3.47E−15 | rs4851012 | 2:103115915 | T | −1.98 | −5.25 | 2.42E−07 |
| rs4142132 | 2:102937482 | A | −2.86 | −8.18 | 3.47E−15 | rs4851599 | 2:103116020 | T | −1.98 | −5.25 | 2.42E−07 |
| rs971764 | 2:102938335 | T | −2.86 | −8.18 | 3.47E−15 | rs4851013 | 2:103116135 | T | −1.94 | −5.2 | 3.18E−07 |
| rs13001325 | 2:102939036 | T | −2.89 | −8.39 | 7.72E−16 | rs4851600 | 2:103116223 | G | −1.94 | −5.2 | 3.18E−07 |
| rs1420088 | 2:102939434 | C | −2.86 | −8.18 | 3.47E−15 | rs4851014 | 2:103116276 | T | −1.94 | −5.2 | 3.18E−07 |
| rs66780767 | 2:102939709 | T | −2.23 | −6.3 | 7.74E−10 | rs4851602 | 2:103116305 | A | −1.85 | −4.97 | 1.01E−06 |
| rs11123919 | 2:102939754 | A | −2.91 | −8.36 | 9.17E−16 | rs12995030 | 2:103116466 | G | −1.97 | −5.23 | 2.68E−07 |
| rs11123920 | 2:102939833 | T | −2.85 | −8.16 | 4.07E−15 | rs11682754 | 2:103117095 | G | −1.97 | −5.23 | 2.68E−07 |
| rs6706844 | 2:102940412 | C | −2.83 | −8.12 | 5.50E−15 | rs6728288 | 2:103117268 | T | −1.97 | −5.23 | 2.68E−07 |
| rs11674832 | 2:102940999 | G | −2.82 | −8.04 | 9.36E−15 | rs6741235 | 2:103117283 | A | −1.97 | −5.23 | 2.68E−07 |
| rs11679889 | 2:102941009 | A | −2.65 | −7.39 | 8.11E−13 | rs56249513 | 2:103117509 | C | −1.97 | −5.23 | 2.68E−07 |
| rs11675988 | 2:102941019 | C | −2.82 | −8.04 | 9.36E−15 | rs6741627 | 2:103117618 | T | −1.97 | −5.23 | 2.68E−07 |
| rs11679900 | 2:102941074 | T | −2.82 | −8.04 | 9.36E−15 | rs6713906 | 2:103117637 | G | −1.92 | −5.11 | 4.97E−07 |
| rs11676075 | 2:102941215 | C | −2.82 | −8.04 | 9.36E−15 | rs6543157 | 2:103117827 | G | −1.92 | −5.11 | 4.97E−07 |
| rs11676124 | 2:102941338 | C | −2.85 | −8.11 | 5.89E−15 | rs7591101 | 2:103117910 | T | −1.89 | −5.01 | 8.17E−07 |
| rs11123921 | 2:102941561 | G | −2.86 | −8.18 | 3.47E−15 | rs7568122 | 2:103117989 | T | −1.97 | −5.27 | 2.23E−07 |
| rs12992762 | 2:102941715 | C | −2.86 | −8.18 | 3.47E−15 | rs2075193 | 2:103118027 | A | −1.77 | −4.77 | 2.57E−06 |
| rs12998412 | 2:102941818 | C | −2.86 | −8.18 | 3.47E−15 | rs7593935 | 2:103118128 | A | −1.95 | −5.24 | 2.50E−07 |
| rs9750771 | 2:102941918 | A | −3.38 | −10.04 | 2.22E−21 | rs2075192 | 2:103118228 | G | −1.97 | −5.24 | 2.50E−07 |
| rs11123922 | 2:102942187 | C | −2.86 | −8.18 | 3.47E−15 | rs2075191 | 2:103118299 | T | −2 | −5.32 | 1.72E−07 |
| rs12053422 | 2:102942537 | A | −2.86 | −8.18 | 3.47E−15 | rs2072509 | 2:103118337 | C | −1.97 | −5.24 | 2.50E−07 |
| rs58933240 | 2:102942920 | C | −2.84 | −8.13 | 5.09E−15 | rs2072508 | 2:103118342 | C | −1.83 | −4.95 | 1.07E−06 |
| rs56403447 | 2:102942921 | C | −2.84 | −8.13 | 5.09E−15 | rs2075190 | 2:103118559 | T | −1.92 | −5.13 | 4.46E−07 |

TABLE 2-continued

List of variants associated with plasma sST2 levels. For each SNP, a positive beta value indicates a higher plasma sST2 level in the minor allele carriers and a negative beta value indicates a lower plasma sST2 level in the minor allele carriers. SNP, single nucleotide polymorphism; MA, minor allele, Beta, effect size; Stat, Coefficient t-statistics.

| SNP | BP | MA | Beta | Stat | P-value | SNP | BP | MA | Beta | Stat | P-value |
|---|---|---|---|---|---|---|---|---|---|---|---|
| rs13005688 | 2:102942939 | C | −2.85 | −8.16 | 4.02E−15 | rs2075189 | 2:103118689 | G | −1.97 | −5.21 | 2.92E−07 |
| rs12725988 | 2:102943386 | T | −2.84 | −8.13 | 5.09E−15 | rs11690932 | 2:103119029 | A | −1.97 | −5.23 | 2.68E−07 |
| rs4490207 | 2:102943822 | G | −2.86 | −8.18 | 3.47E−15 | rs2075188 | 2:103120232 | A | −1.98 | −5.25 | 2.45E−07 |
| rs4455171 | 2:102943844 | T | −2.86 | −8.18 | 3.47E−15 | rs2075187 | 2:103120311 | A | −1.82 | −4.91 | 1.32E−06 |
| rs13007344 | 2:102943883 | C | −2.86 | −8.18 | 3.47E−15 | rs4851015 | 2:103120356 | T | −1.82 | −4.91 | 1.32E−06 |
| rs141508079 | 2:102944191 | G | −2.11 | −5.11 | 4.86E−07 | rs4851016 | 2:103120400 | T | −1.98 | −5.25 | 2.45E−07 |
| rs76520363 | 2:102945241 | A | −2.86 | −8.18 | 3.47E−15 | rs4851017 | 2:103120769 | A | −1.97 | −5.24 | 2.58E−07 |
| rs76278109 | 2:102945378 | G | −2.86 | −8.18 | 3.47E−15 | rs4851605 | 2:103120868 | G | −2.03 | −5.42 | 1.01E−07 |
| rs76886731 | 2:102945416 | T | −2.86 | −8.18 | 3.47E−15 | rs4851606 | 2:103120889 | A | −1.95 | −5.19 | 3.29E−07 |
| rs150341880 | 2:102945755 | T | −2.83 | −8.11 | 5.62E−15 | rs13019784 | 2:103123301 | G | −2.86 | −8.29 | 1.59E−15 |
| rs75392560 | 2:102946082 | C | −2.8 | −7.98 | 1.46E−14 | rs9989842 | 2:103123633 | G | −2.88 | −8.39 | 7.89E−16 |
| rs76498201 | 2:102946111 | G | −2.84 | −8.07 | 7.84E−15 | rs9989749 | 2:103123642 | A | −2.83 | −8.22 | 2.52E−15 |
| rs56192435 | 2:102946677 | G | −2.71 | −7.55 | 2.76E−13 | rs6708949 | 2:103123965 | C | −2.88 | −8.19 | 3.16E−15 |
| rs12996772 | 2:102947201 | T | −2.86 | −8.18 | 3.47E−15 | rs6724109 | 2:103125018 | G | −2.86 | −8.29 | 1.59E−15 |
| rs1420104 | 2:102948470 | A | −2.89 | −8.39 | 7.72E−16 | rs6751949 | 2:103125138 | A | −2.86 | −8.29 | 1.59E−15 |
| rs1420103 | 2:102948632 | C | −3.41 | −10.09 | 1.47E−21 | rs6724322 | 2:103125182 | T | −2.88 | −8.19 | 3.16E−15 |
| rs1420102 | 2:102948819 | T | −2.86 | −8.18 | 3.47E−15 | rs6739301 | 2:103125457 | G | −2.86 | −8.29 | 1.59E−15 |
| rs12466380 | 2:102948939 | G | −2.81 | −7.98 | 1.48E−14 | rs6742381 | 2:103125466 | C | −2.86 | −8.29 | 1.59E−15 |
| rs12479210 | 2:102949161 | T | −2.89 | −8.39 | 7.72E−16 | rs4851607 | 2:103125632 | T | −2.86 | −8.29 | 1.59E−15 |
| rs13019081 | 2:102950822 | C | −2.91 | −8.38 | 8.44E−16 | rs10195948 | 2:103125736 | C | −2.86 | −8.29 | 1.59E−15 |
| rs12712140 | 2:102951062 | A | −2.89 | −8.3 | 1.51E−15 | rs4851608 | 2:103125984 | T | −2.52 | −7.02 | 9.24E−12 |
| rs1997467 | 2:102951073 | G | −2.86 | −8.18 | 3.47E−15 | rs10210680 | 2:103127682 | A | −2.87 | −8.35 | 1.05E−15 |
| rs1997466 | 2:102951467 | G | −2.86 | −8.18 | 3.47E−15 | rs12712155 | 2:103127963 | T | −2.9 | −8.29 | 1.55E−15 |
| rs1362350 | 2:102951798 | C | −2.86 | −8.18 | 3.47E−15 | rs4851609 | 2:103128866 | C | −2.9 | −8.29 | 1.55E−15 |
| rs1362349 | 2:102951972 | C | −2.86 | −8.18 | 3.47E−15 | rs11676371 | 2:103129692 | C | −2.91 | −8.44 | 5.42E−16 |
| rs17026974 | 2:102952360 | A | −2.65 | −7.39 | 8.26E−13 | rs1476999 | 2:103131679 | A | −2.49 | −6.87 | 2.32E−11 |
| rs12712141 | 2:102953067 | C | −2.75 | −7.88 | 2.89E−14 | rs2192758 | 2:103132269 | G | −2.76 | −7.9 | 2.59E−14 |
| rs59247511 | 2:102954190 | C | −2.86 | −8.18 | 3.47E−15 | rs2192757 | 2:103132378 | T | −2.9 | −8.25 | 2.05E−15 |
| rs873022 | 2:102955683 | T | −2.6 | −7.25 | 2.05E−12 | rs2216000 | 2:103132640 | C | −2.52 | −7.02 | 9.24E−12 |
| rs3771177 | 2:102955860 | T | −2.7 | −7.51 | 3.60E−13 | rs6714379 | 2:103133310 | G | −2.92 | −8.32 | 1.31E−15 |
| rs3732129 | 2:102957532 | C | −2.7 | −7.51 | 3.60E−13 | rs1916307 | 2:103134180 | T | −2.9 | −8.25 | 2.05E−15 |
| rs1420101 | 2:102957716 | T | −2.9 | −8.4 | 6.87E−16 | rs4851610 | 2:103134652 | G | −2.9 | −8.25 | 2.05E−15 |
| rs12905 | 2:102960007 | A | −2.71 | −7.55 | 2.76E−13 | rs1523204 | 2:103135637 | A | −2.52 | −7.02 | 9.24E−12 |
| rs3821204 | 2:102960281 | G | −2.71 | −7.55 | 2.76E−13 | rs1523203 | 2:103135759 | G | −2.9 | −8.25 | 2.05E−15 |
| rs13001714 | 2:102960485 | G | −2.89 | −8.39 | 7.72E−16 | rs4851611 | 2:103135938 | T | −2.88 | −8.16 | 4.09E−15 |
| rs12712142 | 2:102960584 | A | −2.92 | −8.47 | 4.41E−16 | rs1403550 | 2:103136309 | C | −2.9 | −8.25 | 2.05E−15 |
| rs6543119 | 2:102963072 | T | −2.9 | −8.43 | 5.91E−16 | rs1403551 | 2:103136446 | G | −2.9 | −8.25 | 2.05E−15 |
| rs13017455 | 2:102964742 | T | −2.92 | −8.47 | 4.41E−16 | rs2058657 | 2:103137015 | C | −2.91 | −8.31 | 1.40E−15 |
| rs55927292 | 2:102964861 | T | −2.71 | −7.55 | 2.76E−13 | rs2058656 | 2:103137026 | G | −2.52 | −7.02 | 9.24E−12 |
| rs17027006 | 2:102965332 | C | −2.71 | −7.55 | 2.76E−13 | rs4851612 | 2:103137880 | G | −2.52 | −7.02 | 9.24E−12 |
| rs12469506 | 2:102965871 | T | −2.71 | −7.55 | 2.76E−13 | rs4851613 | 2:103137990 | C | −2.9 | −8.25 | 2.05E−15 |
| rs1921622 | 2:102966067 | A | −3.35 | −10.21 | 5.35E−22 | rs6750851 | 2:103138761 | G | −2.9 | −8.25 | 2.05E−15 |
| rs1861246 | 2:102966783 | C | −3.38 | −10.07 | 1.65E−21 | rs6750971 | 2:103138825 | G | −2.9 | −8.25 | 2.05E−15 |
| rs11123923 | 2:102967844 | A | −2.92 | −8.47 | 4.41E−16 | rs10193407 | 2:103139298 | T | −2.83 | −8.06 | 7.88E−15 |
| rs35224028 | 2:102969606 | C | −2.88 | −8.42 | 5.99E−16 | rs11123935 | 2:103139751 | G | −2.9 | −8.27 | 1.78E−15 |
| rs67723747 | 2:102969807 | T | −2.73 | −7.62 | 1.72E−13 | rs4851614 | 2:103140398 | T | −2.65 | −7.55 | 2.87E−13 |
| rs56386507 | 2:102971165 | T | −2.67 | −7.44 | 5.91E−13 | rs1357471 | 2:103140472 | T | −2.68 | −7.63 | 1.64E−13 |
| rs13015714 | 2:102971865 | T | −3.36 | −10.02 | 2.5E−21 | rs2015478 | 2:103141447 | G | −2.68 | −7.63 | 1.64E−13 |
| rs12999364 | 2:102974129 | T | −2.86 | −8.24 | 2.30E−15 | rs1024798 | 2:103141651 | C | −2.81 | −7.93 | 1.97E−14 |
| rs12998521 | 2:102974417 | T | −2.88 | −8.32 | 1.26E−15 | rs6712638 | 2:103142491 | C | −2.81 | −7.93 | 1.97E−14 |
| rs12987977 | 2:102975336 | G | −2.86 | −8.24 | 2.30E−15 | rs4241211 | 2:103143159 | G | −2.68 | −7.63 | 1.64E−13 |
| rs6710885 | 2:102977537 | G | −2.82 | −8.07 | 7.50E−15 | rs12712156 | 2:103144020 | C | −2.68 | −7.63 | 1.64E−13 |
| rs2287037 | 2:102979028 | T | −2.86 | −8.24 | 2.30E−15 | rs3849364 | 2:103144242 | C | −2.68 | −7.63 | 1.64E−13 |
| rs6727306 | 2:102981644 | C | −3.32 | −9.8 | 1.48E−20 | rs3849365 | 2:103144391 | A | −2.68 | −7.63 | 1.64E−13 |
| rs11465583 | 2:102982466 | G | −3.27 | −9.59 | 7.91E−20 | rs3849366 | 2:103144900 | A | −2.68 | −7.63 | 1.64E−13 |
| rs10197284 | 2:102982703 | A | −3.19 | −9.37 | 4.79E−19 | rs6739236 | 2:103144944 | G | −2.68 | −7.63 | 1.64E−13 |
| rs1573895 | 2:102982876 | C | −3.32 | −9.86 | 9.52E−21 | rs6712696 | 2:103145001 | A | −2.68 | −7.63 | 1.64E−13 |
| rs4851569 | 2:102983247 | A | −2.86 | −8.24 | 2.30E−15 | rs1005042 | 2:103145359 | A | −2.71 | −7.69 | 1.08E−13 |
| rs1420098 | 2:102984279 | C | −2.85 | −8.25 | 2.12E−15 | rs1005043 | 2:103145426 | G | −2.68 | −7.63 | 1.64E−13 |
| rs1882348 | 2:102984671 | A | −2.86 | −8.24 | 2.30E−15 | rs4851018 | 2:103146615 | T | −2.68 | −7.63 | 1.64E−13 |
| rs1558627 | 2:102984684 | A | −3.32 | −9.86 | 9.52E−21 | rs4851613 | 2:103146999 | T | −2.52 | −6.87 | 2.28E−11 |
| rs2058622 | 2:102985424 | G | −3.32 | −9.86 | 9.52E−21 | rs1003431 | 2:103147256 | C | −2.68 | −7.63 | 1.64E−13 |
| rs3771172 | 2:102985812 | T | −2.56 | −7.05 | 7.38E−12 | rs4241212 | 2:103147671 | G | −2.68 | −7.63 | 1.64E−13 |
| rs3771171 | 2:102985950 | C | −2.58 | −7.09 | 5.74E−12 | rs741285 | 2:103148169 | T | −2.68 | −7.63 | 1.64E−13 |
| rs3771170 | 2:102985980 | A | −3.23 | −9.51 | 1.51E−19 | rs1014286 | 2:103149169 | A | −2.68 | −7.63 | 1.64E−13 |
| rs2160202 | 2:102986154 | A | −2.69 | −7.43 | 6.30E−13 | rs2008159 | 2:103149162 | G | −2.68 | −7.63 | 1.64E−13 |
| rs2058623 | 2:102986170 | T | −3.28 | −9.75 | 2.31E−20 | rs2008157 | 2:103149182 | G | −2.68 | −7.64 | 1.50E−13 |
| rs1465321 | 2:102986618 | C | −3.32 | −9.86 | 9.52E−21 | rs1829849 | 2:103149698 | C | −2.68 | −7.63 | 1.64E−13 |
| rs6742875 | 2:102987526 | G | −3.24 | −9.52 | 1.47E−19 | rs10179779 | 2:103150204 | C | −2.68 | −7.63 | 1.64E−13 |
| rs6733346 | 2:102987698 | C | −3.23 | −9.43 | 2.81E−19 | rs10179874 | 2:103150306 | C | −2.47 | −6.71 | 6.53E−11 |
| rs2041740 | 2:102989734 | G | −3.24 | −9.52 | 1.47E−19 | rs10177737 | 2:103150651 | C | −2.68 | −7.63 | 1.64E−13 |
| rs6731154 | 2:102991181 | T | −3.24 | −9.52 | 1.47E−19 | rs12468713 | 2:103150691 | A | −2.68 | −7.63 | 1.64E−13 |
| rs2270298 | 2:102992079 | G | −2.88 | −8.11 | 5.64E−15 | rs6737119 | 2:103151109 | A | −2.68 | −7.63 | 1.64E−13 |
| rs2270297 | 2:102992675 | C | −3.24 | −9.52 | 1.47E−19 | rs6709284 | 2:103151164 | G | −2.68 | −7.63 | 1.64E−13 |

TABLE 2-continued

List of variants associated with plasma sST2 levels. For each SNP, a positive beta value indicates a higher plasma sST2 level in the minor allele carriers and a negative beta value indicates a lower plasma sST2 level in the minor allele carriers. SNP, single nucleotide polymorphism; MA, minor allele, Beta, effect size; Stat, Coefficient t-statistics.

| SNP | BP | MA | Beta | Stat | P-value | SNP | BP | MA | Beta | Stat | P-value |
|---|---|---|---|---|---|---|---|---|---|---|---|
| rs6753717 | 2:102993161 | C | −3.24 | −9.52 | 1.47E−19 | rs6724213 | 2:103151219 | C | −2.81 | −7.93 | 1.97E−14 |
| rs10190555 | 2:102994056 | G | −3.24 | −9.52 | 1.47E−19 | rs2177317 | 2:103151319 | G | −2.68 | −7.63 | 1.64E−13 |
| rs6750020 | 2:102994714 | A | −3.24 | −9.52 | 1.47E−19 | rs2871474 | 2:103151441 | A | −2.81 | −7.93 | 1.97E−14 |
| rs17027037 | 2:102994884 | G | −2.88 | −8.11 | 5.64E−15 | rs4851616 | 2:103151862 | T | −2.81 | −7.93 | 1.97E−14 |
| rs2080289 | 2:102995020 | A | −2.88 | −8.11 | 5.64E−15 | rs4851617 | 2:103152060 | T | −2.68 | −7.63 | 1.64E−13 |
| rs6729638 | 2:102996022 | T | −3.19 | −9.28 | 9.09E−19 | rs7578425 | 2:103152216 | G | −2.76 | −7.76 | 6.59E−14 |
| rs11683700 | 2:102996805 | T | −2.88 | −8.11 | 5.64E−15 | rs10172553 | 2:103152975 | T | −2.5 | −6.8 | 3.59E−11 |
| rs3821203 | 2:102996872 | T | −2.86 | −8.03 | 9.92E−15 | rs4292112 | 2:103153780 | A | −2.65 | −7.55 | 2.87E−13 |
| rs3771162 | 2:102997174 | T | −2.88 | −8.11 | 5.64E−15 | rs6761291 | 2:103155069 | T | −2.5 | −6.8 | 3.59E−11 |
| rs11465633 | 2:102997733 | T | −2.88 | −8.11 | 5.64E−15 | rs7576376 | 2:103156205 | C | −2.72 | −7.65 | 1.43E−13 |
| rs56258475 | 2:102999312 | G | −2.88 | −8.11 | 5.64E−15 | rs6543158 | 2:103157352 | G | −2.81 | −7.93 | 1.97E−14 |
| rs1035130 | 2:103001402 | T | −2.88 | −8.11 | 5.64E−15 | rs11685483 | 2:103159093 | C | −2.79 | −7.81 | 4.75E−14 |
| rs3755274 | 2:103002395 | G | −3.24 | −9.52 | 1.47E−19 | rs6543159 | 2:103160057 | C | −2.87 | −8.18 | 3.43E−15 |
| rs2241117 | 2:103003043 | C | −3.24 | −9.52 | 1.47E−19 | rs6739426 | 2:103160443 | G | −2.81 | −7.93 | 1.97E−14 |
| rs2241116 | 2:103003265 | A | −2.46 | −5.97 | 5.17E−09 | rs10490202 | 2:103160638 | G | −2.68 | −7.63 | 1.64E−13 |
| rs4851570 | 2:103006387 | G | −2.88 | −8.11 | 5.64E−15 | rs11899041 | 2:103161053 | A | −2.81 | −7.93 | 1.97E−14 |
| rs2001461 | 2:103007220 | C | −3.24 | −9.52 | 1.47E−19 | rs1811263 | 2:103162861 | T | −2.5 | −6.8 | 3.59E−11 |
| rs17027060 | 2:103007567 | C | −2.88 | −8.11 | 5.84E−15 | rs1811262 | 2:103162992 | C | −2.68 | −7.63 | 1.64E−13 |
| rs3860444 | 2:103007623 | G | −3.24 | −9.52 | 1.47E−19 | rs12712157 | 2:103165129 | C | −2.81 | −7.93 | 1.97E−14 |
| rs12712145 | 2:103008710 | C | −3.2 | −9.41 | 3.42E−19 | rs10194822 | 2:103165504 | G | −2.53 | −6.87 | 2.33E−11 |
| rs66919607 | 2:103008969 | G | −2.74 | −7.73 | 7.92E−14 | rs1303960 | 2:103165832 | A | −2.81 | −7.93 | 1.97E−14 |
| rs2287035 | 2:103010530 | A | −2.83 | −8 | 1.26E−14 | rs2215998 | 2:103166043 | G | −2.53 | −6.87 | 2.33E−11 |
| rs2287034 | 2:103010588 | A | −2.83 | −8 | 1.26E−14 | rs12712158 | 2:103166298 | C | −2.59 | −7.02 | 9.00E−12 |
| rs4851005 | 2:103011552 | T | −2.83 | −8 | 1.26E−14 | rs723293 | 2:103166534 | T | −2.56 | −6.92 | 1.69E−11 |
| rs17027071 | 2:103012674 | T | −2.37 | −6.8 | 3.65E−11 | rs7581853 | 2:103167724 | T | −2.69 | −7.67 | 1.27E−13 |
| rs3732126 | 2:103013962 | C | −2.83 | −8 | 1.26E−14 | rs6753722 | 2:103168605 | A | −2.71 | −7.73 | 8.37E−14 |
| rs3732125 | 2:103013963 | C | −2.85 | −8.02 | 1.06E−14 | rs10193009 | 2:103168977 | T | −2.69 | −7.73 | 8.21E−14 |
| rs1135354 | 2:103014302 | G | −2.77 | −7.83 | 3.98E−14 | rs11123937 | 2:103169682 | A | −2.69 | −7.65 | 1.43E−13 |
| rs1568681 | 2:103014696 | T | −3.2 | −9.41 | 3.42E−19 | rs12712159 | 2:103169982 | A | −2.69 | −7.71 | 9.08E−14 |
| rs17027087 | 2:103015918 | T | −2.83 | −7.96 | 1.65E−14 | rs10196579 | 2:103170181 | T | −2.5 | −6.8 | 3.59E−11 |
| rs55664618 | 2:103016216 | A | −2.7 | −7.43 | 6.03E−13 | rs997056 | 2:103170919 | G | −2.68 | −7.63 | 1.64E−13 |
| rs3732123 | 2:103018077 | G | −2.78 | −7.79 | 5.26E−14 | rs2310295 | 2:103171066 | A | −2.5 | −6.8 | 3.59E−11 |
| rs55742125 | 2:103019782 | A | −2.83 | −7.96 | 1.65E−14 | rs2110737 | 2:103172263 | A | −2.69 | −7.67 | 1.27E−13 |
| rs1035127 | 2:103019919 | G | −3.22 | −9.41 | 3.28E−19 | rs2005881 | 2:103173059 | A | −2.81 | −7.88 | 2.89E−14 |
| rs55883125 | 2:103024331 | A | −2.83 | −7.96 | 1.65E−14 | rs1989184 | 2:103174935 | G | −2.81 | −7.93 | 1.97E−14 |
| rs4851006 | 2:103024738 | A | −2.83 | −7.96 | 1.65E−14 | rs10171438 | 2:103175376 | A | −2.53 | −6.87 | 2.33E−11 |
| rs4851007 | 2:103024813 | G | −3.25 | −9.46 | 2.23E−19 | rs10210658 | 2:103175749 | G | −2.7 | −7.71 | 9.21E−14 |
| rs4851575 | 2:103025203 | A | −3.17 | −9.35 | 5.64E−19 | rs4851619 | 2:103176411 | T | −2.81 | −7.93 | 1.97E−14 |
| rs4851008 | 2:103026611 | C | −3.21 | −9.39 | 3.93E−19 | rs6761871 | 2:103176797 | C | −2.74 | −7.76 | 6.65E−14 |
| rs6419573 | 2:103027103 | C | −3.21 | −9.39 | 3.93E−19 | rs10202404 | 2:103177174 | T | −2.53 | −6.87 | 2.33E−11 |
| rs11693955 | 2:103029165 | T | −2.84 | −7.99 | 1.35E−14 | rs4851019 | 2:103177565 | A | −2.5 | −6.81 | 3.41E−11 |
| rs6543132 | 2:103029410 | G | −3.21 | −9.39 | 3.93E−19 | rs12469973 | 2:103182273 | G | −2.45 | −6.68 | 7.63E−11 |
| rs1807782 | 2:103033147 | T | −3.21 | −9.39 | 3.93E−19 | rs11123938 | 2:103188785 | G | −2.34 | −6.34 | 5.93E−10 |
| rs3755272 | 2:103033825 | A | −2.38 | −5.8 | 1.30E−08 | rs1861229 | 2:103208610 | G | −2.02 | −5.45 | 8.66E−08 |
| rs1420106 | 2:103035044 | G | −3.21 | −9.39 | 3.93E−19 | rs11677922 | 2:103273676 | A | −1.67 | −4.69 | 3.74E−06 |
| rs2293225 | 2:103035889 | T | −2.42 | −5.89 | 7.97E−09 | rs12052753 | 2:103287966 | C | 1.86 | 4.95 | 1.09E−06 |
| rs3771156 | 2:103036677 | T | −2.83 | −7.96 | 1.65E−14 | rs199977663 | 2:137575582 | A | 2.7 | 4.99 | 8.87E−07 |
| rs3755268 | 2:103038527 | G | −3.21 | −9.39 | 3.93E−19 | rs2141304 | 4:11286652 | G | 2.12 | 4.65 | 4.47E−06 |
| rs3755267 | 2:103038587 | G | −3.15 | −9.15 | 2.57E−18 | rs10805282 | 4:11291091 | G | −2.1 | −4.56 | 6.72E−06 |
| rs3817465 | 2:103039584 | T | −3.19 | −9.29 | 8.61E−19 | rs10805283 | 4:11291169 | G | −2.1 | −4.56 | 6.72E−06 |
| rs2272128 | 2:103039929 | A | −3.21 | −9.39 | 3.93E−19 | rs13128031 | 4:11291539 | T | −2.1 | −4.56 | 6.72E−06 |
| rs887972 | 2:103040945 | A | −2.83 | −8.06 | 8.10E−15 | rs4103380 | 4:96370605 | C | 1.8 | 4.59 | 5.76E−06 |
| rs887971 | 2:103041167 | C | −2.84 | −8.02 | 1.12E−14 | rs7705676 | 5:35237736 | C | 2.21 | 4.55 | 7.06E−06 |
| rs11678975 | 2:103043739 | A | −2.86 | −8.01 | 1.17E−14 | rs7727503 | 5:35238047 | G | 2.17 | 4.52 | 8.11E−06 |
| rs11694658 | 2:103045020 | G | −3.19 | −9.33 | 6.15E−19 | rs7710279 | 5:35238245 | C | 2.21 | 4.55 | 7.06E−06 |
| rs2160232 | 2:103046880 | A | −3.18 | −9.35 | 5.26E−19 | rs10472952 | 5:35238365 | C | 2.21 | 4.55 | 7.06E−06 |
| rs66566526 | 2:103047802 | G | −2.84 | −8.02 | 1.12E−14 | rs9292581 | 5:35238779 | A | 2.21 | 4.55 | 7.06E−06 |
| rs6755786 | 2:103048103 | T | −3.21 | −9.45 | 2.56E−19 | rs4703514 | 5:35239028 | C | 2.19 | 4.56 | 6.61E−06 |
| rs56331791 | 2:103048157 | A | −2.84 | −8.02 | 1.12E−14 | rs13361375 | 5:35239203 | G | 2.21 | 4.55 | 7.06E−06 |
| rs6713618 | 2:103048437 | T | −3.21 | −9.45 | 2.56E−19 | rs191531802 | 5:156401928 | G | 2.74 | 4.95 | 1.10E−06 |
| rs6716784 | 2:103048467 | A | −3.21 | −9.45 | 2.56E−19 | rs117979984 | 5:156450845 | C | 3.54 | 4.62 | 5.21E−06 |
| rs2041756 | 2:103049910 | G | −3.21 | −9.41 | 3.3E−19 | rs138665140 | 5:156457158 | G | 3.54 | 4.62 | 5.21E−06 |
| rs6543134 | 2:103050458 | G | −3.21 | −9.41 | 3.3E−19 | rs2300619 | 6:146685324 | C | 2.2 | 4.61 | 5.48E−06 |
| rs2110735 | 2:103050925 | G | −3.21 | −9.41 | 3.3E−19 | rs1229502 | 7:81588636 | A | 2.04 | 4.66 | 4.36E−06 |
| rs11681718 | 2:103051144 | G | −2.84 | −8.02 | 1.12E−14 | rs17288506 | 7:106147658 | C | 2.54 | 4.55 | 6.91E−06 |
| rs4851582 | 2:103051558 | C | −2.84 | −8.02 | 1.12E−14 | rs13229385 | 7:106150256 | G | 2.5 | 4.48 | 9.57E−06 |
| rs2110734 | 2:103052206 | T | −3.25 | −9.61 | 6.92E−20 | rs9886235 | 7:106156253 | C | 2.5 | 4.58 | 6.28E−06 |
| rs6746271 | 2:103052995 | C | −3.21 | −9.41 | 3.3E−19 | rs13238247 | 7:106160902 | C | 2.5 | 4.58 | 6.28E−06 |
| rs2058660 | 2:103054449 | G | −3.21 | −9.41 | 3.3E−19 | rs10279909 | 7:106162503 | G | 2.5 | 4.58 | 6.28E−06 |
| rs2058658 | 2:103054803 | C | −3.21 | −9.41 | 3.3E−19 | rs17837506 | 7:106162983 | G | 2.5 | 4.58 | 6.28E−06 |
| rs17027166 | 2:103055420 | A | −2.86 | −8.01 | 1.16E−14 | rs13222141 | 7:106163550 | A | 2.5 | 4.58 | 6.28E−06 |
| rs4851009 | 2:103055644 | A | −3.21 | −9.41 | 3.3E−19 | rs6587006 | 8:21616063 | C | −1.93 | −5.43 | 9.68E−08 |
| rs55645612 | 2:103055661 | T | −2.84 | −8.02 | 1.12E−14 | rs7047059 | 9:71876805 | T | 4.25 | 5.65 | 3.05E−08 |
| rs56166614 | 2:103056096 | G | −2.84 | −8.02 | 1.12E−14 | rs10283781 | 9:71883053 | G | 4.13 | 5.49 | 6.84E−08 |

TABLE 2-continued

List of variants associated with plasma sST2 levels. For each SNP, a positive beta value indicates a higher plasma sST2 level in the minor allele carriers and a negative beta value indicates a lower plasma sST2 level in the minor allele carriers. SNP, single nucleotide polymorphism; MA, minor allele, Beta, effect size; Stat, Coefficient t-statistics.

| SNP | BP | MA | Beta | Stat | P-value | SNP | BP | MA | Beta | Stat | P-value |
|---|---|---|---|---|---|---|---|---|---|---|---|
| rs10490204 | 2:103056534 | C | −2.82 | −7.92 | 2.25E−14 | rs10867298 | 9:71903717 | T | 4.19 | 5.53 | 5.81E−08 |
| rs17027179 | 2:103057159 | T | −2.84 | −8.02 | 1.12E−14 | rs10867299 | 9:71903721 | C | 4.19 | 5.53 | 5.81E−08 |
| rs1558652 | 2:103058328 | A | −3.21 | −9.41 | 3.3E−19 | rs57491316 | 9:71903965 | T | 4.19 | 5.53 | 5.81E−08 |
| rs11123927 | 2:103058803 | T | −2.8 | −7.91 | 2.33E−14 | rs56795581 | 9:71904249 | A | 4.19 | 5.53 | 5.81E−08 |
| rs10490203 | 2:103059237 | G | −2.84 | −8.02 | 1.12E−14 | rs11137952 | 9:71905304 | A | 4.19 | 5.53 | 5.81E−08 |
| rs1558650 | 2:103060024 | A | −3.14 | −9.13 | 2.94E−18 | rs201118747 | 9:71905591 | G | 4.13 | 5.49 | 6.84E−08 |
| rs4851583 | 2:103060300 | C | −2.84 | −8.02 | 1.12E−14 | rs199851061 | 9:71905605 | C | 4.13 | 5.49 | 6.84E−08 |
| rs4851584 | 2:103060313 | G | −3.21 | −9.41 | 3.3E−19 | rs138313346 | 9:71906042 | T | 4.13 | 5.49 | 6.84E−08 |
| rs3771150 | 2:103060851 | A | −2.84 | −8.08 | 7.01E−15 | rs11137959 | 9:71906974 | G | 4.13 | 5.49 | 6.84E−08 |
| rs11694360 | 2:103061147 | A | −2.84 | −8.02 | 1.12E−14 | rs5006678 | 9:111538148 | C | −2.51 | −4.86 | 1.65E−06 |
| rs11123928 | 2:103061286 | A | −2.84 | −8.02 | 1.12E−14 | rs5006679 | 9:111538149 | C | −2.19 | −4.64 | 4.77E−06 |
| rs7597017 | 2:103062116 | G | −2.84 | −8.02 | 1.12E−14 | rs7849649 | 9:131696704 | A | 2.06 | 4.53 | 7.84E−06 |
| rs4851585 | 2:103062754 | A | −2.84 | −8.02 | 1.12E−14 | rs1907370 | 10:27968343 | T | 2.59 | 4.65 | 4.37E−06 |
| rs6734736 | 2:103062880 | T | −3.21 | −9.41 | 3.3E−19 | rs35957931 | 12:74877668 | A | 2.33 | 4.57 | 6.47E−06 |
| rs6708413 | 2:103063369 | A | −3.21 | −9.36 | 5.00E−19 | rs1824539 | 12:74879965 | T | 2.34 | 4.54 | 7.27E−06 |
| rs4851586 | 2:103064264 | C | −3.21 | −9.34 | 5.9E−19 | rs77474403 | 12:74889088 | G | 2.34 | 4.54 | 7.27E−06 |
| rs11465727 | 2:103064503 | G | −2.55 | −7.24 | 2.18E−12 | rs7300059 | 12:74891319 | G | 2.38 | 4.6 | 5.52E−06 |
| rs11465728 | 2:103064511 | A | −2.55 | −7.24 | 2.18E−12 | rs7304361 | 12:74892234 | G | 2.43 | 4.63 | 4.81E−06 |
| rs11465729 | 2:103064512 | T | −2.55 | −7.24 | 2.18E−12 | rs202095841 | 12:74900231 | A | 2.42 | 4.67 | 4.09E−06 |
| rs56044378 | 2:103065367 | A | −2.84 | −8.02 | 1.12E−14 | rs147414753 | 12:74901707 | T | 2.34 | 4.54 | 7.27E−06 |
| rs6543137 | 2:103065908 | G | −3.21 | −9.41 | 3.3E−19 | rs12821034 | 12:74902303 | G | 2.36 | 4.53 | 7.82E−06 |
| rs11465730 | 2:103066858 | G | −2.76 | −7.72 | 8.62E−14 | rs36153793 | 12:74902947 | C | 2.34 | 4.54 | 7.27E−06 |
| rs11123929 | 2:103067143 | A | −2.78 | −7.84 | 3.89E−14 | rs7962722 | 12:74908207 | T | 2.34 | 4.54 | 7.27E−06 |
| rs7559479 | 2:103068787 | A | −3.16 | −9.26 | 1.08E−18 | rs12816163 | 12:74910670 | T | 2.34 | 4.54 | 7.27E−06 |
| rs7603250 | 2:103068834 | A | −3.16 | −9.26 | 1.08E−18 | rs4547177 | 12:74914614 | C | 2.34 | 4.54 | 7.27E−06 |
| rs917997 | 2:103070568 | C | −3.16 | −9.26 | 1.08E−18 | rs2365919 | 12:74914810 | G | 2.34 | 4.54 | 7.27E−06 |
| rs2075185 | 2:103070988 | G | −3.15 | −9.16 | 2.40E−18 | rs35454023 | 12:74915296 | A | 2.34 | 4.54 | 7.27E−06 |
| rs11678721 | 2:103073238 | G | −2.82 | −7.84 | 3.85E−14 | rs58783285 | 12:74915984 | T | 2.34 | 4.54 | 7.27E−06 |
| rs11677555 | 2:103073293 | G | −2.76 | −7.72 | 8.62E−14 | rs1826588 | 12:74917553 | A | 2.34 | 4.54 | 7.27E−06 |
| rs4851587 | 2:103073474 | T | −3.1 | −9.06 | 5.02E−18 | rs1493810 | 12:74920470 | G | 2.34 | 4.54 | 7.27E−06 |
| rs4851588 | 2:103073505 | G | −3.16 | −9.26 | 1.08E−18 | rs34852307 | 12:74922159 | G | 2.33 | 4.49 | 9.31E−06 |
| rs6728475 | 2:103073950 | T | −2.7 | −7.54 | 3.06E−13 | rs2605342 | 12:74922723 | T | −2.34 | −4.54 | 7.27E−06 |
| rs6757276 | 2:103074079 | G | −3.16 | −9.26 | 1.08E−18 | rs2605340 | 12:74923340 | A | −2.34 | −4.54 | 7.27E−06 |
| rs4070554 | 2:103074493 | G | −3.16 | −9.26 | 1.08E−18 | rs12821741 | 12:74923633 | G | 2.34 | 4.54 | 7.27E−06 |
| rs56117144 | 2:103074651 | C | −2.81 | −7.92 | 2.17E−14 | rs1493801 | 12:74924552 | C | 2.34 | 4.54 | 7.27E−06 |
| rs12712150 | 2:103074813 | C | −2.76 | −7.72 | 8.62E−14 | rs1461045 | 12:74925689 | T | −2.34 | −4.54 | 7.27E−06 |
| rs57081652 | 2:103075381 | C | −2.81 | −7.92 | 2.17E−14 | rs1493800 | 12:74926002 | T | 2.34 | 4.54 | 7.27E−06 |
| rs6761825 | 2:103075561 | C | −3.16 | −9.26 | 1.08E−18 | rs17113674 | 12:74926682 | C | 2.34 | 4.54 | 7.27E−06 |
| rs60038017 | 2:103076001 | C | −2.78 | −7.84 | 3.75E−14 | rs17113675 | 12:74926988 | T | 2.34 | 4.54 | 7.27E−06 |
| rs10175585 | 2:103076107 | A | −2.64 | −7.71 | 9.31E−14 | rs17113679 | 12:74927228 | A | 2.34 | 4.54 | 7.27E−06 |
| rs13394086 | 2:103076151 | A | −2.44 | −7.59 | 2.12E−13 | rs60905363 | 12:74927335 | C | 2.34 | 4.54 | 7.27E−06 |
| rs62151860 | 2:103076154 | A | −2.24 | −6.3 | 7.57E−10 | rs34706013 | 12:74928312 | A | 2.34 | 4.54 | 7.27E−06 |
| rs62151861 | 2:103076155 | A | −2.68 | −8.22 | 2.55E−15 | rs2126136 | 12:74929829 | T | 2.34 | 4.54 | 7.27E−06 |
| rs6705001 | 2:103076210 | G | −3.14 | −9.21 | 1.59E−18 | rs2605381 | 12:74929925 | G | −2.34 | −4.54 | 7.27E−06 |
| rs6543141 | 2:103076351 | A | −3.14 | −9.21 | 1.59E−18 | rs12832045 | 12:74930524 | A | 2.34 | 4.54 | 7.27E−06 |
| rs6705385 | 2:103076569 | C | −2.76 | −7.72 | 8.62E−14 | rs1493796 | 12:74931349 | G | 2.34 | 4.54 | 7.27E−06 |
| rs6705498 | 2:103076670 | G | −2.76 | −7.72 | 8.62E−14 | rs590352 | 12:74932159 | C | −2.34 | −4.54 | 7.27E−06 |
| rs6719196 | 2:103076888 | T | −2.76 | −7.72 | 8.62E−14 | rs11615704 | 12:74947219 | T | 2.43 | 4.72 | 3.17E−06 |
| rs7561487 | 2:103077894 | G | −3.16 | −9.26 | 1.08E−18 | rs66994203 | 12:107400417 | G | 3.62 | 5.45 | 8.68E−08 |
| rs4241210 | 2:103078740 | A | −3.16 | −9.26 | 1.08E−18 | rs117523785 | 13:24695615 | G | 3.47 | 4.52 | 8.23E−06 |
| rs6720564 | 2:103079297 | C | −3.16 | −9.26 | 1.08E−18 | rs17641976 | 15:91664657 | A | 4.28 | 5.14 | 4.21E−07 |
| rs17027230 | 2:103079330 | T | −2.82 | −7.95 | 1.82E−14 | rs17515887 | 15:91665392 | C | 3.87 | 4.71 | 3.35E−06 |
| rs6717915 | 2:103079619 | C | −3.16 | −9.26 | 1.08E−18 | rs7208104 | 17:13640730 | C | −2.18 | −4.78 | 2.46E−06 |
| rs6718157 | 2:103079814 | T | −3.16 | −9.26 | 1.08E−18 | rs8081904 | 17:13645480 | G | −2.09 | −4.55 | 7.10E−06 |
| rs2075184 | 2:103080592 | C | −3.16 | −9.26 | 1.08E−18 | rs12600563 | 17:70243206 | T | 2.43 | 4.56 | 6.74E−06 |
| rs11676236 | 2:103081695 | A | −2.76 | −7.72 | 8.62E−14 | rs142226688 | 19:54170960 | A | 3.5 | 4.64 | 4.72E−06 |
| rs11687013 | 2:103081721 | A | −2.76 | −7.72 | 8.62E−14 | rs111246464 | 20:51381201 | T | 3.45 | 4.59 | 5.76E−06 |
| rs917996 | 2:103082273 | A | −3.16 | −9.26 | 1.08E−18 | rs4583526 | 20:55270493 | G | −1.69 | −4.5 | 8.78E−06 |
| rs731628 | 2:103082571 | T | −3.16 | −9.26 | 1.08E−18 | rs56242654 | X:166155 | T | −1.58 | −4.49 | 9.37E−06 |
| rs1403554 | 2:103083453 | A | −3.13 | −9.14 | 2.86E−18 | | | | | | |

TABLE 3

Sequences of the listed variants:

| SNP | BP (Grch37) | Sequences (major/minor alleles) | Seq.ID |
|---|---|---|---|
| rs75687525 | 1:163472218 | TTCTTTTTCTACATTCTCACCTAAGACAA[T/C]TTTTTTATTCCTATAGTTGTAAA TAACAAG | 1 |

TABLE 3-continued

Sequences of the listed variants:

| SNP | BP (Grch37) | Sequences (major/minor alleles) | Seq.ID |
|---|---|---|---|
| rs7605722 | 2:16200946 | GAATTCTGACTGAGAAGTCTTCCAAGAAA[G/A]AAAACCACTAGTCCTGGGTTC CAAAAGAGA | 2 |
| rs7605772 | 2:16201132 | ATAGCAGATGAGAAGGGTTATCGACAAGC[C/A]AACAAGTGTGCCTCTGACTTT GCAAGAAGC | 3 |
| rs13427501 | 2:16202446 | AATAAGCAGGAAAGAAATTCTAAGTACA[A/G]TTAAGCTTTGTTATTCACAAT AGTTATGTT | 4 |
| rs7600440 | 2:16204606 | AGAAGAATGAGTGCCCAGTGAAGGAGGAA[G/A]CCCCTTATTAAACCATCAGA TCTCATGAGA | 5 |
| rs4499395 | 2:16206193 | TTGTTTAATAGAGTCTCCCCAAAACTGGG[C/T]TCTTTGGAGAAAAGATTTTTT TTTAAAGG | 6 |
| rs6760942 | 2:16207141 | TGTAATAAAAAAAGTGTTCATAGAAACAA[G/A]CAAGAAATAAATAGGGACAT TAAGATTATA | 7 |
| rs28432381 | 2:16212065 | TTCGATCCACCCGCCTCAGCCTCCCAAAG[T/A]GCTGGGATGACAGGCATGAGC CTGGGCTAT | 8 |
| rs4073262 | 2:16214286 | GACAAATGGATTGACTTGTCTCTTGCTAA[G/A]AGCGCCTACCTTCGGGGTGTG GAGGTAGAG | 9 |
| rs56238602 | 2:102863095 | CCACCTCATTTGGAGCAGTGAGAGATAAG[G/T]GAAAAAACCATGTCTACATCT TTGACTACA | 10 |
| rs1420091 | 2:102917234 | TAAAACCCACATTATATTGTCATTACTTT[T/C]GCTTCGAACAATCAATTATCTT TTAAATAA | 11 |
| rs4399750 | 2:102917788 | TCACTCCTTTCCTCCTGGAACTTCAATTA[T/C]ACTTACATTAGATGACTCGAAA TTTCCCCA | 12 |
| rs4577297 | 2:102918018 | TATAGGTTTTTTTTTCACATATGGAATTT[G/A]GATATAATAGCTGTTTTCATGT CCTTTTCT | 13 |
| rs2110660 | 2:102918601 | TGAACTCAAGTCACCTTAGCCTTTCCAGA[C/G]TCCCAGCTCTGATTCCTCATCT CGGAGAGA | 14 |
| rs1420090 | 2:102919305 | GCATTTTTATTTCTTTTGATGTATAATAT[T/C]TTAATTAGTTTATTGAAAATCTC TGTCCTT | 15 |
| rs7565653 | 2:102919426 | TTATTAATTTATAAAATATTTGTGTTGAG[T/A]GTGTGAGTGCATGTGCATGCAT GTGTATGC | 16 |
| rs7568913 | 2:102920037 | GACAACAGTAGGCTCAAGGAGAAATCATC[T/C]GTTCTCCTAATCTTTTACTAT TTTTCGTAT | 17 |
| rs10179654 | 2:102921783 | TCCATGAACAAAGATCTGTTGAATAAATA[T/G]TATGAGCGTGTAGAAGGGAG AGACTTTATC | 18 |
| rs4090473 | 2:102922987 | GTTAACTCTTAACTAAACATAGACTTTTT[C/G]TGAACTTTGGAATAGGAGTAA GGGGGAAGA | 19 |
| rs12476925 | 2:102924549 | CAGAAATCAGCAGATGTCATGAGGGGACT[C/T]TGGGTTATCATAAGCTGTGGA ATTGGTATC | 20 |
| rs12476968 | 2:102924662 | TTGCCAATTTAGGGCAATTTTCAACATTA[C/T]GAAAATTCATTTAGTTTGGGTG CAGAGCTC | 21 |
| rs7562254 | 2:102924947 | GGAGAGTTACCTCCAAGAGGGGTCATGGC[A/C]GGCGAGCAAACCATACTTGG GGTGCACCAT | 22 |
| rs56224165 | 2:102925223 | TTATTACTAACTCAGGAGGACCTTGATGG[A/T]TGTTAGTCTCCCTGGATTTGAA AACTATTT | 23 |
| rs4851564 | 2:102925790 | GATCTTCTGAGGTCAGGAGTTCGAGACCA[G/C]CCTGACCAAAATGGAGAAAC TCCATCTCTA | 24 |
| rs6721346 | 2:102926320 | GTAGATTTTCATCTTTTATGTATGGTGAC[T/C]CTAGGTAAGGAGAAGAGGTGA TCTAGCTCA | 25 |
| rs12470864 | 2:102926362 | AAGAGGTGATCTAGCTCACTTGGTGGGAC[G/A]AGCGTCTTGACACAAATCCAC AAAAAAAGG | 26 |

TABLE 3-continued

Sequences of the listed variants:

| SNP | BP (Grch37) | Sequences (major/minor alleles) | Seq.ID |
|---|---|---|---|
| rs12470867 | 2:102926366 | GGTGATCTAGCTCACTTGGTGGGACGAGC[G/A]TCTTGACACAAATCCACAAAA AAAGGAGAG | 27 |
| rs10178436 | 2:102926511 | TGCACCCAAACCAAAACGAGCGTCAGTGA[T/C]GTTAAAGATTGAAGGTCAGG TGCTACCCAG | 28 |
| rs11679191 | 2:102926800 | GATTAGAGGTGTGCACCATCACACGCAGC[A/T]AATTTTTGTATTTTAGTAGAG ACGGGGTTT | 29 |
| rs11685424 | 2:102926981 | AAATCACTAGTATTTCATCAATATGGATA[G/A]CATCCTCCATAGGTTACTGAT TAATATTG | 30 |
| rs11685480 | 2:102927086 | AAGTCAAGCAGCTGGGAAGAGGAAAACTA[G/A]GCTGTGCTCTCCCTAAATCT CATGCTCTAT | 31 |
| rs6543115 | 2:102927641 | ATAAGCAACTTGCTGCAGAAATGGGTACT[C/G]TTGTTCTAGAAATGTGACTAT AGGGAAGTT | 32 |
| rs6543116 | 2:102927726 | AATGAGTGACCTGCCACCTACATGGTGTT[A/G]GGGAGGTTTTGCTGAGAAAGT CACTCATGA | 33 |
| rs6733174 | 2:102929012 | ACAAAATCCAGCAGTGTAATCTACTCAGA[T/C]GGAGATGAAGGAAAAAAACA AAACAAATGA | 34 |
| rs6543118 | 2:102929469 | TTCACATGCCATTGTTCCTGAATACCATT[G/A]TGGACATAATCATCTAATTTTG GCTATTCC | 35 |
| rs1558622 | 2:102930147 | AGAGGCAGACAACTGCAAGGGAGAGCCCC[G/A]CAAGGATTTGGGTGATGACT TTGAGCCAGG | 36 |
| rs1558621 | 2:102930307 | TGTGTGCACGAGTGTGTGTGTGCGTGC[A/G]CTTGCATGCGCGTGCATGTGC AGTAGGGTC | 37 |
| rs10189202 | 2:102930380 | GTGGAAAAGATCCCTCTGGTTCTAGAACA[A/G]AAATCTAACAGCAACCAAGA GTCCAGTTCC | 38 |
| rs10191914 | 2:102930657 | ACTTACTAAGACTGCTATGTGCCAGACCC[T/C]GAGACAAGCACTTTCCACACA CCACATCCT | 39 |
| rs10189711 | 2:102930881 | AGTTGGGTGTGTCTGAGCCCTGGGTAGAA[A/G]GGGATGCTATCCTAATGAAA AAACACAGAA | 40 |
| rs12712135 | 2:102930948 | AGTGTCCACCAAGATGTAACTGAGATTTA[A/G]AGAAGACTTGATAACTTATCA GTTGGGTGG | 41 |
| rs1558620 | 2:102931395 | CTTGCAGGTGTCTGGTGATAGTTGGGTGC[T/C]GGAAGATTCTGAGTTATTTGCT CAGAAGAG | 42 |
| rs1558619 | 2:102931550 | CTAATTAGGATTCCGCACATCCTATGCCT[G/T]TCTCTCAGGAGCCTTGCAGTCA AGTGTGA | 43 |
| rs12996505 | 2:102931802 | ATTTCTCTAATTCCTCTTCACTCTGGGGC[A/G]TTATGATCAGAAAATATCATGT ACCTTTTG | 44 |
| rs13020553 | 2:102931826 | GGGGCATTATGATCAGAAAATATCATGTA[C/G]CTTTTGCTGCAATCTTGGCTG AAAGAACCT | 45 |
| rs13020793 | 2:102931926 | AGATCTCAAACTATAAAGAAAATCAGAGT[C/T]TCTTGATGCCCATGTTCAGGA CAAGTTTTC | 46 |
| rs10183388 | 2:102932247 | CTTTAGAGGAATTATCTAGAAAACTAGCC[C/T]CTATGCAAAGTGAATAACCTT TTCAAAATA | 47 |
| rs953934 | 2:102932293 | ACCTTTTCAAAATATAATCTACATTAAGA[C/T]TTTTGAAACTAACACATTCCTC AATCATAG | 48 |
| rs950880 | 2:102932562 | ATTCACTCACCTCTGATTTCTAGTTCCAC[C/A]CTTATGACGAAAGCATTCTTAA ATCTGATA | 49 |
| rs1968171 | 2:102933552 | AAAATGTTTCAGCCCAGCATGGTGGCTCA[C/T]GCCTGTAATTCCAGCACTTTG GGAGGCCGA | 50 |
| rs4613307 | 2:102933758 | GCGTGAACCCAGGAGGTGGAGCTTGCAGT[A/G]AGCCCAGATGGCGCCACCGC ACTCCAGCCT | 51 |

TABLE 3-continued

Sequences of the listed variants:

| SNP | BP (Grch37) | Sequences (major/minor alleles) | Seq.ID |
|---|---|---|---|
| rs1968170 | 2:102933802 | CACCGCACTCCAGCCTGGGTGACAGAGCC[G/A]GACTCTGTCTCAAAAAAAA AGTTTCAGCA | 52 |
| rs11123918 | 2:102935237 | GAAGAAAGATGTTGGAGAAATTGTTCCAC[T/C]TTGACAGAGGCTGCTTATAGC TCAAGGTAA | 53 |
| rs10182639 | 2:102935805 | AGCTAGGATTCAACTCTTTCTCTTAACAA[C/A]TATGCTTTGATGGAACAATTTT TTTAGATA | 54 |
| rs11693204 | 2:102935974 | TACATTTGATGAGGGGATAAAATGTACAT[G/A]TAGGTGTGGATTTATGGGCTG TGTTTTCA | 55 |
| rs11690443 | 2:102936131 | TTATAGAATTTTGGGGCATATTCTCAGTA[T/A]CTTTTGTATCTCTCGCCCTCTTT TCTTTTT | 56 |
| rs12712136 | 2:102936366 | TGGGGACTTACTATGTTGCCCAGGCTAGT[G/C]TTGAACTCCTGGGCTCCAGCA GTCCTCCCA | 57 |
| rs974389 | 2:102936981 | CCCAATATGTCTCCTGAATTTCAGAAGCA[G/A]ATATTCATCCTACTGATGGGT TCACATCTC | 58 |
| rs4142132 | 2:102937482 | CCCCTCTCCAACCAGCTCTCACTGCTCTG[G/A]AGTTCCTCATGCCCTGTTGGCC ATGTGGCT | 59 |
| rs971764 | 2:102938335 | TAAGTGGTCAAGGTAAAAACATTATTGTG[C/T]GGTTCGCTATAGTTACATTTA AAACAGTCC | 60 |
| rs13001325 | 2:102939036 | ACAGATCCCAGAAATGAATCTGGGTCTCC[C/T]GACTTCAATACAGTTCTCTTCT TATTACAT | 61 |
| rs1420088 | 2:102939434 | CAAGGCTTTATTATTTTTTGTTTGGAAA[T/C]GAACTCAGAGTTACATAACATG ATGTTTTT | 62 |
| rs66780767 | 2:102939709 | AGATGTTCTTTAACTTTTTGTTAGGTTTT[A/T]TATATATATATATATATATAT AGTGTGT | 63 |
| rs11123919 | 2:102939754 | ATATATATAGTGTGTGTGTGTGTGTGTGT[G/A]TATATATATATGGTGTATATAA TTTATATA | 64 |
| rs11123920 | 2:102939833 | TTAAGTGTAAAGTTCAATAAGTTTTGATA[C/T]ATGTATACTCCATTGGCTTTGT TTTGTATT | 65 |
| rs6706844 | 2:102940412 | GGGAACATTATATAAATGGGACGATATAA[T/C]ATGCATTCTTTTAAAACTGGC TTCTTTCAT | 66 |
| rs11674832 | 2:102940999 | CAGTGGGTGCAGAGCACTGAGCGTGAGCC[A/G]AAGCAGGGCGAGGCATCGCT TCACCCAGGA | 67 |
| rs11679889 | 2:102941009 | AGAGCACTGAGCGTGAGCCAAAGCAGGGC[G/A]AGGCATCGCTTCACCCAGGA AGTGCAAGGG | 68 |
| rs11675988 | 2:102941019 | GCGTGAGCCAAAGCAGGGCGAGGCATCGC[T/C]TCACCCAGGAAGTGCAAGGG GTCAGGGAAT | 69 |
| rs11679900 | 2:102941074 | GGAATTCCCTTTCCTAGTCAAAGAAAGGG[G/T]TGACAGATGGCACCTGGAAA ATCGGGTCAC | 70 |
| rs11676075 | 2:102941215 | TCCTACACCCGTGGAGCCTCGCTCGTTGC[T/C]AGCAGAGCAGTCTGAGATCAA ACTGCAAGT | 71 |
| rs11676124 | 2:102941338 | CCGGGAAGCTCGAACTGGGTAGAGCCCAC[T/C]GCAGCTCAAGGAGGCCTGCC TGCCTCTGTA | 72 |
| rs11123921 | 2:102941561 | CCCGAGTAGCCTAACTGGGAGGCACCCCC[C/G]AGTAGGGGGCAGTCTGACAC CTCACACAGC | 73 |
| rs12992762 | 2:102941715 | ATACCCAGGCAAACAGGGTCTGGAGTGGA[A/C]CTCCAGCAAACTCCAACAGA TCTGCAGCTG | 74 |
| rs12998412 | 2:102941818 | ATCCACACCAAAACCCCATCTGTATGTCA[T/C]CATCATCAAAGACCAAAGGTA GATAAAACC | 75 |
| rs9750771 | 2:102941918 | CTAAAAATCAGAGCACCCCTCCTCCTCCA[G/A]AGGAACACAGCTCCTCACCAG CAATGGAAC | 76 |

TABLE 3-continued

Sequences of the listed variants:

| SNP | BP (Grch37) | Sequences (major/minor alleles) | Seq.ID |
|---|---|---|---|
| rs11123922 | 2:102942187 | GATGAATGCGCAAGCCTCAGTAGCCGATT[T/C]GATCAACTGGAAGAAAGGGTATCAGTGACG | 77 |
| rs12053422 | 2:102942537 | TGTCAGATTCACCAAAGTTGAAATGAAGG[C/A]AAAAATGTTAAGGGCAGCCAGAGAGAAAGG | 78 |
| rs58933240 | 2:102942920 | GAAAATGCATCAACTAACGAGCAAAATAA[A/C]TAGCAAACATCATAATGATAGGATCAAATT | 79 |
| rs56403447 | 2:102942921 | AAAATGCATCAACTAACGAGCAAAATAAA[T/C]AGCAAACATCATAATGATAGGATCAAATTC | 80 |
| rs13005688 | 2:102942939 | AGCAAAATAAATAGCAAACATCATAATGA[T/C]AGGATCAAATTCACACATAACAATATTAAC | 81 |
| rs12725988 | 2:102943386 | TAATAATGGGAGACTTTAACACCCCACTG[G/T]AAACATTAGACAGATCAACGAGACAGAAAG | 82 |
| rs4490207 | 2:102943822 | TCTCTGGGACATATTTAAAGCAGTGTGTA[C/G]AGGGAAATTTATAGCACTAAAAGCCCACAA | 83 |
| rs4455171 | 2:102943844 | GTGTGTACAGGGAAATTTATAGCACTAAA[A/T]GCCCACAAGAGAAAGCAGGAAAGATCTAAA | 84 |
| rs13007344 | 2:102943883 | AGAAAGCAGGAAAGATCTAAAATTGACAC[A/C]CTAACATCACAATTAAAAGAACTAGAGAAG | 85 |
| rs141508079 | 2:102944191 | TACCATCAGAGAATACTATAAACACCTCT[A/G]TGCAAATAAACTAGAAAATCTACAAGAAAT | 86 |
| rs76520363 | 2:102945241 | AATGAAATACCTAGGAATCCAACTTACAA[G/A]GGATGTGAAGGACCTCTTCAAGGAGAACTG | 87 |
| rs76278109 | 2:102945378 | ATATCATGAAAATGGCCATACTGCCCAAG[T/G]TAATTTATAGATTCAATGCCATCCCCATCA | 88 |
| rs76886731 | 2:102945416 | AGATTCAATGCCATCCCCATCAAGCTACC[A/T]ATGACTTTCTTCACAGAATTGGAAAAAACT | 89 |
| rs150341880 | 2:102945755 | TGGGATATCTGGCTAGCCATATGTAGAAA[G/T]CTGAAACTGGATCCCTTCCTTACACCTTAT | 90 |
| rs75392560 | 2:102946082 | GACAAAGGCTAATATCCAGAATCTACAAT[T/G]AACTCAAACAAATTTACAAGAAAAAAACAA | 91 |
| rs76498201 | 2:102946111 | TAACTCAAACAAATTTACAAGAAAAAAAC[A/G]AACAACCCCATCAAAAAGTGGGCAAAGGAT | 92 |
| rs56192435 | 2:102946677 | TAGGGACATGGATGAAACTGGAAACCATC[A/G]TTCTCAGCAAACTATCGCAAGGACAAAAAA | 93 |
| rs12996772 | 2:102947201 | GATATGCAAATTATGAGTATTTTGTCTGG[A/T]CTGTGGCTTAGTCTATTCAAATTCTAATGA | 94 |
| rs1420104 | 2:102948470 | TCACCTGAGCCTGGGAGGTGGAGACTGCA[G/A]TGAGCCATGATCACACCACTGCACTCCATC | 95 |
| rs1420103 | 2:102948632 | TATCAATAGACAAAACTCACAAAAATAAT[A/C]TTGCCTTCTGGAGGTCATATTCCAATGGAT | 96 |
| rs1420102 | 2:102948819 | GTCAGGAACTCAAACAAATACTTGGACAC[C/T]GATAGCAGCATTATTCAAAATAGTCAATAG | 97 |
| rs12466380 | 2:102948939 | CACAGTGGAATATTATTCAGTCATTAGAA[A/G]CAATAAAGTACAGACCCATGCTACAATATG | 98 |
| rs12479210 | 2:102949161 | CTTCATGTTAATGGGTATGGGGTTATACT[C/T]GGGGATGGTGAAAATGTTTTGAAACTAGAT | 99 |
| rs13019081 | 2:102950822 | AGGGAAGGAGTGGAGGCTTGAGTGGGCCT[A/C]GAGTTTGGAGTATGGGCAAGAAGGATCCCA | 100 |
| rs12712140 | 2:102951062 | GTCCTCTAGTGAAATGAGGGGAAAAAAAA[C/A]ATCCATCCCCAGCTTATTGTGAGAGTCACT | 101 |

TABLE 3-continued

Sequences of the listed variants:

| SNP | BP (Grch37) | Sequences (major/minor alleles) | Seq.ID |
|---|---|---|---|
| rs1997467 | 2:102951073 | AAATGAGGGGAAAAAAAACATCCATCCCC[A/G]GCTTATTGTGAGAGTCACTGAATGAGAGCC | 102 |
| rs1997466 | 2:102951467 | CAAAATTAAGAAAAGCTGGTTCAATGAG[C/G]TTAGATTCTATGAGATTAATCTGAAAGGG | 103 |
| rs1362350 | 2:102951798 | TCCAAATTATAAAAGAAAAGCTTTACCA[G/C]CCTAATCTCTGGTATAGAGAATGTTCTCTT | 104 |
| rs1362349 | 2:102951972 | GGGTTTTTATTTGTAACTATAAAATTTGA[G/C]TGATGTTAATGATAAGTACCACAGAGTATT | 105 |
| rs17026974 | 2:102952360 | CCCAAACTGCAATAATATCCTGATAAAAC[G/A]GACTTCCACAAGTAGGTCAAGAATAATAAT | 106 |
| rs12712141 | 2:102953067 | TGGAGCCCTAGAGTTCAGGGTTATGGTTT[T/C]CTTTGTCACTCCCCTTGAGGGAAGCTTCTT | 107 |
| rs59247511 | 2:102954190 | TTTGTGAGTTATTTTGTGAGCATGCTGC[T/C]ACCAGCCTGTGTGGATGTCTGTGGTTTCAC | 108 |
| rs873022 | 2:102955683 | ATAAACTTCTAGGAATACTATCAGGTTGA[G/T]GTCTAGCTCATTCTGAGCTATTTGGATTTA | 109 |
| rs3771177 | 2:102955860 | AATAGTAATCTGGATGTTTTCCATCTCAG[G/T]GGGCCTCTAGTAGGTGAAAAGGGGCTTCTA | 110 |
| rs3732129 | 2:102957532 | TTCAAAGCCACATCTGTTCTTTATTCTTT[T/C]TTTGTGACTTAATTTTCCAAAGATAAAGCA | 111 |
| rs1420101 | 2:102957716 | TCTTTAGTAATACTCATTGGATTCAAAGT[C/T]TAATGAGAGGCTTTGTGATGGTATACTATG | 112 |
| rs12905 | 2:102960007 | CTGTGCCATAAAATGTGCTTCTCTTCTTC[G/A]GGATGTTGTTTGCTGTCTGATCTTTGTAGA | 113 |
| rs3821204 | 2:102960281 | ACATGTTGTAAGCATGGTCCGTTCTATAC[C/G]TTTTTCTGGTCATAATGAACACTCATTTTG | 114 |
| rs13001714 | 2:102960485 | TTATATGAAAAGAGGTTTAATTGGCTCAC[A/G]GTTCTGCAGGCTGTATGGGAAGCATGGCGG | 115 |
| rs12712142 | 2:102960584 | CAGAAGGCAAAGCAAAGGCAGGCACTTCA[C/A]ACAGTAAAAGCAGGAGCGAGAGAGAGGTGC | 116 |
| rs6543119 | 2:102963072 | TACACATTCCTCTGTGCATCCAGCTGGGG[A/T]TTTTAGAGAGAGTGACCTGGAAAGGAAT | 117 |
| rs13017455 | 2:102964742 | CATTTTCCATCCTGCTATGTAAATCCTCA[C/T]GGTCCTGAGATCCATCTCAACAGCTCACTT | 118 |
| rs55927292 | 2:102964861 | CCCAGAAAGGTGTAAATTTCATAATGTAT[C/T]GGTAAGACATTATGAAGTTAAACACAGTAG | 119 |
| rs17027006 | 2:102965332 | TTTTGTTATTTAGTCTGTGACAGTAAAAA[G/C]GAGAAACACTTTGGGATGAAGACTGTTATT | 120 |
| rs12469506 | 2:102965871 | TCCAGAAGCAGACACTTATCCTTCAATCG[C/T]CCCTCTCCCATCATTGTCCTGGTGATGAGA | 121 |
| rs1921622 | 2:102966067 | GATTTGAAAGAGGACTTAAAAATTGATGA[G/A]TTTTGTTCTGGTAGCCATAGGCACTAGCTG | 122 |
| rs1861246 | 2:102966783 | ACAAGCTCTTCACCTCTTCTTTTTCAGTC[T/C]ATCCACCTAAGTTCTAGTTACACTTCTCCT | 123 |
| rs11123923 | 2:102967844 | AAAGGAACACAAAGAACAAAACGGGTTCT[C/A]TATCCACACATACTTCCACTTCTCTGAGTA | 124 |
| rs35224028 | 2:102969606 | TATTTTATATAGAATATTATATATAATAT[A/C]ATATATATTTTATATAGAATATTATATATA | 125 |
| rs67723747 | 2:102969807 | TAACTTTCAGAGAAACTTATACATTGTTT[C/T]GCAAACTAATTGTACTACTTTACATTCCCA | 126 |

TABLE 3-continued

Sequences of the listed variants:

| SNP | BP (Grch37) | Sequences (major/minor alleles) | Seq.ID |
|---|---|---|---|
| rs56386507 | 2:102971165 | GGAGAATAGATGTCTTAAGTCTTCCAATC[C/T]GTAAACGTGGTATATCCCTTT ATTACTTAG | 127 |
| rs13015714 | 2:102971865 | CTGTCGGCTATGGGTTTCCCTTTTCCTTT[G/T]GTTAAATAACAGTTCTGCCACA AAATAAAA | 128 |
| rs12999364 | 2:102974129 | GTTGGAGAGCTTCCTTGAGAAGGCAAATA[C/T]TGAGCCAAGTTGAAAGGACT CTAGGGACCT | 129 |
| rs12998521 | 2:102974417 | TTGCATTTGGTTGTTTTATCATCTCACAG[G/T]CTGAGTAAAACGACTATGCATG GAACACTG | 130 |
| rs12987977 | 2:102975336 | AGATGATCACCTAGATTCAAAATTATGTA[T/G]ATTTTATGGATGTAATTCATTC AATAATTC | 131 |
| rs6710885 | 2:102977537 | TCAGAGTTAACTTGTCAGTTTGCTGAGCC[A/G]TCTCCTGATAACTTTGTCTCTT GGTAGATA | 132 |
| rs2287037 | 2:102979028 | AAAATCTGTGTGCCAGAAGATTTTTAAAC[C/T]TTCATAAGATAGGCACACTTT TGTTTGAAA | 133 |
| rs6727306 | 2:102981644 | CCAAGTCCAAAGTCTCATCTGAGACAAGG[A/C]AGGTCCCTTCCTATGAGTCAG TAAATTCAA | 134 |
| rs11465583 | 2:102982466 | AGGCCTCTGGGCCTGTGATGGGAGGGTCT[C/G]TCATGAAGATCTCTGACATAC CCTAGAGGC | 135 |
| rs10197284 | 2:102982703 | TCTTTAGAAATTTCTTCTTCCAGATAATC[G/A]TCTCTCAAGTTCAAAGTTCCAT AGATCTCT | 136 |
| rs1573895 | 2:102982876 | ATTGTCCATAACATTATCAGCATTTTGGT[T/C]AAAGCCATTTAACAAGTCTTTA GGAAGTTC | 137 |
| rs4851569 | 2:102983247 | TGAGAACTCACTCACTATCATGAGAACAG[C/A]ATGAGGGTGACTGCCCCCATG ATTAAATTC | 138 |
| rs1420098 | 2:102984279 | GTTTTTATTTATTTTACTTTACTAATCTT[T/C]TGAAGAATCTTGTACTTCACGTC CCCACAT | 139 |
| rs1882348 | 2:102984671 | TACTCTTCCTATGACATGAAATACATTCT[T/A]TGTTATGGAACAGAATAAGTTT ATCTCTCT | 140 |
| rs1558627 | 2:102984684 | ACATGAAATACATTCTTTGTTATGGAACA[G/A]AATAAGTTTATCTCTCTCTGCT TATTTCT | 141 |
| rs2058622 | 2:102985424 | CCACTGTGAAACCTTGGTAGCACTTCTGT[A/G]GTTTTGCACCAAATCAGGTCA TTTTTGTTT | 142 |
| rs3771172 | 2:102985812 | AGCAAATGGCATTGGCCATCTTTCTGATA[C/T]GGGTAGTAGAGAATACAGCCT GGCTTAGGA | 143 |
| rs3771171 | 2:102985950 | AAGAAAAATGAGGTGTCCCAGAGTGGATA[T/C]TGGAGACTGATCACTATGAG AGTAAAGTGT | 144 |
| rs3771170 | 2:102985980 | TGGAGACTGATCACTATGAGAGTAAAGTG[T/A]TGAGGAGAGAAGCAGCTTTG ACAATGGCCT | 145 |
| rs2160202 | 2:102986154 | GTGTGTATACACATATGTGTTCTAACTTA[G/A]GTGTGTAACCCTTTGCAGTTTG ATGTGGGA | 146 |
| rs2058623 | 2:102986170 | GTGTTCTAACTTAGGTGTGTAACCCTTTG[C/T]AGTTTGATGTGGGATCTATCAG TGAACAGA | 147 |
| rs1465321 | 2:102986618 | TTTGGGTCAGTTGGCCTCAGTGTTAACCC[T/C]AGCCTTGGAGCTCCTGGATGG CAGGTGCAG | 148 |
| rs6742875 | 2:102987526 | GATCACCTTTTTTGTTGTTGTTGTT[G/T]TTTTTTTGAGATGGAATTTCGCT CTTGTTA | 149 |
| rs6733346 | 2:102987698 | GAGACGGAGTTTCACCACATTGGCCAGGC[T/C]GGTCTCAAACTCCTGACCTCA GGTGATCCA | 150 |
| rs2041740 | 2:102989734 | AAAAGCTCTTATACACCATGGAATACTAT[A/G]CAGCCATAAAAAGCATGAG TTCATGTCTT | 151 |

TABLE 3-continued

Sequences of the listed variants:

| SNP | BP (Grch37) | Sequences (major/minor alleles) | Seq.ID |
| --- | --- | --- | --- |
| rs6731154 | 2:102991181 | CACTTGAACCCGGGAGGCAGAGGTTGCAG[C/T]GAGCCGAGACTGGGCCACTG CACTCCAGCC | 152 |
| rs2270298 | 2:102992079 | TCGCTGTTTCTCTCTCTCTGCATGTGTGT[A/G]AAAGAGAGAGATGAAAGAATA TTGATGAAA | 153 |
| rs2270297 | 2:102992675 | TTCAAATATGATGGTCAAAATCTTCATTC[T/C]GGTGCTCCTCTACTTGGCTAAA TAAACCTT | 154 |
| rs6753717 | 2:102993161 | ACTGATGTGCTGGTGGGAGGGAGGGATG[A/C]TGGACCCAGGCTGTGTGTGA TGGAGGAACA | 155 |
| rs10190555 | 2:102994056 | TGGTCTCCCAAAGTACTGGGATTACAGGC[A/G]TAAGCCACTGCACCAGGCTGG AAAATGTGT | 156 |
| rs6750020 | 2:102994714 | TCATGTCATATAATCCTCACAACAGCTCT[G/A]TGAGACTGTGGCCTTGGGTGA GTTAATTTC | 157 |
| rs17027037 | 2:102994884 | GGCTCTAGGGACAGTAAGAGTTCTGCTGT[A/G]ATGACCATCTCCCACTGCTAG GTTCCCAAA | 158 |
| rs2080289 | 2:102995020 | TGAGTCTCTCAGGACTCCACTCAAATGTC[G/A]CTCCTCCTTCATGCCCCATGG CCTCTTGT | 159 |
| rs6729638 | 2:102996022 | GAAGCATGGACAGCCATGTAGAAATGTGA[C/T]TGGACAAAAGGGTATGACCT AATGCTAATG | 160 |
| rs11683700 | 2:102996805 | TGTACTTCACACTGCCCCTTCTCAAGTCT[C/T]CCATGTAAGTTTCTGGGGAAA AAATGGAT | 161 |
| rs3821203 | 2:102996872 | AAGGTAGTCAGTAGCAGTTTTCCCCCTCA[C/T]ACCGAAATTGCCTCCTGCCCTT TGTCTTTG | 162 |
| rs3771162 | 2:102997174 | AGGGCTCAGGGAGGTGTGGGAGCTGCAGG[A/T]GCACTCCTGAGTCTCACTGT ACTCCACTCA | 163 |
| rs11465633 | 2:102997733 | TGTAAATCCATCACTGGCCAGCTGAGGAG[G/T]ACAGATGGAGAGAATCGAGA CAGGGCAGAA | 164 |
| rs56258475 | 2:102999312 | TGTCTTTGTCTTTCTTATTTTTTTCTTCT[A/G]CTCAGTGGGGCTTAACTTGTATC TTTTGTT | 165 |
| rs1035130 | 2:103001402 | AATGAAGAGGATGTAATTTATTGGATGTT[C/T]GGGGAAGAAAATGGATCGGA TCCTAATATA | 166 |
| rs3755274 | 2:103002395 | TAGAAATGCAGCTTAAGCTACAAAAGCAG[A/G]GAGGTCTTTCTTTATAGTTGG GTGCACACA | 167 |
| rs2241117 | 2:103003043 | AGAAAAATAATTGAGAGAGAATATTTTCT[T/C]ATATTTTCAACTTAGCATCAT GATCTTCCA | 168 |
| rs2241116 | 2:103003265 | TGCCTTCAAGCATTTTAAACATGTGAATT[C/A]CCCTCTCAAGGGTAACGAACA GAGCCTACT | 169 |
| rs4851570 | 2:103006387 | AAGGCAGGAATGTGGAGTCACTCAGTGGA[A/G]TGTGTCAGCACGTGGGTTGG CAACTACTGC | 170 |
| rs2001461 | 2:103007220 | AGACCATCCTGGCTAACAGAGTGAAACCC[T/C]GTCTCTACTAAAAATACAAAA AATTAGCCG | 171 |
| rs17027060 | 2:103007567 | TGACCAGAAGTCCTCAAGTTTCCAGATAA[T/C]TACTAATTTAAAGGAAGTCAG TCTAATTCA | 172 |
| rs3860444 | 2:103007623 | TTCATTGCACTTGATTTTGTTTTGCATGT[A/G]TGTGTTTGCAGGAAAAAAACCT TCACAGAG | 173 |
| rs12712145 | 2:103008710 | GTGAATTTAGCTTTGAGCCTGCATGTGCA[T/C]GTGCGAGTTTGCTATGGGGAG AGATGATGC | 174 |
| rs66919607 | 2:103008969 | GGCAGTGCAGAGACATTTAGAGACATGCT[C/G]TAAATCACTTCCATTAAATTA TGGTCCATG | 175 |
| rs2287035 | 2:103010530 | TGTTATTTAGGAGACATTTTCACCTTCTT[G/A]GGGGTCTTTCTGAGCATAGAAA TTGTGATG | 176 |

TABLE 3-continued

Sequences of the listed variants:

| SNP | BP (Grch37) | Sequences (major/minor alleles) | Seq.ID |
|---|---|---|---|
| rs2287034 | 2:103010588 | TGGTGGTAGAATTAAATGATATGAGTAAA[C/A]CAGGGTGAGATTTTCTTTCCA CTCCTGGAA | 177 |
| rs4851005 | 2:103011552 | ATGGGTTTTTATTGTGTTGATATTGGTGA[C/T]GAAATTTAAGTAGAAAATAGG AAAATTGAA | 178 |
| rs17027071 | 2:103012674 | TGGGCAGGTTACTTAACCACTCTGTGCTC[C/T]GGCTTCCTTGTTTGTTAAATGG AGGTGATA | 179 |
| rs3732126 | 2:103013962 | CTTGAAAGCTCGGTAAGGCCCTGCAACGC[A/C]GAGCCTGCTTATGTGGATCTA TTTATGGGA | 180 |
| rs3732125 | 2:103013963 | TTGAAAGCTCGGTAAGGCCCTGCAACGCA[G/C]AGCCTGCTTATGTGGATCTAT TTATGGGAA | 181 |
| rs1135354 | 2:103014302 | TCCAGTCCTGAGTTTGCTACTTACTTCTG[T/G]GGCCTCTGGAACCTTATCCAAC CTCTTGGT | 182 |
| rs1568681 | 2:103014696 | CTTTTGACGTTGGAAGACACATGTCTTAC[C/T]CCCCAAAGGGAGCCCAGCACT GGGAGCCTT | 183 |
| rs17027087 | 2:103015918 | CTTGGAGGCTGCAGGCACTTTTCTGGGGC[C/T]GACAATTTAGGCTAAGAGGGC CTAGGGCAG | 184 |
| rs55664618 | 2:103016216 | CGCCAGTTGGGTTTGCTGGGGCTCTCAGC[G/A]AGGAGCAGAAAGGAGACAGT TGTCCAAAGA | 185 |
| rs3732123 | 2:103018077 | CATTCTTTAGTCATGTGTTTTTGAAATTA[C/G]CAAAGTCACTTGAGCTAAGGCT GATGAGTA | 186 |
| rs55742125 | 2:103019782 | GTAATACATATGTAATTTTGCTCCATATT[G/A]CCTAATTCATCTTCATAGGGGT TGTAACAT | 187 |
| rs1035127 | 2:103019919 | TTTCATTATCATTGTGGGAAGGTTTTTAC[A/G]TGGTAGACATATTAAGACTTTG TGATGTAA | 188 |
| rs55883125 | 2:103024331 | AGGAAGTCAAAGAACTGAGAGACGGGGAC[G/A]TTAAACGGATCATCTATATC AATGCTAATA | 189 |
| rs4851006 | 2:103024738 | CACCATCTACACGTAAGGTTTAAAAAAAA[T/A]TAATGAAAATTCAGTGAATTA TCTCGAGAA | 190 |
| rs4851007 | 2:103024813 | TCAGGTTGGCTAAGAGCTCCTCTCCTGTG[T/G]TCTGCTGTGTATCTTTGTCTAG CATTACAG | 191 |
| rs4851575 | 2:103025203 | GGTTACCGACAGCAGGGGAAAGGCAGCGC[G/A]TAGGTAAATGCGGACAGTTC CCACTCCCAG | 192 |
| rs4851008 | 2:103026611 | ACTCCTTGGGAAAAACAGAGAAGGTGCTA[G/C]AGACCCCATTTTGGGAAGAA AGCTCTGTTT | 193 |
| rs6419573 | 2:103027103 | AGTGCTGGGATTACAGGCATGAGCCACTG[T/C]GCTCGGCTCCAAATGAAAAAT CTTACAACT | 194 |
| rs11693955 | 2:103029165 | TGACTGGAAGGATATGCTTCCACTTAAGG[A/T]ATCTGGCTTGACTTGAAGAGC CAATAAAAG | 195 |
| rs6543132 | 2:103029410 | GTCTTATCTGAGATTCTTGTGGAACAGA[A/G]TTCCCTCAAAGCCAATTTAAA AGCCTATGT | 196 |
| rs1807782 | 2:103033147 | CTGTAGGTATTCACTCACAGGCTTGAAGC[C/T]GGGTGGGTTAGAACAGCTGGG GCCTGGCCT | 197 |
| rs3755272 | 2:103033825 | ACCCGTTTCTCACACCTGCTTTCACCATG[T/A]GATGTGACTGCTCCCCTTTTGC CTTCTGCC | 198 |
| rs1420106 | 2:103035044 | CAACTAAACCCAACCACAAACTTTATCTC[A/G]TCAAGGAGGTTGGTCAGAGA AGAGTTTGAG | 199 |
| rs2293225 | 2:103035889 | GTTCTCTGTGTAAAGTAGTTTAAGTCTGC[C/T]TTTGATGGTGACATTTCTCTCC CTGGGTCT | 200 |
| rs3771156 | 2:103036677 | GGCAACAGCTACTGTAACTCAGCACTAAC[C/T]CACCTCCCCAAGCTCTATGCT TATCCCTGA | 201 |

TABLE 3-continued

Sequences of the listed variants:

| SNP | BP (Grch37) | Sequences (major/minor alleles) | Seq.ID |
|---|---|---|---|
| rs3755268 | 2:103038527 | CCTGTCTTCCTGCATCATGCAGACTCTAG[C/G]AGGCGTGGTTCTTCCCCGCTTCCCACATTC | 202 |
| rs3755267 | 2:103038587 | CCTCTACTCCTCTCTCTCCACCCTGAAGC[T/G]CTCCGTTATCTCACCCCAGCTGCACATGCT | 203 |
| rs3817465 | 2:103039584 | ACCTGCCCTTTCAAAGCTTCCTGTGTGAG[A/T]TGCACTTTGTTCACTGGTTCTGACTTCTTC | 204 |
| rs2272128 | 2:103039929 | ATACAAACCTTTCCATCCTACTATTAAAA[G/A]GGGACTGAGAGGAGAATTATTAGGGTGAAC | 205 |
| rs887972 | 2:103040945 | TTATGGTATCTTCTTCATGGGCTTTTCAT[G/A]GAAAAGCGTGTTTGAGAATCTGAGGTATAC | 206 |
| rs887971 | 2:103041167 | AGACATAAACCTACTAACATCTGCTAATG[T/C]AGGAAGATAGGTTCACTCATTTTCACTGTC | 207 |
| rs11678975 | 2:103043739 | TCTCTTTGGATATGTACCCAAAAGTGGGA[T/A]TGCTGAATCATATGGTAGCTCTATTTTAG | 208 |
| rs11694658 | 2:103045020 | CACTGCTAATTTTTATACGTTGATTTTAC[A/G]TCCTGCAATTTTACTGAATTCATTTATCAC | 209 |
| rs2160232 | 2:103046880 | GTTTTGGTTTGTATGGAATATCTTTGTCC[G/A]TTTTTTCCCTTCTAGTCTATATGTGTCCTT | 210 |
| rs66566526 | 2:103047802 | ATGATATGTTTCTCATCTCTTGCTACTTT[C/T]AATATTCTTTCTTTGTCTTTGAATTTTTGA | 211 |
| rs6755786 | 2:103048103 | GACTAGATAATTTCAAATGTCATCTCTGA[C/T]ATCACGGATGCTTTCTTCTGCTTAATCAAA | 212 |
| rs56331791 | 2:103048157 | ATCAAATCTGCTGTTGATATTATAGTTCA[G/A]GTATTATATTCTTTATCTGTAGGATTTCTT | 213 |
| rs6713618 | 2:103048437 | GATAGCTTTCTTAGTTTCTTTTGATGGTG[A/T]CATATTTCCTTGATTTTTCATAATCATTGT | 214 |
| rs6716784 | 2:103048467 | CATATTTCCTTGATTTTTCATAATCATTG[T/G]TCCTTGCATTGGTGCCTATGCAGTTGAGGA | 215 |
| rs2041756 | 2:103049910 | ACTATGTTGCTCAGGCTGGTTTCAAATTC[A/G]TGGTTTCAACCAATCCTCCTGCCTTGGCCT | 216 |
| rs6543134 | 2:103050458 | CAAAGATTAATGTGTTTCTAAATAGAGAA[T/G]AAGTTAATTTAATGTGTTTCCAAATAGGAA | 217 |
| rs2110735 | 2:103050925 | AAGAGGTTGGAATTCTGATTTTGAATGCC[A/G]ACATATTAGCCATCACACGCAGGTTTGTGA | 218 |
| rs11681718 | 2:103051144 | TTAACTAAAAGGGCACTCGAATGCCCTAT[A/G]TCTGATCATTCAGCTCACAATGTACCTTTG | 219 |
| rs4851582 | 2:103051558 | GCAACTACACTTAACGGGAAAGAGCAACA[T/C]AGACAACAGAAACAGAAAAGCAAAGGGTAT | 220 |
| rs2110734 | 2:103052206 | CTGACTGGTAGTATAAGAAATCGATAATA[C/T]TGCAGTATAATATTATAATACCTGCCCCTA | 221 |
| rs6746271 | 2:103052995 | AATTCCTTCTTGGACCACAGGAAACACAC[G/C]AGGGATGTGGCGTGGGGAATCCCAGCTTC | 222 |
| rs2058660 | 2:103054449 | TACAGCCCCATTAGCAGTAAATGCCCTTT[G/A]TTCCCAAATAATACTTGGTGTTATCAGACT | 223 |
| rs2058658 | 2:103054803 | ACGTAGCTGTTAGTTAAGATATTAATCTT[T/C]TCTTATTACAAGATACAAACCACACAGAGC | 224 |
| rs17027166 | 2:103055420 | GGGGAAGCCCGCTCCAAGTGAGAGCTGAT[G/A]GATGAGGACACACCAGCTCAGTAAGGGTGG | 225 |
| rs4851009 | 2:103055644 | GCATTGAGGATTTTAAGTGGGAGAATGTC[G/A]TGACTGAATTTGTATTCAAGATAGATCACC | 226 |

TABLE 3-continued

Sequences of the listed variants:

| SNP | BP (Grch37) | Sequences (major/minor alleles) | Seq.ID |
|---|---|---|---|
| rs55645612 | 2:103055661 | TGGGAGAATGTCGTGACTGAATTTGTATT[C/T]AAGATAGATCACCTTGTTTGCT GGGTCGGA | 227 |
| rs56166614 | 2:103056096 | GGTCAACAGAGCATGATAATGGTTTTTAC[A/G]TAAAAGGTAGGAGAAAGAGA AGAATCAAGG | 228 |
| rs10490204 | 2:103056534 | GGGTGGTGAGAAGAGAAACAAACGAAGTG[A/C]AATTGATGATGTAGGAAAG ACATAACCTCA | 229 |
| rs17027179 | 2:103057159 | CTGAGATGGTGCAAAGGGGAGAAGGAGGT[C/T]TCTGAGAAGTAAAAGTAGGT GATGTCAACA | 230 |
| rs1558652 | 2:103058328 | GATCGAGCCATTGCACTCCATCCTGGGTG[G/A]CAGAGCAAGATTCCATCTCAA AGAAAAAAA | 231 |
| rs11123927 | 2:103058803 | TTATTATACTTTCTAAAATGCTACTAAAA[C/T]ATTTATTATTTTAGAAAGAAAC ATAAAAAT | 232 |
| rs10490203 | 2:103059237 | TTTTTATTTAAACCACGTGCTACAATAAC[T/G]TTATGATTTTTACTTAATAAAC AAATATTG | 233 |
| rs1558650 | 2:103060024 | CTCTCAAAGTCAAGCTATTGAGCAGACAG[T/A]TGTACTGACCCAGACTGCTTG GAGATAAGT | 234 |
| rs4851583 | 2:103060300 | CAGAGGAGGGCTCTCTGTCTTGAAATCCT[T/C]GGGAGCTATTACATTGTTTGA GAAATTTGA | 235 |
| rs4851584 | 2:103060313 | TCTGTCTTGAAATCCTTGGGAGCTATTAC[A/G]TTGTTTGAGAAATTTGACTTGG TTTGTTGC | 236 |
| rs3771150 | 2:103060851 | CTGATGTCAACATGACCCTTAGCCCCGGT[G/A]AGCCTCCATCACCCATTGATA ATCTATGGA | 237 |
| rs11694360 | 2:103061147 | CCTGGGTGGAGCAGCGTGGCACAAGCCCA[G/A]GAATCAAGCTGCCCATTCCC TGCAGTGTGG | 238 |
| rs11123928 | 2:103061286 | TCCTGGGAGGTGAGGAATGGAGGACATTA[G/A]AGTCCATATTTTGTGCACAG AAGAGGGACT | 239 |
| rs7597017 | 2:103062116 | TTCTACAATAGCTATGGGTATGCCCAGA[A/G]TGGCAGGCATTGTGCTAAGAC CTAGCCTCC | 240 |
| rs4851585 | 2:103062754 | TGTAAGACAGGTCTCAAAATGTGATTTTT[T/A]AAAATTTTATTTTAATAGGTTT TGGGGGTA | 241 |
| rs6734736 | 2:103062880 | CATACCCGTCACCCGAGCAGTGTACACTA[C/T]ACCCGTTGTGTCGTCTTTTATC CCTCACTC | 242 |
| rs6708413 | 2:103063369 | TGGCTAAGTAGTATTCCATGGTGTGATTT[G/A]AGAGGTTTCCAGATTCACAAA AACTGCTGC | 243 |
| rs4851586 | 2:103064264 | GGCTGGAGTGCGGTGGCACCATCTCAGCT[T/C]ACTTCAATCTCCGCCTCCCAG GTTCAAGCA | 244 |
| rs11465727 | 2:103064503 | GTGAGCCACCGTGCCCAGCCACATTAAGT[A/G]TTTAGAATGGTGCCCAGTACA CGGTAAATA | 245 |
| rs11465728 | 2:103064511 | CCGTGCCCAGCCACATTAAGTATTTAGAA[T/A]GGTGCCCAGTACACGGTAAAT AGCTCAGCA | 246 |
| rs11465729 | 2:103064512 | CGTGCCCAGCCACATTAAGTATTTAGAAT[G/T]GTGCCCAGTACACGGTAAATA GCTCAGCAT | 247 |
| rs56044378 | 2:103065367 | CTGAGCCCCGGAGGTCAAGGCTGCAGTGA[G/A]CCATGATTACATCACTGCACT CCAGCCTGG | 248 |
| rs6543137 | 2:103065908 | GCTATTTACCTTAAGATTCTGGAGCTGGC[T/G]TAGAAGAGTCAGTCAATGGGG AAACATTTA | 249 |
| rs11465730 | 2:103066858 | ATTTTACATATGGGGATTCACATATCAGC[A/G]TATGGGCCATCAACTCTCCGA GCAAGTACT | 250 |
| rs11123929 | 2:103067143 | AATTCGATTTGGGGTGAAAAATCAATACC[G/A]CTCAGTGGTATGATTTTGAAA TGAATTTTT | 251 |

TABLE 3-continued

Sequences of the listed variants:

| SNP | BP (Grch37) | Sequences (major/minor alleles) | Seq.ID |
|---|---|---|---|
| rs7559479 | 2:103068787 | AGCACCAAGCAAGCTTGATGGACAATGGA[G/A]TGGGATTGAGACTGTGGTTT AGAGCCTTTG | 252 |
| rs7603250 | 2:103068834 | TTTAGAGCCTTTGATTTCCTGGACTGGAC[T/A]GACGGCGAGTGAATTCTCTAG ACCTTGGGT | 253 |
| rs917997 | 2:103070568 | TAAGATAGATAATGCTAGAACCAAGCTAT[T/C]CAGATGTCCAGCGTTTTGACC TTAGCTTCG | 254 |
| rs2075185 | 2:103070988 | AGTGTCCTACCTTGGATGATGGTCACTCT[A/G]CCTCTAACACTCATCATAGAG AACTCCTTA | 255 |
| rs11678721 | 2:103073238 | TGTTAATGTAAATTACTATTTATTATATA[T/G]TATACATAGTATATGAAAAATA TATTTATA | 256 |
| rs11677555 | 2:103073293 | TTATATATTACTTGTTTCTAAATAAATAA[A/G]TATATATTTATGCACATTTTTT GGGGACAG | 257 |
| rs4851587 | 2:103073474 | GTGCCACCACATCCGGCTAATTTTTTTCA[C/T]ATTTTTTTTGTAGAGATGGAGT TTCACCAT | 258 |
| rs4851588 | 2:103073505 | TTTTTTTTGTAGAGATGGAGTTTCACCAT[C/G]TTGCCCAGGCTGGTCTTGAACT CCTGAGCT | 259 |
| rs6728475 | 2:103073950 | TTGGGAGGCCGAGTTGGGCGGATCACGAG[G/T]TCAGGAGCTTGAGATCAGCC TGCCCAGCAC | 260 |
| rs6757276 | 2:103074079 | GCTACTCAGGAGGCTGAGGCAGGAGAATC[T/G]CCTGAACCCAGGAAGCAGAG GTTGCAGTGA | 261 |
| rs4070554 | 2:103074493 | ACACATTTCTCAATAATCTATGGATAAAA[A/G]TGGAAGTCTCAAAGCAAATGA AATGATATT | 262 |
| rs56117144 | 2:103074651 | AAAGAGGAAAATATATAAATTAATAATC[T/C]AAACTTCCACCTTAGGAAGC CAAAAAAAA | 263 |
| rs12712150 | 2:103074813 | AAAAACTCCTAGCAAGACTGACCAAAAAA[A/C]AAAGAAGAAGAAGGAAGAC ACAAATTACCA | 264 |
| rs57081652 | 2:103075381 | GTGGAGCTTATCATGGGTATTCAGGGCAG[G/C]CTTCATATTTTAAAATATTTC AGTGTAATT | 265 |
| rs6761825 | 2:103075561 | GGGAATTTTCTCATCATGATAAGGGGCTC[T/C]AAAAACAACAACAAACAAAC TATAGATGAA | 266 |
| rs60038017 | 2:103076001 | GGAAAGGAAGGAAAGAAGGAAGGATAGGG[A/C]AGGAAAGGAAGAAAGAGA AAGAAATAAGAG | 267 |
| rs10175585 | 2:103076107 | AGAAAGAGAAAGAAAGAAAGAAAGAAAGA[G/A]AGAAAGAAAGAAAGAAAG AAAGAAAGAAAG | 268 |
| rs13394086 | 2:103076151 | AAAGAAAGAAAGAAAGAAAGAAAGAAAGA[G/A]AGGGAGGGAGGGAGGGAG GGAGATTCATGT | 269 |
| rs62151860 | 2:103076154 | GAAAGAAAGAAAGAAAGAAAGAAAGAGAG[G/A]GAGGGAGGGAGGGAGGGA GATTCATGTATA | 270 |
| rs62151861 | 2:103076155 | AAAGAAAGAAAGAAAGAAAGAAAGAGAGG[G/A]AGGGAGGGAGGGAGGGAG ATTCATGTATAA | 271 |
| rs6705001 | 2:103076210 | TATAAATGAACAGAATGTGTGGATGTTCC[A/G]TAAGCTAAAAACTATGAAAT ACTTATGAGC | 272 |
| rs6543141 | 2:103076351 | TCCCCTTTACATTGATTAAGAGGTTTAAC[G/A]CAATTCCAACTGATATTCCAGC AGAATTTT | 273 |
| rs6705385 | 2:103076569 | AACAAAGCAATAGATCAATGGAACTGAGT[A/C]GAAAGTCTAGAAATACATCC ACACAAATAT | 274 |
| rs6705498 | 2:103076670 | AGAATAGAGTTTTAAACAAATGGTTTTGC[A/G]TCAATTGGACATACATATGCA ATAAGATGA | 275 |
| rs6719196 | 2:103076888 | AGTTTAACAAAGTTAAAACCACTTTTTCC[G/T]AGAAAACCACTGCTAAAAGGA TGAAAAAAA | 276 |

TABLE 3-continued

Sequences of the listed variants:

| SNP | BP (Grch37) | Sequences (major/minor alleles) | Seq.ID |
|---|---|---|---|
| rs7561487 | 2:103077894 | TAGTTGATATGCGGGTACACAGGGCATTC[A/G]GAATGCCACTGTGGGCATGCGGCCTGGAGT | 277 |
| rs4241210 | 2:103078740 | GAAGGTGATACCTTCTCTGTCTCCACCTC[G/A]TCTTCTGCCCCATGCAGTAAAGCCCCTAAT | 278 |
| rs6720564 | 2:103079297 | CACTTGCCACTCTAAGTCCTTAAATTTGT[T/C]ACCTTTGCCAAAATTCAAGGTCAACTGAAA | 279 |
| rs17027230 | 2:103079330 | TTTGCCAAAATTCAAGGTCAACTGAAAAA[C/T]GCCCCATTTAACCTCTGATTGTACCACCCC | 280 |
| rs6717915 | 2:103079619 | ACTACATTTTTTAAGGTCGCATTTGCTTC[A/C]ACTGATCAGATCTCATAAGAAGCTATTTAC | 281 |
| rs6718157 | 2:103079814 | TTCCCAGCCTTCTTTGTAGTTGGTTTGGG[A/T]CACGTGACTAATATTTTCTAGAAGTAGAGT | 282 |
| rs2075184 | 2:103080592 | GGTTCAAGTGATTCTCCTGCCTCAGCCTC[T/C]GGAGTAGCTGGGATTACAGATGCGTACCAC | 283 |
| rs11676236 | 2:103081695 | AGCCCCAACCTCCTGGGCTCAAGCAATTC[C/A]CCCAATCCCCTCTCAGAGGAGCTGGGACTA | 284 |
| rs11687013 | 2:103081721 | TTCCCCCAATCCCCTCTCAGAGGAGCTGG[G/A]ACTAGCTGGGACTACAGGTATATACCACCA | 285 |
| rs917996 | 2:103082273 | GGACAGCGTGTATTGCTAGCCCATGTTA[C/A]CGAGGTGGAGATATTTATCTTCGCCTCAAC | 286 |
| rs731628 | 2:103082571 | CCTTTGCTAAAGGCTGATAATCATAAGTA[C/T]TATATTGTTAGGGGACATAAACTCTGTCTT | 287 |
| rs1403554 | 2:103083453 | TCGAAGCCTGAGTAAAGGAGAAAACTGCA[G/A]TCTCCTCTGGTCCACGGTATTGCCCACATC | 288 |
| rs12463588 | 2:103085257 | AGAACCACAGGGATTCTTGGGACTGGCAC[C/G]AAAAAGGGGTCAGGAAGGCAGGTCAGAGAA | 289 |
| rs10165460 | 2:103085631 | TTTTTTGATAAACTTATTCCTAAGAATTG[C/T]ATTTTTTGATGCTATTATAAATGGCATTAT | 290 |
| rs11123931 | 2:103085660 | CATTTTTTGATGCTATTATAAATGGCATT[A/G]TTTTCTTAATTCCATTTGTTTTATTCATT | 291 |
| rs2310302 | 2:103086049 | TGATGTTGGCTGTGTATTATCATGTTGAA[G/C]AAGTTTCCTTCCATTCCTGACCTGTAGAGT | 292 |
| rs12469887 | 2:103086758 | ACAATGGTTTTAGCAGGCTTCTCTGACTT[T/C]CTTTCACTGATATATTAAGCTTCTAGCTGG | 293 |
| rs990171 | 2:103086770 | GCAGGCTTCTCTGACTTTCTTTCACTGAT[A/C]TATTAAGCTTCTAGCTGGTCTGTTGTATCT | 294 |
| rs56043441 | 2:103087383 | CTCAGTCTTATGAGTAAGTTGAGAGTTAT[C/T]GGGGTCCAGTATTCCTAATTTGCTGTTTCT | 295 |
| rs10195075 | 2:103087652 | TGGGTAGAGAAAACAGGCCGTGCCTTCAG[G/A]TCTTACCAATATTTAGAAGATTTTTTCAA | 296 |
| rs1403553 | 2:103087662 | AAACAGGCCGTGCCTTCAGGTCTTACCAA[T/G]ATTTAGAAGATTTTTTCAATTTCTGTCTG | 297 |
| rs4140786 | 2:103088176 | ACAAAATTTGGAATTTTAGAGCAGGAAAG[G/T]GTTACCAGGTATGGACAGCATCTTTATTTT | 298 |
| rs4140785 | 2:103088517 | GTAGTCCACCTGATAGTCTCATTTCAGTG[A/C]CTGAATCTAATCTATTCTGGAGTCAAACTG | 299 |
| rs10201184 | 2:103089078 | TCACCAAGGTCACCTGGCAACAAGTAGAA[G/C]AGCGAGAAGTAGGCTCATAAAAATTATCTC | 300 |
| rs4851011 | 2:103089678 | TTAAGTGTAGTTCCAGAGCTACCTGAAGC[C/T]GTGGTCATTCAAAACAAATGAGGGACAGG | 301 |

TABLE 3-continued

Sequences of the listed variants:

| SNP | BP (Grch37) | Sequences (major/minor alleles) | Seq.ID |
| --- | --- | --- | --- |
| rs17027255 | 2:103090127 | CACAGACTGTACCTATATTACTTTTGACC[C/T]AGGTGGATGCAGTCACTCTCTAGAAGCCTC | 302 |
| rs1474309 | 2:103091001 | GCAACTTGTATTACTCAGTGATGGGATGT[C/T]GGGGCATATAAGATTATATCTGTCAGTAAA | 303 |
| rs17027258 | 2:103091540 | TTATAGTTGCTATTCATTTTGAGCTAGTA[A/G]AGTGTGAATATTAAATAGGAATGTTAGTTT | 304 |
| rs10197881 | 2:103091715 | ACAGTCTAACATCTTTTGTGAAATCATAT[A/G]GACACTGATTGTGTTCAAGGTGATCTTACT | 305 |
| rs1468791 | 2:103092021 | CCCAGATTCATTCTGTCTAGGAGCGAAGA[A/G]CACTGTGAAAATACGATTATTCATAGAACT | 306 |
| rs1468790 | 2:103092441 | ATTCATTCTTTTATTCCTCATTCCATCAA[G/C]GTACATTTTCTGAGAACCCATGAAATATGT | 307 |
| rs1468789 | 2:103092503 | AAATGACCATGGTCCCTGACCTCAAGGGA[C/T]TTGGTCTAACGGGGAAGATAGGTTAACTTA | 308 |
| rs1468788 | 2:103092513 | GGTCCCTGACCTCAAGGGACTTGGTCTAA[C/T]GGGGAAGATAGGTTAACTTAGTACTTATTG | 309 |
| rs7597819 | 2:103092906 | GTGAAAGGCATGTAGCATTTCCCTTTACA[A/G]GGCCCTACTTATAGGTGTGTGGCCTCTTCC | 310 |
| rs6737668 | 2:103093081 | TCACACTATGGGCTCTTCCACCTCCTTTA[C/T]ATATTGAAAAAGTTAAGTTTGGTTAAAAT | 311 |
| rs10469840 | 2:103093243 | AGGAAGAGAGTAAGAAGGAGCAGCAGGAG[T/C]TGGACAAAGAGAAGATGAAGAAGGAGGAGG | 312 |
| rs759382 | 2:103094213 | TGACAACGGAATGAGAAGACAAGTAATAG[G/T]CCTTCAGAGTGACAAGGTCCTTTGGCTGAA | 313 |
| rs759381 | 2:103094323 | GAGCCCTGTGGTGGTCTCCTGAGCTCTGA[A/T]CTCTCACCATGTTTGTTGATATGTTCAATA | 314 |
| rs6543146 | 2:103096695 | ATCAGCTTGACCTTTTCCCTCCTGTATTT[T/G]TTATATGCATATACAACATTTTTGCAAATC | 315 |
| rs1030026 | 2:103098178 | ATTATTTAAATTTTTTTAGATTATGGTAT[A/C]TTTTACCCTATAAAAGTTCTAAATTTTTAT | 316 |
| rs1523199 | 2:103098191 | TTTTAGATTATGGTATATTTTACCCTATA[A/G]AAGTTCTAAATTTTTATATAGTGAAACCTG | 317 |
| rs1523198 | 2:103098474 | AGCGAAGGAGGCCCATACATGAAGCCGGA[C/T]GTCAAATCATTTATTCATAGCGAGAATCCC | 318 |
| rs2140316 | 2:103098676 | CAGAGTCTGGTCCTCAGGCCAAGTGTTTC[T/A]GCATCACACTGGTGGGACTGATGAGTCTTC | 319 |
| rs74180219 | 2:103100298 | ATATATATATATATATATATATATATATA[T/C]ATACACACACACAATATACACACACATGCA | 320 |
| rs61604733 | 2:103100300 | ATATATATATATATATATATATATATATA[T/C]ACACACACACAATATACACACACATGCACA | 321 |
| rs10175045 | 2:103103232 | TGATTGTGAGGATGTTGTGAAATGAGACT[T/C]CGGATGCCTGGCACAGGGCAGGTGATACAC | 322 |
| rs10172588 | 2:103103297 | TCTTCTTGCCCTTCCTGTGTGCCAGAGAT[A/G]GGTCCACACAAGAACAACCATCTGCCATCT | 323 |
| rs2310303 | 2:103103879 | CAAATCTGACTCCTAACCTTCCACAACAG[A/G]CAACCCCTTTACTTCCTGCACTTGTGGAGT | 324 |
| rs2310304 | 2:103105148 | TGCCTCAGCCTCCCGAGTAGCTGGGACTA[A/C]AGGTGCCCACCACCACGCCCGGCTAATTTT | 325 |
| rs6705272 | 2:103106569 | CTCTTAACTTCCAACGTTTTTTTTTTTA[A/C]CTTGACAGTAAAACAAATAAAGGGTCAGTA | 326 |

TABLE 3-continued

Sequences of the listed variants:

| SNP | BP (Grch37) | Sequences (major/minor alleles) | Seq.ID |
|---|---|---|---|
| rs1523200 | 2:103106773 | GGGGGGCTGAAACAATCTCTGAAATATGA[A/G]AGACTTTTATTCTTTCACATTATGGAGGTT | 327 |
| rs1523201 | 2:103107064 | TCACATTATCAGGTACTGGCAGTTAAACC[C/T]CAACATATAAATTTGGAGAGGGGGGCATGA | 328 |
| rs7567885 | 2:103108852 | CAGCCTGGACATCCAGGCATTACCATACA[T/G]TCTATGAAATCTAGGCAGAGGTTCCCAAAC | 329 |
| rs4851598 | 2:103109676 | TTCTTCTGAGCCCTTCAAATTGTTCCAAA[T/C]TCTGCCTGTTACCCAGTTCCAAGTCACTT | 330 |
| rs1403548 | 2:103110375 | AGACTACTTCCCAGACCCCAGTCTATAGA[C/T]AGACTTCTTGAGGGTCTGTCTACTCTCACC | 331 |
| rs12712153 | 2:103111761 | TAAAAAGTACTCCCAAAACAGAAATACTT[C/T]GAAGTGAATTTAACAAAGATATGCTAGATC | 332 |
| rs11687071 | 2:103111920 | TTCTCCTATTTGATCTATAGATTCAATAA[G/A]AGCCCATCAAAATCCCAGAAAACATTTTAG | 333 |
| rs7566063 | 2:103112565 | AAAAAAGCAAGCTACATATGAAAGAAAAC[C/A]TTCACTATACATGCATTTCACAAAAGACAT | 334 |
| rs7591872 | 2:103112641 | ATTTTAAATAATTTTAGTTCTCAATAAGG[G/C]TATAAACAGCTCAATTGAAAATAAGAAAAA | 335 |
| rs7591878 | 2:103112658 | TTCTCAATAAGGGTATAAACAGCTCAATT[G/A]AAAATAAGAAAAAGATTTGAACAGATACAC | 336 |
| rs6543150 | 2:103113983 | CTCAGGTATAAAAAGGAAGGGACCACTAA[C/T]ACCTGCAACAACTTGGGCAACTCAAAAACA | 337 |
| rs6543151 | 2:103114041 | CATCATGCTGAGTTAAATAAGCCCGAAAA[A/G]AGGAGTTCATAATTTATTATTCAAACTGTA | 338 |
| rs6543152 | 2:103114043 | TCATGCTGAGTTAAATAAGCCCGAAAAAA[G/A]GAGTTCATAATTTATTATTCAAACTGTATA | 339 |
| rs6543153 | 2:103114203 | GTTCTTGGGATTTTTCTATATCTTGACTA[T/C]GGCGATGGCTTTATGAGTATCTACAATGCC | 340 |
| rs6543154 | 2:103114334 | ATGTCAGCACATTTGGAATTGACTCTTCA[T/C]CTCTGCTGAGCCCTGGTCGAAGGACTAATG | 341 |
| rs6543155 | 2:103114895 | GTAGCTACTAATAATCTAACAAGCTATGT[G/A]AAAGAGTTTTAGTTTGTGGCAACAATATTC | 342 |
| rs7573566 | 2:103115205 | AGATTCTTTTGGATTCATTCAAAATCATA[T/C]GTCACATTTTTTTCAAATACTCAGCCCAG | 343 |
| rs11123934 | 2:103115568 | TTATTAAGCTCATCAGGAACCCACAGGCT[G/A]AAACACGTATCCAAGGAGTCCTTTGCCTTC | 344 |
| rs12987295 | 2:103115838 | CTAGGAGGGATTGTGGGACTTTTGTGGGG[G/A]TTTCCCTTTGCTCTTTTGTTTCTGGACAAT | 345 |
| rs4851012 | 2:103115915 | TATATTCTTAACCAAATTCAGTTTAAGAT[C/T]TCTGCAAGTCTTTCTCTTTTTAAGTAATTC | 346 |
| rs4851599 | 2:103116020 | GTCTGTGTGTCTGTTGCATGTGTCTGTTG[C/T]TTGTGTGTCTGTTGTGTGTGTCTATTGCAT | 347 |
| rs4851013 | 2:103116135 | TTCTTCTTCATCTTCCCCAGCTTCCTCTC[C/T]TCCCAGAAAATACACTAGAAACTTATCTTT | 348 |
| rs4851600 | 2:103116223 | TTCTGCCCACATTCCCTTATCTAAACATG[C/G]TTATTGGCTACTGGTTACTTATTACATTGA | 349 |
| rs4851014 | 2:103116276 | ACATTGAACAGTGAGCACTAATTTATACA[C/T]TCAAAACCTGCATCCTAGGCTCTCTTAAGA | 350 |
| rs4851602 | 2:103116305 | CTCAAAACCTGCATCCTAGGCTCTCTTAA[G/A]AAACATGATTGAACCATTTGGGGAATAAGC | 351 |

TABLE 3-continued

Sequences of the listed variants:

| SNP | BP (Grch37) | Sequences (major/minor alleles) | Seq.ID |
|---|---|---|---|
| rs12995030 | 2:103116466 | GGTCATTTTGTTTATAAAAGCTGTACTGG[C/G]TGGAATAGTGTCCCCTCAAAA ATCCATGCT | 352 |
| rs11682754 | 2:103117095 | TCAAGCCATGCCCCTCACTGCCAGCTCAC[A/G]TTCCCAAGCCCAGGGCCACTC TGTATGATG | 353 |
| rs6728288 | 2:103117268 | GGACAGCCTCCCTCAAACAAACGTGAGGC[A/T]TTCTTTAGAAGGGAGAGCAA GGAGAAGGCC | 354 |
| rs6741235 | 2:103117283 | AACAAACGTGAGGCATTCTTTAGAAGGGA[G/A]AGCAAGGAGAAGGCCTTTGT CATCAATGCA | 355 |
| rs56249513 | 2:103117509 | GCAATCTCAGCTCACGGCAACCTCGCCTC[T/C]CGGGTTCAAGTGATTCTCCTG CCTCAGTCT | 356 |
| rs6741627 | 2:103117618 | TTTTTTTCAAGAGATGGAGTCTCGCTCTG[G/T]CACCCAGGCTGGAGTACACTG GTGTGGTCT | 357 |
| rs6713906 | 2:103117637 | TCTCGCTCTGGCACCCAGGCTGGAGTACA[C/G]TGGTGTGGTCTCAGCTTACTG CAACCTCCA | 358 |
| rs6543157 | 2:103117827 | TCGAACTCCTGAGCTCAGGCAATCTGCCC[A/G]CCTCGGCCTCCAAAAGTGCTA GGATTACAG | 359 |
| rs7591101 | 2:103117910 | TTTAGTAGAGATGGGGTTTCACCACGTTG[G/T]CAAGGCTGGTCTCGAACTTCT GACCTTAGG | 360 |
| rs7568122 | 2:103117989 | TCCCAAAGTGCTGGGATTACAGGCATGAG[C/T]CACCACGCCCAGCCAAAAC AACAATCTTT | 361 |
| rs2075193 | 2:103118027 | CCAGCCAAAAACAACAATCTTTTATAATG[G/A]AGGTGATGTTATAGGGAATCA GCAGAGGTC | 362 |
| rs7593935 | 2:103118128 | AGGGGCTGGGGGAGGAATGGCTTCCTGCA[G/A]GCTGCAGACCACAGCAAGGG GTTGGTGTGC | 363 |
| rs2075192 | 2:103118228 | AGCCAAACCCAGAACCCAAGGGCTGTCAG[A/G]CCACACCCAAGATCAGTGGT GATACTGATT | 364 |
| rs2075191 | 2:103118299 | GAGACACTAAGTGTCTCCATAAGGAAGAT[G/T]ATTCCCATCTTGGAGAGATCA GAGTCAAGC | 365 |
| rs2072509 | 2:103118337 | CTTGGAGAGATCAGAGTCAAGCAGAAGGC[G/C]TGGGTGAGCCTGGCAGGGTG CAGCATGAGG | 366 |
| rs2072508 | 2:103118342 | AGAGATCAGAGTCAAGCAGAAGGCGTGGG[T/C]GAGCCTGGCAGGGTGCAGCA TGAGGGCCA | 367 |
| rs2075190 | 2:103118559 | CATTTTTCCTGGTGTAGATAGATGCTAAG[A/T]GGCAAGTACTGTGATTTCGCA GGACTCTTC | 368 |
| rs2075189 | 2:103118689 | ACCTGTACACCTGCTGCTGCTTTTCAGGA[C/G]CTAGATCATAGTTCTGGGCTAT GGAGTGGC | 369 |
| rs11690932 | 2:103119029 | GGAGGGCCCCAAGGAAGGACACGCTTGG[G/A]AGGGGTTCACCTTTTACTGG AGAAGGTGTG | 370 |
| rs2075188 | 2:103120232 | GAAAGAAAGTTTAGAACCACATCACATGA[G/A]CCAGGCATCTGGGAAAGACA TAACCAATGA | 371 |
| rs2075187 | 2:103120311 | TGCAGATTTAGGATCTTCTAAACTTTTAT[G/A]AAACCTGATTCGGGTTCTTTGT CAAACCAA | 372 |
| rs4851015 | 2:103120356 | TCTTTGTCAAACCAACGTTCTCTCCAATG[C/T]CTGCCTTCATCTTCTTGTGATTT GCCTGAG | 373 |
| rs4851016 | 2:103120400 | TTGTGATTTGCCTGAGGAGGAAAGCATAG[C/T]AATTATCACGTCAATTTAGAA GGCTCAGGA | 374 |
| rs4851017 | 2:103120769 | TGACCTCGTGATCTGCCCGCCTTGGCCTC[C/A]CAAAGTGGAAAAGTTAATTTT AAAGTTGAA | 375 |
| rs4851605 | 2:103120868 | CTTCTGCTGTGCCCCTCAAACCACATCAC[A/G]CAGCCATGGCTCTTCAGTGTGT GATGAAAC | 376 |

TABLE 3-continued

Sequences of the listed variants:

| SNP | BP (Grch37) | Sequences (major/minor alleles) | Seq.ID |
|---|---|---|---|
| rs4851606 | 2:103120889 | CACATCACACAGCCATGGCTCTTCAGTGT[G/A]TGATGAAACTAGACAGATGGG ATAAGACTA | 377 |
| rs13019784 | 2:103123301 | GTTAATCCTTCATGATCCAGCTCAACCCC[A/G]TACTCTTACAGTTGAGGAAAC TGATGGAAA | 378 |
| rs9989842 | 2:103123633 | AAGAACCTCGCTCAAGGTCACATGACTGG[C/G]ATGGAGAGGAACCAGGACAA ACACAACAAT | 379 |
| rs9989749 | 2:103123642 | GCTCAAGGTCACATGACTGGCATGGAGAG[G/A]AACCAGGACAAACACAACAA TATTTTAAAA | 380 |
| rs6708949 | 2:103123965 | CTAAACCTTCTGTTTGAGAAGCTCACTGA[G/C]AGTAAGAAGCGCCCACTCACC CCCCAACCC | 381 |
| rs6724109 | 2:103125018 | TTCTGAAAATGAGATTCCAATTAGTACTA[C/G]GTAGCACAAGTTTTTGTTTTAG TTGGAGTT | 382 |
| rs6751949 | 2:103125138 | ATACAGGCATGATATCTATTTTTATTGCA[G/A]TACTTAAAGGAATGGAAAACT GAAATGAAC | 383 |
| rs6724322 | 2:103125182 | GAAAACTGAAATGAACATTGCAGCATTTA[C/T]TCTGTAATAGCTAGTACAAAA ACATATAGA | 384 |
| rs6739301 | 2:103125457 | AAGACATTTCCCCTTTGTCACCATGAGAC[A/G]TGTGCACGTGTCACTAGACTT CCTCTTTCC | 385 |
| rs6742381 | 2:103125466 | CCCCTTTGTCACCATGAGACATGTGCACG[T/C]GTCACTAGACTTCCTCTTTCCT TCCCCACT | 386 |
| rs4851607 | 2:103125632 | AAGTTCAAAATCCAGTTGTTGCAGGGCTG[C/T]GCTCCTTTCTGGAGGCCCTGG GGAGAATCT | 387 |
| rs10195948 | 2:103125736 | GGCCCATGGCCCCTTCCATCTTCAGAGCC[T/C]GCAAAGGCTGCATCCCTCCAA CAATGATCC | 388 |
| rs4851608 | 2:103125984 | AGGTCATTGTTCTCCCTACCACAGTCTGC[C/T]GTCTGTCTCCCAAAGATTCATA TCTGTTCC | 389 |
| rs10210680 | 2:103127682 | GTTCATGGTCAAAGTGACCTAGGAAATTT[G/A]GTTATTTAAATTCCAGGAAAT CCTAATGAA | 390 |
| rs12712155 | 2:103127963 | ATTATTTAATAATTAATTTAATATTTCAA[A/T]CTATTTTTCAAAACAAAATTCA GAAGCCAG | 391 |
| rs4851609 | 2:103128866 | AGTGCTCCTGAGCCATCCCCTACAGGAAG[T/C]GGTTGAAATTCCAGGGCATGC TAAGCCTGG | 392 |
| rs11676371 | 2:103129692 | ATAAGAGGAGGCCTGGTCTGAGCCGAGCT[G/C]GGACAGCAAAGCTCAGGAAG CCAGCCCCTA | 393 |
| rs1476999 | 2:103131679 | TTATGTCTTCACATTTAAAAAGGAAGTTG[G/A]AAGAAGAGCTAAGAATAGGT AGCAATAAAT | 394 |
| rs2192758 | 2:103132269 | TGTCTGTTAAGACACCTCCTATGTGCCAG[C/G]CACCTTGAAGCAGACACAGGC CTTGCCCTC | 395 |
| rs2192757 | 2:103132378 | CAAACATAATCATAAAGAATAGAGAGCTA[C/T]GCAAGTCTATGAGAGGTGCA CCTCACCTGG | 396 |
| rs2216000 | 2:103132640 | GCAATCTTTAAACCAGTTTTATTTGGAGT[G/C]GGGGCCTGCCGGTTAAGTCAA TTATTTCTT | 397 |
| rs6714379 | 2:103133310 | TAAAAGTGTTGAAGCCTTACACATTTTTT[A/G]ATTAAAGTGATATTAAAATAT AAAATATTT | 398 |
| rs1916307 | 2:103134180 | CACATACACCCCAAAACTATGTACAACTA[C/T]TATGTATCAATATAAAGATA AGTAAGAAG | 399 |
| rs4851610 | 2:103134652 | TGAATGGATTTTAACTAAGTTCGTCCCCC[C/G]CAAAGTGGTCAGTTATAAACT GGGAAGAGT | 400 |
| rs1523204 | 2:103135637 | TTTTTAATCCCTTTCAGAGGTGGGAAGGG[G/A]TCACAGTGTATAATATCTTAG AGCTGGGCT | 401 |

TABLE 3-continued

Sequences of the listed variants:

| SNP | BP (Grch37) | Sequences (major/minor alleles) | Seq.ID |
|---|---|---|---|
| rs1523203 | 2:103135759 | TTTCTTAACCAAAGATAAAATCCCTACAG[A/G]TACAATTCCAATATAAATGTACTCATGAAA | 402 |
| rs4851611 | 2:103135938 | CTTTGAATGAATCATTTTTTTCTGTTGC[A/T]TTTAACGGTAAAATATTTGGATTGCATGGT | 403 |
| rs1403550 | 2:103136309 | AAGAATAATGTTTGTCTCTTCTCCAATAA[T/C]GATTCCAGGGCCCAGAGGATACAAGGAATC | 404 |
| rs1403551 | 2:103136446 | GTGTATGAGCCACCTGTGTTGTCCCCATT[T/G]TCTGTCCTTGAAAACAGTCTCTGAAGGGGG | 405 |
| rs2058657 | 2:103137015 | AACTTTGACTTAGTTAAATAATATTCCAT[T/C]TAATTAGTCATCTAACGAAGTCATATAATG | 406 |
| rs2058656 | 2:103137026 | AGTTAAATAATATTCCATTTAATTAGTCA[T/G]CTAACGAAGTCATATAATGACAAGTTTTTT | 407 |
| rs4851612 | 2:103137880 | ATTGCCCTCGAATTAAAGCACAAAGGCCT[C/G]TTTCCATTTAATAAGTTTATTGCTGATGAC | 408 |
| rs4851613 | 2:103137990 | AGCCTATGAGGTGGCTTTTTGACTCTGCT[T/C]TGCTTACTCCGTAAGTCAAACTCACCAGTC | 409 |
| rs6750851 | 2:103138761 | AGCAAATAGTTAATACACATCTAGAATGC[A/G]CCGGGCATCAGGAACACTGCACTGAAAAAG | 410 |
| rs6750971 | 2:103138825 | AGTTCATTCTCCTTTAAGGCTCAAGGTCC[A/G]GTGGGAAATGCAAGCTCCACTATAACACAG | 411 |
| rs10193407 | 2:103139298 | TATTTCAAAATGTCTTCAAAATTCAACTT[C/T]TTGGGGCAAATTCTTGTCAGATCTGTTAAT | 412 |
| rs11123935 | 2:103139751 | CTTGGCAGTCCAGTTTACACCTTCTTTAC[A/G]ACACTATTTTATACAATTATCTATTTTGT | 413 |
| rs4851614 | 2:103140398 | TCATCTCAGTACACTGAACCTTTCCCATC[C/T]AAGACTGGATGAAGTGCCTTTTGCCTGTAC | 414 |
| rs1357471 | 2:103140472 | TGATCCCAGAATCTTATCACTTAGCTGCA[C/T]GCATAGCATCTTATCCCTATTGATTTGACT | 415 |
| rs2015478 | 2:103141447 | GGCTTCCTTGGCTGAAAGTTGTATGGAGG[A/G]GTCCTTACGTATTTGACATTCCATTTTCTC | 416 |
| rs1024798 | 2:103141651 | GGGGCTGGGGACTGGGACATTCCTTCAGT[G/C]TGCAAGTGTTTGTCATCTGCTGAGCCTGTT | 417 |
| rs6712638 | 2:103142491 | TCAGCCTCCTGAGTAGCTGGGATTACAGG[T/C]GCCCGTCTCCACGCCCTGCTAATTTTTGTA | 418 |
| rs4241211 | 2:103143159 | GATCTCATCTTGAAGAAATGTGAAAGGAG[T/G]GTTTCATTGAAGTTCTAATATTCACCCACT | 419 |
| rs12712156 | 2:103144020 | GGCTCTGGACCACTTGTGATTGGTATTTT[A/C]ACAAATAAGCAATTACTCCCTTAGTATATT | 420 |
| rs3849364 | 2:103144242 | AGTAATCTGTGATATCGTAGCATAAAATT[T/C]ATATGTCAGATTTAATTTTCATATGAATCT | 421 |
| rs3849365 | 2:103144391 | TTTTTTGTTTTGTTTTTTCTATTTGGTT[G/A]TTGATTTTCTTGAGATGAATTTGAAGAACC | 422 |
| rs3849366 | 2:103144900 | TTTTTAATTTAAATTTTTTTAGAAAAAAA[T/A]CTTAAAAAGGGACAGGGTCTCCCTATGTTG | 423 |
| rs6739236 | 2:103144944 | GGGTCTCCCTATGTTGCCCAGGCTGATCT[C/G]TAACTCCCGGGCACAAGGGATCCTCCTGCC | 424 |
| rs6712696 | 2:103145001 | GCCTCGCCTCCTAACATGCTAGGATTATA[G/A]GTGTGAGCCACCATGCCTGGACGACAGTTA | 425 |
| rs1005042 | 2:103145359 | GAAGAAATAGACAGGATATATATGAAGGA[A/G]AAATAAAATTCTACTTCTCCACACTGTCAT | 426 |

TABLE 3-continued

Sequences of the listed variants:

| SNP | BP (Grch37) | Sequences (major/minor alleles) | Seq.ID |
|---|---|---|---|
| rs1005043 | 2:103145426 | CTATAAAGAGGATGATATTGGTTCCCTCC[A/G]TATGCAATTGTATTGTCCTGATGTGAAGCC | 427 |
| rs4851018 | 2:103146615 | AAAATGTGGAGGTGGGGAGTGTTGCACTC[C/T]GAGTCTGGGTGTCTGAACAGTGTATCCTGC | 428 |
| rs4851615 | 2:103146999 | TCACATACCCATGCCTCTTCCTAGAGCTT[G/T]GAGTCCACTGTAAAATAACCCAGAGGGTGA | 429 |
| rs1003431 | 2:103147256 | AAAAATGGACAGATATATAGATATATTAA[T/C]TAATGTTTTCTTTATTGAAAGAAGTTGGTC | 430 |
| rs4241212 | 2:103147671 | CTCCCGAGTAGCTGGGACTACAGGTGCCC[A/G]CCACCACGCCCAGCTAATTTTTTCTAGAAA | 431 |
| rs741285 | 2:103148169 | TGATATATTTAAAAGGATTAGCACAGTGA[C/T]AGGCATATAGTAAATTATCAGGAAAGGGAA | 432 |
| rs1014286 | 2:103149100 | GGTCGAGGTGGACAGCTGACCATGGACAC[G/A]GCAGGGACCATCACAGGTCCCATAGTCCTT | 433 |
| rs2008159 | 2:103149162 | CTCCAAAAAAAATAGTGTTATTGTCCACA[A/G]GATTGTTTTGGTGTTTCTCAAGAGTCTGTC | 434 |
| rs2008157 | 2:103149182 | TTGTCCACAAGATTGTTTTGGTGTTTCTC[A/G]AGAGTCTGTCTTCCTATAACTGTGAAAGGA | 435 |
| rs1829849 | 2:103149698 | TATGCAATAATTATGTTCTATCAGAGATA[A/C]AATTTGTTATGAATTTGCTTTATTTAATCA | 436 |
| rs10179779 | 2:103150204 | TCCCACCTATGAGTGAGAATATGCGGTGT[T/G]TGGTTTTTGTTCTTGGGATAGTTTACTGA | 437 |
| rs10179874 | 2:103150306 | TGAACTCATCATTTTTTATGGCTGCATGG[T/C]ATTCCATGGTGTATATGTGCCACATTTTCT | 438 |
| rs10177737 | 2:103150651 | CTGACTTTTTAATGATTGCCTAAAACCAT[A/C]AAAACCCTAGAAGAAAACCTAGGCATTACC | 439 |
| rs12468713 | 2:103150691 | AAGAAAACCTAGGCATTACCATTCAGGAC[T/A]TAGGCATGGGCAAGGACTTCATGTCTAAAA | 440 |
| rs6737119 | 2:103151109 | TAGAATGGTGATCATTAAAACTATTTTTC[G/A]ATTTCATTTTCCATCCCCATCTCCCCAAAT | 441 |
| rs6709284 | 2:103151164 | CAAATTTGACCTTGAATCTCAAATTCCAG[C/G]TCTTCAATTTTACTAGATCACTTTATCTTT | 442 |
| rs6724213 | 2:103151219 | TCTTTCCTCGCTTTTGTCTTCTCTTCCA[A/C]CTTCCCTTTCTTCTTCTGGCCACCAGTAGG | 443 |
| rs2177317 | 2:103151319 | TGCAACTAACCAAATACCCTTTTGCCATC[A/G]CTGGCATCTGTACCATCCTCAGCTGATTTA | 444 |
| rs2871474 | 2:103151441 | TCTCCCTTGGTGCCCCCACACCCCTTCGG[G/A]TATGCTATGTACCTTATCTGTGAATTATGT | 445 |
| rs4851616 | 2:103151862 | CCATGGGTGCTAGTTACTGACTAAAGACA[C/T]GTGTTTTCTCCTGAATGTATCTTTTTTTA | 446 |
| rs4851617 | 2:103152060 | ATCAAATAACAGCAATCAGCCTAAAGGGA[C/T]AGAAGCACACATAAAACTCAGGAATCTTTG | 447 |
| rs7578425 | 2:103152216 | ATCTCTGCTCACTGCAACCCCTGCCTCCC[A/G]GGTTCCAGCAATTCTCCTGCCTCAACCTCC | 448 |
| rs10172553 | 2:103152975 | TGGCTCTGTCAGACATGGAGAGCGCACGG[C/T]CAAAATGGCCTCTGTATTTCATCATCCACT | 449 |
| rs4292112 | 2:103153780 | TCTACTGTGCTTCTCTGAAAAAGTTGAAG[G/A]GTCATGGGAGGCAGAGCTGGAATTACTACC | 450 |
| rs6761291 | 2:103155069 | AGAACACTTCCTTTCAGGACATCAGTCAC[C/T]GTTAATTGCTAATGGGGCCATAAGCTAAGG | 451 |

TABLE 3-continued

Sequences of the listed variants:

| SNP | BP (Grch37) | Sequences (major/minor alleles) | Seq.ID |
|---|---|---|---|
| rs7576376 | 2:103156205 | GTGGTGCGATCTTGGCTCACTGCAAGCTC[T/C]GCCTCCCGGGTTCACGCCATTC TCCTGCCT | 452 |
| rs6543158 | 2:103157352 | GGGTCGTGTAGATGAGGTTTCGGGGAGGG[C/G]GGGTGGTGGGAGGATATCAC TAAAGTTCTA | 453 |
| rs11685483 | 2:103159093 | GGGTGGTGTTTCTTGCTAAACTGACTTAG[A/C]AGGGTTCTTTTCTAAAACAGA TTTTATAAG | 454 |
| rs6543159 | 2:103160057 | GCTGTCTAAAATCAACTGAAAAGTTTTTC[T/C]TTTTTGTTGTTCAGATTGTTTG TTTTGATG | 455 |
| rs6739426 | 2:103160443 | CTCTGAGATCTTCCTTGAATGAGAGTTCT[A/G]TGTGTACCTCATGGCCCTGTTG GGATTAGG | 456 |
| rs10490202 | 2:103160832 | GTTTCAACAAAAGCATGTAGGCTGGTGAC[C/G]TATCTGAGTACTCATAGATCC AGCTATCTG | 457 |
| rs11899041 | 2:103161053 | TGGTTATTATTTCTTTTGTGGTTGTTGGG[T/A]TTAAAGAAACACTTTCTAATAT GGGAAATT | 458 |
| rs1811263 | 2:103162861 | TCACGCCTGTAATCCCAGCACTTTGGGAG[G/T]CCGAGGTGGGCGGATCACAAG GTCATGAGA | 459 |
| rs1811262 | 2:103162992 | GGCGGGCACCTGTAGTCCCAGCTACTCGG[G/C]AGGCTGAGGCAGGAGAATGG CGTGAACCTG | 460 |
| rs12712157 | 2:103165129 | TTGGCTATGATAGTGACAAGAGCCAATTT[T/C]GCTTCTATCCTTTATTCCTGGA CCTATGTA | 461 |
| rs10194822 | 2:103165504 | CAAAGACTTTAAATCAGCTGTTAGAAATA[T/G]GCTCAAAAAGTAAAGAAAAC TAAGCCTAAA | 462 |
| rs1303960 | 2:103165832 | ACATACCAATATATGCATAATGGGAAACC[G/A]AGGAAAGGAGAGAGAAAAA TAATATGAATA | 463 |
| rs2215998 | 2:103166043 | AACAACAGGGAAAAAATGACCCATTGTAG[A/G]CATGGGAGCCTTGGTAAGAT TAACAGATGA | 464 |
| rs12712158 | 2:103166298 | AGCTTGGCGTGGTGGCGCACGCCTGTAAT[T/C]CCAGCTACTCAGGAGGCTGAG GCAGGGGAA | 465 |
| rs723293 | 2:103166534 | AGATAAACAAAACTGGAAAAATTCATCAT[T/C]AGTAAACCTGCCATACAAGA AATGTTAATA | 466 |
| rs7581853 | 2:103167724 | GTGAGATGAAGGAAGAGTCTGGAGTGATA[C/T]GGCCATGAGCTATGGAATGC CAGAGACCTG | 467 |
| rs6753722 | 2:103168605 | GTCTCGCTCTGTCGCCCAGGCTGGAGTGC[T/A]GTGGCACAATCTTGGCTCACT GCAACCTCC | 468 |
| rs10193009 | 2:103168977 | TCCATAATCAGACAGTCTCCAAAGAAACA[C/T]AGCTACATGTCAAAAGAAAA CCTAGAAGAA | 469 |
| rs11123937 | 2:103169682 | CCAGCACATGCTGGAGTGAGTGGTTCAAG[G/A]CATGATTCCATACAAAATAA CCTATACTAA | 470 |
| rs12712159 | 2:103169982 | TATGAAAATTTCATCTTCCTCTTGCTCCT[G/A]TCTACCTCCTACAAGATGAACA CAATCAGA | 471 |
| rs10196579 | 2:103170181 | TGACTGATGGTGAAGATGTTCTTACACAA[C/T]GGAGACAGGGAAGAATATGG CTGTCCCCA | 472 |
| rs997056 | 2:103170919 | TTGCTCTAAATCCTTTCCCTTAGAGCTTC[A/G]TAAGTGTTGCTAACATCATTCT CAAATAAA | 473 |
| rs2310295 | 2:103171066 | AAATTAATATAACTCCTGGCACTTAGCAG[G/A]CAGCTATTGAACTAGAAAATG TGTTTCTCC | 474 |
| rs2110737 | 2:103172263 | CTTGAGTTCTGTTCTGTAAATTTGACTAC[T/A]AGGGCTTTATTTTATCATCCCA TAGGACAT | 475 |
| rs2005881 | 2:103173059 | CATAGGGTTTGTTATATGGCTGAAGTAGC[G/A]GGACTACTTGAAATATTGCCT GGAGCTGCT | 476 |

TABLE 3-continued

Sequences of the listed variants:

| SNP | BP (Grch37) | Sequences (major/minor alleles) | Seq.ID |
|---|---|---|---|
| rs1989184 | 2:103174935 | TGAGCTGAGATTGCACCATTGCACTCCAG[C/G]CTGGCAACAGAGCAAGACTCCGTCTCAAAA | 477 |
| rs10171438 | 2:103175376 | TGACCCAGTAAAACCCATTTCAGACTTTG[G/A]ATTTCTAGAACTGTAAGATAATTAATTTGT | 478 |
| rs10210658 | 2:103175749 | ATCCCAGTATATGACCAGTATATGAAAAT[T/G]TAATAACTACACAATAACAGCATACCACAG | 479 |
| rs4851619 | 2:103176411 | ATCTCTGAAATCTCTGAAAGTAGCACCGA[C/T]TTGTGTGATTCCCCTAGGAATGTGGTAATA | 480 |
| rs6761871 | 2:103176797 | TGGACACAATTATATGTAAAATATCTGCA[A/C]TAACTCTGGGAAATATTGGTAGGAAGCTT | 481 |
| rs10202404 | 2:103177414 | TTCACTACATTTTTCATGTCTTTGGAATC[C/T]TCTTATATGTTACCAATGAGTTTCTGGCCT | 482 |
| rs4851019 | 2:103177565 | ATTAAATCTGAAATGTCTGGTAAGTGCAT[T/A]GGTATCAAAGTCATCTTGATCTAAAATTGT | 483 |
| rs12469973 | 2:103182273 | GCATGTAGTTTCCATAAAAAATATCCACT[A/G]GAGTCTTGATTAGTATTGTTGTGAATCTGT | 484 |
| rs11123938 | 2:103188785 | AAATGCAGAAATCACCTGTCTTCTGCGTC[A/G]CTCACGCTGGGAGCTGTAGACCGGAGCTGT | 485 |
| rs1861229 | 2:103208610 | TGTGGGAGCTTTAGAAGATATTGATGGCT[A/G]CCTGTACCCCCACTTCCTTCAGGACTCTGA | 486 |
| rs11677922 | 2:103273676 | AGAGCAAGACTCCATCTCAAAAAAAAAAA[T/A]AATAATAATAATAATAAATTGTGTTATTC | 487 |
| rs12052753 | 2:103287966 | AAAAAGCTTGTGATTATCTTTTCTTTTCT[A/C]TTGTATAACTTTGCCTGAACTGTAGGGTAA | 488 |
| rs199977663 | 2:137575582 | GTGTGGCGATTCCTCAGGGATCTAGAACT[G/A]GAAATACCATTTGACCCAGCCATCCCATTA | 489 |
| rs2141304 | 4:11286652 | TATTCAGGGCAACTCCTGTTTTTAAAACC[A/G]TCAGATCTCATGAGACCGATTCACTATCAC | 490 |
| rs10805282 | 4:11291091 | TTCACAGGAATCTTCTCTTTAGCTTCCTC[T/G]ATACCTGTGTCTAAAGATAGCTTCCAAGCT | 491 |
| rs10805283 | 4:11291169 | CTGTAATCCCAAAGCTTTGGGAGGCTAAG[T/G]AAGGAGGATTGCTTGAGGCCAGGAGTTCAA | 492 |
| rs13128031 | 4:11291539 | CAGTCTCTGGTAACAGGACAGCTGCACTC[C/T]TGGGGCCAAGCCCCAGGCAGCGCTGCCCAC | 493 |
| rs4103380 | 4:96370605 | TTGTTATAATGAATATTGACTTCCTGTAA[G/C]GTGTATGGTGGTATGCAGCATCCACATCTC | 494 |
| rs7705676 | 5:35237736 | CATCAAACTCAAATGCTTTCATGGTAAAC[T/C]TGATTACATTAGTCCCTGAATTAAAAATTT | 495 |
| rs7727503 | 5:35238047 | TGTCATGTAGCACTTGCAAATGGGTTTAT[A/G]ATACATCTGCTTTGTTCTACCTCCAAAGGT | 496 |
| rs7710279 | 5:35238245 | AGCTTTTATGAGCATGGGAATGGGAATCA[T/C]TTGCTCCATGGGAAGATGCTAAGAGAGCTG | 497 |
| rs10472952 | 5:35238365 | GAATCAAATGCAGCAGTTGTTAGTCTCTA[T/C]AATAGCTGCATAGATGTCTTCGGGCTACTG | 498 |
| rs9292581 | 5:35238779 | TATATTTTAACAAGATCCCTAGGTAGTTC[C/A]TACGTACATTAAATTTTGAAGAGTTATTTT | 499 |
| rs4703514 | 5:35239028 | TACACAGCCATAAAAACCCCAAATCATGT[A/C]CTTGGCAGTAAGATGGATGCAGCTGGAGGC | 500 |
| rs13361375 | 5:35239203 | TGAGGAATTCTAGAAGGGAAGGGAAGGAG[C/G]GGGGCAAGGACTGAAAACTACCTATTCGGT | 501 |

TABLE 3-continued

Sequences of the listed variants:

| SNP | BP (Grch37) | Sequences (major/minor alleles) | Seq.ID |
|---|---|---|---|
| rs191531802 | 5:156401928 | AAGAAAGAAAGAGAGAAAGAAAGAAGGAA[A/G]GAAAGAAAGAAAGAAAGAAGAAAGAAAGA | 502 |
| rs117979984 | 5:156450845 | CTATATTTTGGAGACTCCAGGTAATTTTA[T/C]TTAGCCTCAGAAGTGACAGTGCAAAGCTGG | 503 |
| rs138665140 | 5:156457158 | ATACAAAAATGGAAAATCTAAAAATACAG[A/G]GCTCTGACATCAAACTAAGTGGCTGAATCA | 504 |
| rs2300619 | 6:146685324 | GTGTGTCACATTGTGACTGTATTTCCTTT[T/C]ACCTCTAGCTATTTATTTTGTTTTTAGGG | 505 |
| rs1229502 | 7:81588636 | AAGCAGACATCAGGCCCTTTTCGGTATCT[G/A]GGTTGCTTAACCATGTCACAAGGATTTGGA | 506 |
| rs17288506 | 7:106147658 | AGTAATGTGGTGGTGCCCCTGGTCAATGT[A/C]AGGTAAGCCTTAGTTCTTCCTATTGCCCAG | 507 |
| rs13229385 | 7:106150256 | GGACAAGAGATGATTCCAGGCATAGGGAA[C/G]AGCATAAGCAAAGGTGCAGAGGCACGGAGT | 508 |
| rs9886235 | 7:106156253 | TGAAAGGGAGCTGGAGGGAAAAGTTGAAA[G/C]ACACACTGAACTAAAGATCATAGGTGGGAT | 509 |
| rs13238247 | 7:106160902 | GATGTATTCTGAGCCCTAAACAACTTATA[T/C]ACAGACTTCCAGAATAAAGCCTGCTTCTAA | 510 |
| rs10279909 | 7:106162503 | AGAGTAGATCTCATGTTAAGTATTCTTAC[T/G]AAAGTAAAATAAAATAAATTTTAGGGAAAA | 511 |
| rs17837506 | 7:106162983 | CCTTAAGAATTATGAAAAAGGTTCACAGC[A/G]GCGTCGATTATACAAATGATGCTTTATCTG | 512 |
| rs13222141 | 7:106163550 | ACAAATAGAGGCACCCTGCTGAGACACCA[T/A]GTTAAATTGAAAATATTTGATATAAATGGT | 513 |
| rs6587006 | 8:21616063 | ACCCTGGGTCCCTGAACCAAGATGTGGAG[T/C]TCTACTACTTAAACAGGGGTTAAAGAACGT | 514 |
| rs7047059 | 9:71876805 | GGCAGCACGAGAGAGATGTAAACAGAAGC[A/T]CTCTAGCTGAGTCCAGCCTAGATCAGCCAA | 515 |
| rs10283781 | 9:71883053 | TTACCCACAGCTACAGTTTATGAGGCTGG[A/G]GAGCAAATACCAACATTTAGGGAGCAGAAT | 516 |
| rs10867298 | 9:71903717 | CCAGCCGCCATCCAAGAGCTCACCAAGAG[C/T]CACTTCACTAGAACAAAAGATATGCCTATC | 517 |
| rs10867299 | 9:71903721 | CCGCCATCCAAGAGCTCACCAAGAGCCAC[T/C]TCACTAGAACAAAGATATGCCTATCACCC | 518 |
| rs57491316 | 9:71903965 | ACTAGAAAATAAGAATTAATAGAGAAGAT[C/T]AACAATCCTAAAGGTGTTACTTTGACACAA | 519 |
| rs56795581 | 9:71904249 | TTCTGATTTTAGTTAGATGCATGGTGAT[G/A]TGGTTTGGCTCTGTGTCCCCACCCAAATCT | 520 |
| rs11137952 | 9:71905304 | TAGATTCAATGCCATCCCTATCAAGCTAC[C/A]AATGACTTTCTTCACAGAATTGGAAAAAAC | 521 |
| rs201118747 | 9:71905591 | AACCTGACAAAAACAAGCAATGGGGAAAG[C/G]ATTCCCTATTTAATAAATGGTGCTGGGAAA | 522 |
| rs199851061 | 9:71905605 | AAGCAATGGGGAAAGCATTCCCTATTTAA[T/C]AAATGGTGCTGGGAAAACTGGCTAGCCATA | 523 |
| rs138313346 | 9:71906042 | TCAAAAGTGGGCAAAGGATATGAATAGA[C/T]ACTTCTCAAAAGAAAACATTTATGCAGCCA | 524 |
| rs11137959 | 9:71906974 | AATTATCCAGTCTCAGGTAAGTCCTTATT[A/G]GCAGCATGAGAACAGACTAATACACATGGC | 525 |
| rs5006678 | 9:111538148 | AACCTCGAAATCTTTTTTTTTTTTTTTT[T/C]TCCCCAGTTTCAAGAGTTTAAGCCTTCATG | 526 |

TABLE 3-continued

Sequences of the listed variants:

| SNP | BP (Grch37) | Sequences (major/minor alleles) | Seq.ID |
|---|---|---|---|
| rs5006679 | 9:111538149 | ACCTCGAAATCTTTTTTTTTTTTTTTT[T/C]CCCCAGTTTCAAGAGTTTAAGCCTTCATGG | 527 |
| rs7849649 | 9:131696704 | AAAAAAAAAAAAAAAAGAAAAGGAAAAAG[C/A]ATGGGGAAACTGGGGAAACTGAAGCCTGAA | 528 |
| rs1907370 | 10:27968343 | CCACTTGGGAAGGGCCGGGGGTGGGCAGT[C/T]TCTGTGTTCAAAGTGATTTTAGTTCAAAAA | 529 |
| rs35957931 | 12:74877668 | CATCTCTATTAAAAATACAAAATTAGCCA[G/A]GCTTGGTGGTGCACGCCTGTAATCCCAGCT | 530 |
| rs1824539 | 12:74879965 | GTTTAGGAATCATGCAGCTGGAGGCTACA[C/T]GATTCTGACCCTCCCTAAACTGCTCCTAAG | 531 |
| rs77474403 | 12:74889088 | TTCAAGGAGAACTACAAACCACTGCTCAA[C/G]GAAATAAAAGAGGACACAAACAAATGGAAG | 532 |
| rs7300059 | 12:74891319 | AGAAGTGGAAATAAAAATATATTTGGTAG[A/G]ATTATAATCTTCCTAGGTAGAAATGTTATA | 533 |
| rs7304361 | 12:74892234 | ATGTTTAATATTAAATCATACTACATGTA[A/G]TTCATAAAATTGTGGACAACCAAATGCATG | 534 |
| rs202095841 | 12:74900231 | ATTAGTCTTGCTAGTGGTTTATCAATTTT[G/A]TTGATCCTTTCAAAAAACCAGCTCCTGGAT | 535 |
| rs147414753 | 12:74901707 | GTCTGATGGGCTTCCCTTTGCGGGTAACC[C/T]GACCTTTCTCTCTGGCTGCCCTTAACATTT | 536 |
| rs12821034 | 12:74902303 | GATCGTCTGAAGCCTTCTTCTCTCAGCTC[C/G]TCAAAGTCATTCTCCATCCAGCTTTGTTCC | 537 |
| rs36153793 | 12:74902947 | GATCTCAGACTGCTGTGCTAGCAATCAGC[G/C]AGACTCCGTGGGCGTAGGACCCTCTGAGCC | 538 |
| rs7962722 | 12:74908207 | GGATGGAGTGACACCCAAAAACTCAGAGA[C/T]GCCAGTAACCACAGAGCCCCATGGGAGTGT | 539 |
| rs12816163 | 12:74910670 | GTTTAGCTTAATAAAGATACTGAAGGATA[C/T]GCATACCAATAGTTATAAGTATCTCTTTAT | 540 |
| rs4547177 | 12:74914614 | CATGAGACCCATTCACTATCATGAGAAGA[G/C]CACGGGAAAGACCAGTCCCAATGATTCAGT | 541 |
| rs2365919 | 12:74914810 | TTTAGCATTCTCAACAAGCAGCCAATGAA[C/G]TATATGGCCTGACGTGTTATGTAATAGAGT | 542 |
| rs35454023 | 12:74915296 | TACAAATTATTCAGTTATGCATGCATTCA[G/A]CACTTATATATTCAGTATTAGGTGTGTTCC | 543 |
| rs58783285 | 12:74915984 | CCCCAGTTGAGGTGTGACATAATGGTGGC[C/T]GGGTCATAAGGATGGTGATGATTTAGAAAG | 544 |
| rs1826588 | 12:74917553 | TGTCAATGGATAAATGGCCCCAAAATGTG[G/A]AATATGAGAACGAGATCTCTGAATGTTTTT | 545 |
| rs1493810 | 12:74920470 | GAAAGATGGTAAGAGCATCTATGTTTAAG[T/G]GGAAGATAATCTCACTGCACTAAACTGTGT | 546 |
| rs34852307 | 12:74922159 | TAACCATCATAAGTCCAACCTTTATCAAC[A/G]TGACACCCATACACATCTCCTTAAACCATA | 547 |
| rs2605342 | 12:74922723 | TTCTTTGACAGAGTGCTTTAAAAACGTGA[C/T]GAAATATCAATTTTATCAATAGTTGAAAAT | 548 |
| rs2605340 | 12:74923340 | TATTGAGACAGAGTCTCACTTTGTCAGCA[G/A]GCTGGAGTGCTGTGGCACGATCTCGGCTCA | 549 |
| rs12821741 | 12:74923633 | ACTTTAATAACAAGTATCTGTAATTAATA[T/G]ATGAGAAATTCTGAGATAAAATCACGTTAG | 550 |
| rs1493801 | 12:74924552 | AATGAAGATATTATTTCAGTTTCCTCCTT[T/C]TTCTCTCAGATGGGAGAAATGAAAAAATGC | 551 |

TABLE 3-continued

Sequences of the listed variants:

| SNP | BP (Grch37) | Sequences (major/minor alleles) | Seq.ID |
|---|---|---|---|
| rs1461045 | 12:74925689 | TAATTTTGCACAACTGTAGGCTAATGTAA[G/T]TGTTCTGAGCACATTTAAGGTAAGCTAAAC | 552 |
| rs1493800 | 12:74926002 | CCACATTAGTATAATATTCTACTTACTAA[C/T]TACAGGTAGCTTGGAATTACTGTTTCTTTC | 553 |
| rs17113674 | 12:74926682 | CTAAATAATTCTTTTAGCCCTAAAATATG[G/C]AGGTAATTCAAGATGCTCTAGGGAGCAGAA | 554 |
| rs17113675 | 12:74926988 | TAGGCCAGCAATTAAGGGCTTTGACTCCA[C/T]TCTCAGGTCTATCCCTTGAAGCACTCTGCT | 555 |
| rs17113679 | 12:74927228 | AATTAAAATGTCATAATACATTCATTTTA[C/A]TTGCCTTAATTTGTGCACAATTTTAAGCAA | 556 |
| rs60905363 | 12:74927335 | GTATTGAGAAAATCATTTAGATAATAAAA[A/C]ATTTCTAGGCTGGGCGCGGTGGCTCACGCC | 557 |
| rs34706013 | 12:74928312 | AAATACAGAAAAGGAGGCCCCACCCTAGA[T/A]TTACAAAATCATACTCTACGTTTTTAAAAG | 558 |
| rs2126136 | 12:74929829 | ACTTGAGTTCAGGAGTTCAAGACCATCTG[G/T]GGCAATATAGCAAGACCTCCTCCGCTAAAA | 559 |
| rs2605381 | 12:74929925 | AAGAAATTAGTCTGGGGTTGTGGTGCACC[C/G]CTGTAGTCCCAGCTGCTTGGGAGGCTGAGG | 560 |
| rs12832045 | 12:74930524 | CTCTGTCGCCCAGGCTGGAGTGCAGTGGC[G/A]GGATCTCGGCTCACTGCAAGCTCCGCCTCC | 561 |
| rs1493796 | 12:74931349 | TAAAATTTTCCACTTTTCAGAGGATATCA[A/G]TTAAGCGTGGCTGCTGAATTCATTAGCGAA | 562 |
| rs590352 | 12:74932159 | GAACCTGGGAATGGGCCTGATCAGCAGCT[G/C]CAGCGCTCACCTCCGGAATTCCAGTAGCTG | 563 |
| rs11615704 | 12:74947219 | GAGGCTGTGGCAGGAGAATGGCGTCAACC[C/T]GGGAGACGGAGCTTTCAGTGAGTGGAGATC | 564 |
| rs66994203 | 12:107400417 | ACACTTGCCAATAATATGTATTAGTAATC[T/G]TTTTTTTTTTTTTTTAGATGACATCTCA | 565 |
| rs117523785 | 13:24695615 | TGAAAGTGCCAATTCATTTCCTGATTTTT[A/G]TAATCAGTTATGTAGTGCTACAATAAATGA | 566 |
| rs17641976 | 15:91664657 | CTAATGTGCAGCCAAGACCCAGTGACAGA[G/A]CAAACCTTCAATTATTATTACTGTTTCTAT | 567 |
| rs17515887 | 15:91665392 | GAACTCCCAATATGTGCTAAACCATCTCC[T/C]CTTTGGACTCCCACTATCTCAGCTACTAGA | 568 |
| rs7208104 | 17:13640730 | GACACTGTCTTCACCATTCTGATTACATA[A/C]GCACAGAAAATTATTTAGTAGGACACTTAA | 569 |
| rs8081904 | 17:13645480 | AATGCACATTTCTTTTTTTTTTTGAGAC[A/G]GACTTTTGCTCTGTTACCCAGGCTGGAGTA | 570 |
| rs12600563 | 17:70243206 | CTACACTAGTGGAGCCCCAGTCTGGTGAC[C/T]GGGTCAGCCAGTCTGTTCAAAGGCTGTCTG | 571 |
| rs142226688 | 19:54170960 | CCTATTATCCTAGCACTTTGGGAGGCCGA[G/A]GAGGGCGGATCACAAGGCCAGGAGTTCGAG | 572 |
| rs111246464 | 20:51381201 | ATGTATAACCCAAGTTATACAAGTATGTA[C/T]GTATAACCCAAGTTATACATGTATGTACAT | 573 |
| rs4583526 | 20:55270493 | TTATTTTAAGGAAATACACTCATGCGGTT[A/G]TGGAGGTTGGCAAGTTCAAAATGGCAGGCT | 574 |
| rs56242654 | X:166155 | AGACTATGCAACCTTTAGAGTCTGCACTG[G/T]GCCTAGGTCTCATTGAGGGCAGATAGAGAC | 575 |

Figure 7:
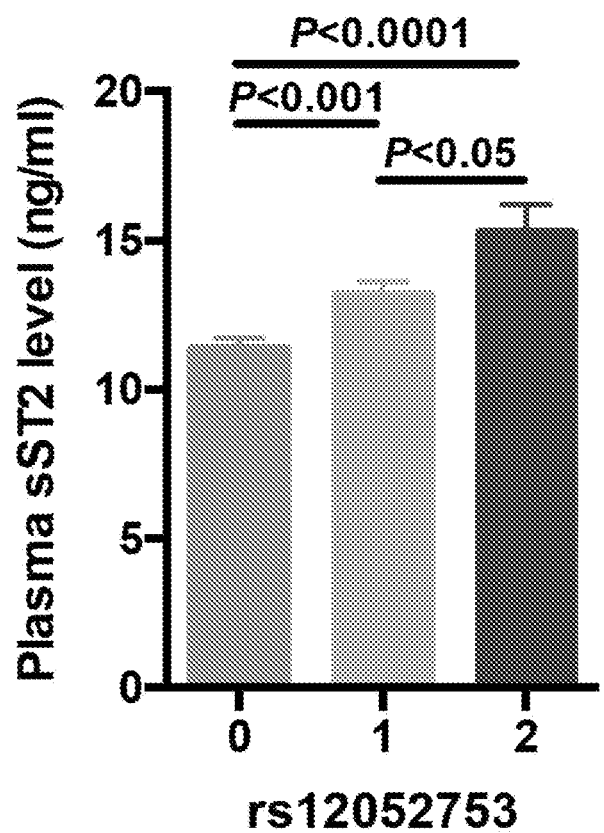
FIG. 7. Association between IL1RL1 variants and plasma sST2 levels. rs12052753 was associated with elevated plasma sST2 levels in the Hong Kong Chinese AD population (n=427). The X-axis indicates the copy number of rs12052753 minor alleles. Data are mean±SEM (linear regression analysis adjusted for age, gender, disease status, and population structure).

The elevated plasma levels of sST2 in AD (FIG. 1) and the association of rs1921622 minor allele with decreased plasma sST2 levels suggest that this variant may exert protective effects against AD. Although rs1921622 was not found to be associated with AD in the mainland Chinese, another Chinese AD cohort with genotype information available, or Hong Kong cohorts, the minor allele of rs1921622 showed a protective effect in female APOE-ε4 carriers from the mainland Chinese AD cohort (odds ratio [OR]=0.63, P=0.01; Table 4), with a concordant trend in the Hong Kong Chinese AD cohort (OR=0.59; P=0.25; Table 4). Moreover, the risk effects of APOE-ε4 were lower in rs1921622 minor allele carriers than non-carriers in the mainland Chinese AD cohort (OR=1.94-3.64 and 4.06-12.40, P=1.2E-9 and 1.1E-11, for rs1921622 minor allele carriers and non-carriers, respectively; Table 5), with a similar trend in the Hong Kong Chinese AD cohort (OR=2.09-9.64 and 1.62-37.77 P=1.4E-4 and 0.0175, for rs1921622 minor allele carriers and non-carriers, respectively; Table 5). In addition, another variant, the minor allele of rs12052753, was associated with higher levels of plasma sST2 (FIG. 7) and exhibited an AD risk effect in the Hong Kong Chinese AD cohort (OR=1.80, P=0.04, Table 6). Moreover, Sanger sequencing of the last exon of IL1RL1 showed an enrichment of rare mutations in AD patients from the mainland Chinese AD cohort (P=0.02, Table 7). Thus, the IL1RL1 variants associated with blood sST2 levels may exert AD protective effects by modulating the APOE-ε4-associated risk in AD.

TABLE 4

MAF and ORs of rs1921622 in females stratified by APOE-ε4 genotype.

| | | Overall | | | | APOE-ε4 non-carriers | | | | APOE-ε4 carriers | | | |
|---|---|---|---|---|---|---|---|---|---|---|---|---|---|
| | N | NC | AD | OR | P | NC | AD | OR | P | NC | AD | OR | P |
| HK Chinese | 282 | 51.27% | 50.61% | 0.87 | 0.52 | 49.50% | 52.94% | 1.04 | 0.88 | 61.76% | 46.77% | 0.59 | 0.25 |
| Mainland Chinese | 911 | 41.95% | 43.06% | 1.03 | 0.71 | 39.78% | 44.14% | 1.22 | 0.10 | 52.74% | 41.09% | 0.63 | 0.01 |

NC, normal controls; AD, Alzheimer's disease; OR, odds ratio; P, p-value.

TABLE 5

MAF and ORs of APOE-ε4 in females stratified by rs1921622 genotype.

| | | | | Overall | | | rs1921622 non-carriers | |
|---|---|---|---|---|---|---|---|---|
| | | | | | OR | | | |
| | | N | NC | AD | (95% CI) | P | NC | AD |
| HK Chinese | | 282 | 7.62% | 20.73% | 4.45 (2.37-8.85) | 7.6E−6 | 7.14% | 20.73% |
| Mainland Chinese | | 911 | 9.19% | 28.46% | 3.51 (2.69-4.63) | 2.2E−16 | 5.92% | 33.33% |

| | | rs1921622 non-carriers | | | rs1921622 carriers | | |
|---|---|---|---|---|---|---|---|
| | | OR (95% CI) | P | NC | AD | OR (95% CI) | P |
| HK Chinese | | 6.47 (1.62-37.77) | 0.0175 | 8.61% | 19.73% | 4.32 (2.09-9.64) | 1.4E−4 |
| Mainland Chinese | | 6.87 (4.06-12.40) | 1.1E−11 | 10.95% | 26.16% | 2.64 (1.94-3.64) | 1.2E−9 |

NC, normal controls; AD, Alzheimer's disease; OR, odds ratio; P, p-value; CI, confident interval.

TABLE 6

MAF and ORs of rs12052753 in females stratified by APOE-ε4 genotype.

| | | Overall | | | | APOE-ε4 non-carriers | | | | APOE-ε4 carriers | | | |
|---|---|---|---|---|---|---|---|---|---|---|---|---|---|
| | N | NC | AD | OR | P | NC | AD | OR | P | NC | AD | OR | P |
| Hong Kong Chinese | 282 | 33.05% | 37.80% | 1.52 | 0.07 | 33.16% | 39.70% | 1.80 | 0.04 | 32.35% | 34.68% | 1.71 | 0.33 |
| Mainland Chinese | 911 | 41.49% | 42.75% | 1.04 | 0.66 | 42.40% | 41.83% | 0.97 | 0.85 | 36.98% | 43.89% | 1.29 | 0.19 |

NC, normal controls; AD, Alzheimer's disease; OR, odds ratio; P, p-value.

TABLE 7

Enrichment of rare mutations in the last exon of IL1RL1 in the mainland Chinese AD cohort

| n | NC 821 | AD 1,014 | P* |
|---|---|---|---|
| # of participants harboring rare mutations** | 37 | 72 | 0.088 |
| Total # of rare mutations in each group | 44 | 90 | 0.024 |

*P, logistic regression adjusted for age and gender.
**Rare mutations are defined as MAF <1%.

TABLE 8

Primers for the Sanger sequencing of last exon of IL1RL1

| Gene | Primer strand | Primer sequences | Seq.ID |
|---|---|---|---|
| IL1RL1 | Forward | 5'-AGACTTTTAAATGTTCAGGATGTTT-3' | 576 |
| IL1RL1 | Reverse | 5'-CCCAGAAGCAGGGAAATG-3' | 577 |

TABLE 9

Amino acid and transcript sequences of sST2, IL1RL1 and CCR3

| Gene | Types | ID | Amino acid/Transcript Sequences | Seq.ID |
|---|---|---|---|---|
| sST2 | Transcript | NM_003856.2 | GAGGAGGGACCTACAAAGACTGGAAACTATTCTTAGCTCCGTCACTG ACTCCAAGTTCATCCCCTCTGTCTTTCAGTTTGGTTGAGATATAGGCTA CTCTTCCCAACTCAGTCTTGAAGAGTATCACCAACTGCCTCATGTGTG GTGACCTTCACTGTCGTATGCCAGTGACTCATCTGGAGTAATCTCAAC AACGAGTTACCAATACTTGCTCTTGATTGATAAACAGAATGGGGTTTT GGATCTTAGCAATTCTCACAATTCTCATGTATTCCACAGCAGCAAAGT TTAGTAAACAATCATGGGGCCTGGAAAATGAGGCTTTAATTGTAAGA TGTCCTAGACAAGGAAAACCTAGTTACACCGTGGATTGGTATTACTCA CAAACAAACAAAAGTATTCCCACTCAGGAAAGAAATCGTGTGTTTGC CTCAGGCCAACTTCTGAAGTTTCTACCAGCTGCAGTTGCTGATTCTGG TATTTATACCTGTATTGTCAGAAGTCCCACATTCAATAGGACTGGATA TGCGAATGTCACCATATATAAAAAACAATCAGATTGCAATGTTCCAG ATTATTTGATGTATTCAACAGTATCTGGATCAGAAAAAAATTCCAAAA TTTATTGTCCTACCATTGACCTCTACAACTGGACAGCACCTCTTGAGT GGTTTAAGAATTGTCAGGCTCTTCAAGGATCAAGGTACAGGGCGCAC AAGTCATTTTTGGTCATTGATAATGTGATGACTGAGGACGCAGGTGAT TACACCTGTAAATTTATACACAATGAAATGGAGCCAATTATAGTGTG ACGGCGACCAGGTCCTTCACGGTCAAGGATGAGCAAGGCTTTTCTCTG TTTCCAGTAATCGGAGCCCCTGCACAAAATGAAATAAAGGAAGTGGA AATTGGAAAAAACGCAAACCTAACTTGCTCTGCTTGTTTTGGAAAAGG CACTCAGTTCTTGGCTGCCGTCCTGTGGCAGCTTAATGGAACAAAAAT TACAGACTTTGGTGAACCAAGAATTCAACAAGAGGAAGGGCAAAATC AAAGTTTCAGCAATGGGCTGGCTTGTCTAGACATGGTTTTAAGAATAG CTGACGTGAAGGAAGAGGATTTATTGCTGCAGTACGACTGTCTGGCCC TGAATTTGCATGGCTTGAGAAGGCACACCGTAAGACTAAGTAGGAAA AATCCAAGTAAGGAGTGTTTCTGAGACTTTGATCACCTGAACTTTCTC TAGCAAGTGTAAGCAGAATGGAGTGTGGTTCCAAGAGATCCATCAAG ACAATGGGAATGGCCTGTGCCATAAAATGTGCTTCTCTTCTTCGGGAT GTTGTTTGCTGTCTGATCTTTGTAGACTGTTCCTGTTTGCTGGGAGCTT CTCTGCTGCTTAAATTGTTCGTCCTCCCCCACTCCCTCCTATCGTTGGT TTGTCTAGAACACTCAGCTGCTTCTTTGGTCATCCTTGTTTTCTAACTT TATGAACTCCCTCTGTGTCACTGTATGTGAAAGGAAATGCACCAACAA CCGTAAACTGAACGTGTTCTTTTGTGCTCTTTTATAACTTGCATTACAT GTTGTAAGCATGGTCCGTTCTATACCTTTTTCTGGTCATAATGAACACT CATTTTGTTAGCGAGGGTGGTAAAGTGAACAAAAAGGGGAAGTATCA AACTACTGCCATTTCAGTGAGAAAATCCTAGGTGCTACTTTATAATAA GACATTTGTTAGGCCATTCTTGCATTGATATAAAGAAATACCTGAGAC TGGGTGATTTATATGAAAAGAGGTTTAATTGGCTCACAGTTCTGCAGG CTGTATGGGAAGCATGGCGGCATCTGCTTCTGGGGACACCTCAGGAG CTTTACTCATGGCAGAAGGCAAAGCAAAGGCAGGCACTTCACACAGT AAAAGCAGGAGCGAGAGAGAGGTGCCACACTGAAACAGCCAGATCT CATGAGAAGTCACTCACTATTGCAAGGACAGCATCAAAGAGATGGTG CTAAACCATTCATGATGAACTCACCCCCATGATCCAATCACCTCCCAC CAGGCTCCACCTCGAATACTGGGGATTACCATTCAGCATGAGATTTGG GCAGGAACACAGACCCAAACCATACCACACACATTATCATTGTTAAA CTTTGTAAAGTATTTAAGGTACATGGAACACACGGGAAGTCTGGTAG CTCAGCCCATTTCTTTATTGCATCTGTTATTCACCATGTAATTCAGGTA CCACGTATTCCAGGGAGCCTTTCTTGGCCCTCAGTTTGCAGTATACAC ACTTTCCAAGTACTCTTGTAGCATCCTGTTTGTATCATAGCACTGGTCA CATTGCCTTACCTAAATCTGTTTGACAGTCTGCTCAACACGACTGCAA GCTCCATGAGGGCAGGGACATCATCTCTTCCATCTTTGGGTCCTTAGT GCAATACCTGGCAGCTAGCCAGTGCTCAGCTAAATATTTGTTGACTGA ATAAATGAATGCACAACCAAAAAAAAAAAAAAAAAAAAAAAAAAA AAAAAAAA | 578 |
| sST2 | Protein | NP_003847.2 | MGFWILAILTILMYSTAAKFSKQSWGLENEALIVRCPRQGKPSYTVDWY YSQTNKSIPTQERNRVFASGQLLKFLPAAVADSGIYTCIVRSPTFNRTGYA NVTIYKKQSDCNVPDYLMYSTVSGSEKNSKIYCPTIDLYNWTAPLEWFK NCQALQGSRYRAHKSFLVIDNVMTEDAGDYTCKFIHNENGANYSVTATR SFTVKDEQGFSLFPVIGAPAQNEIKEVEIGKNANLTCSACFGKGTQFLAAV | 579 |

TABLE 9-continued

Amino acid and transcript sequences of sST2, IL1RL1 and CCR3

| Gene | Types | ID | Amino acid/Transcript Sequences | Seq.ID |
|---|---|---|---|---|
| | | | LWQLNGTKITDFGEPRIQQEEGQNQSFSNGLACLDMVLRIADVKEEDLLL<br>QYDCLALNLHGLRRHTVRLSRKNPSKECF | |
| IL1RL1 | Transcript | NM_016232.5 | GAGTTGTGAAACTGTGGGCAGAAAGTTGAGGAAGAAAGAACTCAAGT<br>ACAACCCAATGAGGTTGAGATATAGGCTACTCTTCCCAACTCAGTCTT<br>GAAGAGTATCACCAACTGCCTCATGTGTGGTGACCTTCACTGTCGTAT<br>GCCAGTGACTCATCTGGAGTAATCTCAACAACGAGTTACCAATACTTG<br>CTCTTGATTGATAAACAGAATGGGGTTTTGGATCTTAGCAATTCTCAC<br>AATTCTCATGTATTCCACAGCAGCAAAGTTTAGTAAACAATCATGGGG<br>CCTGGAAAATGAGGCTTTAATTGTAAGATGTCCTAGACAAGGAAAAC<br>CTAGTTACACCGTGGATTGGTATTACTCACAAACAAACAAAAGTATTC<br>CCACTCAGGAAAGAAATCGTGTGTTTGCCTCAGGCCAACTTCTGAAGT<br>TTCTACCAGCTGCAGTTGCTGATTCTGGTATTTATACCTGTATTGTCAG<br>AAGTCCCACATTCAATAGGACTGGATATGCGAATGTCACCATATATAA<br>AAAACAATCAGATTGCAATGTTCCAGATTATTTGATGTATTCAACAGT<br>ATCTGGATCAGAAAAAAATTCCAAAATTTATTGTCCTACCATTGACCT<br>CTACAACTGGACAGCACCTCTTGAGTGGTTTAAGAATTGTCAGGCTCT<br>TCAAGGATCAAGGTACAGGGCGCACAAGTCATTTTTGGTCATTGATAA<br>TGTGATGACTGAGGACGCAGGTGATTACACCTGTAAATTTATACACAA<br>TGAAAATGGAGCCAATTATAGTGTGACGGCGACCAGGTCCTTCACGG<br>TCAAGGATGAGCAAGGCTTTTCTCTGTTTCCAGTAATCGGAGCCCCTG<br>CACAAAATGAAATAAAGGAAGTGGAAATTGGAAAAAAACGCAAACCT<br>AACTTGCTCTGCTTGTTTTGGAAAAGGCACTCAGTTCTTGGCTGCCGT<br>CCTGTGGCAGCTTAATGGAACAAAAATTACAGACTTTGGTGAACCAA<br>GAATTCAACAAGAGGAAGGGCAAAATCAAAGTTTCAGCAATGGGCTG<br>GCTTGTCTAGACATGGTTTTAAGAATAGCTGACGTGAAGGAAGAGGA<br>TTTATTGCTGCAGTACGACTGTCTGGCCCTGAATTTGCATGGCTTGAG<br>AAGGCACACCGTAAGACTAAGTAGGAAAAATCCAATTGATCATCATA<br>GCATCTACTGCATAATTGCAGTATGTAGTGTATTTTTAATGCTAATCA<br>ATGTCCTGGTTATCATCCTAAAAATGTTCTGGATTGAGGCCACTCTGC<br>TCTGGAGAGACATAGCTAAACCTTACAAGACTAGGAATGATGGAAAG<br>CTCTATGATGCTTATGTTGTCTACCCACGGAACTACAAATCCAGTACA<br>GATGGGGCCAGTCGTGTAGAGCACTTTGTTCACCAGATTCTGCCTGAT<br>GTTCTTGAAAATAAATGTGGCTATACCTTATGCATTTATGGGAGAGAT<br>ATGCTACCTGGAGAAGATGTAGTCACTGCAGTGGAAACCAACATACG<br>AAAGAGCAGGCGGCACATTTTCATCCTGACCCCTCAGATCACTCACAA<br>TAAGGAGTTTGCCTACGAGCAGGAGGTTGCCCTGCACTGTGCCCTCAT<br>CCAGAACGACGCCAAGGTGATACTTATTGAGATGGAGGCTCTGAGCG<br>AGCTGGACATGCTGCAGGCTGAGGCGCTTCAGGACTCCCTCCAGCATC<br>TTATGAAAGTACAGGGGACCATCAAGTGGAGGGAGGACCACATTGCC<br>AATAAAAGGTCCCTGAATTCTAAATTCTGGAAGCACGTGAGGTACCA<br>AATGCCTGTGCCAAGCAAAATTCCCAGAAAGGCCTCTAGTTTGACTCC<br>CTTGGCTGCCCAGAAGCAATAGTGCCTGCTGTGATGTGCAAAGGCATC<br>TGAGTTTGAAGCTTTCCTGACTTCTCCTAGCTGGCTTATGCCCCTGCAC<br>TGAAGTGTGAGGAGCAGGAATATTAAAGGGATTCAGGCCTC | 580 |
| IL1RL1 | Protein | NP_057316.3 | MGFWILAILTILMYSTAAKFSKQSWGLENEALIVRCPRQGKPSYTVDWY<br>YSQTNKSIPTQERNRVFASGQLLKFLPAAVADSGIYTCIVRSPTFNRTGYA<br>NVTIYKKQSDCNVPDYLMYSTVSGSEKNSKIYCPTIDLYNWTAPLEWFK<br>NCQALQGSRYRAHKSFLVIDNVMTEDAGDYTCKFIHNENGANYSVTATR<br>SFTVKDEQGFSLFPVIGAPAQNEIKEVEIGKNANLTCSACFGKGTQFLAAV<br>LWQLNGTKITDFGEPRIQQEEGQNQSFSNGLACLDMVLRIADVKEEDLLL<br>QYDCLALNLHGLRRHTVRLSRKNPIDHHSIYCIIAVCSVFLMLINVLVIILK<br>MFWIEATLLWRDIAKPYKTRNDGKLYDAYVVYPRNYKSSTDGASRVEH<br>FVHQILPDVLENKCGYTLCIYGRDMLPGEDVVTAVETNIRKSRRHIFILTP<br>QITHNKEFAYEQEVALHCALIQNDAKVILLEMEALSELDMLQAEALQDSL<br>QHLMKVQGTIKWREDHIANKRSLNSKFWKHVRYQMPVPSKIPRKASSLT<br>PLAAQKQ | 581 |
| CCR3 | Transcript | NM_178328.1 | CTGATGGTATCTCTGTTTCAGGAGTGGTGACGCCTAAGCTATCACTGG<br>ACATATCAAGGACTTCACTAAATTAGCAGGTACCACTGGTCTTCTTGT<br>GCTTATCCGGGCAAGAACTTATCGAAATACAATAGAAGTTTTTACTTA<br>GAAGAGATTTTCAGCTGCTGTGGATTGGATTATGCCATTTGGAATAAG<br>AATGCTGTTAAGAGCACACAAGCCAGGTTCCTCAAGGAGAAGTGAAA<br>TGACAACCTCACTAGATACAGTTGAGACCTTTGGTACCACATCCTACT<br>ATGATGACGTGGGCCTGCTCTGTGAAAAAGCTGATACCAGAGCACTG<br>ATGGCCCAGTTTGTGC<br>CCCCGCTGTACTCCCTGGTGTTCACTGTGGGCCTCTTGGGCAATGTGG<br>TGGTGGTGATGATCCTCATAAAATACAGGAGGCTCCGAATTATGACC<br>AACATCTACCTGCTCAACCTGGCCATTTCGGACCTGCTCTTCCTCGTCA<br>CCCTTCCATTCTGGATTCACTATGTCAGGGGGCATAACTGGGTTTTTG<br>GCCATGGCATGTGTAAGCTCCTCTCAGGGTTTTATCACACAGGCTTGT<br>ACAGCGAGATCTTTTTCATAATCCTGCTGACAATCGACAGGTACCTGG<br>CCATTGTCCATGCTGTGTTTGCCCTTCGAGCCCGGACTGTCACTTTTGG<br>TGTCATCACCAGCATCGTCACCTGGGGCCTGGCAGTGCTAGCAGCTCT<br>TCCTGAATTTATCTTCTATGAGACTGAAGAGTTGTTTGAAGAGACTCT | 582 |

TABLE 9-continued

Amino acid and transcript sequences of sST2, IL1RL1 and CCR3

| Gene | Types | ID | Amino acid/Transcript Sequences | Seq.ID |
|---|---|---|---|---|
| | | | TTGCAGTGCTCTTTACCCAGAGGATACAGTATATAGCTGGAGGCATTT<br>CCACACTCTGAGAATGACCATCTTCTGTCTCGTTCTCCCTCTGCTCGTT<br>ATGGCCATCTGCTACACAGGAATCATCAAAACGCTGCTGAGGTGCCC<br>CAGTAAAAAAAAGTACAAGGCCATCCGGCTCATTTTTGTCATCATGGC<br>GGTGTTTTTCATTTTCTGGACACCCTACAATGTGGCTATCCTTCTCTCT<br>TCCTATCAATCCATCTTATTTGGAAATGACTGTGAGCGGAGCAAGCAT<br>CTGGACCTGGTCATGCTGGTGACAGAGGTGATCGCCTACTCCCACTGC<br>TGCATGAACCCGGTGATCTACGCCTTTGTTGGAGAGAGGTTCCGGAAG<br>TACCTGCGCCACTTCTTCCACAGGCACTTGCTCATGCACCTGGGCAGA<br>TACATCCCATTCCTTCCTAGTGAGAAGCTGGAAAGAACCAGCTCTGTC<br>TCTCCATCCACAGCAGAGCCGGAACTCTCTATTGTGTTTTAGGTCAGA<br>TGCAGAAAATTGCCTAAAGAGGAAGGACCAAGGAGATGAAGCAAAC<br>ACATTAAGCCTTCCACACTCACCTCTAAAACAGTCCTTCAAACTTCCA<br>GTGCAACACTGAAGCTCTTGAAGACACTGAAATATACACACAGCAGT<br>AGCAGTAGATGCATGTACCCTAAGGTCATTACCACAGGCCAGGGGCT<br>GGGCAGCGTACTCATCATCAACCCTAAAAAGCAGAGCTTTGCTTCTCT<br>CTCTAAAATGAGTTACCTACATTTTAATGCACCTGAATGTTAGATAGT<br>TACTATATGCCGCTACAAAAAGGTAAAACTTTTTATATTTTATACATT<br>AACTTCAGCCAGCTATTGATATAAATAAAACATTTTCACACAATACAA<br>TAAGTTAACTATTTTATTTTCTAATGTGCCTAGTTCTTTCCCTGCTTAA<br>TGAAAAGCTTGTTTTTCAGTGTGAATAAATAATCGTAAGCAACA | |
| CCR3 | Protein | NP_847898.1 | MPFGIRMLLRAHKPGSSRRSEMTTSLDTVETFGTTSYYDDVGLLCEKADT<br>RALMAQFVPPLYSLVFTVGLLGNVVVVMILIKYRRLRIMTNIYLLNLAIS<br>DLLFLVTLPFWIHYVRGHNWVFGHGMCKLLSGFYHTGLYSEIFFIILLTID<br>RYLAIVHAVFALRARTVTFGVITSIVTWGLAVLAALPEFIFYETEELFEETL<br>CSALYPEDTVYSWRHFHTLRMTIFCLVLPLLVMAICYTGIIKTLLRCPSKK<br>KYKAIRLIFVIMAVFFIFWTPYNVAILLSSYQSILFGNDCERSKHLDLVML<br>VTEVIAYSHCCMNPVIYAFVGERFRKYLRHFFHRHLLMHLGRYIPFLPSE<br>KLERTSSVSPSTAEPELSIVF | 583 |

Figure 8:
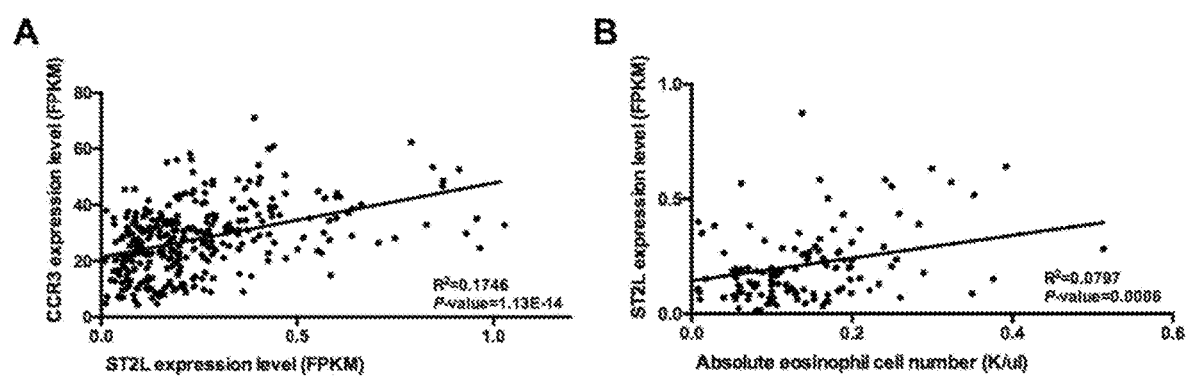
FIG. 8. Association between blood ST2L transcript levels and a blood eosinophil marker or eosinophil cell counts. (A) ST2L transcript levels were positively correlated with the transcript level of CCR3 (an eosinophil marker) in the blood (n=322 whole blood bulk RNA sequencing dataset in the Hong Kong Chinese AD cohort; linear regression analysis adjusted for age, gender, disease status, RNA quality, and population structure). (B) ST2L transcript levels were positively correlated with eosinophil blood cell counts (n=144 absolute blood cell counting dataset in the Hong Kong Chinese AD cohort; linear regression adjusted for age, gender, disease status, RNA quality, and population structure).
Figure 9:
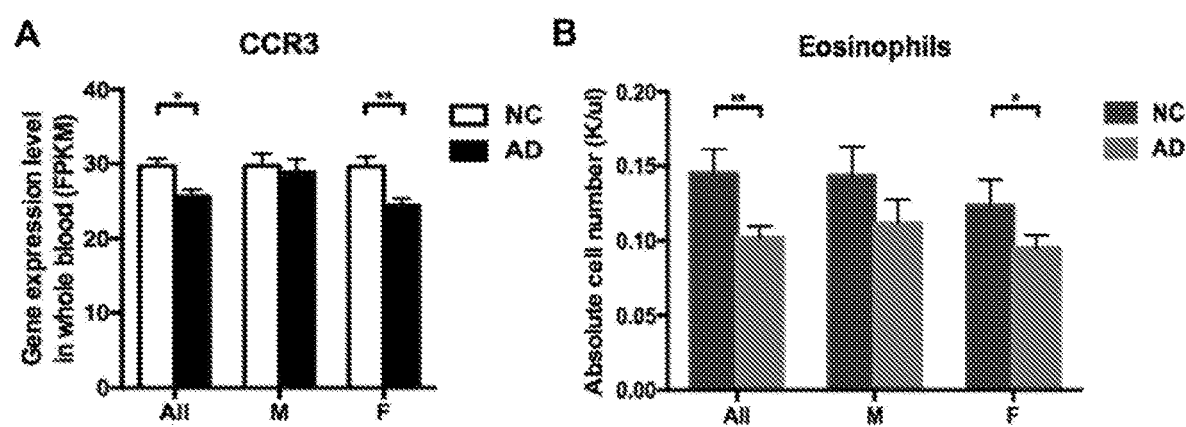
FIG. 9. Female AD patients have decreased blood eosinophil marker levels and cell counts. (A) The transcript level of the eosinophil marker, CCR3, was decreased in blood from female AD patients (n=62, 47, 95, and 118 male NC, male AD, female NC, and female AD in the whole blood bulk RNA sequencing dataset of the Hong Kong Chinese AD cohort, respectively; linear regression analysis adjusted for age, gender, disease status, RNA quality, and population structure). (B) Eosinophil cell numbers decreased in blood from female AD patients (n=18, 30, 27 and 78 for male NC, male AD, female NC, and female AD subjects in the Hong Kong Chinese AD cohort, respectively). Data are mean±SEM (*P<0.05, **P<0.01; linear regression adjusted for age, gender, disease status, and population structure).

Moreover, as levels of sST2 protein and full-length ST2 transcript were altered in the peripheral blood of AD patients, which implies dysregulation of IL-33/ST2 signaling in the peripheral circulatory system, the inventors examined whether this dysregulated IL-33/ST2 signaling leads to alteration of blood signatures, such as changes in the proportion of blood cells. Accordingly, the correlations between full-length ST2 transcript level and blood cell counts or transcript levels of specific blood cell-type markers were determined. The transcript levels of full-length ST2 were positively correlated with that of CCR3 (an eosinophil marker) in the blood as well as the absolute eosinophil count in the Hong Kong Chinese AD cohort (FIG. 8). Moreover, the gene expression of CCR3 in the blood and the eosinophil count were reduced in AD patients (FIG. 9), and were associated with the genotype dosage of the AD protective IL1RL1 variant, rs1921622. These results collectively indicate an association between IL33/ST2 signaling and eosinophil functions in AD pathogenesis.

Additionally, medications that may regulate the plasma sST2 protein level were investigated. The inventors conducted an association analysis of the plasma sST2 protein level and medical information collected in Hong Kong female AD patients. Trazodone may lead a decreased plasma sST2 level in AD patients (FIG. 10), and altered cognitive performance in female AD patients (P=0.0202). Thus, trazodone might lower plasma sST2 level and modify cognitive performance.

Furthermore, the inventors developed a polygenic risk score (PRS) model, to calculate individual risk level, by summarizing the effects from a total of 29 sST2-associated variants as listed: rs75687525, rs4499395, rs56238602, rs1921622, rs2140316, rs12052753, rs199977663, rs2141304, rs4103380, rs4703514, rs191531802, rs2300619, rs1229502, rs9886235, rs6587006, rs7047059, rs5006678, rs7849649, rs1907370, rs11615704, rs66994203, rs117523785, rs17641976, rs7208104, rs12600563, rs142226688, rs111246464, rs4583526, rs56242654. Association analysis revealed significant association between the obtained PRS and AD for female participants harboring APOE-ε4 risk variants in the mainland Chinese AD cohort (effect size=0.344, P-value=0.046; Table 10), with concordant trend in the Hong Kong Chinese AD cohort.

TABLE 10 sST2-polygenic score is associated with AD-risks in female APOE-ε4 carriers.
n, sample size; Beta, effect size.

| | | Overall | | APOE-ε4 non-carriers | | APOE-ε4 carriers | |
|---|---|---|---|---|---|---|---|
| | n | Beta | P-value | Beta | P-value | Beta | P-value |
| Hong Kong Chinese | 282 | 0.014 | 0.356 | 0.004 | 0.833 | 0.031 | 0.379 |
| Mainland Chinese | 911 | 0.146 | 0.057 | 0.066 | 0.475 | 0.344 | 0.046 |

*P, Linear regression test, adjusted by age, disease history and population structure.

Figure 11:
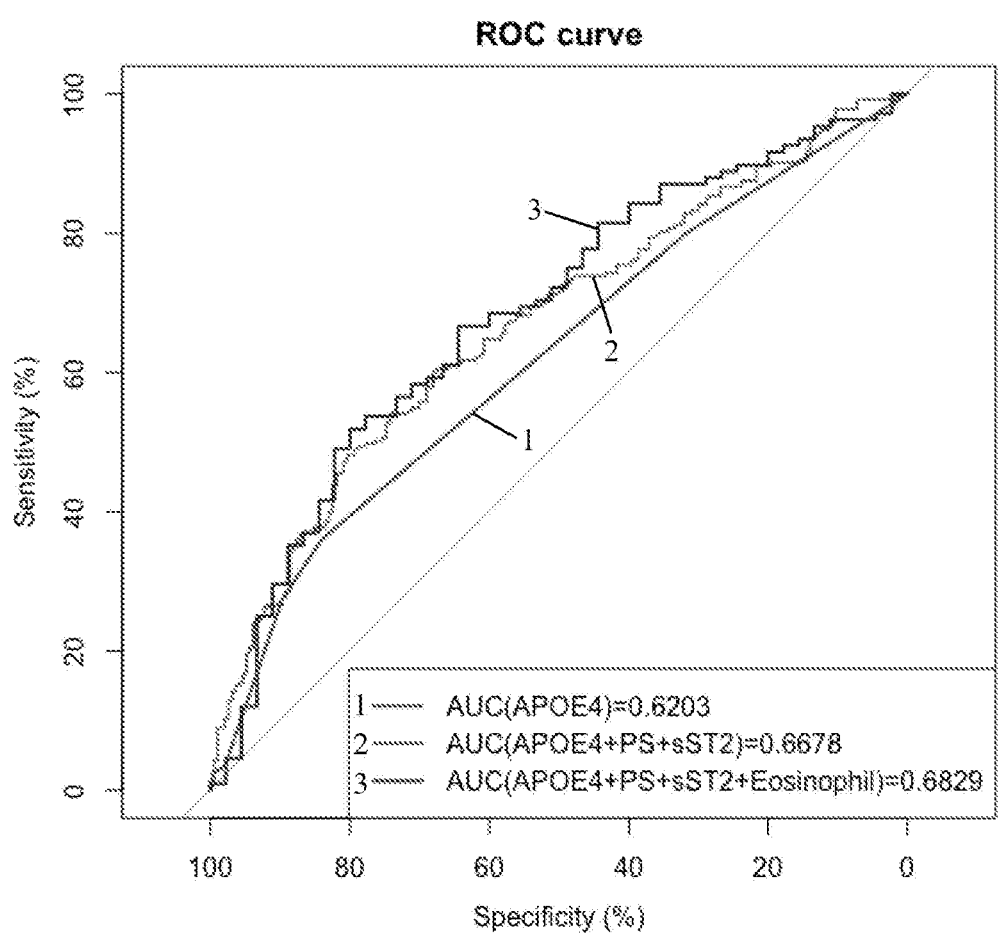
FIG. 11. ROC (Receiver operating characteristic) curve for polygenic risk score model onto AD risk prediction. Data were generated by using information from (red) APOE-ε4 as reference; (green) APOE-ε4, polygenic risk score (PRS) and plasma sST2 level; and (blue) APOE-ε4, polygenic risk score (PRS), plasma sST2 level and eosinophil counts. The models were assessed by values of area under curve (AUC).

The PRS model was further optimized by adding the information on APOE genotypes and plasma sST2 levels, to increase its accuracy in classifying AD and NC (AUC=0.6203 and 0.6678, for APOE alone and after adding PRS and plasma sST2, respectively; FIG. 11), which can be further improved by adding the eosinophil count data (AUC=0.6829, FIG. 11). Thus, the inventors have demonstrated use of either genetic information derived from the sST2 region, or an improved strategy that integrates plasma protein and blood cell count data, as a viable strategy to screen the general population for AD risk.

Methods

Subject Recruitment for the Hong Kong Chinese AD Cohort: A cohort of Hong Kong Chinese was recruited from individuals who visited the Specialist Outpatient Department of the Prince of Wales Hospital, the Chinese University of Hong Kong. A total of 427 subjects were recruited: 233 with AD and 194 normal controls (NCs). All subjects were ≥60 years old. The clinical diagnosis of AD was established based on the American Psychiatric Association's Diagnostic and Statistical Manual of Mental Disorders, Fifth Edition (DSM-5). All subjects were given medical history assessment, cognitive and functional assessment through the Montreal Cognitive Assessment (MoCA) test, and neuroimaging assessment by MRI. Each individual's data, including age, sex, education, medical history, and cardiovascular disease history, were recorded. Individuals with any significant neurological disease or psychiatric disorder were excluded. The plasma of subjects was collected and stored at −80° C. as aliquots until use. This study was approved by the Prince of Wales Hospital, the Chinese University of Hong Kong, and the Hong Kong University of Science and Technology. All participants provided written informed consent for both study enrollment and sample collection. Absolute blood cell count was determined by complete blood count (CBC) at the Prince of Wales Hospital. The medication and disease records for the Hong Kong Chinese AD cohort were obtained from the Prince of Wales Hospital, as well.

Subject Recruitment for the Mainland Chinese AD Cohort: A cohort of mainland Chinese participants with AD, mild cognitive impairment (MCI), and age- and gender-matched normal controls were recruited by the Department of Neurology or Memory Clinic, Huashan Hospital, Fudan University, Shanghai, China, from 2007 to 2018. AD patients were diagnosed based on the recommendations of the National Institute on Aging and the Alzheimer's Association workgroup, and had an onset age of ≥50 years. Patients with MCI were diagnosed according to the Peterson criteria. Individuals with any significant neurological disease or psychiatric disorder were excluded. Part of the NCs without subjective memory complaints were recruited from the general community in Shanghai. A total of 1,696 participants (N=867 and 829, for AD and NC, respectively), with 911 female participants, were recruited. All participants were subjected to medical history assessment, neuropsychological assessment, and imaging assessment including computed tomography (CT) or magnetic resonance imaging (MRI). Some subjects also underwent positron emission tomography using Pittsburgh compound B. The study was approved by the Ethics Committee of Huashan Hospital, the Hong Kong University of Science and Technology (HKUST), and the HKUST Shenzhen Research Institute. All subjects provided written informed consent for both study enrollment and sample collection.

Human Cerebrospinal Fluid Samples: All human cerebrospinal fluid (CSF) samples were obtained from The MRC UK Brain Bank Network (UKBBN). The samples from AD and un-demented NCs were selected on the basis of clinical diagnosis, with post-mortem duration ≤30 h.

Detection of Soluble ST2 Protein by ELISA: Human plasma and CSF soluble ST2 (sST2) protein levels were measured using the Human ST2/IL-33 R Quantikine ELISA Kit (DST200).

Blood Transcriptome RNA Sequencing: Total RNA was extracted from blood samples collected in PAXgene tubes, followed by globin depletion using the GLOBINclear Kit (Thermo Fisher) to eliminate high-copy globin mRNA from the total RNA. The integrity, purity, and concentration were evaluated by Fragment Analyzer and Biodrop spectrophotometer. Library construction and RNA sequencing (RNA-seq) were performed by Novogene (Beijing). Briefly, mRNA was enriched from total RNA using oligo-dT beads and then subjected to chemical fragmentation. The fragmented mRNA was reverse-transcribed to cDNA, ligated to adapters, and amplified by PCR to generate cDNA libraries. All libraries were assessed for quality (i.e., concentration and library size distribution), and the ones that passed quality control requirements were subjected to the Illumina HiSeq X platform for transcriptome profiling, generating 12 million 150-bp paired-end reads per sample. Sequencing reads were mapped to the human reference genome (Grch37) using the splice-aware aligner, STAR, followed by Stringtie for transcript quantification.

Whole-genome sequencing and Variant Calling Method: Whole-genome sequencing (WGS, 5× coverage) was performed by Novogene. The genomic DNA libraries were sequenced on an Illumina Hiseq X Ten platform, which generated 150-bp paired-end reads. Variants from the sequencing data were detected by the Gotcloud pipeline, which were subsequently subjected to FastQC for quality checking and Trimmomatic to trim and filter low-quality reads. GRCh37, containing the decoy fragments, was adopted as the reference genome to map the filtered data by BWA-mem. After de-duplication and clipping of the overlapped paired-end reads, the BAM files were subjected to samtools to generate glf files, which contained the marginal likelihoods for genotypes, followed by glfFlex for population-based SNP calling. Hard filtering implemented in the Gotcloud pipeline as VcfCooker was applied to filter low-confidence variant calls based on distance with known insertion/deletion sites, allele balance, and mapping quality. Variants with high-confidence calls and a minor allele frequency (MAF) ≥5% were subjected to Beagle for phasing. The top five principal components were generated by PLINK software with the following parameters: -pca header tabs, -maf 0.05, -hwe 0.00001, and -not-chr x y.

Association Test and Data Visualization for GWAS: A genome-wide SNP association test with plasma sST2 level was performed using PLINK software, adjusting for covariates (including age, gender, and top five principal components), and with the following parameters: -keep-allele-order, -linear, -ci 0.95, -hwe 0.00001, and -maf 0.05. To visualize the data, Manhattan plots were generated using the R qqman package. Regional plots for IL1RL1 locus were generated using LocusZoom. Fine mapping analysis for the effects of the IL1RL1 locus on plasma sST2 expression was performed using CAVIAR software with association test results and pairwise linkage disequilibrium (LD) information generated from PLINK using the following parameters: -hwe 0.00001, -maf 0.05, -r, -matrix, -chr 2, -from-bp102000000, and -to-bp 104000000.

Sanger sequencing for the last exon of IL1RL1: Sanger sequencing was performed using the following primers for PCR with 10 ng extracted blood genomic DNA as input:

forward primer: 5'-AGACTTTTAAATGTTCAG-GATGTTT-3' (SEQ ID NO:576); reverse primer: 5"-CCCAGAAGCAGGGAAATG-3' (SEQ ID NO:577).

Genotyping of APOE by TaqMan assay: For APOE-ε4 (rs429358 and rs7412), genotyping was conducted by TaqMan assay with probe ordered from Thermo Scientific (assay ID: C_3084793_20 and C_904973_10). 10 ng genomic DNA were subjected to real-time PCR on the QuantStudio 7 Flex Real-Time PCR system (Applied Biosystems) and genotype calling was performed using QuanStudio Real-Time PCR software (Applied Biosystems).

Polygenic Risk Score for sST2 Level and Its Association with AD: sST2-associated variants with P-value lower than 1E-5 were subjected to SNP pruning ($r^2<0.2$) to yield 29 independent signals. Polygenic risk scores (PRS) were calculated by weighting the genotype dosage by the effect size of each corresponding variants onto the sST2 level, to generate PRS at individual level. Lasso regression with cross-validation were performed for PRS alone, or in combination with plasma sST2 levels and eosinophil counts to estimate their effectiveness on classifying AD and NC. Logistic regression was performed using R programming with adjustment for age to test the association between PRS and AD.

Statistical Analyses and Data Visualization: All statistical plots were generated using GraphPad Prism version 6.0, Locuszoom or R programming. For sST2 level analysis, the investigators who performed the ELISA were blinded to the experimental groups and conditions. Linear regression was performed, adjusting for covariates including age, gender, disease history, and population structure (top principal components obtained from principal components analysis using whole-genome sequencing data). The level of significance was set at $P<0.05$. For blood transcriptome and blood cell count analysis, linear regression was performed, adjusting for age, gender, disease history, RNA integrity number (RIN), and population structure (top principal components obtained from principal components analysis using whole-genome sequencing data). The level of significance was set at $P<0.05$. For medication analysis, the linear regression analysis for plasma sST2 protein level, individual cognitive performance as indicated by MoCA score, and medication history in female AD patients were conducted using R, adjusting for age and population structure.

Figure 12:
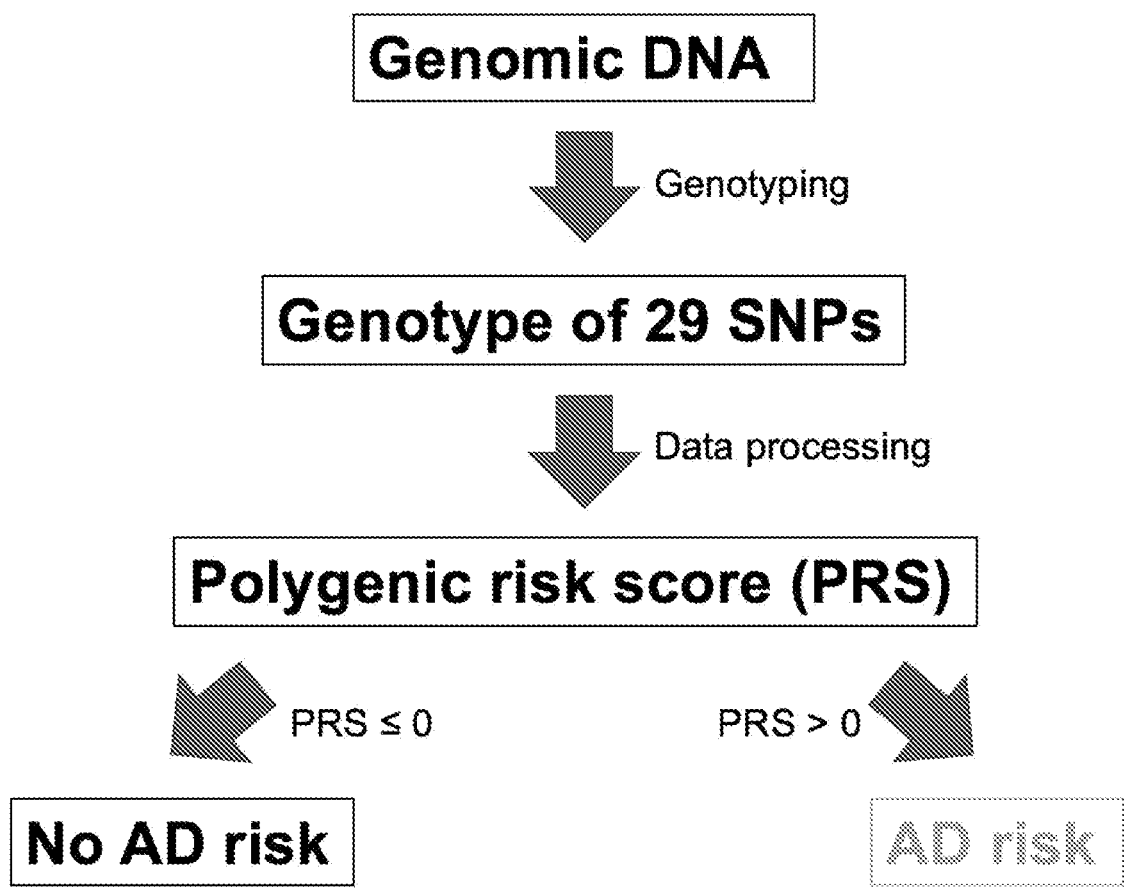
FIG. 12. Work flow of AD-risk prediction in female APOE-ε4 carriers based on PRS.

Polygenic risk derived sST2-associated variants in predicting AD risk: To investigate polygenic effects of IL1RL1 locus, which potentially influence the plasma sST2, on to the AD risk, a polygenic risk score (PRS) were calculated at individual level summarizing effects from multiple sST2-associated variants. Association analysis revealed the significant association between the obtained PRS and AD in mainland AD cohort for female participants harboring APOE-ε4 risk variants (effect size=0.344, P-value=0.046, with concordant trend can be observed in Hong Kong Chinese AD cohort). Particularly, a cutoff value of 0 for PRS is able to predict AD risks for individuals in mainland female APOE-ε4 carriers (Sensitivity=62.32%, specificity=57.74%; Table 11). Therefore, to predict the risk of AD for female APOE-ε4 carriers, genomic DNA can be extracted from blood for genotyping of 29 sST2-associated SNPs. The polygenic risk score (PRS) is calculated based on the genotype dosage of 29 SNPs as previously described and a PRS larger than 0 suggests the high risk of AD for the individual in testing (FIG. 12).

Moreover, after adding the information of APOE genotypes and plasma sST2 level, the PRS model display more accuracy on classification of AD and NC (AUC=0.6203 and 0.6678, for APOE alone and after adding PRS and plasma sST2, respectively; FIG. 11), which can be further improved after adding the eosinophil count data (AUC=0.6829, FIG. 11). Thus, by either relying genetic information derived from sST2 region, or an improve strategy by integrating plasma protein and blood cell count, a kit or strategy can be designed to screening AD risk at population scale.

Polygenic Risk Score for sST2 Level and Its Association with AD: sST2-associated variants with P-value lower than 1E-5 were subjected to the SNP pruning ($r^2<0.2$), yielding 29 independent signals. Polygenic risk scores (PRS) were calculated by the sum of effect size-weighted ($\beta_i$) genotype dosage of corresponding variants ($snp_i$) onto the sST2 level, to generate PRS at individual level:

$$\text{Individual PRS} = \beta_1 snp_1 + \beta_2 snp_2 + \ldots + \beta_{29} snp_{29}$$

The individual polygenic scores were further normalized by subtracting the mean and dividing by the standard deviation. Lasso regression with cross-validation were performed for PRS alone, or in combination with plasma sST2 level and eosinophil counts for estimation their effectiveness on classifying AD and NC. Logistic regression was performed using R programming with adjustment for age to test association between PRS and AD.

TABLE 11

The sensitivity and specificity of different cutoff scores for sST2-polygenic risk score (PRS) in prediction of AD in mainland female APOE-ε4 carriers.

| PRS cutoff score | Sensitivity | Specificity |
| --- | --- | --- |
| PRS >−2 | 100.00% | 0.00% |
| PRS >−1.5 | 98.14% | 1.41% |
| PRS >−1 | 90.23% | 8.45% |
| PRS >−0.5 | 75.81% | 28.17% |
| PRS >0 | 62.32% | 57.74% |
| PRS >0.5 | 41.86% | 76.05% |
| PRS >1 | 19.07% | 97.18% |
| PRS >1.5 | 8.84% | 100.00% |
| PRS >2 | 2.79% | 100.00% |

Trazodone treatment of mice: Mice were treated with Trazodone or vehicle control either by intraperitoneal (IP) injection or oral administration. For IP injection, mice were daily injected with 50 mg/kg Trazodone or vehicle (saline). For oral administration, mice were daily fed with 100 mg/kg Trazodone or vehicle (water). After the 2 days, 4 days, 7 days or 14 days of treatment, mouse blood was collected by intracardial bleed at time of sacrifice. The blood without anticoagulants was incubated at room temperature for 2 h and then centrifuged at 2,000×g for 20 min. The serum sST2 level was measured using the Mouse ST2/IL-33 R Quantikine ELISA Kit (MST200, R&D).

Figure 10:
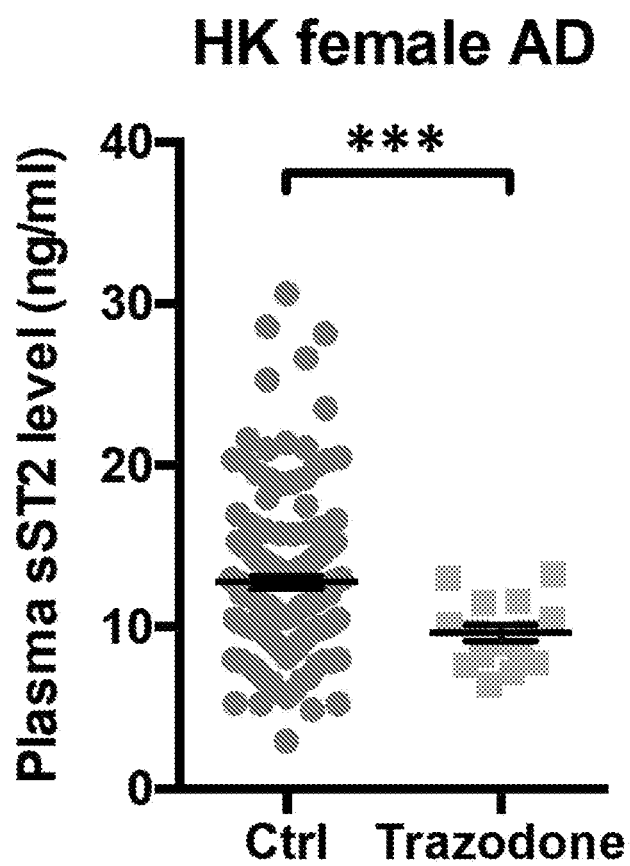
FIG. 10. Trazodone is associated with decreased plasma sST2 level in female AD patients. Data are mean±SEM (***P<0.001; linear regression test adjusted for age and population structure; n=149 and 15 for female AD patients not taking trazodone [Ctrl] and female AD taking trazodone in the Hong Kong Chinese AD cohort, respectively).
Figure 13:
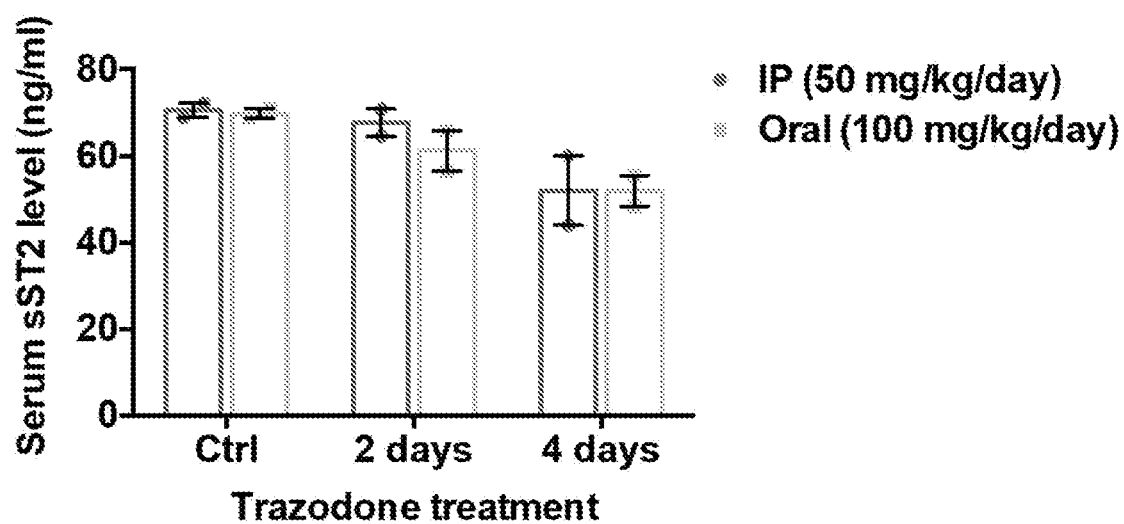
FIG. 13. Trazodone treatment down-regulates the serum sST2 level in wildtype mice. Female wildtype mice at age of 18 mo were daily given Trazodone or vehicle control (Ctrl) for 2 or 4 days by intraperitoneal injection (IP) or oral administration (Oral). n=2 mice/group. Data are mean±SEM.
Figure 14:
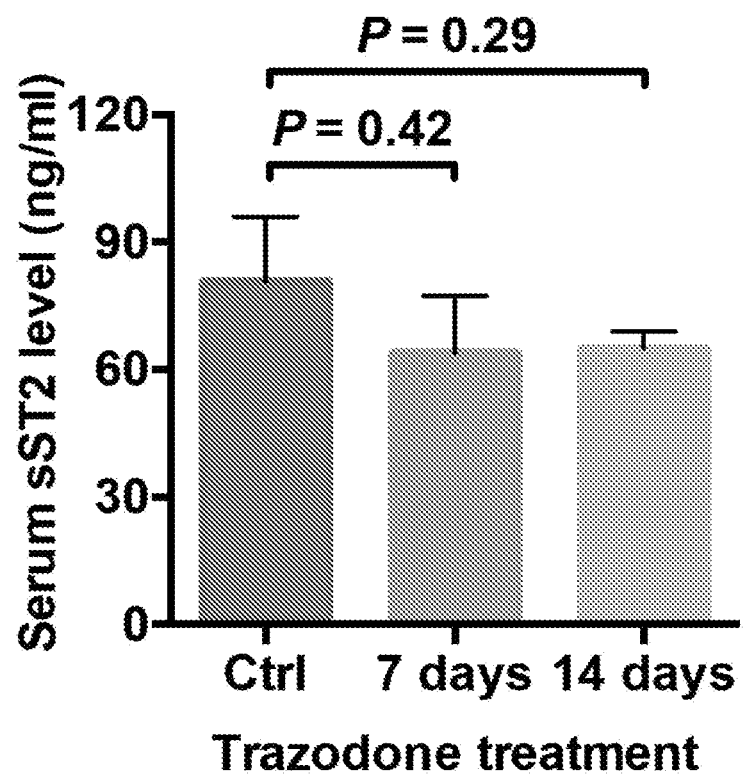
FIG. 14. Trazodone treatment down-regulates the serum sST2 level in AD mouse models. Female APP/PS1 mice at age of 18 mo were daily given Trazodone or vehicle control (Ctrl) for 7 or 14 days by oral administration. n=5 mice/group. Data are mean±SEM. Unpaired t test.
Figure 15:
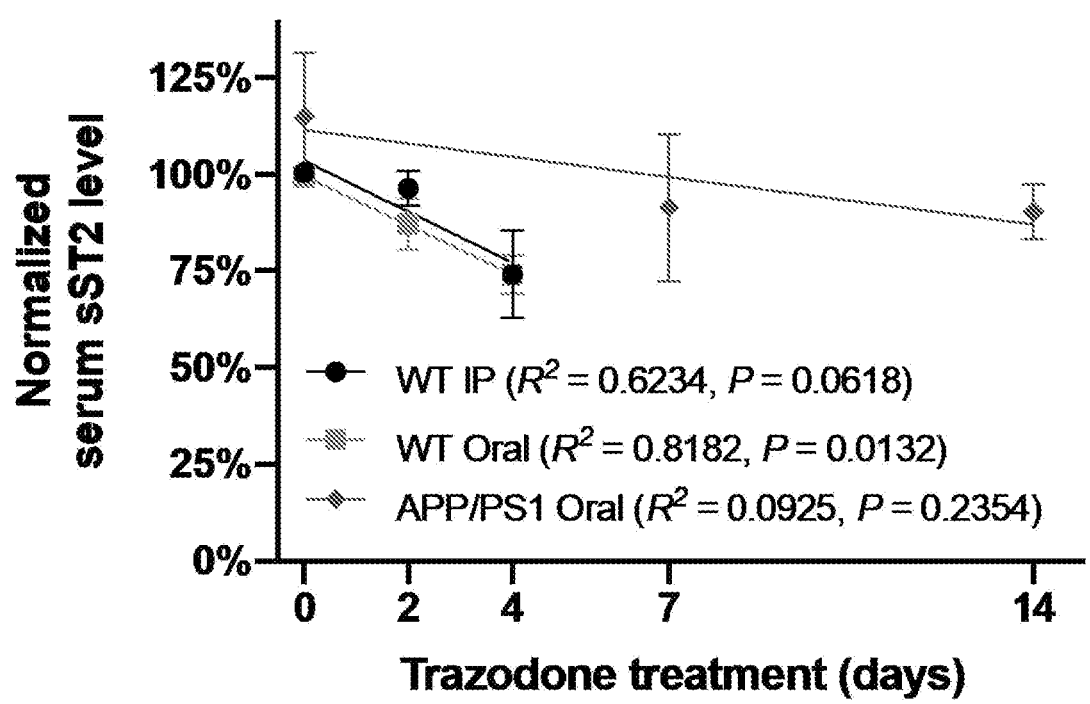
FIG. 15. Trazodone treatment down-regulates the serum sST2 level in wildtype and APP/PS1 mice. Female wildtype mice at age of 18 months were daily given Trazodone or vehicle control (Ctrl) for 2 or 4 days by intraperitoneal injection (WT IP) or oral administration (WT Oral). N=2 mice/group. Female APP/PS1 mice at age of 18 mo were daily given Trazodone or vehicle control (Ctrl) for 7 or 14 days by oral administration (APP/PS1 Oral). N=5 mice/group. Data are mean±SEM. Linear regression test.

Medications that Modulate Human Plasma sST2 Level: To investigate medications that may regulate the plasma sST2 protein level, an association analysis was conducted of the plasma sST2 protein level and medications in Hong Kong female AD patients. Trazodone was associated with a decreased plasma sST2 level in AD patients (FIG. 10). Meanwhile, the treatment of Trazodone through intraperitoneal injection or oral administration lead to the reduction of serum sST2 level in aged female wildtype mice as well as APP/PS1 mice (FIGS. 13-15). Moreover, trazodone was associated with altered cognitive performance in female AD patients (P=0.0202). Thus, trazodone is capable of modulating plasma sST2 level and cognitive performance.

All patents, patent applications, other publications, and GenBank Accession NOs or equivalents cited herein are incorporated by reference in the entirety for all purposes.

LIST OF REFERENCES

Gordon, E. D., Palandra, J., Wesolowska-Andersen, A., Ringel, L., Rios, C. L., Lachowicz-Scroggins, M. E., . . . Lee, J. W. (2016). IL1RL1 asthma risk variants regulate airway type 2 inflammation. JCI insight, 1(14).

Grotenboer, N. S., Ketelaar, M. E., Koppelman, G. H., & Nawijn, M. C. (2013). Decoding asthma: translating genetic variation in IL33 and IL1RL1 into disease pathophysiology. Journal of Allergy and Clinical Immunology, 131(3), 856-865. e859.

Gudbjartsson, D. F., Bjornsdottir, U. S., Halapi, E., Helgadottir, A., Sulem, P., Jonsdottir, G. M., . . . Stefansson, H. (2009). Sequence variants affecting eosinophil numbers associate with asthma and myocardial infarction. Nature Genetics, 41(3), 342.

Ho, J. E., Chen, W.-Y., Chen, M.-H., Larson, M. G., McCabe, E. L., Cheng, S., . . . Johnson, A. D. (2013). Common genetic variation at the IL1RL1 locus regulates IL-33/ST2 signaling. The Journal of clinical investigation, 123(10), 4208-4218.

Kakkar, R., & Lee, R. T. (2008). The IL-33/ST2 pathway: therapeutic target and novel biomarker. Nat Rev Drug Discov, 7(10), 827-840. doi:10.1038/nrd2660

Lin, J.-F., Wu, S., Juang, J.-M. J., Chiang, F.-T., Hsu, L.-A., Teng, M.-S., . . . Liu, P.-Y. (2017). IL1RL1 single nucleotide polymorphism predicts sST2 level and mortality in coronary and peripheral artery disease. Atherosclerosis, 257, 71-77.

McGeer, P. L., & McGeer, E. G. (2001) Inflammation, autotoxicity and Alzheimer disease. Neurobiol Aging, 22(6), 799-809.

Newman, A. B., Fitzpatrick, A. L., Lopez, O., Jackson, S., Lyketsos, C., Jagust, W., . . . Kuller, L. H. (2005). Dementia and Alzheimer's disease incidence in relationship to cardiovascular disease in the Cardiovascular Health Study cohort. J Am Geriatr Soc, 53(7), 1101-1107. doi:10.1111/j.1532-5415.2005.53360.x Pascual-Figal, D. A., & Januzzi, J. L. (2015). The biology of ST2: the International ST2 Consensus Panel. Am J Cardiol, 115(7 Suppl), 3B-7B. doi:10.1016/j.amjcard.2015.01.034

Ramirez-Carrozzi, V., Dressen, A., Lupardus, P., Yaspan, B., & Pappu, R. (2015). Functional analysis of protective IL1RL1 variants associated with asthma risk. Journal of Allergy and Clinical Immunology, 135(4), 1080-1083. e1083.

Sanada, S., Hakuno, D., Higgins, L. J., Schreiter, E. R., McKenzie, A. N., & Lee, R. T. (2007). IL-33 and ST2 comprise a critical biomechanically induced and cardioprotective signaling system. Journal of Clinical Investigation, 117(6), 1538-1549. doi:10.1172/JCI30634

Tu, X., Nie, S., Liao, Y., Zhang, H., Fan, Q., Xu, C., . . . Tang, T. (2013). The IL-33-ST2L pathway is associated with coronary artery disease in a Chinese Han population. The American Journal of Human Genetics, 93(4), 652-660.

Zhu, Z., Lee, P. H., Chaffin, M. D., Chung, W., Loh, P.-R., Lu, Q., . . . Liang, L. (2018). A genome-wide cross-trait analysis from UK Biobank highlights the shared genetic architecture of asthma and allergic diseases. Nature Genetics, 50(6), 857-864.

What is claimed is:

1. A method for detecting the presence of Alzheimer's Disease (AD) or an increased risk of later developing AD in a subject, comprising the step of detecting in a biological sample taken from the subject the presence of genetic variants comprising rs1921622, rs75687525, rs4499395, rs56238602, rs2140316, rs12052753, rs199977663, rs2141304, rs4103380, rs4703514, rs191531802, rs2300619, rs1229502, rs9886235, rs6587006, rs7047059, rs5006678, rs7849649, rs1907370, rs11615704, rs66994203, rs117523785, rs17641976, rs7208104, rs12600563, rs142226688, rs111246464, rs4583526, and rs56242654.

2. The method of claim 1, wherein the subject is a Chinese.

3. The method of claim 2, wherein the subject is Hong Kong Chinese or mainland Chinese.

4. The method of claim 1, wherein the subject has a family history of AD but does not exhibit symptoms of AD, or the subject has no family history of AD.

5. The method of claim 1, wherein the sample is a blood sample (such as whole blood or blood cells) or cells (or tissues from any part of body), saliva, oral swab, sweat, or urine.

6. The method of claim 1, wherein the detecting step comprises an amplification reaction to amplify the genetic variants, a hybridization-based method, or a sequencing-based method.

7. The method of claim 6, wherein the amplification reaction is a polymerase chain reaction (PCR), especially a reverse transcription PCR (RT-PCR).

8. The method of claim 1, wherein the variants consist of rs1921622, rs75687525, rs4499395, rs56238602, rs2140316, rs12052753, rs199977663, rs2141304, rs4103380, rs4703514, rs191531802, rs2300619, rs1229502, rs9886235, rs6587006, rs7047059, rs5006678, rs7849649, rs1907370, rs11615704, rs66994203, rs117523785, rs17641976, rs7208104, rs12600563, rs142226688, rs111246464, rs4583526, and rs56242654.

9. The method of claim 1, further comprising the step of determining the subject's APOE genotype or haplotype.

10. The method of claim 1, further comprising the step of determining eosinophil count in a blood sample.

11. The method of claim 1, further comprising the step of determining sST2, full length ST2, or CCR3 expression level in a blood sample.

12. The method of claim 11, wherein the expression level is protein level.

13. The method of claim 12, wherein the step of determining sST2 or CCR3 expression level comprises an immunoassay or mass spectrometry.

14. The method of claim 11, wherein the expression level is mRNA level.

15. The method of claim 14, wherein the step of determining sST2 or CCR3 expression level comprises a reverse transcription polymerase chain reaction (RT-PCR), in situ hybridization, or a sequencing-based method.

16. The method of claim 1, further comprising a step of calculating a Polygenic Risk Score (PRS) as the sum of effect size-weighted (Bi) genotype dosage of corresponding variants on sST2 level in the sample, wherein n is the number of genetic variants tested:

$$PRS=\beta_1 snp_1+\beta_2 snp_2+ \ldots +\beta_n snp_n.$$

17. The method of claim 16, wherein the number of genetic variants tested is 29.

18. The method of claim 16, determining the subject with a PRS no greater than 0 as not having AD or not having increased risk for AD and the subject with a PRS greater than 0 as having AD or having increased risk for AD.

\* \* \* \* \*

SEQUENCE LISTING

```
<160> NUMBER OF SEQ ID NOS: 583

<210> SEQ ID NO 1
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs75687525, location, BP: 1:163472218

<400> SEQUENCE: 1 ttcttttct acattctcac ctaagacaay tttttattc ctatagttgt aaataacaag      60

<210> SEQ ID NO 2
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs7605722, location, BP: 2:16200946

<400> SEQUENCE: 2
gaattctgac tgagaagtct tccaagaaar aaaaccacta gtcctgggtt ccaaaagaga     60

<210> SEQ ID NO 3
<211> LENGTH: 60
<212> TYPE: DNA
<213> ORGANISM: Artificial sequence
```

```
<220> FEATURE:
<223> OTHER INFORMATION: Description of sequence: single nucleotide
      polymorphism
<220> FEATURE:
<223> OTHER INFORMATION: name: rs7605772, location, BP: 2:16201132

<400> SEQUENCE: 3
atagcagatg agaagggtta tcgacaagcm aacaagtgtg cctctgactt tgcaagaagc    60

<210> SEQ ID NO 4
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs13427501, location, BP: 2:16202446

<400> SEQUENCE: 4
aataagcagg aaaagaaatt ctaagtacar ttaagctttg ttattcacaa tagttatgtt    60

<210> SEQ ID NO 5
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs7600440, location, BP: 2:16204606

<400> SEQUENCE: 5
agaagaatga gtgcccagtg aaggaggaar ccccttatta aaccatcaga tctcatgaga    60

<210> SEQ ID NO 6
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs4499395, location, BP: 2:16206193

<400> SEQUENCE: 6
ttgtttaata gagtctcccc aaaactgggy tctttggaga aaagattttt tttttaaagg    60

<210> SEQ ID NO 7
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs6760942, location, BP: 2:16207141

<400> SEQUENCE: 7
tgtaataaaa aaagtgttca tagaaacaar caagaaataa atagggacat taagattata    60

<210> SEQ ID NO 8
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
```

<223> OTHER INFORMATION: name: rs28432381, location, BP: 2:16212065

<400> SEQUENCE: 8
ttcgatccac cgcctcagc ctcccaaagw gctgggatga caggcatgag cctgggctat    60

<210> SEQ ID NO 9
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs4073262, location, BP: 2:16214286

<400> SEQUENCE: 9
gacaaatgga ttgacttgtc tcttgctaar agcgcctacc ttcggggtgt ggaggtagag    60

<210> SEQ ID NO 10
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs56238602, location, BP: 2:102863095

<400> SEQUENCE: 10
ccacctcatt tggagcagtg agagataagk gaaaaaacca tgtctacatc tttgactaca    60

<210> SEQ ID NO 11
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs1420091, location, BP: 2:102917234

<400> SEQUENCE: 11
taaaacccac attatattgt cattacttty gcttcgaaca atcaattatc ttttaaataa    60

<210> SEQ ID NO 12
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs4399750, location, BP: 2:102917788

<400> SEQUENCE: 12
tcactccttt cctcctggaa cttcaattay acttacatta gatgactcga aatttcccca    60

<210> SEQ ID NO 13
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs4577297, location, BP: 2:102918018

<400> SEQUENCE: 13
tataggtttt tttttcacat atggaattr gataataag ctgttttcat gtccttttct    60

<210> SEQ ID NO 14
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs2110660, location, BP: 2:102918601

<400> SEQUENCE: 14
tgaactcaag tcaccttagc ctttccagas tcccagctct gattcctcat ctcggagaga    60

<210> SEQ ID NO 15
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs1420090, location, BP: 2:102919305

<400> SEQUENCE: 15
gcatttttat ttcttttgat gtaataty ttaattagtt tattgaaaat ctctgtcctt    60

<210> SEQ ID NO 16
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs7565653, location, BP: 2:102919426

<400> SEQUENCE: 16
ttattaattt ataaaatatt tgtgttgagw gtgtgagtgc atgtgcatgc atgtgtatgc    60

<210> SEQ ID NO 17
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs7568913, location, BP: 2:102920037

<400> SEQUENCE: 17
gacaacagta ggctcaagga gaaatcatcy gttctcctaa tcttttacta tttttcgtat    60

<210> SEQ ID NO 18
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs10179654, location, BP: 2:102921783

<400> SEQUENCE: 18
tccatgaaca aagatctgtt gaataaatak tatgagcgtg tagaagggag agactttatc    60

<210> SEQ ID NO 19

```
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs4090473, location, BP: 2:102922987

<400> SEQUENCE: 19
gttaactctt aactaaacat agactttts tgaactttgg aataggagta aggggggaaga    60

<210> SEQ ID NO 20
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs12476925, location, BP: 2:102924549

<400> SEQUENCE: 20
cagaaatcag cagatgtcat gaggggacty tgggttatca taagctgtgg aattggtatc    60

<210> SEQ ID NO 21
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs12476968, location, BP: 2:102924662

<400> SEQUENCE: 21
ttgccaattt agggcaattt tcaacattay gaaaattcat ttagtttggg tgcagagctc    60

<210> SEQ ID NO 22
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs7562254, location, BP: 2:102924947

<400> SEQUENCE: 22
ggagagttac ctccaagagg ggtcatggcm ggcgagcaaa ccatacttgg ggtgcaccat    60

<210> SEQ ID NO 23
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs56224165, location, BP: 2:102925223

<400> SEQUENCE: 23
ttattactaa ctcaggagga ccttgatggw tgttagtctc cctggatttg aaaactattt    60

<210> SEQ ID NO 24
<211> LENGTH: 60
<212> TYPE: DNA
<213> ORGANISM: Artificial sequence
<220> FEATURE:
```

<223> OTHER INFORMATION: Description of sequence: single nucleotide
    polymorphism
<220> FEATURE:
<223> OTHER INFORMATION: name: rs4851564, location, BP: 2:102925790

<400> SEQUENCE: 24
gatcttctga ggtcaggagt tcgagaccas cctgaccaaa atggagaaac tccatctcta    60

<210> SEQ ID NO 25
<211> LENGTH: 60
<212> TYPE: DNA
<213> ORGANISM: Artificial sequence
<220> FEATURE:
<223> OTHER INFORMATION: Description of sequence: single nucleotide
    polymorphism
<220> FEATURE:
<223> OTHER INFORMATION: name: rs6721346, location, BP: 2:102926320

<400> SEQUENCE: 25
gtagattttc atcttttatg tatggtgacy ctaggtaagg agaagaggtg atctagctca    60

<210> SEQ ID NO 26
<211> LENGTH: 60
<212> TYPE: DNA
<213> ORGANISM: Artificial sequence
<220> FEATURE:
<223> OTHER INFORMATION: Description of sequence: single nucleotide
    polymorphism
<220> FEATURE:
<223> OTHER INFORMATION: name: rs12470864, location, BP: 2:102926362

<400> SEQUENCE: 26
aagaggtgat ctagctcact tggtgggacr agcgtcttga cacaaatcca caaaaaaagg    60

<210> SEQ ID NO 27
<211> LENGTH: 60
<212> TYPE: DNA
<213> ORGANISM: Artificial sequence
<220> FEATURE:
<223> OTHER INFORMATION: Description of sequence: single nucleotide
    polymorphism
<220> FEATURE:
<223> OTHER INFORMATION: name: rs12470867, location, BP: 2:102926366

<400> SEQUENCE: 27
ggtgatctag ctcacttggt gggacgagcr tcttgacaca aatccacaaa aaaggagag    60

<210> SEQ ID NO 28
<211> LENGTH: 60
<212> TYPE: DNA
<213> ORGANISM: Artificial sequence
<220> FEATURE:
<223> OTHER INFORMATION: Description of sequence: single nucleotide
    polymorphism
<220> FEATURE:
<223> OTHER INFORMATION: name: rs10178436, location, BP: 2:102926511

<400> SEQUENCE: 28
tgcacccaaa ccaaaacgag cgtcagtgay gttaaagatt gaaggtcagg tgctacccag    60

<210> SEQ ID NO 29
<211> LENGTH: 60
<212> TYPE: DNA
<213> ORGANISM: Artificial sequence
<220> FEATURE:
<223> OTHER INFORMATION: Description of sequence: single nucleotide
    polymorphism
<220> FEATURE:
<223> OTHER INFORMATION: name: rs11679191, location, BP: 2:102926800

```
<400> SEQUENCE: 29
gattagaggt gtgcaccatc acacgcagcw aattttttgta ttttagtaga gacggggttt      60

<210> SEQ ID NO 30
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs11685424, location, BP: 2:102926981

<400> SEQUENCE: 30
aaatcactag tatttcatca atatggatar catcctccat aggttactga tttaatattg      60

<210> SEQ ID NO 31
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs11685480, location, BP: 2:102927086

<400> SEQUENCE: 31
aagtcaagca gctgggaaga ggaaaactar gctgtgctct ccctaaatct catgctctat      60

<210> SEQ ID NO 32
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs6543115, location, BP: 2:102927641

<400> SEQUENCE: 32
ataagcaact tgctgcagaa atgggtacts ttgttctaga aatgtgacta tagggaagtt      60

<210> SEQ ID NO 33
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs6543116, location, BP: 2:102927726

<400> SEQUENCE: 33
aatgagtgac ctgccaccta catggtgttr gggaggtttt gctgagaaag tcactcatga      60

<210> SEQ ID NO 34
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs6733174, location, BP: 2:102929012

<400> SEQUENCE: 34
acaaaatcca gcagtgtaat ctactcagay ggagatgaag gaaaaaaaca aacaaatga       60
```

<210> SEQ ID NO 35
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs6543118, location, BP: 2:102929469

<400> SEQUENCE: 35
ttcacatgcc attgttcctg aataccattr tggacataat catctaattt tggctattcc    60

<210> SEQ ID NO 36
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs1558622, location, BP: 2:102930147

<400> SEQUENCE: 36
agaggcagac aactgcaagg gagagccccr caaggatttg ggtgatgact ttgagccagg    60

<210> SEQ ID NO 37
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs1558621, location, BP: 2:102930307

<400> SEQUENCE: 37
tgtgtgcacg agtgtgtgtg tgtgcgtgcr cttgcatgcg cgtgcatgtg cagtagggtc    60

<210> SEQ ID NO 38
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs10189202, location, BP: 2:102930380

<400> SEQUENCE: 38
gtggaaaaga tccctctggt tctagaacar aaatctaaca gcaaccaaga gtccagttcc    60

<210> SEQ ID NO 39
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs10191914, location, BP: 2:102930657

<400> SEQUENCE: 39
acttactaag actgctatgt gccagacccy gagacaagca ctttccacac accacatcct    60

<210> SEQ ID NO 40
<211> LENGTH: 60

```
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs10189711, location, BP: 2:102930881

<400> SEQUENCE: 40
agttgggtgt gtctgagccc tgggtagaar gggatgctat cctaatgaaa aaacacagaa      60

<210> SEQ ID NO 41
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs12712135, location, BP: 2:102930948

<400> SEQUENCE: 41
agtgtccacc aagatgtaac tgagatttar agaagacttg ataacttatc agttgggtgg      60

<210> SEQ ID NO 42
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs1558620, location, BP: 2:102931395

<400> SEQUENCE: 42
cttgcaggtg tctggtgata gttgggtgcy ggaagattct gagttatttg ctcagaagag      60

<210> SEQ ID NO 43
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs1558619, location, BP: 2:102931550

<400> SEQUENCE: 43
ctaattagga ttccgcacat cctatgcctk tctctcagga gccttgcagt caaagtgtga      60

<210> SEQ ID NO 44
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs12996505, location, BP: 2:102931802

<400> SEQUENCE: 44
atttctctaa ttcctcttca ctctggggcr ttatgatcag aaaatatcat gtaccttttg      60

<210> SEQ ID NO 45
<211> LENGTH: 60
<212> TYPE: DNA
<213> ORGANISM: Artificial sequence
<220> FEATURE:
<223> OTHER INFORMATION: Description of sequence: single nucleotide
```

```
polymorphism
<220> FEATURE:
<223> OTHER INFORMATION: name: rs13020553, location, BP: 2:102931826

<400> SEQUENCE: 45
ggggcattat gatcagaaaa tatcatgtas cttttgctgc aatcttggct gaaagaacct    60

<210> SEQ ID NO 46
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs13020793, location, BP: 2:102931926

<400> SEQUENCE: 46
agatctcaaa ctataaagaa aatcagagty tcttgatgcc catgttcagg acaagttttc    60

<210> SEQ ID NO 47
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs10183388, location, BP: 2:102932247

<400> SEQUENCE: 47
ctttagagga attatctaga aaactagccy ctatgcaaag tgaataacct tttcaaaata    60

<210> SEQ ID NO 48
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs953934, location, BP: 2:102932293

<400> SEQUENCE: 48
accttttcaa aatataatct acattaagay ttttgaaact aacacattcc tcaatcatag    60

<210> SEQ ID NO 49
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs950880, location, BP: 2:102932562

<400> SEQUENCE: 49
attcactcac ctctgatttc tagttccacm cttatgacga aagcattctt aaatctgata    60

<210> SEQ ID NO 50
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs1968171, location, BP: 2:102933552
```

```
<400> SEQUENCE: 50
aaaatgtttc agcccagcat ggtggctcay gcctgtaatt ccagcacttt gggaggccga      60

<210> SEQ ID NO 51
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs4613307, location, BP: 2:102933758

<400> SEQUENCE: 51
gcgtgaaccc aggaggtgga gcttgcagtr agcccagatg gcgccaccgc actccagcct      60

<210> SEQ ID NO 52
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs1968170, location, BP: 2:102933802

<400> SEQUENCE: 52
caccgcactc cagcctgggt gacagagccr gactctgtct caaaaaaaaa agtttcagca      60

<210> SEQ ID NO 53
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs11123918, location, BP: 2:102935237

<400> SEQUENCE: 53
gaagaaagat gttggagaaa ttgttccacy ttgacagagg ctgcttatag ctcaaggtaa      60

<210> SEQ ID NO 54
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs10182639, location, BP: 2:102935805

<400> SEQUENCE: 54
agctaggatt caactctttc tcttaacaam tatgctttga tggaacaatt tttttagata      60

<210> SEQ ID NO 55
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs11693204, location, BP: 2:102935974

<400> SEQUENCE: 55
tacatttgat gagggataa aatgtacatr taggtgtgga tttatgggct gtgtttttca      60
```

<210> SEQ ID NO 56
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs11690443, location, BP: 2:102936131

<400> SEQUENCE: 56
ttatagaatt ttggggcata ttctcagtaw cttttgtatc tctcgccctc ttttcttttt       60

<210> SEQ ID NO 57
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs12712136, location, BP: 2:102936366

<400> SEQUENCE: 57
tggggactta ctatgttgcc caggctagts ttgaactcct gggctccagc agtcctccca       60

<210> SEQ ID NO 58
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs974389, location, BP: 2:102936981

<400> SEQUENCE: 58
cccaatatgt ctcctgaatt tcagaagcar atattcatcc tactgatggg ttcacatctc       60

<210> SEQ ID NO 59
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs4142132, location, BP: 2:102937482

<400> SEQUENCE: 59
cccctctcca accagctctc actgctctgr agttcctcat gccctgttgg ccatgtggct       60

<210> SEQ ID NO 60
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs971764, location, BP: 2:102938335

<400> SEQUENCE: 60
taagtggtca aggtaaaaac attattgtgy ggttcgctat agttacattt aaaacagtcc       60

<210> SEQ ID NO 61
<211> LENGTH: 60
<212> TYPE: DNA

```
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs13001325, location, BP: 2:102939036

<400> SEQUENCE: 61
acagatccca gaaatgaatc tgggtctccy gacttcaata cagttctctt cttattacat    60

<210> SEQ ID NO 62
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs1420088, location, BP: 2:102939434

<400> SEQUENCE: 62
caaggcttta ttatttttt gtttggaaay gaactcagag ttacataaca tgatgttttt    60

<210> SEQ ID NO 63
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs66780767, location, BP: 2:102939709

<400> SEQUENCE: 63
agatgttctt taacttttg ttaggttttw tatatatata tatatatata tatagtgtgt    60

<210> SEQ ID NO 64
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs11123919, location, BP: 2:102939754

<400> SEQUENCE: 64
atatatatag tgtgtgtgtg tgtgtgtgtr tatatatata tggtgtatat aatttatata    60

<210> SEQ ID NO 65
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs11123920, location, BP: 2:102939833

<400> SEQUENCE: 65
ttaagtgtaa agttcaataa gttttgatay atgtatactc cattggcttt gttttgtatt    60

<210> SEQ ID NO 66
<211> LENGTH: 60
<212> TYPE: DNA
<213> ORGANISM: Artificial sequence
<220> FEATURE:
<223> OTHER INFORMATION: Description of sequence: single nucleotide
      polymorphism
```

```
<220> FEATURE:
<223> OTHER INFORMATION: name: rs6706844, location, BP: 2:102940412

<400> SEQUENCE: 66
gggaacatta tataaatggg acgatataay atgcattctt ttaaaactgg cttctttcat    60

<210> SEQ ID NO 67
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs11674832, location, BP: 2:102940999

<400> SEQUENCE: 67
cagtgggtgc agagcactga gcgtgagccr aagcagggcg aggcatcgct tcacccagga    60

<210> SEQ ID NO 68
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs11679889, location, BP: 2:102941009

<400> SEQUENCE: 68
agagcactga gcgtgagcca aagcagggcr aggcatcgct tcacccagga agtgcaaggg    60

<210> SEQ ID NO 69
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs11675988, location, BP: 2:102941019

<400> SEQUENCE: 69
gcgtgagcca aagcagggcg aggcatcgcy tcacccagga agtgcaaggg gtcagggaat    60

<210> SEQ ID NO 70
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs11679900, location, BP: 2:102941074

<400> SEQUENCE: 70
ggaattccct ttcctagtca aagaaagggk tgacagatgg cacctggaaa atcgggtcac    60

<210> SEQ ID NO 71
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs11676075, location, BP: 2:102941215

<400> SEQUENCE: 71
```
tcctacaccc gtggagcctc gctcgttgcy agcagagcag tctgagatca aactgcaagt    60

<210> SEQ ID NO 72
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs11676124, location, BP: 2:102941338

<400> SEQUENCE: 72
ccgggaagct cgaactgggt agagcccacy gcagctcaag gaggcctgcc tgcctctgta    60

<210> SEQ ID NO 73
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs11123921, location, BP: 2:102941561

<400> SEQUENCE: 73
cccgagtagc ctaactggga ggcaccccs agtagggggc agtctgacac ctcacacagc    60

<210> SEQ ID NO 74
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs12992762, location, BP: 2:102941715

<400> SEQUENCE: 74
atacccaggc aaacagggtc tggagtggam ctccagcaaa ctccaacaga tctgcagctg    60

<210> SEQ ID NO 75
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs12998412, location, BP: 2:102941818

<400> SEQUENCE: 75
atccacacca aaccccatc tgtatgtcay catcatcaaa gaccaaggt agataaaacc    60

<210> SEQ ID NO 76
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs9750771, location, BP: 2:102941918

<400> SEQUENCE: 76
ctaaaaatca gagcaccct cctcctccar aggaacacag ctcctcacca gcaatggaac    60

-continued

```
<210> SEQ ID NO 77
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs11123922, location, BP: 2:102942187

<400> SEQUENCE: 77
gatgaatgcg caagcctcag tagccgatty gatcaactgg aagaaagggt atcagtgacg    60

<210> SEQ ID NO 78
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs12053422, location, BP: 2:102942537

<400> SEQUENCE: 78
tgtcagattc accaaagttg aaatgaaggm aaaaatgtta agggcagcca gagagaaagg    60

<210> SEQ ID NO 79
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs58933240, location, BP: 2:102942920

<400> SEQUENCE: 79
gaaaatgcat caactaacga gcaaaataam tagcaaacat cataatgata ggatcaaatt    60

<210> SEQ ID NO 80
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs56403447, location, BP: 2:102942921

<400> SEQUENCE: 80
aaaatgcatc aactaacgag caaaataaay agcaaacatc ataatgatag gatcaaattc    60

<210> SEQ ID NO 81
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs13005688, location, BP: 2:102942939

<400> SEQUENCE: 81
agcaaaataa atagcaaaca tcataatgay aggatcaaat tcacacataa caatattaac    60

<210> SEQ ID NO 82
<211> LENGTH: 60
<212> TYPE: DNA
<213> ORGANISM: Artificial sequence
```

```
<220> FEATURE:
<223> OTHER INFORMATION: Description of sequence: single nucleotide
      polymorphism
<220> FEATURE:
<223> OTHER INFORMATION: name: rs12725988, location, BP: 2:102943386

<400> SEQUENCE: 82
taataatggg agactttaac accccactgk aaacattaga cagatcaacg agacagaaag    60

<210> SEQ ID NO 83
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs4490207, location, BP: 2:102943822

<400> SEQUENCE: 83
tctctgggac atatttaaag cagtgtgtas agggaaattt atagcactaa aagcccacaa    60

<210> SEQ ID NO 84
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs4455171, location, BP: 2:102943844

<400> SEQUENCE: 84
gtgtgtacag ggaaatttat agcactaaaw gcccacaaga gaaagcagga aagatctaaa    60

<210> SEQ ID NO 85
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs13007344, location, BP: 2:102943883

<400> SEQUENCE: 85
agaaagcagg aaagatctaa aattgacacm ctaacatcac aattaaaaga actagagaag    60

<210> SEQ ID NO 86
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs141508079, location, BP: 2:102944191

<400> SEQUENCE: 86
taccatcaga gaatactata aacacctctr tgcaaataaa ctagaaaatc tacaagaaat    60

<210> SEQ ID NO 87
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
```

-continued

<223> OTHER INFORMATION: name: rs76520363, location, BP: 2:102945241

<400> SEQUENCE: 87
aatgaaatac ctaggaatcc aacttacaar ggatgtgaag gacctcttca aggagaactg    60

<210> SEQ ID NO 88
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs76278109, location, BP: 2:102945378

<400> SEQUENCE: 88
atatcatgaa aatggccata ctgcccaagk taatttatag attcaatgcc atccccatca    60

<210> SEQ ID NO 89
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs76886731, location, BP: 2:102945416

<400> SEQUENCE: 89
agattcaatg ccatccccat caagctaccw atgactttct tcacagaatt ggaaaaaact    60

<210> SEQ ID NO 90
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs150341880, location, BP: 2:102945755

<400> SEQUENCE: 90
tgggatatct ggctagccat atgtagaaak ctgaaactgg atcccttcct tacaccttat    60

<210> SEQ ID NO 91
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs75392560, location, BP: 2:102946082

<400> SEQUENCE: 91
gacaaaggct aatatccaga atctacaatk aactcaaaca aatttacaag aaaaaaacaa    60

<210> SEQ ID NO 92
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs76498201, location, BP: 2:102946111

<400> SEQUENCE: 92

```
taactcaaac aaatttacaa gaaaaaaacr aacaacccca tcaaaaagtg ggcaaaggat      60
```

<210> SEQ ID NO 93
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs56192435, location, BP: 2:102946677

<400> SEQUENCE: 93

```
tagggacatg gatgaaactg gaaccatcr ttctcagcaa actatcgcaa ggacaaaaaa      60
```

<210> SEQ ID NO 94
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs12996772, location, BP: 2:102947201

<400> SEQUENCE: 94

```
gatatgcaaa ttatgagtat tttgtctggw ctgtggctta gtctattcaa attctaatga     60
```

<210> SEQ ID NO 95
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs1420104, location, BP: 2:102948470

<400> SEQUENCE: 95

```
tcacctgagc ctgggaggtg gagactgcar tgagccatga tcacaccact gcactccatc     60
```

<210> SEQ ID NO 96
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs1420103, location, BP: 2:102948632

<400> SEQUENCE: 96

```
tatcaataga caaaactcac aaaaataatm ttgccttctg gaggtcatat tccaatggat     60
```

<210> SEQ ID NO 97
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs1420102, location, BP: 2:102948819

<400> SEQUENCE: 97

```
gtcaggaact caaacaaata cttggacacy gatagcagca ttattcaaaa tagtcaatag     60
```

<210> SEQ ID NO 98

```
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs12466380, location, BP: 2:102948939

<400> SEQUENCE: 98
cacagtggaa tattattcag tcattagaar caataaagta cagacccatg ctacaatatg    60

<210> SEQ ID NO 99
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs12479210, location, BP: 2:102949161

<400> SEQUENCE: 99
cttcatgtta atgggtatgg ggttatacty ggggatggtg aaaatgtttt gaaactagat    60

<210> SEQ ID NO 100
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs13019081, location, BP: 2:102950822

<400> SEQUENCE: 100
agggaaggag tggaggcttg agtgggcctm gagtttggag tatgggcaag aaggatccca    60

<210> SEQ ID NO 101
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs12712140, location, BP: 2:102951062

<400> SEQUENCE: 101
gtcctctagt gaaatgaggg gaaaaaaaam atccatcccc agcttattgt gagagtcact    60

<210> SEQ ID NO 102
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs1997467, location, BP: 2:102951073

<400> SEQUENCE: 102
aaatgagggg aaaaaaaaca tccatccccr gcttattgtg agagtcactg aatgagagcc    60

<210> SEQ ID NO 103
<211> LENGTH: 60
<212> TYPE: DNA
<213> ORGANISM: Artificial sequence
<220> FEATURE:
```

<223> OTHER INFORMATION: Description of sequence: single nucleotide
     polymorphism
<220> FEATURE:
<223> OTHER INFORMATION: name: rs1997466, location, BP: 2:102951467

<400> SEQUENCE: 103
caaaattaag aaaaagctgg ttcaatgags ttagattcta tgagattaat ctgaaaaggg    60

<210> SEQ ID NO 104
<211> LENGTH: 60
<212> TYPE: DNA
<213> ORGANISM: Artificial sequence
<220> FEATURE:
<223> OTHER INFORMATION: Description of sequence: single nucleotide
     polymorphism
<220> FEATURE:
<223> OTHER INFORMATION: name: rs1362350, location, BP: 2:102951798

<400> SEQUENCE: 104
tccaaattat aaaagaaaa gctttaccas cctaatctct ggtatagaga atgttctctt    60

<210> SEQ ID NO 105
<211> LENGTH: 60
<212> TYPE: DNA
<213> ORGANISM: Artificial sequence
<220> FEATURE:
<223> OTHER INFORMATION: Description of sequence: single nucleotide
     polymorphism
<220> FEATURE:
<223> OTHER INFORMATION: name: rs1362349, location, BP: 2:102951972

<400> SEQUENCE: 105 gggttttat ttgtaactat aaaatttgas tgatgttaat gataagtacc acagagtatt    60

<210> SEQ ID NO 106
<211> LENGTH: 60
<212> TYPE: DNA
<213> ORGANISM: Artificial sequence
<220> FEATURE:
<223> OTHER INFORMATION: Description of sequence: single nucleotide
     polymorphism
<220> FEATURE:
<223> OTHER INFORMATION: name: rs17026974, location, BP: 2:102952360

<400> SEQUENCE: 106
cccaaactgc aataatatcc tgataaaacr gacttccaca agtaggtcaa gaataataat    60

<210> SEQ ID NO 107
<211> LENGTH: 60
<212> TYPE: DNA
<213> ORGANISM: Artificial sequence
<220> FEATURE:
<223> OTHER INFORMATION: Description of sequence: single nucleotide
     polymorphism
<220> FEATURE:
<223> OTHER INFORMATION: name: rs12712141, location, BP: 2:102953067

<400> SEQUENCE: 107
tggagcccta gagttcaggg ttatggttty ctttgtcact ccccttgagg gaagcttctt    60

<210> SEQ ID NO 108
<211> LENGTH: 60
<212> TYPE: DNA
<213> ORGANISM: Artificial sequence
<220> FEATURE:
<223> OTHER INFORMATION: Description of sequence: single nucleotide
     polymorphism
<220> FEATURE:
<223> OTHER INFORMATION: name: rs59247511, location, BP: 2:102954190

```
<400> SEQUENCE: 108
tttgtgagtt atttttgtga gcatgctgcy accagcctgt gtggatgtct gtggtttcac      60

<210> SEQ ID NO 109
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs873022, location, BP: 2:102955683

<400> SEQUENCE: 109
ataaacttct aggaatacta tcaggttgak gtctagctca ttctgagcta tttggattta      60

<210> SEQ ID NO 110
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs3771177, location, BP: 2:102955860

<400> SEQUENCE: 110
aatagtaatc tggatgtttt ccatctcagk gggcctctag taggtgaaaa ggggcttcta      60

<210> SEQ ID NO 111
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs3732129, location, BP: 2:102957532

<400> SEQUENCE: 111
ttcaaagcca catctgttct ttattctttty tttgtgactt aattttccaa agataaagca     60

<210> SEQ ID NO 112
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs1420101, location, BP: 2:102957716

<400> SEQUENCE: 112
tctttagtaa tactcattgg attcaaagty taatgagagg ctttgtgatg gtatactatg      60

<210> SEQ ID NO 113
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs12905, location, BP: 2:102960007

<400> SEQUENCE: 113
ctgtgccata aaatgtgctt ctcttcttcr ggatgttgtt tgctgtctga tctttgtaga      60
```

```
<210> SEQ ID NO 114
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs3821204, location, BP: 2:102960281

<400> SEQUENCE: 114
acatgttgta agcatggtcc gttctatacs tttttctggt cataatgaac actcattttg     60

<210> SEQ ID NO 115
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs13001714, location, BP: 2:102960485

<400> SEQUENCE: 115
ttatatgaaa agaggtttaa ttggctcacr gttctgcagg ctgtatggga agcatggcgg     60

<210> SEQ ID NO 116
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs12712142, location, BP: 2:102960584

<400> SEQUENCE: 116
cagaaggcaa agcaaaggca ggcacttcam acagtaaaag caggagcgag agagaggtgc     60

<210> SEQ ID NO 117
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs6543119, location, BP: 2:102963072

<400> SEQUENCE: 117
tacacattcc tctgtgcatc cagctggggw ttttagagag agagtgacct ggaaaggaat     60

<210> SEQ ID NO 118
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs13017455, location, BP: 2:102964742

<400> SEQUENCE: 118
cattttccat cctgctatgt aaatcctcay ggtcctgaga tccatctcaa cagctcactt     60

<210> SEQ ID NO 119
<211> LENGTH: 60
```

```
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs55927292, location, BP: 2:102964861

<400> SEQUENCE: 119
cccagaaagg tgtaaatttc ataatgtaty ggtaagacat tatgaagtta aacacagtag      60

<210> SEQ ID NO 120
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs17027006, location, BP: 2:102965332

<400> SEQUENCE: 120
ttttgttatt tagtctgtga cagtaaaaas gagaaacact ttgggatgaa gactgttatt      60

<210> SEQ ID NO 121
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs12469506, location, BP: 2:102965871

<400> SEQUENCE: 121
tccagaagca gacacttatc cttcaatcgy ccctctccca tcattgtcct ggtgatgaga      60

<210> SEQ ID NO 122
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs1921622, location, BP: 2:102966067

<400> SEQUENCE: 122
gatttgaaag aggacttaaa aattgatgar ttttgttctg gtagccatag gcactagctg      60

<210> SEQ ID NO 123
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs1861246, location, BP: 2:102966783

<400> SEQUENCE: 123
acaagctctt cacctcttct ttttcagtcy atccacctaa gttctagtta cacttctcct      60

<210> SEQ ID NO 124
<211> LENGTH: 60
<212> TYPE: DNA
<213> ORGANISM: Artificial sequence
<220> FEATURE:
<223> OTHER INFORMATION: Description of sequence: single nucleotide
```

```
    polymorphism
<220> FEATURE:
<223> OTHER INFORMATION: name: rs11123923, location, BP: 2:102967844

<400> SEQUENCE: 124
aaaggaacac aaagaacaaa acgggttctm tatccacaca tacttccact tctctgagta    60

<210> SEQ ID NO 125
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs35224028, location, BP: 2:102969606

<400> SEQUENCE: 125
tattttatat agaatattat atataatatm atatatattt tatatagaat attatatata    60

<210> SEQ ID NO 126
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs67723747, location, BP: 2:102969807

<400> SEQUENCE: 126
taactttcag agaaacttat acattgttty gcaaactaat tgtactactt tacattccca    60

<210> SEQ ID NO 127
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs56386507, location, BP: 2:102971165

<400> SEQUENCE: 127
ggagaataga tgtcttaagt cttccaatcy gtaaacgtgg tatatccctt tattacttag    60

<210> SEQ ID NO 128
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs13015714, location, BP: 2:102971865

<400> SEQUENCE: 128
ctgtcggcta tgggtttccc ttttcctttk gttaaataac agttctgcca caaaataaaa    60

<210> SEQ ID NO 129
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs12999364, location, BP: 2:102974129
```

<400> SEQUENCE: 129
gttggagagc ttccttgaga aggcaaatay tgagccaagt tgaaaggact ctagggacct    60

<210> SEQ ID NO 130
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs12998521, location, BP: 2:102974417

<400> SEQUENCE: 130
ttgcatttgg ttgttttatc atctcacagk ctgagtaaaa cgactatgca tggaacactg    60

<210> SEQ ID NO 131
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs12987977, location, BP: 2:102975336

<400> SEQUENCE: 131
agatgatcac ctagattcaa aattatgtak attttatgga tgtaattcat tcaataattc    60

<210> SEQ ID NO 132
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs6710885, location, BP: 2:102977537

<400> SEQUENCE: 132
tcagagttaa cttgtcagtt tgctgagccr tctcctgata actttgtctc ttggtagata    60

<210> SEQ ID NO 133
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs2287037, location, BP: 2:102979028

<400> SEQUENCE: 133
aaaatctgtg tgccagaaga tttttaaacy ttcataagat aggcacactt ttgtttgaaa    60

<210> SEQ ID NO 134
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs6727306, location, BP: 2:102981644

<400> SEQUENCE: 134
ccaagtccaa agtctcatct gagacaaggm aggtcccttc ctatgagtca gtaaattcaa    60

<210> SEQ ID NO 135
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs11465583, location, BP: 2:102982466

<400> SEQUENCE: 135
aggcctctgg gcctgtgatg ggagggtcts tcatgaagat ctctgacata ccctagaggc    60

<210> SEQ ID NO 136
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs10197284, location, BP: 2:102982703

<400> SEQUENCE: 136
tctttagaaa tttcttcttc cagataatcr tctctcaagt tcaaagttcc atagatctct    60

<210> SEQ ID NO 137
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs1573895, location, BP: 2:102982876

<400> SEQUENCE: 137
attgtccata acattatcag cattttggty aaagccattt aacaagtctt taggaagttc    60

<210> SEQ ID NO 138
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs4851569, location, BP: 2:102983247

<400> SEQUENCE: 138
tgagaactca ctcactatca tgagaacagm atgagggtga ctgcccccat gattaaattc    60

<210> SEQ ID NO 139
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs1420098, location, BP: 2:102984279

<400> SEQUENCE: 139
gttttatttt attttacttt actaatctty tgaagaatct tgtacttcac gtccccacat    60

<210> SEQ ID NO 140
<211> LENGTH: 60
<212> TYPE: DNA

```
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs1882348, location, BP: 2:102984671

<400> SEQUENCE: 140
tactcttcct atgacatgaa atacattctw tgttatggaa cagaataagt ttatctctct    60

<210> SEQ ID NO 141
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs1558627, location, BP: 2:102984684

<400> SEQUENCE: 141
acatgaaata cattctttgt tatggaacar aataagttta tctctctctg cttattttct    60

<210> SEQ ID NO 142
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs2058622, location, BP: 2:102985424

<400> SEQUENCE: 142
ccactgtgaa accttggtag cacttctgtr gttttgcacc aaatcaggtc attttgttt    60

<210> SEQ ID NO 143
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs3771172, location, BP: 2:102985812

<400> SEQUENCE: 143
agcaaatggc attggccatc tttctgatay gggtagtaga gaatacagcc tggcttagga    60

<210> SEQ ID NO 144
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs3771171, location, BP: 2:102985950

<400> SEQUENCE: 144
aagaaaaatg aggtgtccca gagtggatay tggagactga tcactatgag agtaaagtgt    60

<210> SEQ ID NO 145
<211> LENGTH: 60
<212> TYPE: DNA
<213> ORGANISM: Artificial sequence
<220> FEATURE:
<223> OTHER INFORMATION: Description of sequence: single nucleotide
      polymorphism
```

```
<220> FEATURE:
<223> OTHER INFORMATION: name: rs3771170, location, BP: 2:102985980

<400> SEQUENCE: 145
tggagactga tcactatgag agtaaagtgw tgaggagaga agcagctttg acaatggcct    60

<210> SEQ ID NO 146
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs2160202, location, BP: 2:102986154

<400> SEQUENCE: 146
gtgtgtatac acatatgtgt tctaacttar gtgtgtaacc ctttgcagtt tgatgtggga    60

<210> SEQ ID NO 147
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs2058623, location, BP: 2:102986170

<400> SEQUENCE: 147
gtgttctaac ttaggtgtgt aaccctttgy agtttgatgt gggatctatc agtgaacaga    60

<210> SEQ ID NO 148
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs1465321, location, BP: 2:102986618

<400> SEQUENCE: 148
tttgggtcag ttggcctcag tgttaacccy agccttggag ctcctggatg gcaggtgcag    60

<210> SEQ ID NO 149
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs6742875, location, BP: 2:102987526

<400> SEQUENCE: 149 gatcacccttt ttttgttgtt gttgttgttk ttttttgag atggaatttc gctcttgtta    60

<210> SEQ ID NO 150
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs6733346, location, BP: 2:102987698

<400> SEQUENCE: 150
```
gagacggagt tcaccacat tggccaggcy ggtctcaaac tcctgacctc aggtgatcca        60

<210> SEQ ID NO 151
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs2041740, location, BP: 2:102989734

<400> SEQUENCE: 151
aaaagctctt atacaccatg gaatactatr cagccataaa aaagcatgag ttcatgtctt       60

<210> SEQ ID NO 152
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs6731154, location, BP: 2:102991181

<400> SEQUENCE: 152
cacttgaacc cgggaggcag aggttgcagy gagccgagac tgggccactg cactccagcc       60

<210> SEQ ID NO 153
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs2270298, location, BP: 2:102992079

<400> SEQUENCE: 153
tcgctgtttc tctctctctg catgtgtgtr aaagagagag atgaaagaat attgatgaaa       60

<210> SEQ ID NO 154
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs2270297, location, BP: 2:102992675

<400> SEQUENCE: 154
ttcaaatatg atggtcaaaa tcttcattcy ggtgctcctc tacttggcta aataaacctt       60

<210> SEQ ID NO 155
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs6753717, location, BP: 2:102993161

<400> SEQUENCE: 155
actgatgtgc tggtgggagg ggagggatgm tggacccagg ctgtgtgtga tggaggaaca       60

```
<210> SEQ ID NO 156
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs10190555, location, BP: 2:102994056

<400> SEQUENCE: 156
tggtctccca aagtactggg attacaggcr taagccactg caccaggctg gaaaatgtgt      60

<210> SEQ ID NO 157
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs6750020, location, BP: 2:102994714

<400> SEQUENCE: 157
tcatgtcata taatcctcac aacagctctr tgagactgtg gccttgggtg agttaatttc      60

<210> SEQ ID NO 158
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs17027037, location, BP: 2:102994884

<400> SEQUENCE: 158
ggctctaggg acagtaagag ttctgctgtr atgaccatct cccactgcta ggttcccaaa      60

<210> SEQ ID NO 159
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs2080289, location, BP: 2:102995020

<400> SEQUENCE: 159
tgagtctctc aggactccac tcaaatgtcr ctcctccttc atgcccccat ggcctcttgt      60

<210> SEQ ID NO 160
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs6729638, location, BP: 2:102996022

<400> SEQUENCE: 160
gaagcatgga cagccatgta gaaatgtgay tggacaaaag ggtatgacct aatgctaatg      60

<210> SEQ ID NO 161
<211> LENGTH: 60
<212> TYPE: DNA
<213> ORGANISM: Artificial sequence
```

<220> FEATURE:
<223> OTHER INFORMATION: Description of sequence: single nucleotide
      polymorphism
<220> FEATURE:
<223> OTHER INFORMATION: name: rs11683700, location, BP: 2:102996805

<400> SEQUENCE: 161
tgtacttcac actgcccctt ctcaagtcty ccatgtaagt ttctggggga aaaaatggat    60

<210> SEQ ID NO 162
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs3821203, location, BP: 2:102996872

<400> SEQUENCE: 162
aaggtagtca gtagcagttt tccccctcay accgaaattg cctcctgccc tttgtctttg    60

<210> SEQ ID NO 163
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs3771162, location, BP: 2:102997174

<400> SEQUENCE: 163
agggctcagg gaggtgtggg agctgcaggw gcactcctga gtctcactgt actccactca    60

<210> SEQ ID NO 164
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs11465633, location, BP: 2:102997733

<400> SEQUENCE: 164
tgtaaatcca tcactggcca gctgaggagk acagatggag agaatcgaga cagggcagaa    60

<210> SEQ ID NO 165
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs56258475, location, BP: 2:102999312

<400> SEQUENCE: 165
tgtctttgtc tttcttattt ttttcttctr ctcagtgggg cttaacttgt atcttttgtt    60

<210> SEQ ID NO 166
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:

<223> OTHER INFORMATION: name: rs1035130, location, BP: 2:103001402

<400> SEQUENCE: 166
aatgaagagg atgtaattta ttggatgtty ggggaagaaa atggatcgga tcctaatata    60

<210> SEQ ID NO 167
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs3755274, location, BP: 2:103002395

<400> SEQUENCE: 167
tagaaatgca gcttaagcta caaaagcagr gaggtctttc tttatagttg ggtgcacaca    60

<210> SEQ ID NO 168
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs2241117, location, BP: 2:103003043

<400> SEQUENCE: 168
agaaaaataa ttgagagaga atattttcty atattttcaa cttagcatca tgatcttcca    60

<210> SEQ ID NO 169
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs2241116, location, BP: 2:103003265

<400> SEQUENCE: 169
tgccttcaag cattttaaac atgtgaattm ccctctcaag ggtaacgaac agagcctact    60

<210> SEQ ID NO 170
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs4851570, location, BP: 2:103006387

<400> SEQUENCE: 170
aaggcaggaa tgtggagtca ctcagtggar tgtgtcagca cgtgggttgg caactactgc    60

<210> SEQ ID NO 171
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs2001461, location, BP: 2:103007220

<400> SEQUENCE: 171
agaccatcct ggctaacaga gtgaaacccy gtctctacta aaatacaaa aaattagccg    60

<210> SEQ ID NO 172
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs17027060, location, BP: 2:103007567

<400> SEQUENCE: 172
tgaccagaag tcctcaagtt tccagataay tactaattta aaggaagtca gtctaattca    60

<210> SEQ ID NO 173
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs3860444, location, BP: 2:103007623

<400> SEQUENCE: 173
ttcattgcac ttgattttgt tttgcatgtr tgtgtttgca ggaaaaaaac cttcacagag    60

<210> SEQ ID NO 174
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs12712145, location, BP: 2:103008710

<400> SEQUENCE: 174
gtgaatttag ctttgagcct gcatgtgcay gtgcgagttt gctatgggga gagatgatgc    60

<210> SEQ ID NO 175
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs66919607, location, BP: 2:103008969

<400> SEQUENCE: 175
ggcagtgcag agacatttag agacatgcts taaatcactt ccattaaatt atggtccatg    60

<210> SEQ ID NO 176
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs2287035, location, BP: 2:103010530

<400> SEQUENCE: 176
tgttatttag gagacatttt caccttcttr ggggtctttc tgagcataga aattgtgatg    60

<210> SEQ ID NO 177

-continued

```
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs2287034, location, BP: 2:103010588

<400> SEQUENCE: 177
tggtggtaga attaaatgat atgagtaaam cagggtgaga ttttctttcc actcctggaa    60

<210> SEQ ID NO 178
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs4851005, location, BP: 2:103011552

<400> SEQUENCE: 178
atgggttttt attgtgttga tattggtgay gaaatttaag tagaaaatag gaaaattgaa    60

<210> SEQ ID NO 179
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs17027071, location, BP: 2:103012674

<400> SEQUENCE: 179
tgggcaggtt acttaaccac tctgtgctcy ggcttccttg tttgttaaat ggaggtgata    60

<210> SEQ ID NO 180
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs3732126, location, BP: 2:103013962

<400> SEQUENCE: 180
cttgaaagct cggtaaggcc ctgcaacgcm gagcctgctt atgtggatct atttatggga    60

<210> SEQ ID NO 181
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs3732125, location, BP: 2:103013963

<400> SEQUENCE: 181
ttgaaagctc ggtaaggccc tgcaacgcas agcctgctta tgtggatcta tttatgggaa    60

<210> SEQ ID NO 182
<211> LENGTH: 60
<212> TYPE: DNA
<213> ORGANISM: Artificial sequence
<220> FEATURE:
```

```
<223> OTHER INFORMATION: Description of sequence: single nucleotide
      polymorphism
<220> FEATURE:
<223> OTHER INFORMATION: name: rs1135354, location, BP: 2:103014302

<400> SEQUENCE: 182
tccagtcctg agtttgctac ttacttctgk ggcctctgga accttatcca acctcttggt    60

<210> SEQ ID NO 183
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs1568681, location, BP: 2:103014696

<400> SEQUENCE: 183
cttttgacgt tggaagacac atgtcttacy ccccaaaggg agcccagcac tgggagcctt    60

<210> SEQ ID NO 184
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs17027087, location, BP: 2:103015918

<400> SEQUENCE: 184
cttggaggct gcaggcactt ttctggggcy gacaatttag gctaagaggg cctagggcag    60

<210> SEQ ID NO 185
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs55664618, location, BP: 2:103016216

<400> SEQUENCE: 185
cgccagttgg gtttgctggg gctctcagcr aggagcagaa aggagacagt tgtccaaaga    60

<210> SEQ ID NO 186
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs3732123, location, BP: 2:103018077

<400> SEQUENCE: 186
cattctttag tcatgtgttt ttgaaattas caaagtcact tgagctaagg ctgatgagta    60

<210> SEQ ID NO 187
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs55742125, location, BP: 2:103019782
```

<400> SEQUENCE: 187
gtaatacata tgtaattttg ctccatattr cctaattcat cttcataggg gttgtaacat    60

<210> SEQ ID NO 188
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs1035127, location, BP: 2:103019919

<400> SEQUENCE: 188
tttcattatc attgtgggaa ggtttttacr tggtagacat attaagactt tgtgatgtaa    60

<210> SEQ ID NO 189
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs55883125, location, BP: 2:103024331

<400> SEQUENCE: 189
aggaagtcaa agaactgaga gacggggacr ttaaacggat catctatatc aatgctaata    60

<210> SEQ ID NO 190
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs4851006, location, BP: 2:103024738

<400> SEQUENCE: 190
caccatctac acgtaaggtt taaaaaaaaw taatgaaaat tcagtgaatt atctcgagaa    60

<210> SEQ ID NO 191
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs4851007, location, BP: 2:103024813

<400> SEQUENCE: 191
tcaggttggc taagagctcc tctcctgtgk tctgctgtgt atctttgtct agcattacag    60

<210> SEQ ID NO 192
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs4851575, location, BP: 2:103025203

<400> SEQUENCE: 192
ggttaccgac agcaggggaa aggcagcgcr taggtaaatg cggacagttc ccactcccag    60

<210> SEQ ID NO 193
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs4851008, location, BP: 2:103026611

<400> SEQUENCE: 193
actccttggg aaaaacagag aaggtgctas agaccccatt ttgggaagaa agctctgttt    60

<210> SEQ ID NO 194
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs6419573, location, BP: 2:103027103

<400> SEQUENCE: 194
agtgctggga ttacaggcat gagccactgy gctcggctcc aaatgaaaaa tcttacaact    60

<210> SEQ ID NO 195
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs11693955, location, BP: 2:103029165

<400> SEQUENCE: 195
tgactggaag gatatgcttc cacttaaggw atctggcttg acttgaagag ccaataaaag    60

<210> SEQ ID NO 196
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs6543132, location, BP: 2:103029410

<400> SEQUENCE: 196
gtcttatctg agatttcttg tggaacagar ttccctcaaa gccaatttaa aagcctatgt    60

<210> SEQ ID NO 197
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs1807782, location, BP: 2:103033147

<400> SEQUENCE: 197
ctgtaggtat tcactcacag gcttgaagcy gggtgggtta gaacagctgg ggcctggcct    60

<210> SEQ ID NO 198
<211> LENGTH: 60

```
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs3755272, location, BP: 2:103033825

<400> SEQUENCE: 198
acccgtttct cacacctgct ttcaccatgw gatgtgactg ctcccctttt gccttctgcc      60

<210> SEQ ID NO 199
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs1420106, location, BP: 2:103035044

<400> SEQUENCE: 199
caactaaacc caaccacaaa ctttatctcr tcaaggaggt tggtcagaga agagtttgag      60

<210> SEQ ID NO 200
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs2293225, location, BP: 2:103035889

<400> SEQUENCE: 200
gttctctgtg taaagtagtt taagtctgcy tttgatggtg acatttctct ccctgggtct      60

<210> SEQ ID NO 201
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs3771156, location, BP: 2:103036677

<400> SEQUENCE: 201
ggcaacagct actgtaactc agcactaacy cacctcccca agctctatgc ttatccctga      60

<210> SEQ ID NO 202
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs3755268, location, BP: 2:103038527

<400> SEQUENCE: 202
cctgtcttcc tgcatcatgc agactctags aggcgtggtt cttccccgct tcccacattc      60

<210> SEQ ID NO 203
<211> LENGTH: 60
<212> TYPE: DNA
<213> ORGANISM: Artificial sequence
<220> FEATURE:
<223> OTHER INFORMATION: Description of sequence: single nucleotide
```

```
      polymorphism
<220> FEATURE:
<223> OTHER INFORMATION: name: rs3755267, location, BP: 2:103038587

<400> SEQUENCE: 203
cctctactcc tctctctcca ccctgaagck ctccgttatc tcaccccagc tgcacatgct    60

<210> SEQ ID NO 204
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs3817465, location, BP: 2:103039584

<400> SEQUENCE: 204
acctgccctt tcaaagcttc ctgtgtgagw tgcactttgt tcactggttc tgacttcttc    60

<210> SEQ ID NO 205
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs2272128, location, BP: 2:103039929

<400> SEQUENCE: 205
atacaaacct ttccatccta ctattaaaar gggactgaga ggagaattat tagggtgaac    60

<210> SEQ ID NO 206
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs887972, location, BP: 2:103040945

<400> SEQUENCE: 206
ttatggtatc ttcttcatgg gcttttcatr gaaaagcgtg tttgagaatc tgaggtatac    60

<210> SEQ ID NO 207
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs887971, location, BP: 2:103041167

<400> SEQUENCE: 207
agacataaac ctactaacat ctgctaatgy aggaagatag gttcactcat tttcactgtc    60

<210> SEQ ID NO 208
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs11678975, location, BP: 2:103043739
```

```
<400> SEQUENCE: 208
tctctttgga tatgtaccca aaagtgggaw tgctgaatca tatggtagct ctatttttag    60

<210> SEQ ID NO 209
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs11694658, location, BP: 2:103045020

<400> SEQUENCE: 209
cactgctaat ttttatacgt tgattttacr tcctgcaatt ttactgaatt catttatcac    60

<210> SEQ ID NO 210
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs2160232, location, BP: 2:103046880

<400> SEQUENCE: 210
gttttggttt gtatggaata tctttgtccr ttttttccct tctagtctat atgtgtcctt    60

<210> SEQ ID NO 211
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs66566526, location, BP: 2:103047802

<400> SEQUENCE: 211
atgatatgtt tctcatctct tgctacttty aatattcttt ctttgtcttt gaattttga    60

<210> SEQ ID NO 212
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs6755786, location, BP: 2:103048103

<400> SEQUENCE: 212
gactagataa tttcaaatgt catctctgay atcacggatg ctttcttctg cttaatcaaa    60

<210> SEQ ID NO 213
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs56331791, location, BP: 2:103048157

<400> SEQUENCE: 213
atcaaatctg ctgttgatat tatagttcar gtattatatt ctttatctgt aggatttctt    60
```

<210> SEQ ID NO 214
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs6713618, location, BP: 2:103048437

<400> SEQUENCE: 214
gatagctttc ttagtttctt ttgatggtgw catatttcct tgattttca taatcattgt     60

<210> SEQ ID NO 215
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs6716784, location, BP: 2:103048467

<400> SEQUENCE: 215
catatttcct tgattttca taatcattgk tccttgcatt ggtgcctatg cagttgagga      60

<210> SEQ ID NO 216
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs2041756, location, BP: 2:103049910

<400> SEQUENCE: 216
actatgttgc tcaggctggt ttcaaattcr tggtttcaac caatcctcct gccttggcct    60

<210> SEQ ID NO 217
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs6543134, location, BP: 2:103050458

<400> SEQUENCE: 217
caaagattaa tgtgtttcta aatagagaak aagttaattt aatgtgtttc caaataggaa    60

<210> SEQ ID NO 218
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs2110735, location, BP: 2:103050925

<400> SEQUENCE: 218
aagaggttgg aattctgatt ttgaatgccr acatattagc catcacacgc aggtttgtga    60

<210> SEQ ID NO 219
<211> LENGTH: 60
<212> TYPE: DNA

```
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs11681718, location, BP: 2:103051144

<400> SEQUENCE: 219
ttaactaaaa gggcactcga atgccctatr tctgatcatt cagctcacaa tgtacctttg    60

<210> SEQ ID NO 220
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs4851582, location, BP: 2:103051558

<400> SEQUENCE: 220
gcaactacac ttaacgggaa agagcaacay agacaacaga aacagaaaag caaagggtat    60

<210> SEQ ID NO 221
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs2110734, location, BP: 2:103052206

<400> SEQUENCE: 221
ctgactggta gtataagaaa tcgataatay tgcagtataa tattataata cctgcccta    60

<210> SEQ ID NO 222
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs6746271, location, BP: 2:103052995

<400> SEQUENCE: 222
aattccttct tggaccacag gaaacacacs agggatgtgg cgtgggggaa tcccagcttc    60

<210> SEQ ID NO 223
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs2058660, location, BP: 2:103054449

<400> SEQUENCE: 223
tacagcccca ttagcagtaa atgccctttr ttcccaaata atacttggtg ttatcagact    60

<210> SEQ ID NO 224
<211> LENGTH: 60
<212> TYPE: DNA
<213> ORGANISM: Artificial sequence
<220> FEATURE:
<223> OTHER INFORMATION: Description of sequence: single nucleotide
      polymorphism
```

```
<220> FEATURE:
<223> OTHER INFORMATION: name: rs2058658, location, BP: 2:103054803

<400> SEQUENCE: 224
acgtagctgt tagttaagat attaatctty tcttattaca agatacaaac cacacagagc    60

<210> SEQ ID NO 225
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs17027166, location, BP: 2:103055420

<400> SEQUENCE: 225
ggggaagccc gctccaagtg agagctgatr gatgaggaca caccagctca gtaagggtgg    60

<210> SEQ ID NO 226
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs4851009, location, BP: 2:103055644

<400> SEQUENCE: 226
gcattgagga ttttaagtgg gagaatgtcr tgactgaatt tgtattcaag atagatcacc    60

<210> SEQ ID NO 227
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs55645612, location, BP: 2:103055661

<400> SEQUENCE: 227
tgggagaatg tcgtgactga atttgtatty aagatagatc accttgtttg ctgggtcgga    60

<210> SEQ ID NO 228
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs56166614, location, BP: 2:103056096

<400> SEQUENCE: 228
ggtcaacaga gcatgataat ggtttttacr taaaaggtag gagaaagaga agaatcaagg    60

<210> SEQ ID NO 229
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs10490204, location, BP: 2:103056534

<400> SEQUENCE: 229
```

```
gggtggtgag aagagaaaca aacgaagtgm aattgatgat gtaggaaaga cataacctca    60
```

<210> SEQ ID NO 230
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs17027179, location, BP: 2:103057159

<400> SEQUENCE: 230

```
ctgagatggt gcaaagggga gaaggaggty tctgagaagt aaaagtaggt gatgtcaaca    60
```

<210> SEQ ID NO 231
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs1558652, location, BP: 2:103058328

<400> SEQUENCE: 231

```
gatcgagcca ttgcactcca tcctgggtgr cagagcaaga ttccatctca aagaaaaaaa    60
```

<210> SEQ ID NO 232
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs11123927, location, BP: 2:103058803

<400> SEQUENCE: 232

```
ttattatact ttctaaaatg ctactaaaay atttattatt ttagaaagaa acataaaaat    60
```

<210> SEQ ID NO 233
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs10490203, location, BP: 2:103059237

<400> SEQUENCE: 233

```
tttttattta aaccacgtgc tacaataack ttatgatttt tacttaataa acaaatattg    60
```

<210> SEQ ID NO 234
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs1558650, location, BP: 2:103060024

<400> SEQUENCE: 234

```
ctctcaaagt caagctattg agcagacagw tgtactgacc cagactgctt ggagataagt    60
```

```
<210> SEQ ID NO 235
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs4851583, location, BP: 2:103060300

<400> SEQUENCE: 235
cagaggaggg ctctctgtct tgaaatccty gggagctatt acattgtttg agaaatttga      60

<210> SEQ ID NO 236
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs4851584, location, BP: 2:103060313

<400> SEQUENCE: 236
tctgtcttga aatccttggg agctattacr ttgtttgaga aatttgactt ggtttgttgc      60

<210> SEQ ID NO 237
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs3771150, location, BP: 2:103060851

<400> SEQUENCE: 237
ctgatgtcaa catgacccctt agccccggtr agcctccatc acccattgat aatctatgga     60

<210> SEQ ID NO 238
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs11694360, location, BP: 2:103061147

<400> SEQUENCE: 238
cctgggtgga gcagcgtggc acaagcccar gaatcaagct gcccattccc tgcagtgtgg     60

<210> SEQ ID NO 239
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs11123928, location, BP: 2:103061286

<400> SEQUENCE: 239
tcctgggagg tgaggaatgg aggacattar agtccatatt ttgtgcacag aagagggact     60

<210> SEQ ID NO 240
<211> LENGTH: 60
<212> TYPE: DNA
<213> ORGANISM: Artificial sequence
```

```
<220> FEATURE:
<223> OTHER INFORMATION: Description of sequence: single nucleotide
      polymorphism
<220> FEATURE:
<223> OTHER INFORMATION: name: rs7597017, location, BP: 2:103062116

<400> SEQUENCE: 240
ttctacaata gctatggggt atgcccagar tggcaggcat tgtgctaaga cctagcctcc      60

<210> SEQ ID NO 241
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs4851585, location, BP: 2:103062754

<400> SEQUENCE: 241
tgtaagacag gtctcaaaat gtgattttw aaaattttat tttaataggt tttgggggta      60

<210> SEQ ID NO 242
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs6734736, location, BP: 2:103062880

<400> SEQUENCE: 242
catacccgtc acccgagcag tgtacactay acccgttgtg tcgtctttta tccctcactc      60

<210> SEQ ID NO 243
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs6708413, location, BP: 2:103063369

<400> SEQUENCE: 243
tggctaagta gtattccatg gtgtgatttr agaggtttcc agattcacaa aaactgctgc      60

<210> SEQ ID NO 244
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs4851586, location, BP: 2:103064264

<400> SEQUENCE: 244
ggctggagtg cggtggcacc atctcagcty acttcaatct ccgcctccca ggttcaagca      60

<210> SEQ ID NO 245
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
```

<223> OTHER INFORMATION: name: rs11465727, location, BP: 2:103064503

<400> SEQUENCE: 245
gtgagccacc gtgcccagcc acattaagtr tttagaatgg tgcccagtac acggtaaata    60

<210> SEQ ID NO 246
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs11465728, location, BP: 2:103064511

<400> SEQUENCE: 246
ccgtgcccag ccacattaag tatttagaaw ggtgcccagt acacggtaaa tagctcagca    60

<210> SEQ ID NO 247
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs11465729, location, BP: 2:103064512

<400> SEQUENCE: 247
cgtgcccagc cacattaagt atttagaatk gtgcccagta cacggtaaat agctcagcat    60

<210> SEQ ID NO 248
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs56044378, location, BP: 2:103065367

<400> SEQUENCE: 248
ctgagccccg gaggtcaagg ctgcagtgar ccatgattac atcactgcac tccagcctgg    60

<210> SEQ ID NO 249
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs6543137, location, BP: 2:103065908

<400> SEQUENCE: 249
gctatttacc ttaagattct ggagctggck tagaagagtc agtcaatggg gaaacattta    60

<210> SEQ ID NO 250
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs11465730, location, BP: 2:103066858

<400> SEQUENCE: 250 atttttacata tgggattca catatcagcr tatgggccat caactctccg agcaagtact     60

<210> SEQ ID NO 251
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs11123929, location, BP: 2:103067143

<400> SEQUENCE: 251
aattcgattt ggggtgaaaa atcaataccr ctcagtggta tgattttgaa atgaattttt     60

<210> SEQ ID NO 252
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs7559479, location, BP: 2:103068787

<400> SEQUENCE: 252
agcaccaagc aagcttgatg gacaatggar tgggattgag actgtggttt agagcctttg     60

<210> SEQ ID NO 253
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs7603250, location, BP: 2:103068834

<400> SEQUENCE: 253
tttagagcct ttgatttcct ggactggacw gacggcgagt gaattctcta gaccttgggt     60

<210> SEQ ID NO 254
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs917997, location, BP: 2:103070568

<400> SEQUENCE: 254
taagatagat aatgctagaa ccaagctaty cagatgtcca gcgttttgac cttagcttcg     60

<210> SEQ ID NO 255
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs2075185, location, BP: 2:103070988

<400> SEQUENCE: 255
agtgtcctac cttggatgat ggtcactctr cctctaacac tcatcataga gaactcctta     60

<210> SEQ ID NO 256

```
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs11678721, location, BP: 2:103073238

<400> SEQUENCE: 256
tgttaatgta aattactatt tattatatak tatacatagt atatgaaaaa tatatttata      60

<210> SEQ ID NO 257
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs11677555, location, BP: 2:103073293

<400> SEQUENCE: 257
ttatatatta cttgtttcta aataaataar tatatattta tgcacatttt ttggggacag      60

<210> SEQ ID NO 258
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs4851587, location, BP: 2:103073474

<400> SEQUENCE: 258
gtgccaccac atccggctaa ttttttttcay attttttttg tagagatgga gtttcaccat      60

<210> SEQ ID NO 259
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs4851588, location, BP: 2:103073505

<400> SEQUENCE: 259
ttttttttgt agagatggag tttcaccats ttgcccaggc tggtcttgaa ctcctgagct      60

<210> SEQ ID NO 260
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs6728475, location, BP: 2:103073950

<400> SEQUENCE: 260
ttgggaggcc gagttgggcg gatcacgagk tcaggagctt gagatcagcc tgcccagcac      60

<210> SEQ ID NO 261
<211> LENGTH: 60
<212> TYPE: DNA
<213> ORGANISM: Artificial sequence
<220> FEATURE:
```

<223> OTHER INFORMATION: Description of sequence: single nucleotide
    polymorphism
<220> FEATURE:
<223> OTHER INFORMATION: name: rs6757276, location, BP: 2:103074079

<400> SEQUENCE: 261
gctactcagg aggctgaggc aggagaatck cctgaaccca ggaagcagag gttgcagtga    60

<210> SEQ ID NO 262
<211> LENGTH: 60
<212> TYPE: DNA
<213> ORGANISM: Artificial sequence
<220> FEATURE:
<223> OTHER INFORMATION: Description of sequence: single nucleotide
    polymorphism
<220> FEATURE:
<223> OTHER INFORMATION: name: rs4070554, location, BP: 2:103074493

<400> SEQUENCE: 262
acacatttct caataatcta tggataaaar tggaagtctc aaagcaaatg aaatgatatt    60

<210> SEQ ID NO 263
<211> LENGTH: 60
<212> TYPE: DNA
<213> ORGANISM: Artificial sequence
<220> FEATURE:
<223> OTHER INFORMATION: Description of sequence: single nucleotide
    polymorphism
<220> FEATURE:
<223> OTHER INFORMATION: name: rs56117144, location, BP: 2:103074651

<400> SEQUENCE: 263
aaaagaggaa aatatataaa ttaataatcy aaacttccac cttaggaagc caaaaaaaa    60

<210> SEQ ID NO 264
<211> LENGTH: 60
<212> TYPE: DNA
<213> ORGANISM: Artificial sequence
<220> FEATURE:
<223> OTHER INFORMATION: Description of sequence: single nucleotide
    polymorphism
<220> FEATURE:
<223> OTHER INFORMATION: name: rs12712150, location, BP: 2:103074813

<400> SEQUENCE: 264
aaaaactcct agcaagactg accaaaaaam aaagaagaag aaggaagaca caaattacca    60

<210> SEQ ID NO 265
<211> LENGTH: 60
<212> TYPE: DNA
<213> ORGANISM: Artificial sequence
<220> FEATURE:
<223> OTHER INFORMATION: Description of sequence: single nucleotide
    polymorphism
<220> FEATURE:
<223> OTHER INFORMATION: name: rs57081652, location, BP: 2:103075381

<400> SEQUENCE: 265
gtggagctta tcatgggtat tcagggcags cttcatattt taaaatattt cagtgtaatt    60

<210> SEQ ID NO 266
<211> LENGTH: 60
<212> TYPE: DNA
<213> ORGANISM: Artificial sequence
<220> FEATURE:
<223> OTHER INFORMATION: Description of sequence: single nucleotide
    polymorphism
<220> FEATURE:
<223> OTHER INFORMATION: name: rs6761825, location, BP: 2:103075561

<400> SEQUENCE: 266
gggaattttc tcatcatgat aagggctcy aaaaacaaca acaaacaaac tatagatgaa        60

<210> SEQ ID NO 267
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs60038017, location, BP: 2:103076001

<400> SEQUENCE: 267
ggaaaggaag gaaagaagga aggatagggm aggaaaggaa gaaagagaaa gaaataagag        60

<210> SEQ ID NO 268
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs10175585, location, BP: 2:103076107

<400> SEQUENCE: 268
agaaagagaa agaaagaaag aaagaaagar agaaagaaag aaagaaagaa agaaagaaag        60

<210> SEQ ID NO 269
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs13394086, location, BP: 2:103076151

<400> SEQUENCE: 269
aaagaaagaa agaaagaaag aaagaaagar agggagggag ggagggaggg agattcatgt        60

<210> SEQ ID NO 270
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs62151860, location, BP: 2:103076154

<400> SEQUENCE: 270
gaaagaaaga agaaagaaa gaaagagagr gagggaggga gggagggaga ttcatgtata        60

<210> SEQ ID NO 271
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs62151861, location, BP: 2:103076155

<400> SEQUENCE: 271
aaagaaagaa agaaagaaag aaagagaggr agggagggag ggagggagat tcatgtataa        60

<210> SEQ ID NO 272
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs6705001, location, BP: 2:103076210

<400> SEQUENCE: 272
tataaatgaa cagaatgtgt ggatgttccr taagctaaaa actatgaaat acttatgagc    60

<210> SEQ ID NO 273
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs6543141, location, BP: 2:103076351

<400> SEQUENCE: 273
tcccctttac attgattaag aggtttaacr caattccaac tgatattcca gcagaatttt    60

<210> SEQ ID NO 274
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs6705385, location, BP: 2:103076569

<400> SEQUENCE: 274
aacaaagcaa tagatcaatg gaactgagtm gaaagtctag aaatacatcc acacaaatat    60

<210> SEQ ID NO 275
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs6705498, location, BP: 2:103076670

<400> SEQUENCE: 275
agaatagagt tttaaacaaa tggttttgcr tcaattggac atacatatgc aataagatga    60

<210> SEQ ID NO 276
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs6719196, location, BP: 2:103076888

<400> SEQUENCE: 276
agtttaacaa agttaaaacc acttttttcck agaaaaccac tgctaaaagg atgaaaaaaa    60

<210> SEQ ID NO 277
<211> LENGTH: 60

```
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs7561487, location, BP: 2:103077894

<400> SEQUENCE: 277
tagttgatat gcgggtacac agggcattcr gaatgccact gtgggcatgc ggcctggagt    60

<210> SEQ ID NO 278
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs4241210, location, BP: 2:103078740

<400> SEQUENCE: 278
gaaggtgata ccttctctgt ctccacctcr tcttctgccc catgcagtaa agccctaat    60

<210> SEQ ID NO 279
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs6720564, location, BP: 2:103079297

<400> SEQUENCE: 279
cacttgccac tctaagtcct taaatttgty acctttgcca aaattcaagg tcaactgaaa    60

<210> SEQ ID NO 280
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs17027230, location, BP: 2:103079330

<400> SEQUENCE: 280
tttgccaaaa ttcaaggtca actgaaaaay gccccattta acctctgatt gtaccacccc    60

<210> SEQ ID NO 281
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs6717915, location, BP: 2:103079619

<400> SEQUENCE: 281
actacatttt ttaaggtcgc atttgcttcm actgatcaga tctcataaga agctatttac    60

<210> SEQ ID NO 282
<211> LENGTH: 60
<212> TYPE: DNA
<213> ORGANISM: Artificial sequence
<220> FEATURE:
<223> OTHER INFORMATION: Description of sequence: single nucleotide
``` polymorphism
<220> FEATURE:
<223> OTHER INFORMATION: name: rs6718157, location, BP: 2:103079814

<400> SEQUENCE: 282
ttcccagcct tctttgtagt tggtttgggw cacgtgacta atattttcta gaagtagagt    60

<210> SEQ ID NO 283
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs2075184, location, BP: 2:103080592

<400> SEQUENCE: 283
ggttcaagtg attctcctgc ctcagcctcy ggagtagctg ggattacaga tgcgtaccac    60

<210> SEQ ID NO 284
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs11676236, location, BP: 2:103081695

<400> SEQUENCE: 284
agccccaacc tcctgggctc aagcaattcm cccaatcccc tctcagagga gctgggacta    60

<210> SEQ ID NO 285
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs11687013, location, BP: 2:103081721

<400> SEQUENCE: 285
ttcccccaat ccctctcag aggagctggr actagctggg actacaggta tataccacca    60

<210> SEQ ID NO 286
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs917996, location, BP: 2:103082273

<400> SEQUENCE: 286
ggacagcgtg gtattgctag cccatgttam cgaggtggag atatttatct tcgcctcaac    60

<210> SEQ ID NO 287
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs731628, location, BP: 2:103082571

<400> SEQUENCE: 287
cctttgctaa aggctgataa tcataagtay tatattgtta ggggacataa actctgtctt    60

<210> SEQ ID NO 288
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs1403554, location, BP: 2:103083453

<400> SEQUENCE: 288
tcgaagcctg agtaaaggag aaaactgcar tctcctctgg tccacggtat tgcccacatc    60

<210> SEQ ID NO 289
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs12463588, location, BP: 2:103085257

<400> SEQUENCE: 289
agaaccacag ggattcttgg gactggcacs aaaaaggggt caggaaggca ggtcagagaa    60

<210> SEQ ID NO 290
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs10165460, location, BP: 2:103085631

<400> SEQUENCE: 290 tttttttgata aacttattcc taagaattgy attttttgat gctattataa atggcattat    60

<210> SEQ ID NO 291
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs11123931, location, BP: 2:103085660

<400> SEQUENCE: 291
cattttttga tgctattata aatggcattr ttttcttaat tccattttgt tttattcatt    60

<210> SEQ ID NO 292
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs2310302, location, BP: 2:103086049

<400> SEQUENCE: 292
tgatgttggc tgtgtattat catgttgaas aagtttcctt ccattcctga cctgtagagt    60

<210> SEQ ID NO 293
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs12469887, location, BP: 2:103086758

<400> SEQUENCE: 293
acaatggttt tagcaggctt ctctgactty ctttcactga tatattaagc ttctagctgg    60

<210> SEQ ID NO 294
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs990171, location, BP: 2:103086770

<400> SEQUENCE: 294
gcaggcttct ctgactttct ttcactgatm tattaagctt ctagctggtc tgttgtatct    60

<210> SEQ ID NO 295
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs56043441, location, BP: 2:103087383

<400> SEQUENCE: 295
ctcagtctta tgagtaagtt gagagttaty ggggtccagt attcctaatt tgctgtttct    60

<210> SEQ ID NO 296
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs10195075, location, BP: 2:103087652

<400> SEQUENCE: 296
tgggtagaga aaacaggccg tgccttcagr tcttaccaat atttagaaga ttttttcaa    60

<210> SEQ ID NO 297
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs1403553, location, BP: 2:103087662

<400> SEQUENCE: 297
aaacaggccg tgccttcagg tcttaccaak atttagaaga ttttttcaa tttctgtctg    60

<210> SEQ ID NO 298
<211> LENGTH: 60
<212> TYPE: DNA

```
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs4140786, location, BP: 2:103088176

<400> SEQUENCE: 298
acaaaatttg gaattttaga gcaggaaagk gttaccaggt atggacagca tctttatttt    60

<210> SEQ ID NO 299
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs4140785, location, BP: 2:103088517

<400> SEQUENCE: 299
gtagtccacc tgatagtctc atttcagtgm ctgaatctaa tctattctgg agtcaaactg    60

<210> SEQ ID NO 300
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs10201184, location, BP: 2:103089078

<400> SEQUENCE: 300
tcaccaaggt cacctggcaa caagtagaas agcgagaagt aggctcataa aaattatctc    60

<210> SEQ ID NO 301
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs4851011, location, BP: 2:103089678

<400> SEQUENCE: 301
ttaagtgtag ttccagagct acctgaagcy gtggtcattc aaaacaaatg agaggacagg    60

<210> SEQ ID NO 302
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs17027255, location, BP: 2:103090127

<400> SEQUENCE: 302
cacagactgt acctatatta cttttgaccy aggtggatgc agtcactctc tagaagcctc    60

<210> SEQ ID NO 303
<211> LENGTH: 60
<212> TYPE: DNA
<213> ORGANISM: Artificial sequence
<220> FEATURE:
<223> OTHER INFORMATION: Description of sequence: single nucleotide
      polymorphism
```

<220> FEATURE:
<223> OTHER INFORMATION: name: rs1474309, location, BP: 2:103091001

<400> SEQUENCE: 303
gcaacttgta ttactcagtg atgggatgty ggggcatata agattatatc tgtcagtaaa    60

<210> SEQ ID NO 304
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs17027258, location, BP: 2:103091540

<400> SEQUENCE: 304
ttatagttgc tattcatttt gagctagtar agtgtgaata ttaaatagga atgttagttt    60

<210> SEQ ID NO 305
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs10197881, location, BP: 2:103091715

<400> SEQUENCE: 305
acagtctaac atcttttgtg aaatcatatr gacactgatt gtgttcaagg tgatcttact    60

<210> SEQ ID NO 306
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs1468791, location, BP: 2:103092021

<400> SEQUENCE: 306
cccagattca ttctgtctag gagcgaagar cactgtgaaa atacgattat tcatagaact    60

<210> SEQ ID NO 307
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs1468790, location, BP: 2:103092441

<400> SEQUENCE: 307
attcattctt ttattcctca ttccatcaas gtacattttc tgagaaccca tgaaatatgt    60

<210> SEQ ID NO 308
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs1468789, location, BP: 2:103092503

<400> SEQUENCE: 308
aaatgaccat ggtccctgac ctcaagggay ttggtctaac ggggaagata ggttaactta    60

<210> SEQ ID NO 309
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs1468788, location, BP: 2:103092513

<400> SEQUENCE: 309
ggtccctgac ctcaagggac ttggtctaay ggggaagata ggttaactta gtacttattg    60

<210> SEQ ID NO 310
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs7597819, location, BP: 2:103092906

<400> SEQUENCE: 310
gtgaaaggca tgtagcattt ccctttacar ggccctactt ataggtgtgt ggcctcttcc    60

<210> SEQ ID NO 311
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs6737668, location, BP: 2:103093081

<400> SEQUENCE: 311
tcacactatg ggctcttcca cctcctttay atattgaaaa aagttaagtt tggttaaaat    60

<210> SEQ ID NO 312
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs10469840, location, BP: 2:103093243

<400> SEQUENCE: 312
aggaagagag taagaaggag cagcaggagy tggacaaaga gaagatgaag aaggaggagg    60

<210> SEQ ID NO 313
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs759382, location, BP: 2:103094213

<400> SEQUENCE: 313
tgacaacgga atgagaagac aagtaatagk ccttcagagt gacaaggtcc tttggctgaa    60

```
<210> SEQ ID NO 314
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs759381, location, BP: 2:103094323

<400> SEQUENCE: 314
gagccctgtg gtggtctcct gagctctgaw ctctcaccat gtttgttgat atgttcaata     60

<210> SEQ ID NO 315
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs6543146, location, BP: 2:103096695

<400> SEQUENCE: 315
atcagcttga cctttccct cctgtatttk ttatatgcat atacaacatt tttgcaaatc      60

<210> SEQ ID NO 316
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs1030026, location, BP: 2:103098178

<400> SEQUENCE: 316
attatttaaa ttttttaga ttatggtatm ttttaccta taaaagttct aaattttat       60

<210> SEQ ID NO 317
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs1523199, location, BP: 2:103098191

<400> SEQUENCE: 317
ttttagatta tggtatattt taccctatar aagttctaaa ttttatata gtgaaacctg      60

<210> SEQ ID NO 318
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs1523198, location, BP: 2:103098474

<400> SEQUENCE: 318
agcgaaggag gcccatacat gaagccggay gtcaaatcat ttattcatag cgagaatccc     60

<210> SEQ ID NO 319
<211> LENGTH: 60
<212> TYPE: DNA
<213> ORGANISM: Artificial sequence
```

```
<220> FEATURE:
<223> OTHER INFORMATION: Description of sequence: single nucleotide
      polymorphism
<220> FEATURE:
<223> OTHER INFORMATION: name: rs2140316, location, BP: 2:103098676

<400> SEQUENCE: 319
cagagtctgg tcctcaggcc aagtgtttcw gcatcacact ggtgggactg atgagtcttc    60

<210> SEQ ID NO 320
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs74180219, location, BP: 2:103100298

<400> SEQUENCE: 320
atatatatat atatatatat atatatatay atacacacac acaatataca cacacatgca    60

<210> SEQ ID NO 321
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs61604733, location, BP: 2:103100300

<400> SEQUENCE: 321
atatatatat atatatatat atatatatay acacacacac aatatacaca cacatgcaca    60

<210> SEQ ID NO 322
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs10175045, location, BP: 2:103103232

<400> SEQUENCE: 322
tgattgtgag gatgttgtga aatgagacty cggatgcctg gcacagggca ggtgatacac    60

<210> SEQ ID NO 323
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs10172588, location, BP: 2:103103297

<400> SEQUENCE: 323
tcttcttgcc cttcctgtgt gccagagatr ggtccacaca agaacaacca tctgccatct    60

<210> SEQ ID NO 324
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
```

```
<223> OTHER INFORMATION: name: rs2310303, location, BP: 2:103103879

<400> SEQUENCE: 324
caaatctgac tcctaacctt ccacaacagr caaccccttt acttcctgca cttgtggagt    60

<210> SEQ ID NO 325
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs2310304, location, BP: 2:103105148

<400> SEQUENCE: 325
tgcctcagcc tcccgagtag ctgggactam aggtgcccac caccacgccc ggctaatttt    60

<210> SEQ ID NO 326
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs6705272, location, BP: 2:103106569

<400> SEQUENCE: 326
ctcttaactt ccaacgtttt ttttttttam cttgacagta aaacaaataa agggtcagta    60

<210> SEQ ID NO 327
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs1523200, location, BP: 2:103106773

<400> SEQUENCE: 327 gggggggctga aacaatctct gaaatatgar agactttat tctttcacat tatggaggtt    60

<210> SEQ ID NO 328
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs1523201, location, BP: 2:103107064

<400> SEQUENCE: 328
tcacattatc aggtactggc agttaaaccy caacatataa atttggagag gggggcatga    60

<210> SEQ ID NO 329
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs7567885, location, BP: 2:103108852

<400> SEQUENCE: 329
```
cagcctggac atccaggcat taccatacak tctatgaaat ctaggcagag gttcccaaac    60

<210> SEQ ID NO 330
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs4851598, location, BP: 2:103109676

<400> SEQUENCE: 330
ttcttctgag cccttcaaat tgttccaaay tctgcctgtt acccagttcc aaagtcactt    60

<210> SEQ ID NO 331
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs1403548, location, BP: 2:103110375

<400> SEQUENCE: 331
agactacttc ccagacccca gtctatagay agacttcttg agggtctgtc tactctcacc    60

<210> SEQ ID NO 332
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs12712153, location, BP: 2:103111761

<400> SEQUENCE: 332
taaaaagtac tcccaaaaca gaaatactty gaagtgaatt taacaaagat atgctagatc    60

<210> SEQ ID NO 333
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs11687071, location, BP: 2:103111920

<400> SEQUENCE: 333
ttctcctatt tgatctatag attcaataar agcccatcaa aatcccagaa aacatttag    60

<210> SEQ ID NO 334
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs7566063, location, BP: 2:103112565

<400> SEQUENCE: 334
aaaaaagcaa gctacatatg aaagaaaacm ttcactatac atgcatttca caaaagacat    60

<210> SEQ ID NO 335

```
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs7591872, location, BP: 2:103112641

<400> SEQUENCE: 335
attttaaata attttagttc tcaataaggs tataaacagc tcaattgaaa ataagaaaaa      60

<210> SEQ ID NO 336
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs7591878, location, BP: 2:103112658

<400> SEQUENCE: 336
ttctcaataa gggtataaac agctcaattr aaaataagaa aaagatttga acagatacac      60

<210> SEQ ID NO 337
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs6543150, location, BP: 2:103113983

<400> SEQUENCE: 337
ctcaggtata aaaggaagg gaccactaay acctgcaaca acttgggcaa ctcaaaaaca       60

<210> SEQ ID NO 338
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs6543151, location, BP: 2:103114041

<400> SEQUENCE: 338
catcatgctg agttaaataa gcccgaaaar aggagttcat aatttattat tcaaactgta     60

<210> SEQ ID NO 339
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs6543152, location, BP: 2:103114043

<400> SEQUENCE: 339
tcatgctgag ttaaataagc ccgaaaaaar gagttcataa tttattattc aaactgtata     60

<210> SEQ ID NO 340
<211> LENGTH: 60
<212> TYPE: DNA
<213> ORGANISM: Artificial sequence
<220> FEATURE:
```

```
<223> OTHER INFORMATION: Description of sequence: single nucleotide
      polymorphism
<220> FEATURE:
<223> OTHER INFORMATION: name: rs6543153, location, BP: 2:103114203

<400> SEQUENCE: 340
gttcttggga tttttctata tcttgactay ggcgatggct ttatgagtat ctacaatgcc     60

<210> SEQ ID NO 341
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs6543154, location, BP: 2:103114334

<400> SEQUENCE: 341
atgtcagcac atttggaatt gactcttcay ctctgctgag ccctggtcga aggactaatg     60

<210> SEQ ID NO 342
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs6543155, location, BP: 2:103114895

<400> SEQUENCE: 342
gtagctacta ataatctaac aagctatgtr aaagagtttt agtttgtggc aacaatattc     60

<210> SEQ ID NO 343
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs7573566, location, BP: 2:103115205

<400> SEQUENCE: 343
agattctttt ggattcattc aaaatcatay gtcacatttt ttttcaaata ctcagcccag     60

<210> SEQ ID NO 344
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs11123934, location, BP: 2:103115568

<400> SEQUENCE: 344
ttattaagct catcaggaac ccacaggctr aaacacgtat ccaaggagtc ctttgccttc     60

<210> SEQ ID NO 345
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs12987295, location, BP: 2:103115838
```

<400> SEQUENCE: 345
ctaggaggga ttgtgggact tttgtggggr tttcccttag ctcttttgtt tctggacaat    60

<210> SEQ ID NO 346
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs4851012, location, BP: 2:103115915

<400> SEQUENCE: 346
tatattctta accaaattca gtttaagaty tctgcaagtc tttctctttt taagtaattc    60

<210> SEQ ID NO 347
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs4851599, location, BP: 2:103116020

<400> SEQUENCE: 347
gtctgtgtgt ctgttgcatg tgtctgttgy ttgtgtgtct gttgtgtgtg tctattgcat    60

<210> SEQ ID NO 348
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs4851013, location, BP: 2:103116135

<400> SEQUENCE: 348
ttcttcttca tcttccccag cttcctctcy tcccagaaaa tacactagaa acttatcttt    60

<210> SEQ ID NO 349
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs4851600, location, BP: 2:103116223

<400> SEQUENCE: 349
ttctgcccac attcccttat ctaaacatgs ttattggcta ctggttactt attacattga    60

<210> SEQ ID NO 350
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs4851014, location, BP: 2:103116276

<400> SEQUENCE: 350
acattgaaca gtgagcacta atttatacay tcaaaacctg catcctaggc tctcttaaga    60

<210> SEQ ID NO 351
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs4851602, location, BP: 2:103116305

<400> SEQUENCE: 351
ctcaaaacct gcatcctagg ctctcttaar aaacatgatt gaaccatttg gggaataagc    60

<210> SEQ ID NO 352
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs12995030, location, BP: 2:103116466

<400> SEQUENCE: 352
ggtcattttg tttataaaag ctgtactggs tggaatagtg tcccctcaaa aatccatgct    60

<210> SEQ ID NO 353
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs11682754, location, BP: 2:103117095

<400> SEQUENCE: 353
tcaagccatg cccctcactg ccagctcacr ttcccaagcc cagggccact ctgtatgatg    60

<210> SEQ ID NO 354
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs6728288, location, BP: 2:103117268

<400> SEQUENCE: 354
ggacagcctc cctcaaacaa acgtgaggcw ttctttagaa gggagagcaa ggagaaggcc    60

<210> SEQ ID NO 355
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs6741235, location, BP: 2:103117283

<400> SEQUENCE: 355
aacaaacgtg aggcattctt tagaagggar agcaaggaga aggcctttgt catcaatgca    60

<210> SEQ ID NO 356
<211> LENGTH: 60

<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs56249513, location, BP: 2:103117509

<400> SEQUENCE: 356
gcaatctcag ctcacggcaa cctcgcctcy cgggttcaag tgattctcct gcctcagtct    60

<210> SEQ ID NO 357
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs6741627, location, BP: 2:103117618

<400> SEQUENCE: 357 ttttttcaa gagatggagt ctcgctctgk cacccaggct ggagtacact ggtgtggtct    60

<210> SEQ ID NO 358
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs6713906, location, BP: 2:103117637

<400> SEQUENCE: 358
tctcgctctg gcacccaggc tggagtacas tggtgtggtc tcagcttact gcaacctcca    60

<210> SEQ ID NO 359
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs6543157, location, BP: 2:103117827

<400> SEQUENCE: 359
tcgaactcct gagctcaggc aatctgcccr cctcggcctc caaaagtgct aggattacag    60

<210> SEQ ID NO 360
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs7591101, location, BP: 2:103117910

<400> SEQUENCE: 360
tttagtagag atggggtttc accacgttgk caaggctggt ctcgaacttc tgaccttagg    60

<210> SEQ ID NO 361
<211> LENGTH: 60
<212> TYPE: DNA
<213> ORGANISM: Artificial sequence
<220> FEATURE:
<223> OTHER INFORMATION: Description of sequence: single nucleotide

```
            polymorphism
<220> FEATURE:
<223> OTHER INFORMATION: name: rs7568122, location, BP: 2:103117989

<400> SEQUENCE: 361
tcccaaagtg ctgggattac aggcatgagy caccacgccc agccaaaaac aacaatcttt    60

<210> SEQ ID NO 362
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs2075193, location, BP: 2:103118027

<400> SEQUENCE: 362
ccagccaaaa acaacaatct tttataatgr aggtgatgtt atagggaatc agcagaggtc    60

<210> SEQ ID NO 363
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs7593935, location, BP: 2:103118128

<400> SEQUENCE: 363
aggggctggg ggaggaatgg cttcctgcar gctgcagacc acagcaaggg gttggtgtgc    60

<210> SEQ ID NO 364
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs2075192, location, BP: 2:103118228

<400> SEQUENCE: 364
agccaaaccc agaacccaag ggctgtcagr ccacacccaa gatcagtggt gatactgatt    60

<210> SEQ ID NO 365
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs2075191, location, BP: 2:103118299

<400> SEQUENCE: 365
gagacactaa gtgtctccat aaggaagatk attcccatct tggagagatc agagtcaagc    60

<210> SEQ ID NO 366
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs2072509, location, BP: 2:103118337
```

```
<400> SEQUENCE: 366
cttggagaga tcagagtcaa gcagaaggcs tgggtgagcc tggcagggtg cagcatgagg    60

<210> SEQ ID NO 367
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs2072508, location, BP: 2:103118342

<400> SEQUENCE: 367
agagatcaga gtcaagcaga aggcgtgggy gagcctggca gggtgcagca tgagggccca    60

<210> SEQ ID NO 368
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs2075190, location, BP: 2:103118559

<400> SEQUENCE: 368 cattttcct ggtgtagata gatgctaagw ggcaagtact gtgatttcgc aggactcttc    60

<210> SEQ ID NO 369
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs2075189, location, BP: 2:103118689

<400> SEQUENCE: 369
acctgtacac ctgctgctgc ttttcaggas ctagatcata gttctgggct atggagtggc    60

<210> SEQ ID NO 370
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs11690932, location, BP: 2:103119029

<400> SEQUENCE: 370
ggagggcccc caaggaagga cacgcttggr aggggttcac cttttactgg agaaggtgtg    60

<210> SEQ ID NO 371
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs2075188, location, BP: 2:103120232

<400> SEQUENCE: 371
gaaagaaagt ttagaaccac atcacatgar ccaggcatct gggaaagaca taaccaatga    60
```

<210> SEQ ID NO 372
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs2075187, location, BP: 2:103120311

<400> SEQUENCE: 372
tgcagattta ggatcttcta aactttttatr aaacctgatt cgggttcttt gtcaaaccaa    60

<210> SEQ ID NO 373
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs4851015, location, BP: 2:103120356

<400> SEQUENCE: 373
tctttgtcaa accaacgttc tctccaatgy ctgccttcat cttcttgtga tttgcctgag    60

<210> SEQ ID NO 374
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs4851016, location, BP: 2:103120400

<400> SEQUENCE: 374
ttgtgatttg cctgaggagg aaagcatagy aattatcacg tcaatttaga aggctcagga    60

<210> SEQ ID NO 375
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs4851017, location, BP: 2:103120769

<400> SEQUENCE: 375
tgacctcgtg atctgcccgc cttggcctcm caaagtggaa aagttaattt taaagttgaa    60

<210> SEQ ID NO 376
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs4851605, location, BP: 2:103120868

<400> SEQUENCE: 376
cttctgctgt gccccctcaaa ccacatcacr cagccatggc tcttcagtgt gtgatgaaac    60

<210> SEQ ID NO 377
<211> LENGTH: 60
<212> TYPE: DNA

```
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs4851606, location, BP: 2:103120889

<400> SEQUENCE: 377
cacatcacac agccatggct cttcagtgtr tgatgaaact agacagatgg gataagacta    60

<210> SEQ ID NO 378
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs13019784, location, BP: 2:103123301

<400> SEQUENCE: 378
gttaatcctt catgatccag ctcaaccccr tactcttaca gttgaggaaa ctgatggaaa    60

<210> SEQ ID NO 379
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs9989842, location, BP: 2:103123633

<400> SEQUENCE: 379
aagaacctcg ctcaaggtca catgactggs atggagagga accaggacaa acacaacaat    60

<210> SEQ ID NO 380
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs9989749, location, BP: 2:103123642

<400> SEQUENCE: 380
gctcaaggtc acatgactgg catggagagr aaccaggaca aacacaacaa tattttaaaa    60

<210> SEQ ID NO 381
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs6708949, location, BP: 2:103123965

<400> SEQUENCE: 381
ctaaaccttc tgtttgagaa gctcactgas agtaagaagc gcccactcac cccccaaccc    60

<210> SEQ ID NO 382
<211> LENGTH: 60
<212> TYPE: DNA
<213> ORGANISM: Artificial sequence
<220> FEATURE:
<223> OTHER INFORMATION: Description of sequence: single nucleotide
      polymorphism
```

<220> FEATURE:
<223> OTHER INFORMATION: name: rs6724109, location, BP: 2:103125018

<400> SEQUENCE: 382
ttctgaaaat gagattccaa ttagtactas gtagcacaag tttttgtttt agttggagtt    60

<210> SEQ ID NO 383
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs6751949, location, BP: 2:103125138

<400> SEQUENCE: 383
atacaggcat gatatctatt tttattgcar tacttaaagg aatggaaaac tgaaatgaac    60

<210> SEQ ID NO 384
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs6724322, location, BP: 2:103125182

<400> SEQUENCE: 384
gaaaactgaa atgaacattg cagcatttay tctgtaatag ctagtacaaa aacatataga    60

<210> SEQ ID NO 385
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs6739301, location, BP: 2:103125457

<400> SEQUENCE: 385
aagacatttc ccctttgtca ccatgagacr tgtgcacgtg tcactagact tcctctttcc    60

<210> SEQ ID NO 386
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs6742381, location, BP: 2:103125466

<400> SEQUENCE: 386
cccctttgtc accatgagac atgtgcacgy gtcactagac ttcctctttc cttccccact    60

<210> SEQ ID NO 387
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs4851607, location, BP: 2:103125632

<400> SEQUENCE: 387
aagttcaaaa tccagttgtt gcagggctgy gctcctttct ggaggccctg gggagaatct    60

<210> SEQ ID NO 388
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs10195948, location, BP: 2:103125736

<400> SEQUENCE: 388
ggcccatggc ccttccatc ttcagagccy gcaaaggctg catccctcca acaatgatcc    60

<210> SEQ ID NO 389
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs4851608, location, BP: 2:103125984

<400> SEQUENCE: 389
aggtcattgt tctccctacc acagtctgcy gtctgtctcc caaagattca tatctgttcc    60

<210> SEQ ID NO 390
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs10210680, location, BP: 2:103127682

<400> SEQUENCE: 390
gttcatggtc aaagtgacct aggaaatttr gttatttaaa ttccaggaaa tcctaatgaa    60

<210> SEQ ID NO 391
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs12712155, location, BP: 2:103127963

<400> SEQUENCE: 391
attatttaat aattaattta atatttcaaw ctattttca aaacaaaatt cagaagccag    60

<210> SEQ ID NO 392
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs4851609, location, BP: 2:103128866

<400> SEQUENCE: 392
agtgctcctg agccatcccc tacaggaagy ggttgaaatt ccagggcatg ctaagcctgg    60

-continued

```
<210> SEQ ID NO 393
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs11676371, location, BP: 2:103129692

<400> SEQUENCE: 393
ataagaggag gcctggtctg agccgagcts ggacagcaaa gctcaggaag ccagcccta      60

<210> SEQ ID NO 394
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs1476999, location, BP: 2:103131679

<400> SEQUENCE: 394
ttatgtcttc acatttaaaa aggaagttgr aagaagagct aagaataggt agcaataaat     60

<210> SEQ ID NO 395
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs2192758, location, BP: 2:103132269

<400> SEQUENCE: 395
tgtctgttaa gacacctcct atgtgccags caccttgaag cagacacagg ccttgccctc     60

<210> SEQ ID NO 396
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs2192757, location, BP: 2:103132378

<400> SEQUENCE: 396
caaacataat cataaagaat agagagctay gcaagtctat gagaggtgca cctcacctgg     60

<210> SEQ ID NO 397
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs2216000, location, BP: 2:103132640

<400> SEQUENCE: 397
gcaatcttta aaccagtttt atttggagts ggggcctgcc ggttaagtca attatttctt     60

<210> SEQ ID NO 398
<211> LENGTH: 60
<212> TYPE: DNA
<213> ORGANISM: Artificial sequence
```

<220> FEATURE:
<223> OTHER INFORMATION: Description of sequence: single nucleotide
      polymorphism
<220> FEATURE:
<223> OTHER INFORMATION: name: rs6714379, location, BP: 2:103133310

<400> SEQUENCE: 398
taaaagtgtt gaagccttac acatttttr attaaagtga tattaaaata taaaatattt    60

<210> SEQ ID NO 399
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs1916307, location, BP: 2:103134180

<400> SEQUENCE: 399
cacatacacc ccaaaactat gtacaactay tatgtatcaa tataaaagat aagtaagaag    60

<210> SEQ ID NO 400
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs4851610, location, BP: 2:103134652

<400> SEQUENCE: 400
tgaatggatt ttaactaagt tcgtccccs caaagtggtc agttataaac tgggaagagt    60

<210> SEQ ID NO 401
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs1523204, location, BP: 2:103135637

<400> SEQUENCE: 401
tttttaatcc ctttcagagg tgggaagggr tcacagtgta taatatctta gagctgggct    60

<210> SEQ ID NO 402
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs1523203, location, BP: 2:103135759

<400> SEQUENCE: 402
tttcttaacc aaagataaaa tccctacagr tacaattcca atataaatgt actcatgaaa    60

<210> SEQ ID NO 403
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:

```
<223> OTHER INFORMATION: name: rs4851611, location, BP: 2:103135938

<400> SEQUENCE: 403
ctttgaatga atcatttttt ttctgttgcw tttaacggta aaatatttgg attgcatggt    60

<210> SEQ ID NO 404
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs1403550, location, BP: 2:103136309

<400> SEQUENCE: 404
aagaataatg tttgtctctt ctccaataay gattccaggg cccagaggat acaaggaatc    60

<210> SEQ ID NO 405
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs1403551, location, BP: 2:103136446

<400> SEQUENCE: 405
gtgtatgagc cacctgtgtt gtccccattk tctgtccttg aaaacagtct ctgaaggggg    60

<210> SEQ ID NO 406
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs2058657, location, BP: 2:103137015

<400> SEQUENCE: 406
aactttgact tagttaaata atattccaty taattagtca tctaacgaag tcatataatg    60

<210> SEQ ID NO 407
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs2058656, location, BP: 2:103137026

<400> SEQUENCE: 407
agttaaataa tattccattt aattagtcak ctaacgaagt catataatga caagtttttt    60

<210> SEQ ID NO 408
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs4851612, location, BP: 2:103137880

<400> SEQUENCE: 408
```
attgccctcg aattaaagca caaaggccts tttccattta ataagtttat tgctgatgac    60

<210> SEQ ID NO 409
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs4851613, location, BP: 2:103137990

<400> SEQUENCE: 409
agcctatgag gtggctttt gactctgcty tgcttactcc gtaagtcaaa ctcaccagtc    60

<210> SEQ ID NO 410
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs6750851, location, BP: 2:103138761

<400> SEQUENCE: 410
agcaaatagt taatacacat ctagaatgcr ccgggcatca ggaacactgc actgaaaaag    60

<210> SEQ ID NO 411
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs6750971, location, BP: 2:103138825

<400> SEQUENCE: 411
agttcattct cctttaaggc tcaaggtccr gtgggaaatg caagctccac tataacacag    60

<210> SEQ ID NO 412
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs10193407, location, BP: 2:103139298

<400> SEQUENCE: 412
tatttcaaaa tgtcttcaaa attcaactty ttggggcaaa ttcttgtcag atctgttaat    60

<210> SEQ ID NO 413
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs11123935, location, BP: 2:103139751

<400> SEQUENCE: 413
cttggcagtc cagtttacac cttctttacr acactatttt tatacaatta tctattttgt    60

<210> SEQ ID NO 414

<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs4851614, location, BP: 2:103140398

<400> SEQUENCE: 414
tcatctcagt acactgaacc tttcccatcy aagactggat gaagtgcctt ttgcctgtac    60

<210> SEQ ID NO 415
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs1357471, location, BP: 2:103140472

<400> SEQUENCE: 415
tgatcccaga atcttatcac ttagctgcay gcatagcatc ttatccctat tgatttgact    60

<210> SEQ ID NO 416
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs2015478, location, BP: 2:103141447

<400> SEQUENCE: 416
ggcttccttg gctgaaagtt gtatggaggr gtccttacgt atttgacatt ccattttctc    60

<210> SEQ ID NO 417
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs1024798, location, BP: 2:103141651

<400> SEQUENCE: 417
ggggctgggg actgggacat tccttcagts tgcaagtgtt tgtcatctgc tgagcctgtt    60

<210> SEQ ID NO 418
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs6712638, location, BP: 2:103142491

<400> SEQUENCE: 418
tcagcctcct gagtagctgg gattacaggy gcccgtctcc acgccctgct aattttgta    60

<210> SEQ ID NO 419
<211> LENGTH: 60
<212> TYPE: DNA
<213> ORGANISM: Artificial sequence
<220> FEATURE:

```
<223> OTHER INFORMATION: Description of sequence: single nucleotide
      polymorphism
<220> FEATURE:
<223> OTHER INFORMATION: name: rs4241211, location, BP: 2:103143159

<400> SEQUENCE: 419
gatctcatct tgaagaaatg tgaaaggagk gtttcattga agttctaata ttcacccact      60

<210> SEQ ID NO 420
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs12712156, location, BP: 2:103144020

<400> SEQUENCE: 420
ggctctggac cacttgtgat tggtattttm acaaataagc aattactccc ttagtatatt      60

<210> SEQ ID NO 421
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs3849364, location, BP: 2:103144242

<400> SEQUENCE: 421
agtaatctgt gatatcgtag cataaaatty atatgtcaga tttaattttc atatgaatct      60

<210> SEQ ID NO 422
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs3849365, location, BP: 2:103144391

<400> SEQUENCE: 422 tttttgttt tgtttttttc tatttggttr ttgattttct tgagatgaat ttgaagaacc      60

<210> SEQ ID NO 423
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs3849366, location, BP: 2:103144900

<400> SEQUENCE: 423
tttttaattt aaattttttt agaaaaaaaw cttaaaaagg dacagggtct ccctatgttg      60

<210> SEQ ID NO 424
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs6739236, location, BP: 2:103144944
```

<400> SEQUENCE: 424
gggtctccct atgttgccca ggctgatcts taactcccgg gcacaaggga tcctcctgcc    60

<210> SEQ ID NO 425
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs6712696, location, BP: 2:103145001

<400> SEQUENCE: 425
gcctcgcctc ctaacatgct aggattatar gtgtgagcca ccatgcctgg acgacagtta    60

<210> SEQ ID NO 426
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs1005042, location, BP: 2:103145359

<400> SEQUENCE: 426
gaagaaatag acaggatata tatgaaggar aaataaaatt ctacttctcc acactgtcat    60

<210> SEQ ID NO 427
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs1005043, location, BP: 2:103145426

<400> SEQUENCE: 427
ctataaagag gatgatattg gttccctccr tatgcaattg tattgtcctg atgtgaagcc    60

<210> SEQ ID NO 428
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs4851018, location, BP: 2:103146615

<400> SEQUENCE: 428
aaaatgtgga ggtggggagt gttgcactcy gagtctgggt gtctgaacag tgtatcctgc    60

<210> SEQ ID NO 429
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs4851615, location, BP: 2:103146999

<400> SEQUENCE: 429
tcacataccc atgcctcttc ctagagcttk gagtccactg taaaataacc cagagggtga    60

<210> SEQ ID NO 430
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs1003431, location, BP: 2:103147256

<400> SEQUENCE: 430
aaaaatggac agatatatag atatattaay taatgttttc tttattgaaa gaagttggtc    60

<210> SEQ ID NO 431
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs4241212, location, BP: 2:103147671

<400> SEQUENCE: 431
ctcccgagta gctgggacta caggtgcccr ccaccacgcc cagctaattt tttctagaaa    60

<210> SEQ ID NO 432
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs741285, location, BP: 2:103148169

<400> SEQUENCE: 432
tgatatattt aaaaggatta gcacagtgay aggcatatag taaattatca ggaaagggaa    60

<210> SEQ ID NO 433
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs1014286, location, BP: 2:103149100

<400> SEQUENCE: 433
ggtcgaggtg gacagctgac catggacacr gcagggacca tcacaggtcc catagtcctt    60

<210> SEQ ID NO 434
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs2008159, location, BP: 2:103149162

<400> SEQUENCE: 434
ctccaaaaaa aatagtgtta ttgtccacar gattgttttg gtgtttctca agagtctgtc    60

<210> SEQ ID NO 435
<211> LENGTH: 60

-continued

```
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs2008157, location, BP: 2:103149182

<400> SEQUENCE: 435
ttgtccacaa gattgttttg gtgtttctcr agagtctgtc ttcctataac tgtgaaagga      60

<210> SEQ ID NO 436
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs1829849, location, BP: 2:103149698

<400> SEQUENCE: 436
tatgcaataa ttatgttcta tcagagatam aatttgttat gaatttgctt tatttaatca      60

<210> SEQ ID NO 437
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs10179779, location, BP: 2:103150204

<400> SEQUENCE: 437
tcccacctat gagtgagaat atgcggtgtk tggtttttttg ttcttgggat agtttactga     60

<210> SEQ ID NO 438
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs10179874, location, BP: 2:103150306

<400> SEQUENCE: 438
tgaactcatc attttttatg gctgcatggy attccatggt gtatatgtgc cacattttct      60

<210> SEQ ID NO 439
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs10177737, location, BP: 2:103150651

<400> SEQUENCE: 439
ctgacttttt aatgattgcc taaaaccatm aaaaccctag aagaaaacct aggcattacc      60

<210> SEQ ID NO 440
<211> LENGTH: 60
<212> TYPE: DNA
<213> ORGANISM: Artificial sequence
<220> FEATURE:
<223> OTHER INFORMATION: Description of sequence: single nucleotide
```

```
          polymorphism
<220> FEATURE:
<223> OTHER INFORMATION: name: rs12468713, location, BP: 2:103150691

<400> SEQUENCE: 440
aagaaaacct aggcattacc attcaggacw taggcatggg caaggacttc atgtctaaaa      60

<210> SEQ ID NO 441
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs6737119, location, BP: 2:103151109

<400> SEQUENCE: 441
tagaatggtg atcattaaaa ctatttttcr atttcatttt ccatccccat ctccccaaat      60

<210> SEQ ID NO 442
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs6709284, location, BP: 2:103151164

<400> SEQUENCE: 442
caaatttgac cttgaatctc aaattccags tcttcaattt tactagatca ctttatcttt      60

<210> SEQ ID NO 443
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs6724213, location, BP: 2:103151219

<400> SEQUENCE: 443
tctttcctcg cttttgtct tctcttccam cttccctttc ttcttctggc caccagtagg      60

<210> SEQ ID NO 444
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs2177317, location, BP: 2:103151319

<400> SEQUENCE: 444
tgcaactaac caaatacect tttgccatcr ctggcatctg taccatcctc agctgattta      60

<210> SEQ ID NO 445
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs2871474, location, BP: 2:103151441
```

<400> SEQUENCE: 445
tctcccttgg tgcccccaca ccccttcggr tatgctatgt accttatctg tgaattatgt    60

<210> SEQ ID NO 446
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs4851616, location, BP: 2:103151862

<400> SEQUENCE: 446
ccatgggtgc tagttactga ctaaagacay gtgttttctc ctgaatgtat cttttttta    60

<210> SEQ ID NO 447
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs4851617, location, BP: 2:103152060

<400> SEQUENCE: 447
atcaaataac agcaatcagc ctaaagggay agaagcacac ataaaactca ggaatctttg    60

<210> SEQ ID NO 448
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs7578425, location, BP: 2:103152216

<400> SEQUENCE: 448
atctctgctc actgcaaccc ctgcctcccr ggttccagca attcctgc ctcaacctcc    60

<210> SEQ ID NO 449
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs10172553, location, BP: 2:103152975

<400> SEQUENCE: 449
tggctctgtc agacatggag agcgcacggy caaaatggcc tctgtatttc atcatccact    60

<210> SEQ ID NO 450
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs4292112, location, BP: 2:103153780

<400> SEQUENCE: 450
tctactgtgc ttctctgaaa aagttgaagr gtcatgggag gcagagctgg aattactacc    60

<210> SEQ ID NO 451
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs6761291, location, BP: 2:103155069

<400> SEQUENCE: 451
agaacacttc ctttcaggac atcagtcacy gttaattgct aatggggcca taagctaagg     60

<210> SEQ ID NO 452
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs7576376, location, BP: 2:103156205

<400> SEQUENCE: 452
gtggtgcgat cttggctcac tgcaagctcy gcctcccggg ttcacgccat tctcctgcct     60

<210> SEQ ID NO 453
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs6543158, location, BP: 2:103157352

<400> SEQUENCE: 453
gggtcgtgta gatgaggttt cggggagggs gggtggtggg aggatatcac taaagttcta     60

<210> SEQ ID NO 454
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs11685483, location, BP: 2:103159093

<400> SEQUENCE: 454
gggtggtgtt tcttgctaaa ctgacttagm agggttcttt tctaaaacag attttataag     60

<210> SEQ ID NO 455
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs6543159, location, BP: 2:103160057

<400> SEQUENCE: 455
gctgtctaaa atcaactgaa aagtttttcy tttttgttgt tcagattgtt tgttttgatg     60

<210> SEQ ID NO 456
<211> LENGTH: 60
<212> TYPE: DNA

```
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs6739426, location, BP: 2:103160443

<400> SEQUENCE: 456
ctctgagatc ttccttgaat gagagttctr tgtgtacctc atggccctgt tgggattagg    60

<210> SEQ ID NO 457
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs10490202, location, BP: 2:103160832

<400> SEQUENCE: 457
gtttcaacaa aagcatgtag gctggtgacs tatctgagta ctcatagatc cagctatctg    60

<210> SEQ ID NO 458
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs11899041, location, BP: 2:103161053

<400> SEQUENCE: 458
tggttattat ttcttttgtg gttgttgggw ttaaagaaac actttctaat atgggaaatt    60

<210> SEQ ID NO 459
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs1811263, location, BP: 2:103162861

<400> SEQUENCE: 459
tcacgcctgt aatcccagca ctttgggagk ccgaggtggg cggatcacaa ggtcatgaga    60

<210> SEQ ID NO 460
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs1811262, location, BP: 2:103162992

<400> SEQUENCE: 460
ggcgggcacc tgtagtccca gctactcggs aggctgaggc aggagaatgg cgtgaacctg    60

<210> SEQ ID NO 461
<211> LENGTH: 60
<212> TYPE: DNA
<213> ORGANISM: Artificial sequence
<220> FEATURE:
<223> OTHER INFORMATION: Description of sequence: single nucleotide
      polymorphism
```

```
<220> FEATURE:
<223> OTHER INFORMATION: name: rs12712157, location, BP: 2:103165129

<400> SEQUENCE: 461
ttggctatga tagtgacaag agccaattty gcttctatcc tttattcctg gacctatgta      60

<210> SEQ ID NO 462
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs10194822, location, BP: 2:103165504

<400> SEQUENCE: 462
caaagacttt aaatcagctg ttagaaatak gctcaaaaag taaagaaaac taagcctaaa      60

<210> SEQ ID NO 463
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs1303960, location, BP: 2:103165832

<400> SEQUENCE: 463
acataccaat atatgcataa tgggaaaccr aggaaaggag agagaaaaat aatatgaata      60

<210> SEQ ID NO 464
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs2215998, location, BP: 2:103166043

<400> SEQUENCE: 464
aacaacaggg aaaaaatgac ccattgtagr catgggagcc ttggtaagat taacagatga      60

<210> SEQ ID NO 465
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs12712158, location, BP: 2:103166298

<400> SEQUENCE: 465
agcttggcgt ggtggcgcac gcctgtaaty ccagctactc aggaggctga ggcaggggaa      60

<210> SEQ ID NO 466
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs723293, location, BP: 2:103166534

<400> SEQUENCE: 466
```

```
agataaacaa aactggaaaa attcatcaty agtaaacctg ccatacaaga aatgttaata      60
```

<210> SEQ ID NO 467
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs7581853, location, BP: 2:103167724

<400> SEQUENCE: 467

```
gtgagatgaa ggaagagtct ggagtgatay ggccatgagc tatggaatgc cagagacctg      60
```

<210> SEQ ID NO 468
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs6753722, location, BP: 2:103168605

<400> SEQUENCE: 468

```
gtctcgctct gtcgcccagg ctggagtgcw gtggcacaat cttggctcac tgcaacctcc      60
```

<210> SEQ ID NO 469
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs10193009, location, BP: 2:103168977

<400> SEQUENCE: 469

```
tccataatca gacagtctcc aaagaaacay agctacatgt caaaagaaaa cctagaagaa      60
```

<210> SEQ ID NO 470
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs11123937, location, BP: 2:103169682

<400> SEQUENCE: 470

```
ccagcacatg ctggagtgag tggttcaagr catgattcca tacaaaataa cctatactaa      60
```

<210> SEQ ID NO 471
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs12712159, location, BP: 2:103169982

<400> SEQUENCE: 471

```
tatgaaaatt tcatcttcct cttgctcctr tctacctcct acaagatgaa cacaatcaga      60
```

-continued

```
<210> SEQ ID NO 472
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs10196579, location, BP: 2:103170181

<400> SEQUENCE: 472
tgactgatgg tgaagatgtt cttacacaay ggagacaggg aagaatatgg ctgtccccca    60

<210> SEQ ID NO 473
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs997056, location, BP: 2:103170919

<400> SEQUENCE: 473
ttgctctaaa tcctttccct tagagcttcr taagtgttgc taacatcatt ctcaaataaa    60

<210> SEQ ID NO 474
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs2310295, location, BP: 2:103171066

<400> SEQUENCE: 474
aaattaatat aactcctggc acttagcagr cagctattga actagaaaat gtgtttctcc    60

<210> SEQ ID NO 475
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs2110737, location, BP: 2:103172263

<400> SEQUENCE: 475
cttgagttct gttctgtaaa tttgactacw agggctttat tttatcatcc cataggacat    60

<210> SEQ ID NO 476
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs2005881, location, BP: 2:103173059

<400> SEQUENCE: 476
catagggttt gttatatggc tgaagtagcr ggactacttg aaatattgcc tggagctgct    60

<210> SEQ ID NO 477
<211> LENGTH: 60
<212> TYPE: DNA
<213> ORGANISM: Artificial sequence
```

```
<220> FEATURE:
<223> OTHER INFORMATION: Description of sequence: single nucleotide
      polymorphism
<220> FEATURE:
<223> OTHER INFORMATION: name: rs1989184, location, BP: 2:103174935

<400> SEQUENCE: 477
tgagctgaga ttgcaccatt gcactccags ctggcaacag agcaagactc cgtctcaaaa    60

<210> SEQ ID NO 478
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs10171438, location, BP: 2:103175376

<400> SEQUENCE: 478
tgacccagta aaacccattt cagactttgr atttctagaa ctgtaagata attaatttgt    60

<210> SEQ ID NO 479
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs10210658, location, BP: 2:103175749

<400> SEQUENCE: 479
atcccagtat atgaccagta tatgaaaatk taataactac acaataacag cataccacag    60

<210> SEQ ID NO 480
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs4851619, location, BP: 2:103176411

<400> SEQUENCE: 480
atctctgaaa tctctgaaag tagcaccgay ttgtgtgatt cccctaggaa tgtggtaata    60

<210> SEQ ID NO 481
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs6761871, location, BP: 2:103176797

<400> SEQUENCE: 481
tggacacaat tatatgtaaa atatctgcam taactctggg aaatattggg taggaagctt    60

<210> SEQ ID NO 482
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
```

<223> OTHER INFORMATION: name: rs10202404, location, BP: 2:103177414

<400> SEQUENCE: 482
ttcactacat ttttcatgtc tttggaatcy tcttatatgt taccaatgag tttctggcct    60

<210> SEQ ID NO 483
<211> LENGTH: 60
<212> TYPE: DNA
<213> ORGANISM: Artificial sequence
<220> FEATURE:
<223> OTHER INFORMATION: Description of sequence: single nucleotide
    polymorphism
<220> FEATURE:
<223> OTHER INFORMATION: name: rs4851019, location, BP: 2:103177565

<400> SEQUENCE: 483
attaaatctg aaatgtctgg taagtgcatw ggtatcaaag tcatcttgat ctaaaattgt    60

<210> SEQ ID NO 484
<211> LENGTH: 60
<212> TYPE: DNA
<213> ORGANISM: Artificial sequence
<220> FEATURE:
<223> OTHER INFORMATION: Description of sequence: single nucleotide
    polymorphism
<220> FEATURE:
<223> OTHER INFORMATION: name: rs12469973, location, BP: 2:103182273

<400> SEQUENCE: 484
gcatgtagtt tccataaaaa atatccactr gagtcttgat tagtattgtt gtgaatctgt    60

<210> SEQ ID NO 485
<211> LENGTH: 60
<212> TYPE: DNA
<213> ORGANISM: Artificial sequence
<220> FEATURE:
<223> OTHER INFORMATION: Description of sequence: single nucleotide
    polymorphism
<220> FEATURE:
<223> OTHER INFORMATION: name: rs11123938, location, BP: 2:103188785

<400> SEQUENCE: 485
aaatgcagaa atcacctgtc ttctgcgtcr ctcacgctgg gagctgtaga ccggagctgt    60

<210> SEQ ID NO 486
<211> LENGTH: 60
<212> TYPE: DNA
<213> ORGANISM: Artificial sequence
<220> FEATURE:
<223> OTHER INFORMATION: Description of sequence: single nucleotide
    polymorphism
<220> FEATURE:
<223> OTHER INFORMATION: name: rs1861229, location, BP: 2:103208610

<400> SEQUENCE: 486
tgtgggagct ttagaagata ttgatggctr cctgtacccc cacttccttc aggactctga    60

<210> SEQ ID NO 487
<211> LENGTH: 60
<212> TYPE: DNA
<213> ORGANISM: Artificial sequence
<220> FEATURE:
<223> OTHER INFORMATION: Description of sequence: single nucleotide
    polymorphism
<220> FEATURE:
<223> OTHER INFORMATION: name: rs11677922, location, BP: 2:103273676

<400> SEQUENCE: 487
agagcaagac tccatctcaa aaaaaaaaaw aataataata ataataaaat tgtgttattc    60

<210> SEQ ID NO 488
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs12052753, location, BP: 2:103287966

<400> SEQUENCE: 488
aaaaagcttg tgattatctt ttcttttctm ttgtataact ttgcctgaac tgtagggtaa    60

<210> SEQ ID NO 489
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs199977663, location, BP: 2:137575582

<400> SEQUENCE: 489
gtgtggcgat tcctcaggga tctagaactr gaaataccat ttgacccagc catcccatta    60

<210> SEQ ID NO 490
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs2141304, location, BP: 4:11286652

<400> SEQUENCE: 490
tattcagggc aactcctgtt tttaaaaccr tcagatctca tgagaccgat tcactatcac    60

<210> SEQ ID NO 491
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs10805282, location, BP: 4:11291091

<400> SEQUENCE: 491
ttcacaggaa tcttctcttt agcttcctck atacctgtgt ctaaagatag cttccaagct    60

<210> SEQ ID NO 492
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs10805283, location, BP: 4:11291169

<400> SEQUENCE: 492
ctgtaatccc aaagctttgg gaggctaagk aaggaggatt gcttgaggcc aggagttcaa    60

<210> SEQ ID NO 493

```
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs13128031, location, BP: 4:11291539

<400> SEQUENCE: 493
cagtctctgg taacaggaca gctgcactcy tggggccaag ccccaggcag cgctgcccac    60

<210> SEQ ID NO 494
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs4103380, location, BP: 4:96370605

<400> SEQUENCE: 494
ttgttataat gaatattgac ttcctgtaas gtgtatggtg gtatgcagca tccacatctc    60

<210> SEQ ID NO 495
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs7705676, location, BP: 5:35237736

<400> SEQUENCE: 495
catcaaactc aaatgctttc atggtaaacy tgattacatt agtccctgaa ttaaaatttt    60

<210> SEQ ID NO 496
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs7727503, location, BP: 5:35238047

<400> SEQUENCE: 496
tgtcatgtag cacttgcaaa tgggtttatr atacatctgc tttgttctac ctccaaaggt    60

<210> SEQ ID NO 497
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs7710279, location, BP: 5:35238245

<400> SEQUENCE: 497
agcttttatg agcatgggaa tgggaatcay ttgctccatg ggaagatgct aagagagctg    60

<210> SEQ ID NO 498
<211> LENGTH: 60
<212> TYPE: DNA
<213> ORGANISM: Artificial sequence
<220> FEATURE:
```

<223> OTHER INFORMATION: Description of sequence: single nucleotide
      polymorphism
<220> FEATURE:
<223> OTHER INFORMATION: name: rs10472952, location, BP: 5:35238365

<400> SEQUENCE: 498
gaatcaaatg cagcagttgt tagtctctay aatagctgca tagatgtctt cgggctactg    60

<210> SEQ ID NO 499
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs9292581, location, BP: 5:35238779

<400> SEQUENCE: 499 tatatttaa caagatccct aggtagttcm tacgtacatt aaattttgaa gagttatttt    60

<210> SEQ ID NO 500
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs4703514, location, BP: 5:35239028

<400> SEQUENCE: 500
tacacagcca taaaaacccc aaatcatgtm cttggcagta agatggatgc agctggaggc    60

<210> SEQ ID NO 501
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs13361375, location, BP: 5:35239203

<400> SEQUENCE: 501
tgaggaattc tagaagggaa gggaaggags ggggcaagga ctgaaaacta cctattcggt    60

<210> SEQ ID NO 502
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs191531802, location, BP: 5:156401928

<400> SEQUENCE: 502
aagaaagaaa gagagaaaga aagaaggaar gaaagaaaga aagaaagaaa gaaagaaaga    60

<210> SEQ ID NO 503
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs117979984, location, BP: 5:156450845

<400> SEQUENCE: 503
ctatattttg gagactccag gtaattttay ttagcctcag aagtgacagt gcaaagctgg    60

<210> SEQ ID NO 504
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs138665140, location, BP: 5:156457158

<400> SEQUENCE: 504
atacaaaaat ggaaaatcta aaaatacagr gctctgacat caaactaagt ggctgaatca    60

<210> SEQ ID NO 505
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs2300619, location, BP: 6:146685324

<400> SEQUENCE: 505
gtgtgtcaca ttgtgactgt atttcctttty acctctagct atttatttt gtttttaggg    60

<210> SEQ ID NO 506
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs1229502, location, BP: 7:81588636

<400> SEQUENCE: 506
aagcagacat caggcccttt tcggtatctr ggttgcttaa ccatgtcaca aggatttgga    60

<210> SEQ ID NO 507
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs17288506, location, BP: 7:106147658

<400> SEQUENCE: 507
agtaatgtgg tggtgcccct ggtcaatgtm aggtaagcct tagttcttcc tattgcccag    60

<210> SEQ ID NO 508
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs13229385, location, BP: 7:106150256

<400> SEQUENCE: 508
ggacaagaga tgattccagg catagggaas agcataagca aaggtgcaga ggcacggagt    60

```
<210> SEQ ID NO 509
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs9886235, location, BP: 7:106156253

<400> SEQUENCE: 509
tgaaagggag ctggagggaa aagttgaaas acacactgaa ctaaagatca taggtgggat    60

<210> SEQ ID NO 510
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs13238247, location, BP: 7:106160902

<400> SEQUENCE: 510
gatgtattct gagccctaaa caacttatay acagacttcc agaataaagc ctgcttctaa    60

<210> SEQ ID NO 511
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs10279909, location, BP: 7:106162503

<400> SEQUENCE: 511
agagtagatc tcatgttaag tattcttack aaagtaaaat aaaataaatt ttagggaaaa    60

<210> SEQ ID NO 512
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs17837506, location, BP: 7:106162983

<400> SEQUENCE: 512
ccttaagaat tatgaaaaag gttcacagcr gcgtcgatta tacaaatgat gctttatctg    60

<210> SEQ ID NO 513
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs13222141, location, BP: 7:106163550

<400> SEQUENCE: 513
acaaatagag gcaccctgct gagacaccaw gttaaattga aaatatttga tataaatggt    60

<210> SEQ ID NO 514
<211> LENGTH: 60
```

```
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs6587006, location, BP: 8:21616063

<400> SEQUENCE: 514
accctgggtc cctgaaccaa gatgtggagy tctactactt aaacaggggt taaagaacgt    60

<210> SEQ ID NO 515
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs7047059, location, BP: 9:71876805

<400> SEQUENCE: 515
ggcagcacga gagagatgta aacagaagcw ctctagctga gtccagccta gatcagccaa    60

<210> SEQ ID NO 516
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs10283781, location, BP: 9:71883053

<400> SEQUENCE: 516
ttacccacag ctacagttta tgaggctggr gagcaaatac caacatttag ggagcagaat    60

<210> SEQ ID NO 517
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs10867298, location, BP: 9:71903717

<400> SEQUENCE: 517
ccagccgcca tccaagagct caccaagagy cacttcacta gaacaaaaga tatgcctatc    60

<210> SEQ ID NO 518
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs10867299, location, BP: 9:71903721

<400> SEQUENCE: 518
ccgccatcca agagctcacc aagagccacy tcactagaac aaaagatatg cctatcaccc    60

<210> SEQ ID NO 519
<211> LENGTH: 60
<212> TYPE: DNA
<213> ORGANISM: Artificial sequence
<220> FEATURE:
<223> OTHER INFORMATION: Description of sequence: single nucleotide
```

```
                               polymorphism
<220> FEATURE:
<223> OTHER INFORMATION: name: rs57491316, location, BP: 9:71903965

<400> SEQUENCE: 519
actagaaaat aagaattaat agagaagaty aacaatccta aaggtgttac tttgacacaa    60

<210> SEQ ID NO 520
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs56795581, location, BP: 9:71904249

<400> SEQUENCE: 520
ttctgatttt tagttagatg catggtgatr tggtttggct ctgtgtcccc acccaaatct    60

<210> SEQ ID NO 521
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs11137952, location, BP: 9:71905304

<400> SEQUENCE: 521
tagattcaat gccatcccta tcaagctacm aatgactttc ttcacagaat tggaaaaaac    60

<210> SEQ ID NO 522
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs201118747, location, BP: 9:71905591

<400> SEQUENCE: 522
aacctgacaa aaacaagcaa tggggaaags attccctatt taataaatgg tgctgggaaa    60

<210> SEQ ID NO 523
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs199851061, location, BP: 9:71905605

<400> SEQUENCE: 523
aagcaatggg gaaagcattc cctatttaay aaatggtgct gggaaaactg gctagccata    60

<210> SEQ ID NO 524
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs138313346, location, BP: 9:71906042
```

```
<400> SEQUENCE: 524
tcaaaaagtg ggcaaaggat atgaatagay acttctcaaa agaaaacatt tatgcagcca    60

<210> SEQ ID NO 525
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs11137959, location, BP: 9:71906974

<400> SEQUENCE: 525
aattatccag tctcaggtaa gtccttattr gcagcatgag aacagactaa tacacatggc    60

<210> SEQ ID NO 526
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs5006678, location, BP: 9:111538148

<400> SEQUENCE: 526
aacctcgaaa tctttttttt ttttttttty tccccagttt caagagttta agccttcatg    60

<210> SEQ ID NO 527
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs5006679, location, BP: 9:111538149

<400> SEQUENCE: 527
acctcgaaat cttttttttt tttttttty ccccagtttc aagagtttaa gccttcatgg    60

<210> SEQ ID NO 528
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs7849649, location, BP: 9:131696704

<400> SEQUENCE: 528
aaaaaaaaaa aaaaaagaaa aggaaaaagm atggggaaac tggggaaact gaagcctgaa    60

<210> SEQ ID NO 529
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs1907370, location, BP: 10:27968343

<400> SEQUENCE: 529
ccacttggga agggccgggg gtgggcagty tctgtgttca aagtgatttt agttcaaaaa    60
```

```
<210> SEQ ID NO 530
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs35957931, location, BP: 12:74877668

<400> SEQUENCE: 530
catctctatt aaaaatacaa aattagccar gcttggtggt gcacgcctgt aatcccagct    60

<210> SEQ ID NO 531
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs1824539, location, BP: 12:74879965

<400> SEQUENCE: 531
gtttaggaat catgcagctg gaggctacay gattctgacc ctccctaaac tgctcctaag    60

<210> SEQ ID NO 532
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs77474403, location, BP: 12:74889088

<400> SEQUENCE: 532
ttcaaggaga actacaaacc actgctcaas gaaataaaag aggacacaaa caaatggaag    60

<210> SEQ ID NO 533
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs7300059, location, BP: 12:74891319

<400> SEQUENCE: 533
agaagtggaa ataaaaatat atttggtagr attataatct tcctaggtag aaatgttata    60

<210> SEQ ID NO 534
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs7304361, location, BP: 12:74892234

<400> SEQUENCE: 534
atgtttaata ttaaatcata ctacatgtar ttcataaaat tgtggacaac caaatgcatg    60

<210> SEQ ID NO 535
<211> LENGTH: 60
<212> TYPE: DNA
```

<213> ORGANISM: Artificial sequence
<220> FEATURE:
<223> OTHER INFORMATION: Description of sequence: single nucleotide
    polymorphism
<220> FEATURE:
<223> OTHER INFORMATION: name: rs202095841, location, BP: 12:74900231

<400> SEQUENCE: 535
attagtcttg ctagtggttt atcaattttr ttgatccttt caaaaaacca gctcctggat    60

<210> SEQ ID NO 536
<211> LENGTH: 60
<212> TYPE: DNA
<213> ORGANISM: Artificial sequence
<220> FEATURE:
<223> OTHER INFORMATION: Description of sequence: single nucleotide
    polymorphism
<220> FEATURE:
<223> OTHER INFORMATION: name: rs147414753, location, BP: 12:74901707

<400> SEQUENCE: 536
gtctgatggg cttccctttg cgggtaaccy gacctttctc tctggctgcc cttaacattt    60

<210> SEQ ID NO 537
<211> LENGTH: 60
<212> TYPE: DNA
<213> ORGANISM: Artificial sequence
<220> FEATURE:
<223> OTHER INFORMATION: Description of sequence: single nucleotide
    polymorphism
<220> FEATURE:
<223> OTHER INFORMATION: name: rs12821034, location, BP: 12:74902303

<400> SEQUENCE: 537
gatcgtctga agccttcttc tctcagctcs tcaaagtcat tctccatcca gctttgttcc    60

<210> SEQ ID NO 538
<211> LENGTH: 60
<212> TYPE: DNA
<213> ORGANISM: Artificial sequence
<220> FEATURE:
<223> OTHER INFORMATION: Description of sequence: single nucleotide
    polymorphism
<220> FEATURE:
<223> OTHER INFORMATION: name: rs36153793, location, BP: 12:74902947

<400> SEQUENCE: 538
gatctcagac tgctgtgcta gcaatcagcs agactccgtg ggcgtaggac cctctgagcc    60

<210> SEQ ID NO 539
<211> LENGTH: 60
<212> TYPE: DNA
<213> ORGANISM: Artificial sequence
<220> FEATURE:
<223> OTHER INFORMATION: Description of sequence: single nucleotide
    polymorphism
<220> FEATURE:
<223> OTHER INFORMATION: name: rs7962722, location, BP: 12:74908207

<400> SEQUENCE: 539
ggatggagtg cacccaaaa actcagagay gccagtaacc acagagcccc atgggagtgt    60

<210> SEQ ID NO 540
<211> LENGTH: 60
<212> TYPE: DNA
<213> ORGANISM: Artificial sequence
<220> FEATURE:
<223> OTHER INFORMATION: Description of sequence: single nucleotide
    polymorphism

```
<220> FEATURE:
<223> OTHER INFORMATION: name: rs12816163, location, BP: 12:74910670

<400> SEQUENCE: 540
gtttagctta ataaagatac tgaaggatay gcataccaat agttataagt atctctttat    60

<210> SEQ ID NO 541
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs4547177, location, BP: 12:74914614

<400> SEQUENCE: 541
catgagaccc attcactatc atgagaagas cacgggaaag accagtccca atgattcagt    60

<210> SEQ ID NO 542
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs2365919, location, BP: 12:74914810

<400> SEQUENCE: 542
tttagcattc tcaacaagca gccaatgaas tatatggcct gacgtgttat gtaatagagt    60

<210> SEQ ID NO 543
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs35454023, location, BP: 12:74915296

<400> SEQUENCE: 543
tacaaattat tcagttatgc atgcattcar cacttatata ttcagtatta ggtgtgttcc    60

<210> SEQ ID NO 544
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs58783285, location, BP: 12:74915984

<400> SEQUENCE: 544
ccccagttga ggtgtgacat aatggtggcy gggtcataag gatggtgatg atttagaaag    60

<210> SEQ ID NO 545
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs1826588, location, BP: 12:74917553

<400> SEQUENCE: 545
```
tgtcaatgga taaatggccc caaaatgtgr aatatgagaa cgagatctct gaatgttttt    60

<210> SEQ ID NO 546
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs1493810, location, BP: 12:74920470

<400> SEQUENCE: 546
gaaagatggt aagagcatct atgtttaagk ggaagataat ctcactgcac taaactgtgt    60

<210> SEQ ID NO 547
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs34852307, location, BP: 12:74922159

<400> SEQUENCE: 547
taaccatcat aagtccaacc tttatcaacr tgacacccat acacatctcc ttaaaccata    60

<210> SEQ ID NO 548
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs2605342, location, BP: 12:74922723

<400> SEQUENCE: 548
ttctttgaca gagtgcttta aaaacgtgay gaaatatcaa ttttatcaat agttgaaaat    60

<210> SEQ ID NO 549
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs2605340, location, BP: 12:74923340

<400> SEQUENCE: 549
tattgagaca gagtctcact ttgtcagcar gctggagtgc tgtggcacga tctcggctca    60

<210> SEQ ID NO 550
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs12821741, location, BP: 12:74923633

<400> SEQUENCE: 550
actttaataa caagtatctg taattaatak atgagaaatt ctgagataaa atcacgttag    60

-continued

```
<210> SEQ ID NO 551
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs1493801, location, BP: 12:74924552

<400> SEQUENCE: 551
aatgaagata ttatttcagt ttcctccttty ttctctcaga tgggagaaat gaaaaaatgc    60

<210> SEQ ID NO 552
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs1461045, location, BP: 12:74925689

<400> SEQUENCE: 552
taattttgca caactgtagg ctaatgtaak tgttctgagc acatttaagg taagctaaac    60

<210> SEQ ID NO 553
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs1493800, location, BP: 12:74926002

<400> SEQUENCE: 553
ccacattagt ataatattct acttactaay tacaggtagc ttggaattac tgtttctttc    60

<210> SEQ ID NO 554
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs17113674, location, BP: 12:74926682

<400> SEQUENCE: 554
ctaaataatt cttttagccc taaaatatgs aggtaattca agatgctcta gggagcagaa    60

<210> SEQ ID NO 555
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs17113675, location, BP: 12:74926988

<400> SEQUENCE: 555
taggccagca attaagggct ttgactccay tctcaggtct atcccttgaa gcactctgct    60

<210> SEQ ID NO 556
<211> LENGTH: 60
<212> TYPE: DNA
<213> ORGANISM: Artificial sequence
```

```
<220> FEATURE:
<223> OTHER INFORMATION: Description of sequence: single nucleotide
      polymorphism
<220> FEATURE:
<223> OTHER INFORMATION: name: rs17113679, location, BP: 12:74927228

<400> SEQUENCE: 556
aattaaaatg tcataataca ttcattttam ttgccttaat ttgtgcacaa ttttaagcaa        60

<210> SEQ ID NO 557
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs60905363, location, BP: 12:74927335

<400> SEQUENCE: 557
gtattgagaa aatcatttag ataataaaam atttctaggc tgggcgcggt ggctcacgcc        60

<210> SEQ ID NO 558
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs34706013, location, BP: 12:74928312

<400> SEQUENCE: 558
aaatacagaa aaggaggccc caccctagaw ttacaaaatc atactctacg tttttaaaag        60

<210> SEQ ID NO 559
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs2126136, location, BP: 12:74929829

<400> SEQUENCE: 559
acttgagttc aggagttcaa gaccatctgk ggcaatatag caagacctcc tccgctaaaa        60

<210> SEQ ID NO 560
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs2605381, location, BP: 12:74929925

<400> SEQUENCE: 560
aagaaattag tctggggttg tggtgcaccs ctgtagtccc agctgcttgg gaggctgagg        60

<210> SEQ ID NO 561
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
```

<223> OTHER INFORMATION: name: rs12832045, location, BP: 12:74930524

<400> SEQUENCE: 561
ctctgtcgcc caggctggag tgcagtggcr ggatctcggc tcactgcaag ctccgcctcc    60

<210> SEQ ID NO 562
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs1493796, location, BP: 12:74931349

<400> SEQUENCE: 562
taaaattttc cacttttcag aggatatcar ttaagcgtgg ctgctgaatt cattagcgaa    60

<210> SEQ ID NO 563
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs590352, location, BP: 12:74932159

<400> SEQUENCE: 563
gaacctggga atgggcctga tcagcagcts cagcgctcac ctccggaatt ccagtagctg    60

<210> SEQ ID NO 564
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs11615704, location, BP: 12:74947219

<400> SEQUENCE: 564
gaggctgtgg caggagaatg gcgtcaaccy gggagacgga gctttcagtg agtggagatc    60

<210> SEQ ID NO 565
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs66994203, location, BP: 12:107400417

<400> SEQUENCE: 565
acacttgcca ataatatgta ttagtaatck tttttttttt tttttttaga tgacatctca    60

<210> SEQ ID NO 566
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs117523785, location, BP: 13:24695615

<400> SEQUENCE: 566
tgaaagtgcc aattcatttc ctgatttttr taatcagtta tgtagtgcta caataaatga    60

<210> SEQ ID NO 567
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs17641976, location, BP: 15:91664657

<400> SEQUENCE: 567
ctaatgtgca gccaagaccc agtgacagar caaaccttca attattatta ctgtttctat    60

<210> SEQ ID NO 568
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs17515887, location, BP: 15:91665392

<400> SEQUENCE: 568
gaactcccaa tatgtgctaa accatctccy ctttggactc ccactatctc agctactaga    60

<210> SEQ ID NO 569
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs7208104, location, BP: 17:13640730

<400> SEQUENCE: 569
gacactgtct tcaccattct gattacatam gcacagaaaa ttatttagta ggacacttaa    60

<210> SEQ ID NO 570
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs8081904, location, BP: 17:13645480

<400> SEQUENCE: 570
aatgcacatt tcttttttt ttttgagacr gactttgct ctgttaccca ggctggagta    60

<210> SEQ ID NO 571
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs12600563, location, BP: 17:70243206

<400> SEQUENCE: 571
ctacactagt ggagcccag tctggtgacy gggtcagcca gtctgttcaa aggctgtctg    60

<210> SEQ ID NO 572

```
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs142226688, location, BP: 19:54170960

<400> SEQUENCE: 572
cctattatcc tagcactttg ggaggccgar gagggcggat cacaaggcca ggagttcgag    60

<210> SEQ ID NO 573
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs111246464, location, BP: 20:51381201

<400> SEQUENCE: 573
atgtataacc caagttatac aagtatgtay gtataaccca agttatacat gtatgtacat    60

<210> SEQ ID NO 574
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs4583526, location, BP: 20:55270493

<400> SEQUENCE: 574 ttatttttaag gaaatacact catgcggttr tggaggttgg caagttcaaa atggcaggct    60

<210> SEQ ID NO 575
<211> LENGTH: 60
<212> TYPE: DNA
<213> ORGANISM: Artificial sequence
<220> FEATURE:
<223> OTHER INFORMATION: Description of sequence: single nucleotide
      polymorphism
<220> FEATURE:
<223> OTHER INFORMATION: name: rs56242654, location, BP: X:166155

<400> SEQUENCE: 575
agactatgca acctttagag tctgcactgk gcctaggtct cattgagggc agatagagac    60

<210> SEQ ID NO 576
<211> LENGTH: 25
<212> TYPE: DNA
<213> ORGANISM: Artificial sequence
<220> FEATURE:
<223> OTHER INFORMATION: Description of sequence: primer
<220> FEATURE:
<223> OTHER INFORMATION: name: IL1RL1, direction: Forward

<400> SEQUENCE: 576
agacttttaa atgttcagga tgttt                                          25

<210> SEQ ID NO 577
<211> LENGTH: 18
<212> TYPE: DNA
<213> ORGANISM: Artificial sequence
<220> FEATURE:
<223> OTHER INFORMATION: Description of sequence: primer
```

```
<220> FEATURE:
<223> OTHER INFORMATION: name: IL1RL1, direction: Reverse

<400> SEQUENCE: 577
cccagaagca gggaaatg                                                    18

<210> SEQ ID NO 578
<211> LENGTH: 2542
<212> TYPE: DNA
<213> ORGANISM: Artificial sequence
<220> FEATURE:
<223> OTHER INFORMATION: Description of sequence: transcript, gene:
      sST2, name: NM_003856.2

<400> SEQUENCE: 578
gaggagggac ctacaaagac tggaaactat tcttagctcc gtcactgact ccaagttcat     60
cccctctgtc tttcagtttg gttgagatat aggctactct tcccaactca gtcttgaaga    120
gtatcaccaa ctgcctcatg tgtggtgacc ttcactgtcg tatgccagtg actcatctgg    180
agtaatctca acaacgagtt accaatactt gctcttgatt gataaacaga atggggtttt    240
ggatcttagc aattctcaca attctcatgt attccacagc agcaaagttt agtaaacaat    300 catgggcct ggaaatgag gctttaattg taagatgtcc tagacaagga aaacctagtt     360
acaccgtgga ttggtattac tcacaaacaa acaaaagtat tcccactcag gaaagaaatc    420
gtgtgtttgc ctcaggccaa cttctgaagt ttctaccagc tgcagttgct gattctggta    480
tttatacctg tattgtcaga agtcccacat tcaataggac tggatatgcg aatgtcacca    540
tatataaaaa acaatcagat tgcaatgttc cagattattt gatgtattca acagtatctg    600
gatcagaaaa aaattccaaa atttattgtc ctaccattga cctctacaac tggacagcac    660
ctcttgagtg gtttaagaat tgtcaggctc ttcaaggatc aaggtacagg gcgcacaagt    720 cattttggt cattgataat gtgatgactg aggacgcagg tgattacacc tgtaaattta    780
tacacaatga aaatggagcc aattatagtg tgacggcgac caggtccttc acggtcaagg    840
atgagcaagg ctttctctg tttccagtaa tcggagcccc tgcacaaaat gaaataaagg    900
aagtggaaat tggaaaaaac gcaaacctaa cttgctctgc ttgttttgga aaaggcactc    960
agttcttggc tgccgtcctg tggcagctta atggaacaaa aattacagac tttggtgaac   1020
caagaattca acaagaggaa gggcaaaatc aaagtttcag caatgggctg gcttgtctag   1080
acatggtttt aagaatagct gacgtgaagg aagaggattt attgctgcag tacgactgtc   1140 tggcccctgaa tttgcatggc ttgagaaggc acaccgtaag actaagtagg aaaaatccaa   1200
gtaaggagtg tttctgagac tttgatcacc tgaactttct ctagcaagtg taagcagaat   1260
ggagtgtggt tccaagagat ccatcaagac aatgggaatg gcctgtgcca taaaatgtgc   1320
ttctcttctt cgggatgttg tttgctgtct gatctttgta gactgttcct gtttgctggg   1380
agcttctctg ctgcttaaat tgttcgtcct ccccactcc ctcctatcgt tggtttgtct   1440
agaacactca gctgcttctt tggtcatcct tgttttctaa ctttatgaac tccctctgtg   1500
tcactgtatg tgaaaggaaa tgcaccaaca accgtaaact gaacgtgttc ttttgtgctc   1560
ttttataact tgcattacat gttgtaagca tggtccgttc tatacctttt tctggtcata   1620
atgaacactc attttgttag cgagggtggt aaagtgaaca aaaaggggaa gtatcaaact   1680
actgccattt cagtgagaaa atcctaggtg ctactttata ataagacatt tgttaggcca   1740
ttcttgcatt gatataaaga aatacctgag actgggtgat ttatatgaaa agaggtttaa   1800
ttggctcaca gttctgcagg ctgtatggga agcatggcgg catctgcttc tggggacacc   1860
```

-continued

```
tcaggagctt tactcatggc agaaggcaaa gcaaaggcag gcacttcaca cagtaaaagc   1920
aggagcgaga gagaggtgcc acactgaaac agccagatct catgagaagt cactcactat   1980
tgcaaggaca gcatcaaaga gatggtgcta aaccattcat gatgaactca cccccatgat   2040
ccaatcacct cccaccaggc tccacctcga atactgggga ttaccattca gcatgagatt   2100
tgggcaggaa cacagaccca aaccatacca cacacattat cattgttaaa ctttgtaaag   2160
tatttaaggt acatggaaca cacgggaagt ctggtagctc agcccatttc tttattgcat   2220
ctgttattca ccatgtaatt caggtaccac gtattccagg gagcctttct tggccctcag   2280
tttgcagtat acacactttc caagtactct tgtagcatcc tgtttgtatc atagcactgg   2340
tcacattgcc ttacctaaat ctgtttgaca gtctgctcaa cacgactgca agctccatga   2400
gggcagggac atcatctctt ccatctttgg gtccttagtg caatacctgg cagctagcca   2460
gtgctcagct aaatatttgt tgactgaata atgaatgca caaccaaaaa aaaaaaaaaa   2520
aaaaaaaaaa aaaaaaaaaa aa                                            2542
```

<210> SEQ ID NO 579
<211> LENGTH: 328
<212> TYPE: PRT
<213> ORGANISM: Artificial sequence
<220> FEATURE:
<223> OTHER INFORMATION: Description of sequence: protein, gene: sST2, name: NP_003847.2

<400> SEQUENCE: 579

```
Met Gly Phe Trp Ile Leu Ala Ile Leu Thr Ile Leu Met Tyr Ser Thr
 1               5                  10                  15

Ala Ala Lys Phe Ser Lys Gln Ser Trp Gly Leu Glu Asn Glu Ala Leu
                20                  25                  30

Ile Val Arg Cys Pro Arg Gln Gly Lys Pro Ser Tyr Thr Val Asp Trp
            35                  40                  45

Tyr Tyr Ser Gln Thr Asn Lys Ser Ile Pro Thr Gln Glu Arg Asn Arg
        50                  55                  60

Val Phe Ala Ser Gly Gln Leu Leu Lys Phe Leu Pro Ala Ala Val Ala
 65                  70                  75                  80

Asp Ser Gly Ile Tyr Thr Cys Ile Val Arg Ser Pro Thr Phe Asn Arg
                 85                  90                  95

Thr Gly Tyr Ala Asn Val Thr Ile Tyr Lys Lys Gln Ser Asp Cys Asn
            100                 105                 110

Val Pro Asp Tyr Leu Met Tyr Ser Thr Val Ser Gly Ser Glu Lys Asn
        115                 120                 125

Ser Lys Ile Tyr Cys Pro Thr Ile Asp Leu Tyr Asn Trp Thr Ala Pro
    130                 135                 140

Leu Glu Trp Phe Lys Asn Cys Gln Ala Leu Gln Gly Ser Arg Tyr Arg
145                 150                 155                 160

Ala His Lys Ser Phe Leu Val Ile Asp Asn Val Met Thr Glu Asp Ala
                165                 170                 175

Gly Asp Tyr Thr Cys Lys Phe Ile His Asn Glu Asn Gly Ala Asn Tyr
            180                 185                 190

Ser Val Thr Ala Thr Arg Ser Phe Thr Val Lys Asp Glu Gln Gly Phe
        195                 200                 205

Ser Leu Phe Pro Val Ile Gly Ala Pro Ala Gln Asn Glu Ile Lys Glu
    210                 215                 220

Val Glu Ile Gly Lys Asn Ala Asn Leu Thr Cys Ser Ala Cys Phe Gly
```

```
                    225                 230                 235                 240
Lys Gly Thr Gln Phe Leu Ala Ala Val Leu Trp Gln Leu Asn Gly Thr
                245                 250                 255

Lys Ile Thr Asp Phe Gly Glu Pro Arg Ile Gln Gln Glu Glu Gly Gln
            260                 265                 270

Asn Gln Ser Phe Ser Asn Gly Leu Ala Cys Leu Asp Met Val Leu Arg
        275                 280                 285

Ile Ala Asp Val Lys Glu Glu Asp Leu Leu Leu Gln Tyr Asp Cys Leu
    290                 295                 300

Ala Leu Asn Leu His Gly Leu Arg Arg His Thr Val Arg Leu Ser Arg
305                 310                 315                 320

Lys Asn Pro Ser Lys Glu Cys Phe
                325

<210> SEQ ID NO 580
<211> LENGTH: 1997
<212> TYPE: DNA
<213> ORGANISM: Artificial sequence
<220> FEATURE:
<223> OTHER INFORMATION: Description of sequence: transcript, gene:
      IL1RL1, name: NM_016232.5

<400> SEQUENCE: 580
gagttgtgaa actgtgggca gaaagttgag gaagaaagaa ctcaagtaca acccaatgag      60
gttgagatat aggctactct tcccaactca gtcttgaaga gtatcaccaa ctgcctcatg     120
tgtggtgacc tcactgtcg tatgccagtg actcatctgg agtaatctca acaacgagtt     180
accaatactt gctcttgatt gataaacaga atggggtttt ggatcttagc aattctcaca     240
attctcatgt attccacagc agcaaagttt agtaaacaat catggggcct ggaaaatgag     300
gctttaattg taagatgtcc tagacaagga aaacctagtt acaccgtgga ttggtattac     360
tcacaaacaa acaaaagtat tcccactcag gaaagaaatc gtgtgtttgc ctcaggccaa     420
cttctgaagt ttcctaccagc tgcagttgct gattctggta tttatacctg tattgtcaga     480
agtcccacat tcaataggac tggatatgcg aatgtcacca tatataaaaa acaatcagat     540
tgcaatgttc cagattattt gatgtattca acagtatctg gatcagaaaa aaattccaaa     600
atttattgtc ctaccattga cctctacaac tggacagcac ctcttgagtg gtttaagaat     660
tgtcaggctc ttcaaggatc aaggtacagg gcgcacaagt catttttggt cattgataat     720
gtgatgactg aggacgcagg tgattacacc tgtaaattta cacaatgaa aatggagcc      780 aattatagtg tgacggcgac caggtccttc acggtcaagg atgagcaagg cttttctctg     840
tttccagtaa tcggagcccc tgcacaaaat gaaataaagg aagtggaaat tggaaaaaac     900
gcaaacctaa cttgctctgc ttgttttgga aaaggcactc agttcttggc tgccgtcctg     960
tggcagctta atggaacaaa aattacagac tttggtgaac caagaattca acaagaggaa    1020
gggcaaaatc aaagtttcag caatgggctg gcttgtctag acatggtttt aagaatagct    1080
gacgtgaagg aagaggattt attgctgcag tacgactgtc tggccctgaa tttgcatggc    1140
ttgagaaggc acaccgtaag actaagtagg aaaaatccaa ttgatcatca tagcatctac    1200
tgcataattg cagtatgtag tgtatttttta atgctaatca atgtcctggt tatcatccta    1260
aaaatgttct ggattgaggc cactctgctc tggagagaca tagctaaacc ttacaagact    1320
aggaatgatg gaaagctcta tgatgcttat gttgtctacc cacgaactac aaatccagt    1380 acagatgggg ccagtcgtgt agagcacttt gttcaccaga ttctgcctga tgttcttgaa    1440
```

```
aataaatgtg gctataccvt atgcatttat gggagagata tgctacctgg agaagatgta    1500
gtcactgcag tggaaaccaa catacgaaag agcaggcggc acattttcat cctgacccct    1560
cagatcactc acaataagga gtttgcctac gagcaggagg ttgccctgca ctgtgccctc    1620
atccagaacg acgccaaggt gatacttatt gagatggagg ctctgagcga gctggacatg    1680
ctgcaggctg aggcgcttca ggactccctc cagcatctta tgaaagtaca ggggaccatc    1740
aagtggaggg aggaccacat tgccaataaa aggtccctga attctaaatt ctggaagcac    1800
gtgaggtacc aaatgcctgt gccaagcaaa attcccagaa aggcctctag tttgactccc    1860
ttggctgccc agaagcaata gtgcctgctg tgatgtgcaa aggcatctga gtttgaagct    1920
ttcctgactt ctcctagctg gcttatgccc ctgcactgaa gtgtgaggag caggaatatt    1980
aaagggattc aggcctc                                                   1997
```

<210> SEQ ID NO 581
<211> LENGTH: 556
<212> TYPE: PRT
<213> ORGANISM: Artificial sequence
<220> FEATURE:
<223> OTHER INFORMATION: Description of sequence: protein, gene: IL1RL1, name: NP_057316.3

<400> SEQUENCE: 581

```
Met Gly Phe Trp Ile Leu Ala Ile Leu Thr Ile Leu Met Tyr Ser Thr
1               5                   10                  15

Ala Ala Lys Phe Ser Lys Gln Ser Trp Gly Leu Glu Asn Glu Ala Leu
            20                  25                  30

Ile Val Arg Cys Pro Arg Gln Gly Lys Pro Ser Tyr Thr Val Asp Trp
        35                  40                  45

Tyr Tyr Ser Gln Thr Asn Lys Ser Ile Pro Thr Gln Glu Arg Asn Arg
    50                  55                  60

Val Phe Ala Ser Gly Gln Leu Leu Lys Phe Leu Pro Ala Ala Val Ala
65                  70                  75                  80

Asp Ser Gly Ile Tyr Thr Cys Ile Val Arg Ser Pro Thr Phe Asn Arg
                85                  90                  95

Thr Gly Tyr Ala Asn Val Thr Ile Tyr Lys Lys Gln Ser Asp Cys Asn
            100                 105                 110

Val Pro Asp Tyr Leu Met Tyr Ser Thr Val Ser Gly Ser Glu Lys Asn
        115                 120                 125

Ser Lys Ile Tyr Cys Pro Thr Ile Asp Leu Tyr Asn Trp Thr Ala Pro
    130                 135                 140

Leu Glu Trp Phe Lys Asn Cys Gln Ala Leu Gln Gly Ser Arg Tyr Arg
145                 150                 155                 160

Ala His Lys Ser Phe Leu Val Ile Asp Asn Val Met Thr Glu Asp Ala
                165                 170                 175

Gly Asp Tyr Thr Cys Lys Phe Ile His Asn Glu Asn Gly Ala Asn Tyr
            180                 185                 190

Ser Val Thr Ala Thr Arg Ser Phe Thr Val Lys Asp Glu Gln Gly Phe
        195                 200                 205

Ser Leu Phe Pro Val Ile Gly Ala Pro Ala Gln Asn Glu Ile Lys Glu
    210                 215                 220

Val Glu Ile Gly Lys Asn Ala Asn Leu Thr Cys Ser Ala Cys Phe Gly
225                 230                 235                 240

Lys Gly Thr Gln Phe Leu Ala Ala Val Leu Trp Gln Leu Asn Gly Thr
                245                 250                 255
```

Lys Ile Thr Asp Phe Gly Glu Pro Arg Ile Gln Gln Glu Glu Gly Gln
                260                 265                 270

Asn Gln Ser Phe Ser Asn Gly Leu Ala Cys Leu Asp Met Val Leu Arg
            275                 280                 285

Ile Ala Asp Val Lys Glu Asp Leu Leu Leu Gln Tyr Asp Cys Leu
290                 295                 300

Ala Leu Asn Leu His Gly Leu Arg Arg His Thr Val Arg Leu Ser Arg
305                 310                 315                 320

Lys Asn Pro Ile Asp His His Ser Ile Tyr Cys Ile Ala Val Cys
                325                 330                 335

Ser Val Phe Leu Met Leu Ile Asn Val Leu Val Ile Ile Leu Lys Met
                340                 345                 350

Phe Trp Ile Glu Ala Thr Leu Leu Trp Arg Asp Ile Ala Lys Pro Tyr
            355                 360                 365

Lys Thr Arg Asn Asp Gly Lys Leu Tyr Asp Ala Tyr Val Val Tyr Pro
370                 375                 380

Arg Asn Tyr Lys Ser Ser Thr Asp Gly Ala Ser Arg Val Glu His Phe
385                 390                 395                 400

Val His Gln Ile Leu Pro Asp Val Leu Glu Asn Lys Cys Gly Tyr Thr
                405                 410                 415

Leu Cys Ile Tyr Gly Arg Asp Met Leu Pro Gly Glu Asp Val Val Thr
                420                 425                 430

Ala Val Glu Thr Asn Ile Arg Lys Ser Arg Arg His Ile Phe Ile Leu
            435                 440                 445

Thr Pro Gln Ile Thr His Asn Lys Glu Phe Ala Tyr Glu Gln Glu Val
450                 455                 460

Ala Leu His Cys Ala Leu Ile Gln Asn Asp Ala Lys Val Ile Leu Ile
465                 470                 475                 480

Glu Met Glu Ala Leu Ser Glu Leu Asp Met Leu Gln Ala Glu Ala Leu
                485                 490                 495

Gln Asp Ser Leu Gln His Leu Met Lys Val Gln Gly Thr Ile Lys Trp
            500                 505                 510

Arg Glu Asp His Ile Ala Asn Lys Arg Ser Leu Asn Ser Lys Phe Trp
            515                 520                 525

Lys His Val Arg Tyr Gln Met Pro Val Pro Ser Lys Ile Pro Arg Lys
530                 535                 540

Ala Ser Ser Leu Thr Pro Leu Ala Ala Gln Lys Gln
545                 550                 555

<210> SEQ ID NO 582
<211> LENGTH: 1786
<212> TYPE: DNA
<213> ORGANISM: Artificial sequence
<220> FEATURE:
<223> OTHER INFORMATION: Description of sequence: transcript, gene:
      CCR3, name: NM_178328.1

<400> SEQUENCE: 582
ctgatggtat tctctgtttca ggagtggtga cgcctaagct atcactggac atatcaagga      60
cttcactaaa ttagcaggta ccactggtct tcttgtgctt atccgggcaa gaacttatcg     120
aaatacaata gaagtttttta cttagaagag attttcagct gctgtggatt ggattatgcc     180
atttggaata agaatgctgt taagagcaca caagccaggt tcctcaagga gaagtgaaat     240
gacaacctca ctagatacag ttgagacctt tggtaccaca tcctactatg atgacgtggg     300
cctgctctgt gaaaaagctg ataccagagc actgatggcc cagtttgtgc cccgctgta      360

```
ctccctggtg ttcactgtgg gcctcttggg caatgtggtg gtggtgatga tcctcataaa    420
atacaggagg ctccgaatta tgaccaacat ctacctgctc aacctggcca tttcggacct    480
gctcttcctc gtcacccttc cattctggat ccactatgtc aggggcata actgggtttt     540
tggccatggc atgtgtaagc tcctctcagg gttttatcac acaggcttgt acagcgagat    600
cttttcata atcctgctga caatcgacag gtacctggcc attgtccatg ctgtgtttgc     660
ccttcgagcc cggactgtca cttttggtgt catcaccagc atcgtcacct ggggcctggc    720
agtgctagca gctcttcctg aatttatctt ctatgagact gaagagttgt tgaagagac     780
tctttgcagt gctcttacc cagaggatac agtatatagc tggaggcatt tccacactct     840
gagaatgacc atcttctgtc tcgttctccc tctgctcgtt atggccatct gctacacagg    900
aatcatcaaa acgctgctga ggtgccccag taaaaaaaag tacaaggcca tccggctcat    960
ttttgtcatc atggcggtgt ttttcatttt ctggacaccc tacaatgtgg ctatccttct   1020
ctcttcctat caatccatct tatttggaaa tgactgtgag cggagcaagc atctggacct   1080
ggtcatgctg gtgacagagg tgatcgccta ctcccactgc tgcatgaacc cggtgatcta   1140
cgcctttgtt ggagagaggt tccggaagta cctgcgccac ttcttccaca ggcacttgct   1200
catgcacctg ggcagataca tcccattcct tcctagtgag aagctggaaa gaaccagctc   1260
tgtctctcca tccacagcag agccggaact ctctattgtg ttttaggtca gatgcagaaa   1320
attgcctaaa gaggaaggac caaggagatg aagcaaacac attaagcctt ccacactcac   1380
ctctaaaaca gtccttcaaa cttccagtgc aacactgaag ctcttgaaga cactgaaata   1440
tacacacagc agtagcagta gatgcatgta ccctaaggtc attaccacag gccaggggct   1500
gggcagcgta ctcatcatca accctaaaaa gcagagctt gcttctctct ctaaaatgag    1560
ttacctacat tttaatgcac ctgaatgtta gatagttact atatgccgct acaaaaaggt   1620
aaaacttttt atatttata cattaacttc agccagctat tgatataaat aaaacatttt    1680
cacacaatac aataagttaa ctattttatt ttctaatgtg cctagttctt tccctgctta   1740
atgaaaagct tgttttttca gtgtgaataa ataatcgtaa gcaaca                 1786
```

<210> SEQ ID NO 583
<211> LENGTH: 376
<212> TYPE: PRT
<213> ORGANISM: Artificial sequence
<220> FEATURE:
<223> OTHER INFORMATION: Description of sequence: protein, gene: CCR3,
      name: NP_847898.1

<400> SEQUENCE: 583

Met Pro Phe Gly Ile Arg Met Leu Leu Arg Ala His Lys Pro Gly Ser
1               5                   10                  15

Ser Arg Arg Ser Glu Met Thr Thr Ser Leu Asp Thr Val Glu Thr Phe
            20                  25                  30

Gly Thr Thr Ser Tyr Tyr Asp Asp Val Gly Leu Leu Cys Glu Lys Ala
        35                  40                  45

Asp Thr Arg Ala Leu Met Ala Gln Phe Val Pro Pro Leu Tyr Ser Leu
    50                  55                  60

Val Phe Thr Val Gly Leu Leu Gly Asn Val Val Val Met Ile Leu
65                  70                  75                  80

Ile Lys Tyr Arg Arg Leu Arg Ile Met Thr Asn Ile Tyr Leu Leu Asn
                85                  90                  95

Leu Ala Ile Ser Asp Leu Leu Phe Leu Val Thr Leu Pro Phe Trp Ile

|  |  |  |  |  |  |  |  |  |  |  |  |
|---|---|---|---|---|---|---|---|---|---|---|---|
|  |  | 100 |  |  |  | 105 |  |  |  | 110 |  |
| His | Tyr | Val | Arg | Gly | His | Asn | Trp | Val | Phe | Gly | His |
|  |  | 115 |  |  |  | 120 |  |  |  | 125 |  |
| Gly | Met | Cys | Lys |  |  |  |  |  |  |  |  |

```
                  100                 105                 110
His Tyr Val Arg Gly His Asn Trp Val Phe Gly His Gly Met Cys Lys
            115                 120                 125

Leu Leu Ser Gly Phe Tyr His Thr Gly Leu Tyr Ser Glu Ile Phe Phe
            130                 135                 140

Ile Ile Leu Leu Thr Ile Asp Arg Tyr Leu Ala Ile Val His Ala Val
145                 150                 155                 160

Phe Ala Leu Arg Ala Arg Thr Val Thr Phe Gly Val Ile Thr Ser Ile
            165                 170                 175

Val Thr Trp Gly Leu Ala Val Leu Ala Ala Leu Pro Glu Phe Ile Phe
            180                 185                 190

Tyr Glu Thr Glu Glu Leu Phe Glu Glu Thr Leu Cys Ser Ala Leu Tyr
            195                 200                 205

Pro Glu Asp Thr Val Tyr Ser Trp Arg His Phe His Thr Leu Arg Met
            210                 215                 220

Thr Ile Phe Cys Leu Val Leu Pro Leu Leu Val Met Ala Ile Cys Tyr
225                 230                 235                 240

Thr Gly Ile Ile Lys Thr Leu Leu Arg Cys Pro Ser Lys Lys Lys Tyr
            245                 250                 255

Lys Ala Ile Arg Leu Ile Phe Val Ile Met Ala Val Phe Phe Ile Phe
            260                 265                 270

Trp Thr Pro Tyr Asn Val Ala Ile Leu Leu Ser Ser Tyr Gln Ser Ile
            275                 280                 285

Leu Phe Gly Asn Asp Cys Glu Arg Ser Lys His Leu Asp Leu Val Met
            290                 295                 300

Leu Val Thr Glu Val Ile Ala Tyr Ser His Cys Cys Met Asn Pro Val
305                 310                 315                 320

Ile Tyr Ala Phe Val Gly Glu Arg Phe Arg Lys Tyr Leu Arg His Phe
            325                 330                 335

Phe His Arg His Leu Leu Met His Leu Gly Arg Tyr Ile Pro Phe Leu
            340                 345                 350

Pro Ser Glu Lys Leu Glu Arg Thr Ser Ser Val Ser Pro Ser Thr Ala
            355                 360                 365

Glu Pro Glu Leu Ser Ile Val Phe
            370                 375
```